(12) United States Patent
LeBrun

(10) Patent No.: US 10,614,530 B2
(45) Date of Patent: Apr. 7, 2020

(54) METHOD AND APPARATUS FOR THE OPTIMIZATION OF ASSETS AND AN ASSET ALLOCATION REGISTER FOR PERSONAL USE, ENTERPRISE OR BUSINESS USE, AND SAVINGS AND RETIREMENT

(71) Applicant: Luke A. LeBrun, Manchester, NH (US)

(72) Inventor: Luke A. LeBrun, Manchester, NH (US)

( * ) Notice: Subject to any disclaimer, the term of this patent is extended or adjusted under 35 U.S.C. 154(b) by 146 days.

(21) Appl. No.: 15/727,458

(22) Filed: Oct. 6, 2017

(65) Prior Publication Data

US 2019/0108595 A1 Apr. 11, 2019

(51) Int. Cl.
*G06Q 40/00* (2012.01)
*G06Q 10/04* (2012.01)

(52) U.S. Cl.
CPC .......... *G06Q 40/128* (2013.12); *G06Q 10/04* (2013.01)

(58) Field of Classification Search
CPC ............................. G06Q 40/00; G06Q 10/04
USPC .......................................................... 705/33
See application file for complete search history.

(56) References Cited

U.S. PATENT DOCUMENTS

| | | | |
|---|---|---|---|
| 8,989,712 B2 * | 3/2015 | Wentker | G06Q 20/10 455/414.1 |
| 2011/0095085 A1 * | 4/2011 | Hilliard | G06Q 20/346 235/379 |

* cited by examiner

*Primary Examiner* — Russell S Glass
(74) *Attorney, Agent, or Firm* — Z IP Law PLLC

(57) ABSTRACT

A method and apparatus for the optimization of asset allocation and an asset allocation register using sub-value indicators and designations to optimize the utilization and availability of assets without the transfer of actual assets. The present invention may be used as shown in the following examples to allocate personal and business enterprise finances or to allocate and designate the utilization of valuables such as heirlooms, jewelry and other items. The allocation register of the present invention also provides to a user or business optimization of assets for savings, retirement, special events or purchases of desired tangible items. Importantly, the asset allocation register supports the user in a way that allows them to pay themselves first by embracing the way they may already think about the assets in their account.

24 Claims, 91 Drawing Sheets

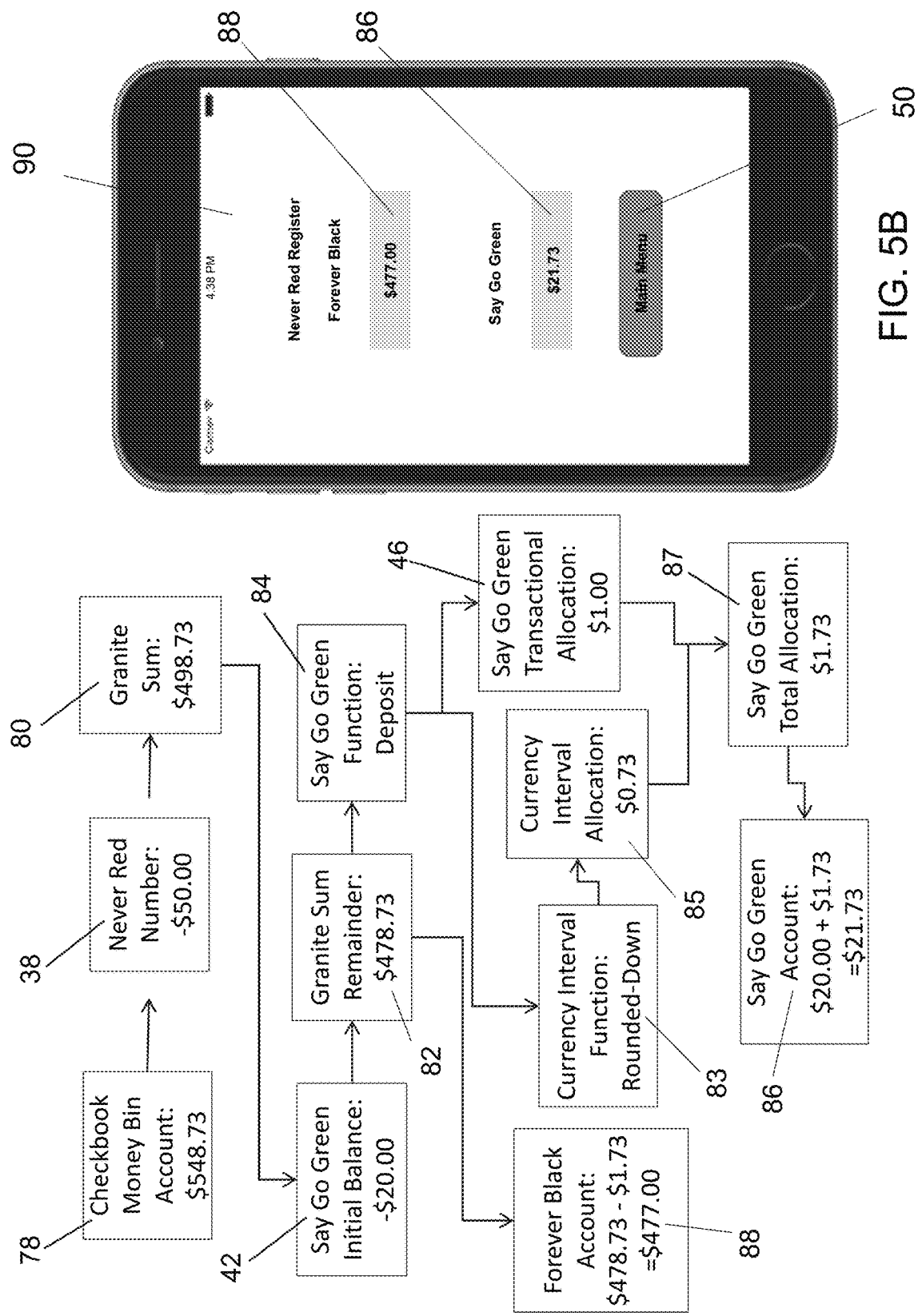

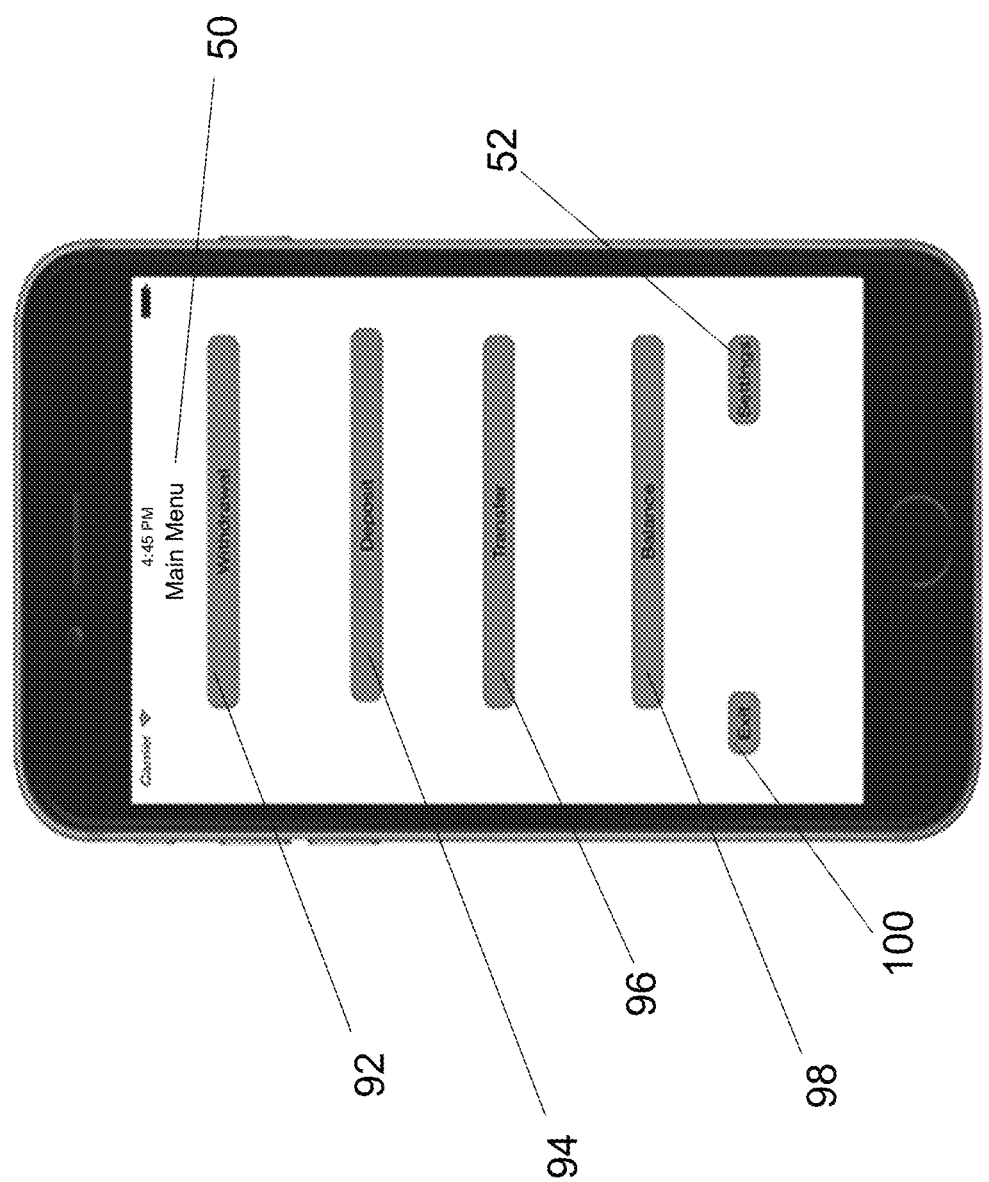

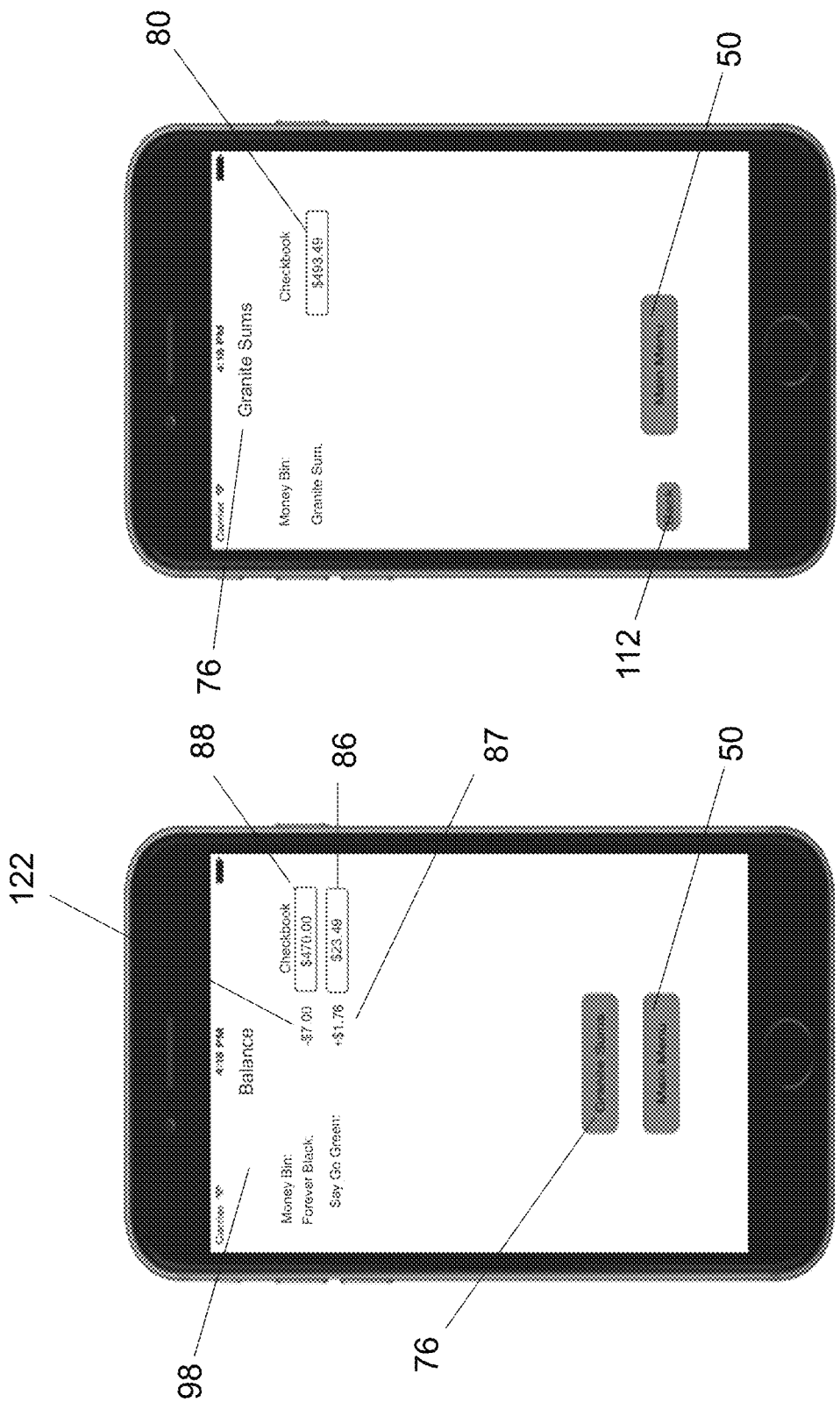

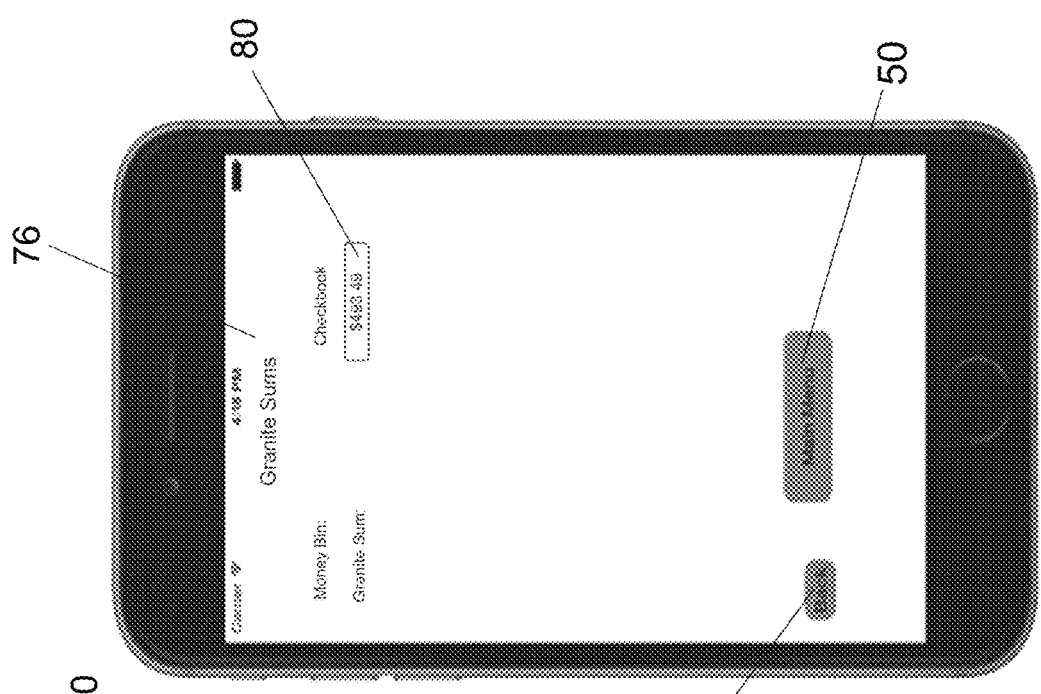
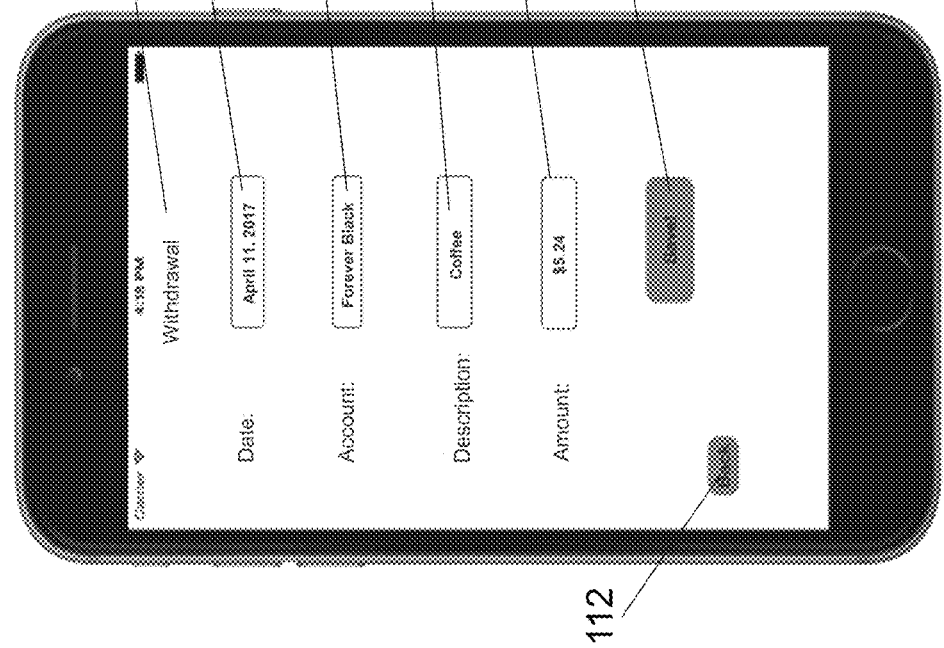
FIG. 9A  FIG. 9B  FIG. 9C

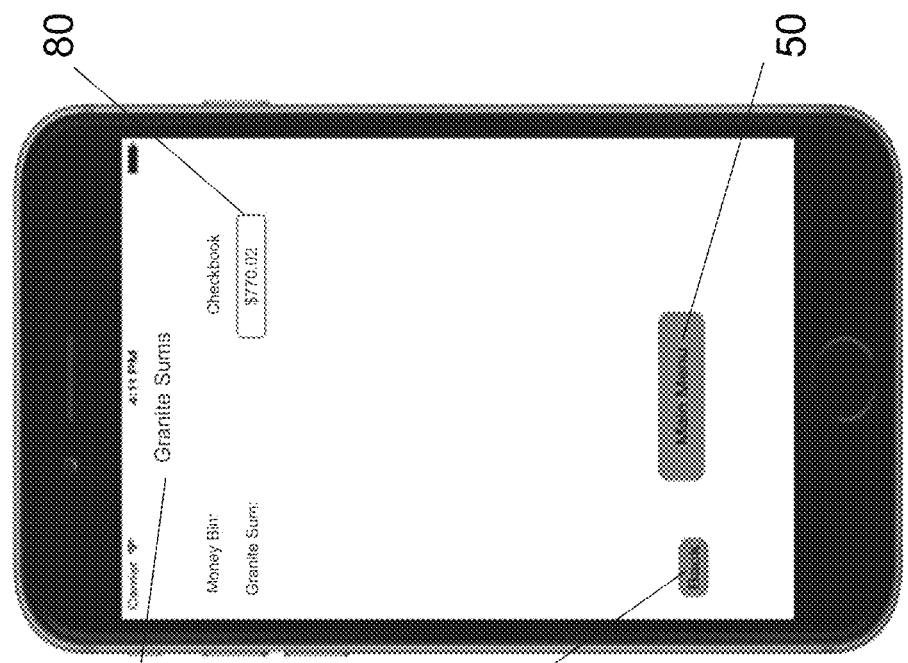
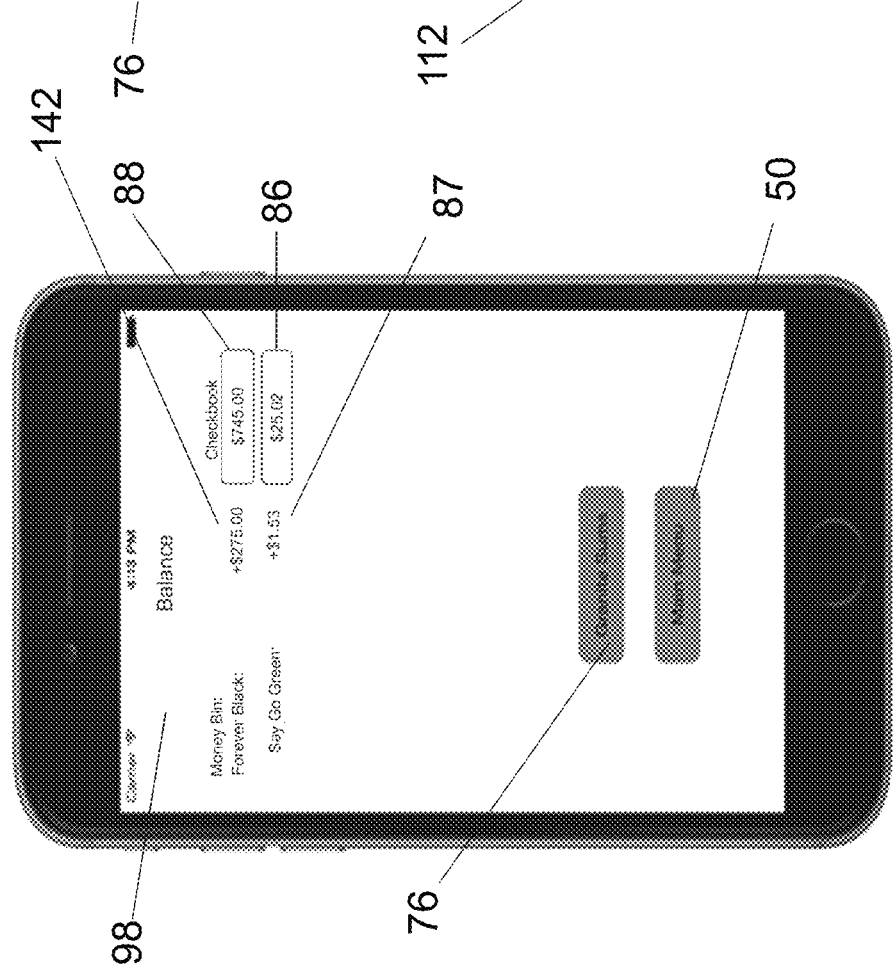
FIG. 11B
FIG. 11A

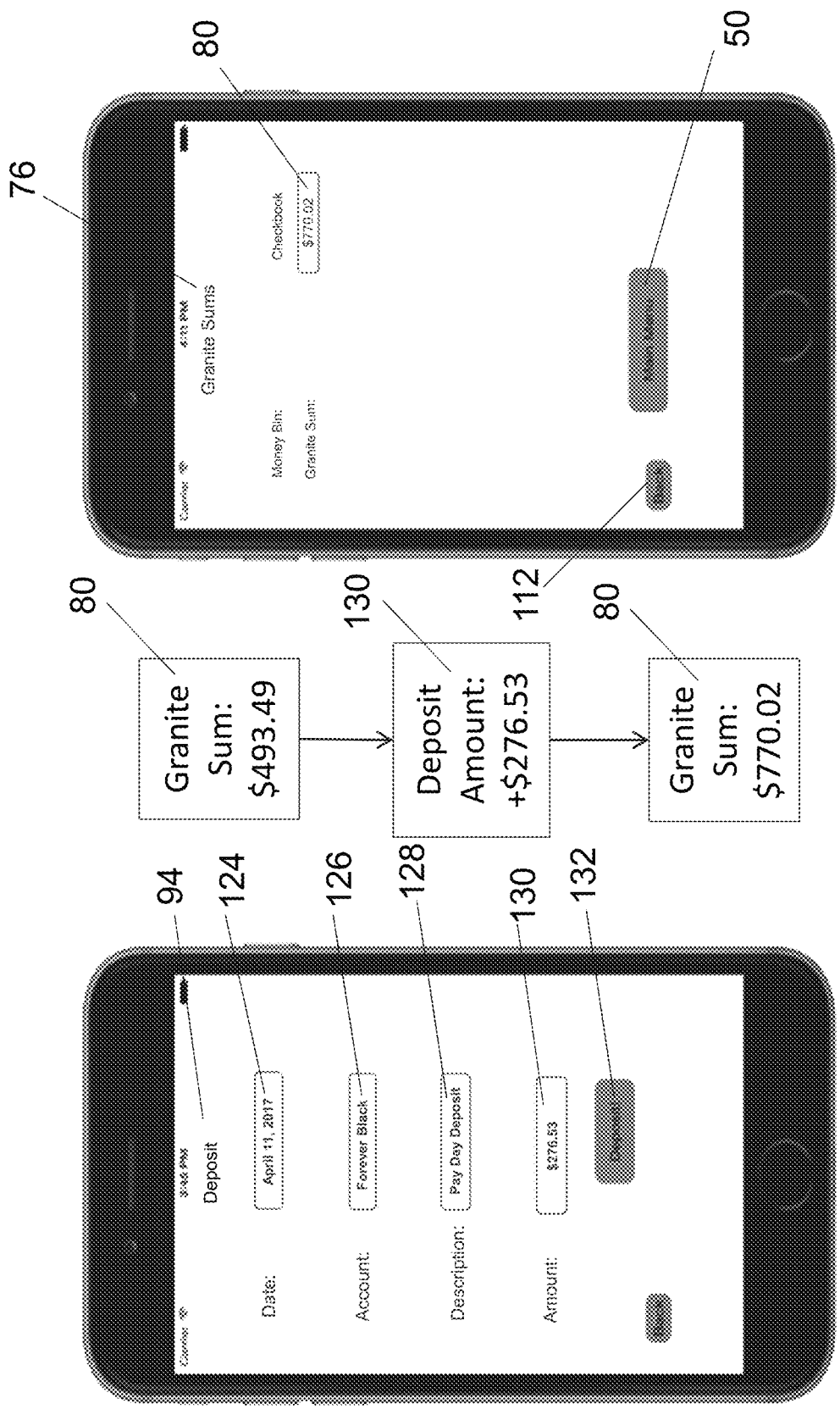

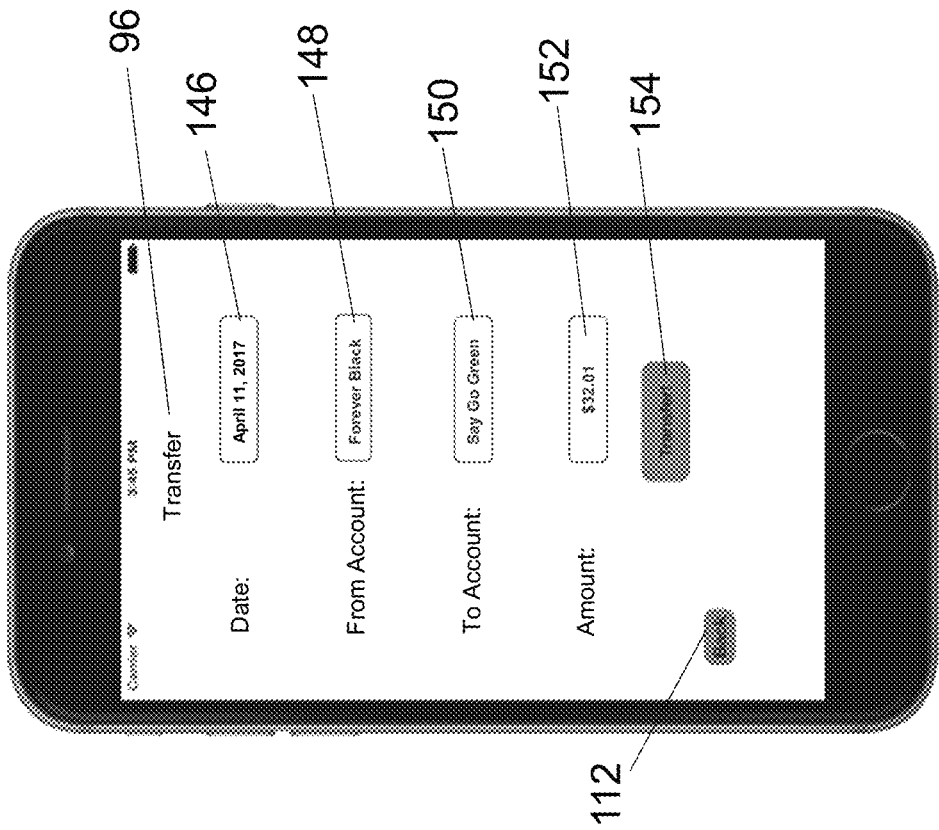
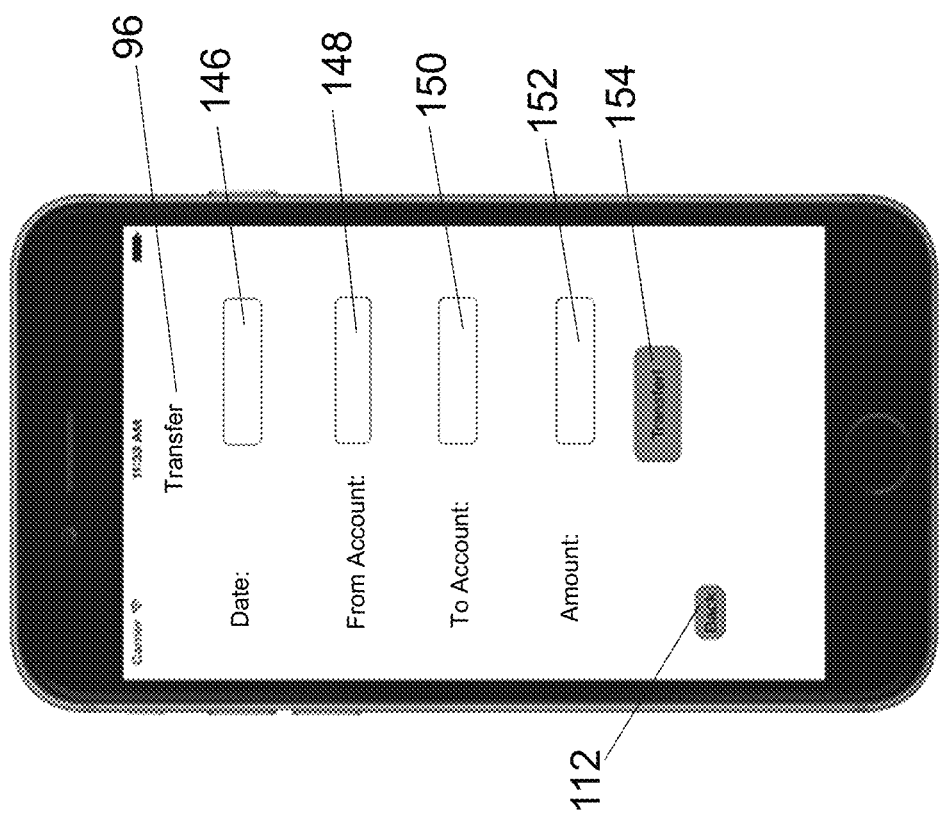
FIG. 13B
FIG. 13A

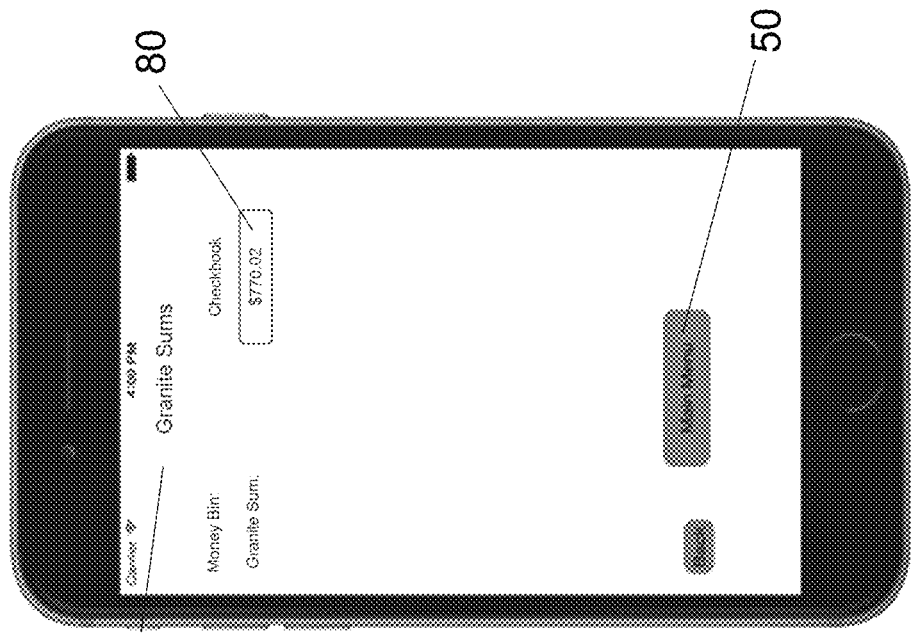
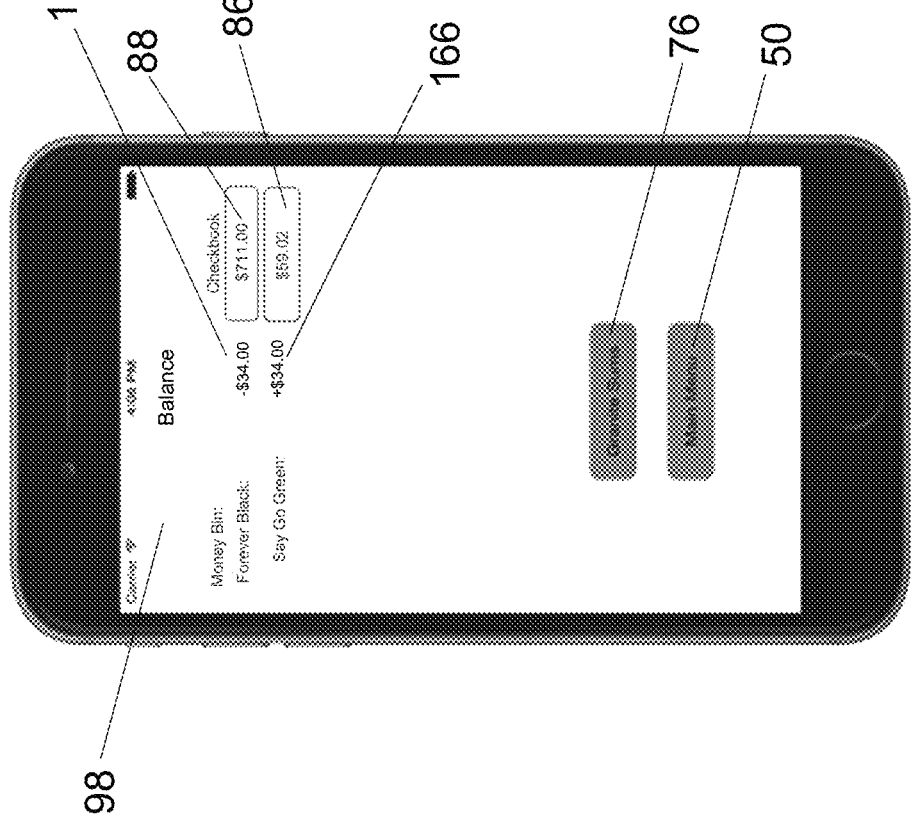
FIG. 13H
FIG. 13G

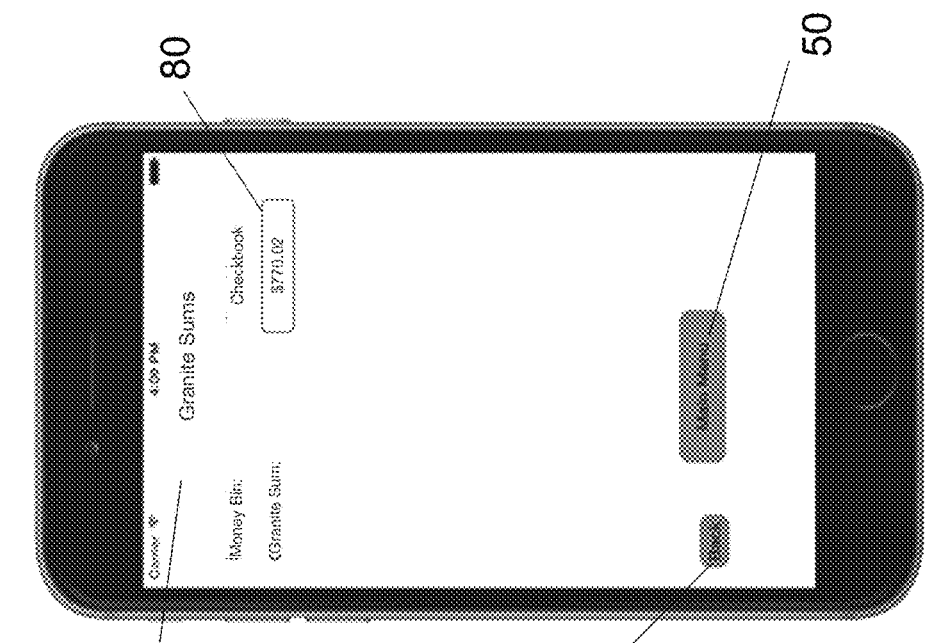
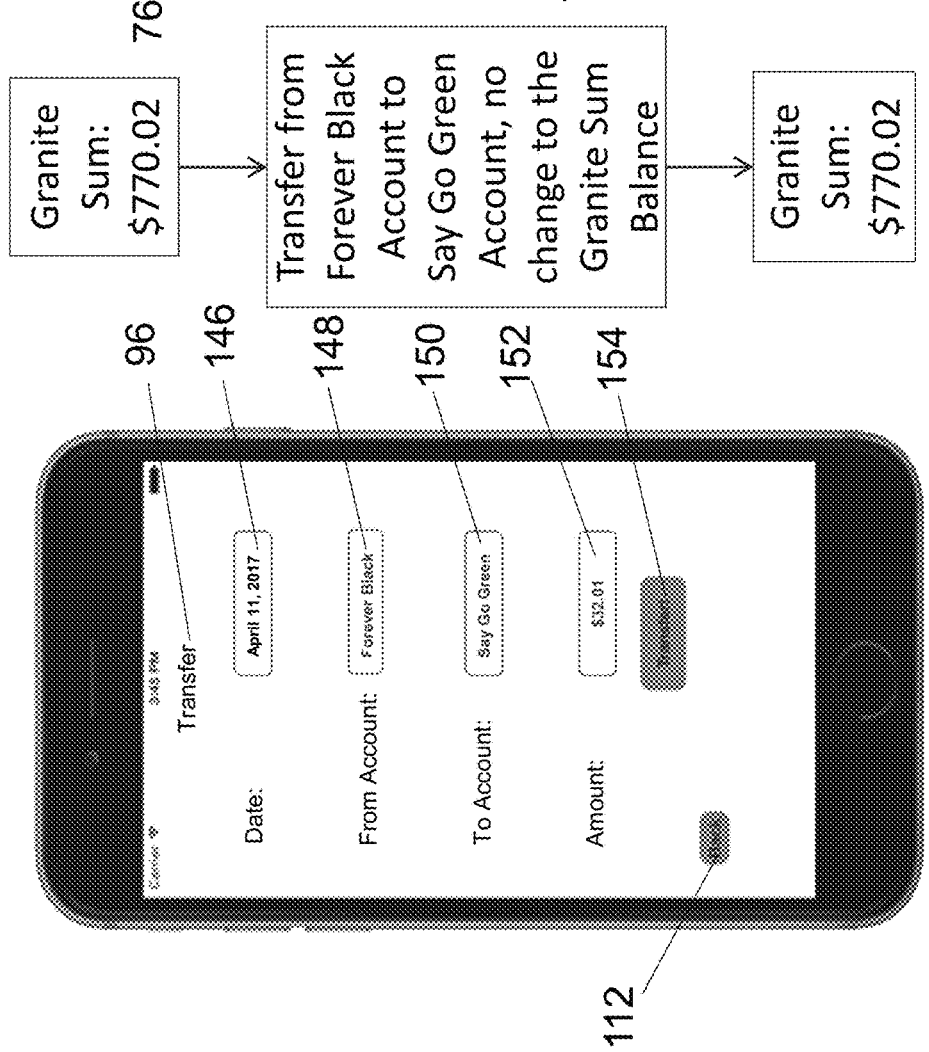
FIG. 14C
FIG. 14B
FIG. 14A

FIG. 17A

| | A | B | C | D | E | F | G | H | I | J | K | L | M |
|---|---|---|---|---|---|---|---|---|---|---|---|---|---|
| 1 | | | THIS IS HOW YOU ARE SAVING IN "CHECKBOOK" | | | | | | | | | | |
| 2 | Code | Date | Description | Withdrawal | Deposit | Transfer | Say Go Green | Amt Removed | Amt Deposited | Forever Black Balance | | Initial Balance | $545.73 |
| 3 | AP | 4/11/2017 | Coffee | $5.39 | | | $1.76 | $7.00 | | $477.38 | | Never Red Number | $50.00 |
| 4 | DEP | 4/11/2017 | Pay Day Deposit (Phase 1) | | $276.53 | | $3.53 | | $275.00 | $478.00 | | Money Bin "Checkbook" Balance | $828.02 |
| 5 | TF | 4/11/2017 | Transfer Forever Black to Say Go Green | | | $92.00 | $1.99 | $34.00 | | $745.00 | | Forever Black | $722.00 |
| 6 | TF | 4/11/2017 | Transfer Say Go Green to Forever Black | | | $2.10 | $3.00 | | $11.00 | $711.00 | | Say Go Green | $48.02 |
| 7 | | | | | | | | | | $722.00 | | Granite Sum | $770.02 |
| 8 | | | | | | | | | | | | | |

FIG. 17B

| | A | B | C | D | E | F | G | H | I |
|---|---|---|---|---|---|---|---|---|---|
| 1 | | | THIS IS THE SAY GO GREEN ACCOUNT REGISTER | | | | | | |
| 2 | Code | Date | Description | Withdrawal | Deposit | Balance | | Say Go Green Balance | $48.02 |
| 3 | DEP | 4/11/2017 | Coffee | | $1.76 | $21.73 | | | |
| 4 | DEP | 4/11/2017 | Pay Day Deposit (Phase 1) | | $1.76 | $23.49 | | | |
| 5 | TF | 4/11/2017 | Transfer Forever Black to Say Go Green | | $1.53 | $25.02 | | | |
| 6 | TF | 4/11/2017 | Transfer Say Go Green to Forever Black | $11.00 | $34.00 | $59.02 | | | |
| 7 | | | | | | $48.02 | | | |

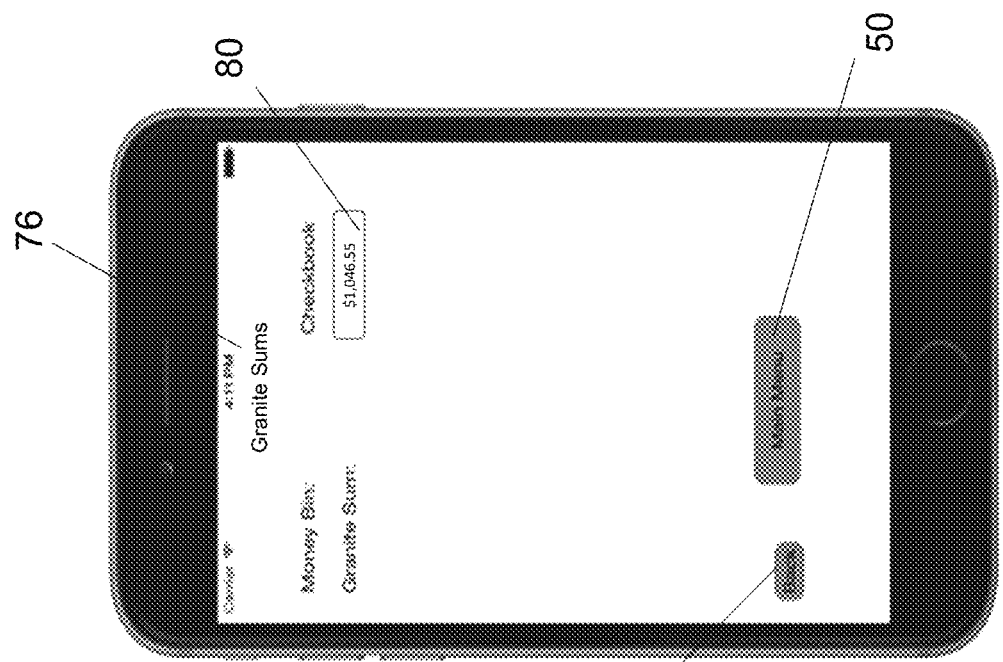
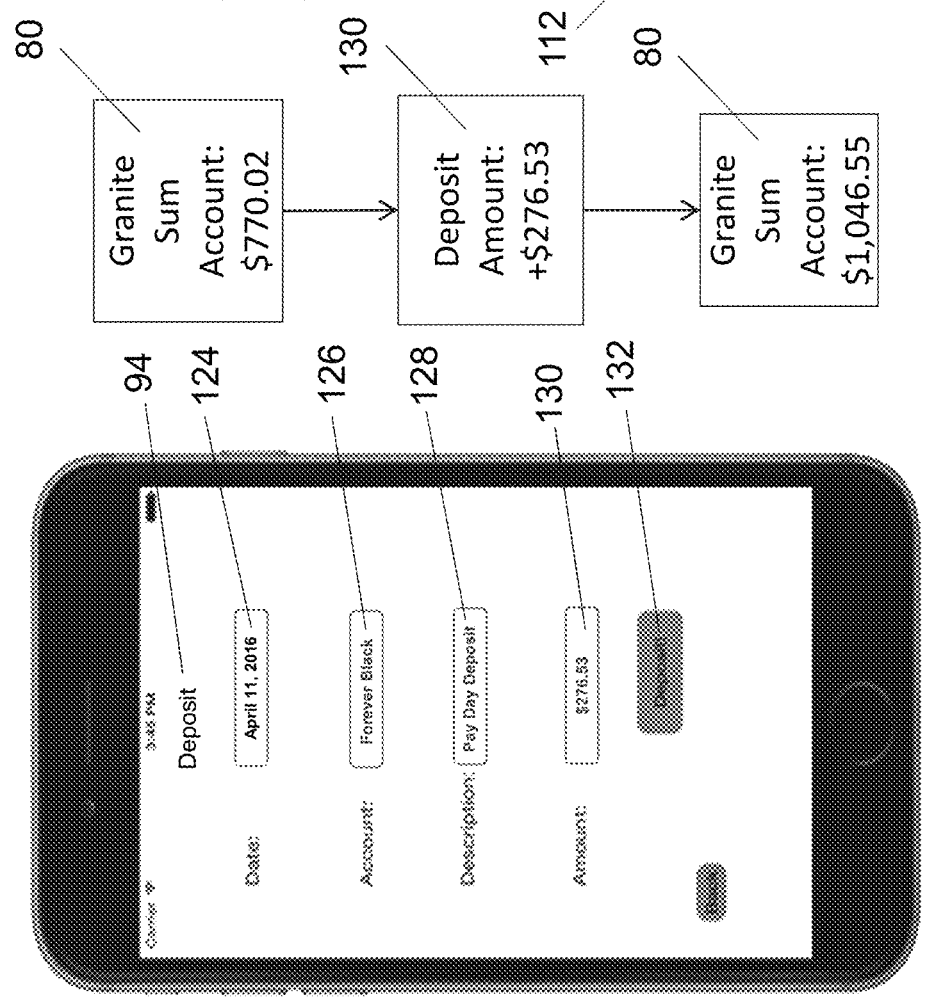
FIG. 21C
FIG. 21B
FIG. 21A

FIG. 22A

| Code | Date | Description | Withdrawal | Deposit | Transfer | Say Go Green | Silver Savings | Amt Removed | Amt Deposited | Forever Black Balance | | Initial Balance | $548.73 |
|---|---|---|---|---|---|---|---|---|---|---|---|---|---|
| | | THIS IS HOW YOU ARE SAVING IN "CHECKBOCK" | | | | | | | | | | Never Red Number | $50.00 |
| AP | 4/11/2017 | Coffee | $1.76 | | | | | | | $477.00 | | Money Bin "Checkbook" Balance | $1,096.55 |
| DEP | 4/11/2017 | Pay Day Deposit (Phase 1) | | $276.53 | | $1.53 | | | $275.00 | $478.00 | | | |
| TF | 4/11/2017 | Transfer Forever Black to Say Go Green | | | $2.02 | $1.99 | | $7.00 | | $745.00 | | Say Go Green | $49.72 |
| TF | 4/11/2017 | Transfer Say Go Green to Forever Black | | | $2.00 | $1.11 | $23.83 | $24.00 | $11.00 | $721.00 | | Silver Savings | $11.83 |
| DEP | 4/11/2017 | Pay Day Deposit (Phase 2) | | $276.39 | | $1.70 | | | $263.00 | $722.08 | | Forever Black | $983.00 |
| | | | | | | | | | | $983.00 | | Granite Sam | $1,046.55 |

FIG. 22B

| Code | Date | Description | Withdrawal | Deposit | Balance | | Say Go Green Balance | $49.72 |
|---|---|---|---|---|---|---|---|---|
| | | THIS IS THE SAY GO GREEN ACCOUNT REGISTER | | | | | | |
| DEP | 4/11/2017 | Coffee | $1.76 | | $21.73 | | | |
| DEP | 4/11/2017 | Pay Day Deposit (Phase 1) | | $1.53 | $23.49 | | | |
| TF | 4/11/2017 | Transfer Forever Black to Say Go Green | | $1.53 | $25.02 | | | |
| TF | 4/11/2017 | Transfer Say Go Green to Forever Black | $34.00 | | $59.02 | | | |
| DEP | 4/11/2017 | Pay Day Deposit (Phase 2) | $11.00 | | $48.02 | | | |
| | | | | $1.70 | $49.72 | | | |

| | A | B | C | D | E | F |
|---|---|---|---|---|---|---|
| 1 | | | THIS IS THE EXACT "CHECKBOOK" REGISTER | | | |
| 2 | Code | Date | Description | Withdrawal | Deposit | Balance |
| 3 | AP | 4/11/2017 | Coffee | $5.24 | | $548.73 |
| 4 | DEP | 4/11/2017 | Pay Day Deposit | | $276.53 | $43.49 |
| 5 | DEP | 4/11/2017 | Pay Day Deposit (Phase 2) | | $276.53 | $820.02 |
| 6 | | | | | | $1,086.55 |

FIG. 22C

| | A | B | C | D | E | F | G | H | I |
|---|---|---|---|---|---|---|---|---|---|
| 1 | | | THIS IS THE SILVER SAVINGS REGISTER | | | | | | |
| 2 | Code | Date | Description | Withdrawal | Deposit | Balance | | Silver Savings Balance | $13.83 |
| 3 | DEP | 4/11/2017 | Pay Day Deposit (Phase 2) | | $13.83 | $0.00 | | | |
| 4 | | | | | | $13.83 | | | |

FIG. 22D

| Never Red Checkbook Register | "Checkbook" Say Go Green | "Checkbook" Silver Savings | Actual "Checkbook" Register |
|---|---|---|---|

FIG. 22E

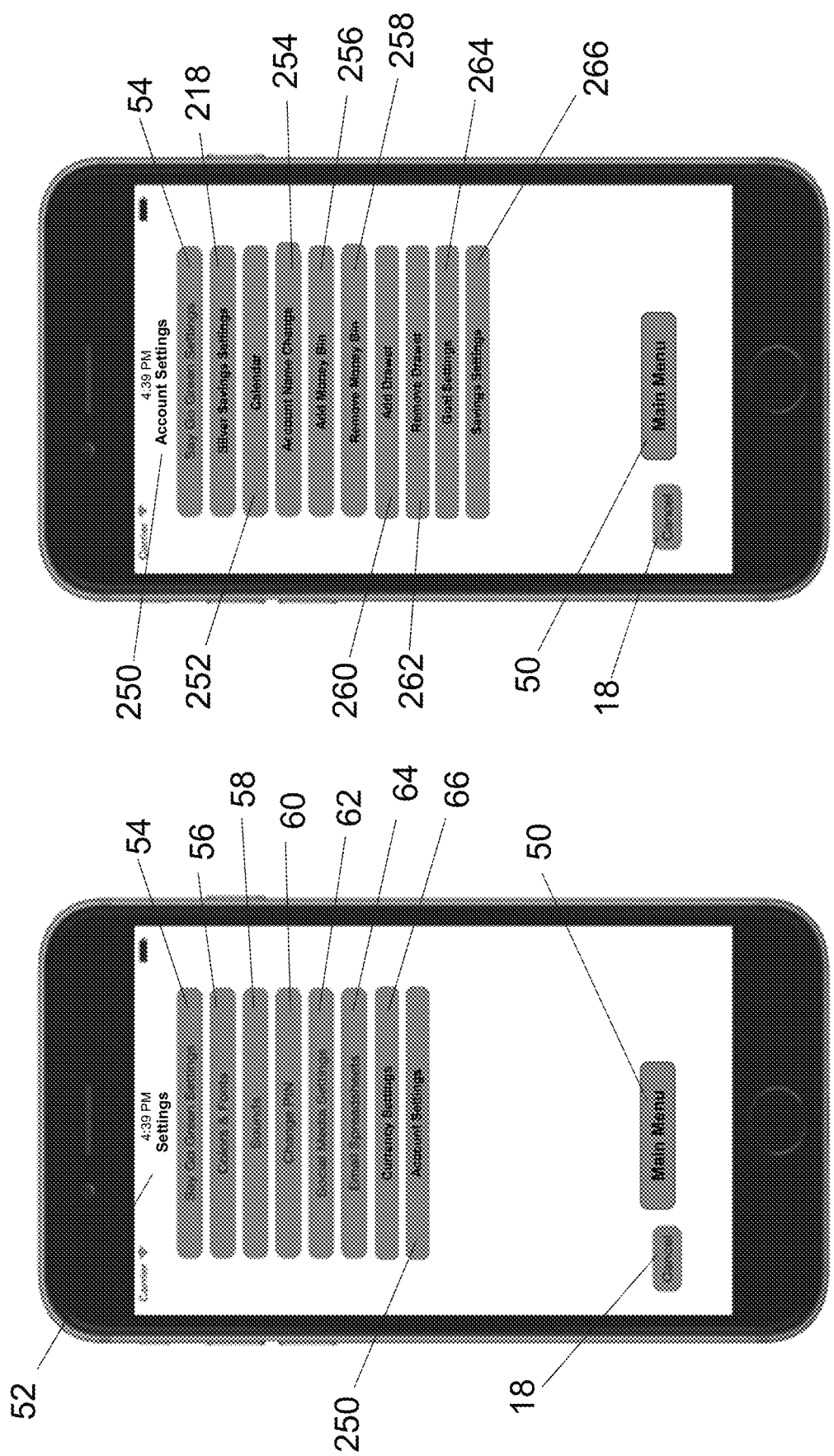

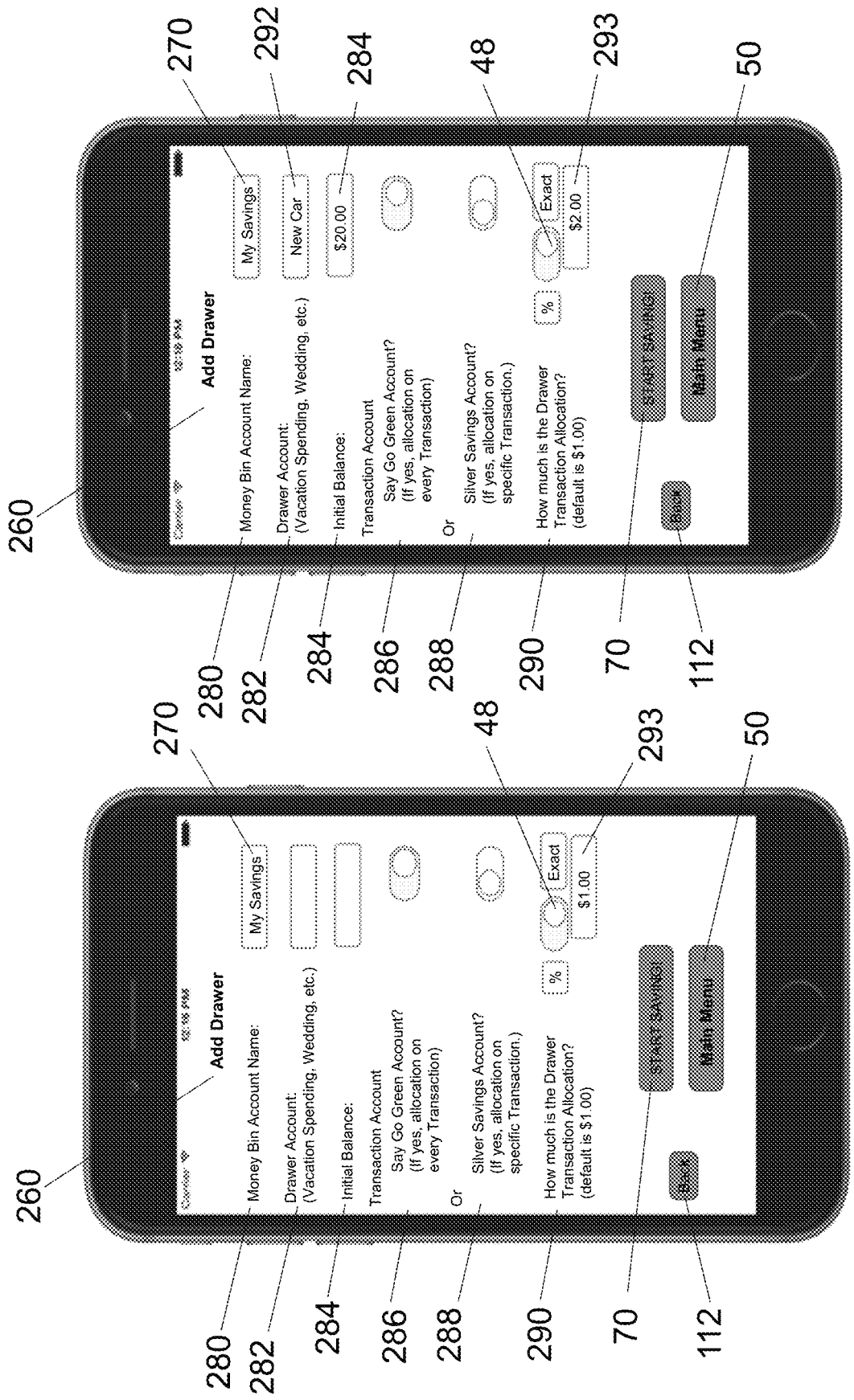

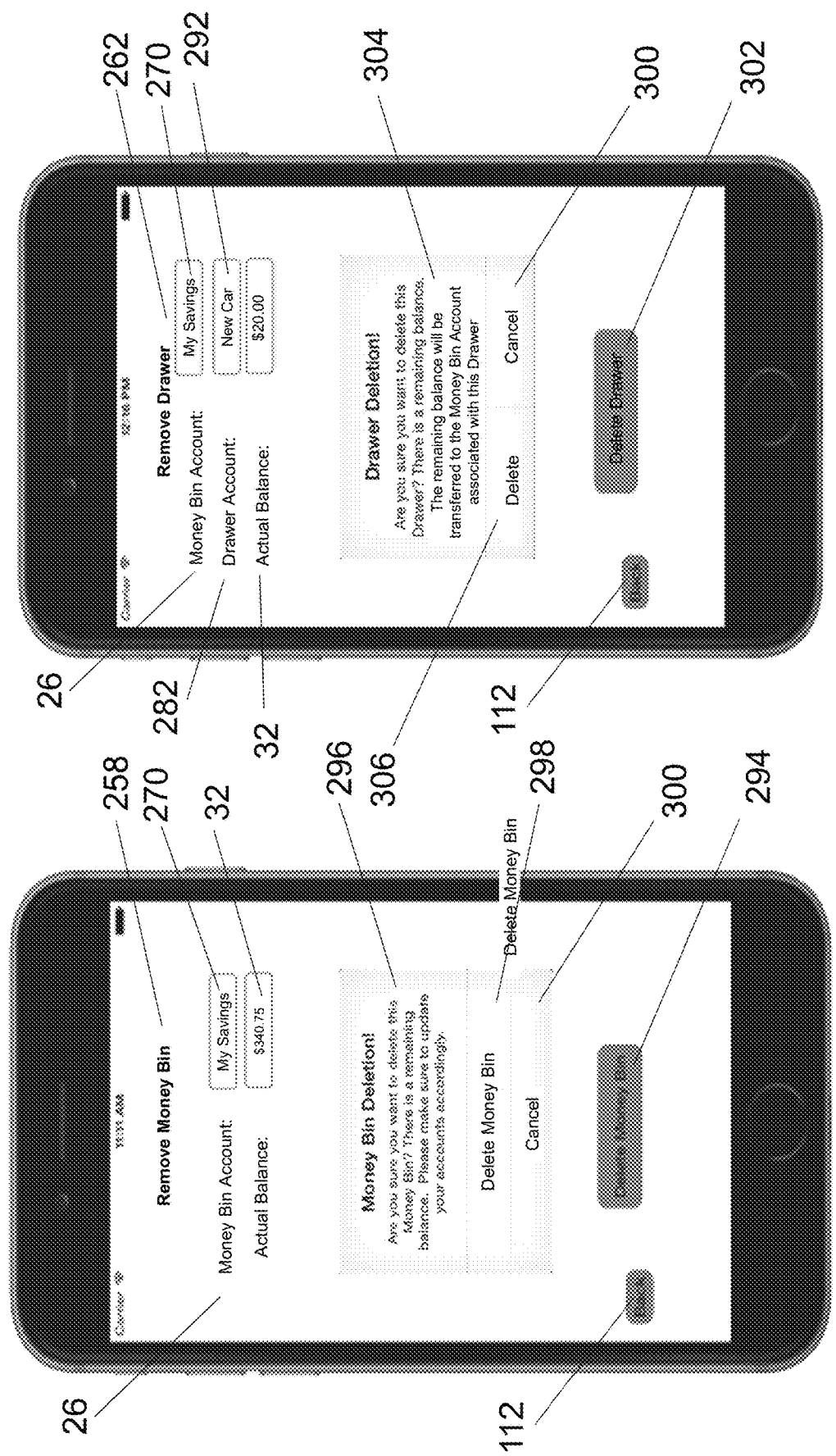

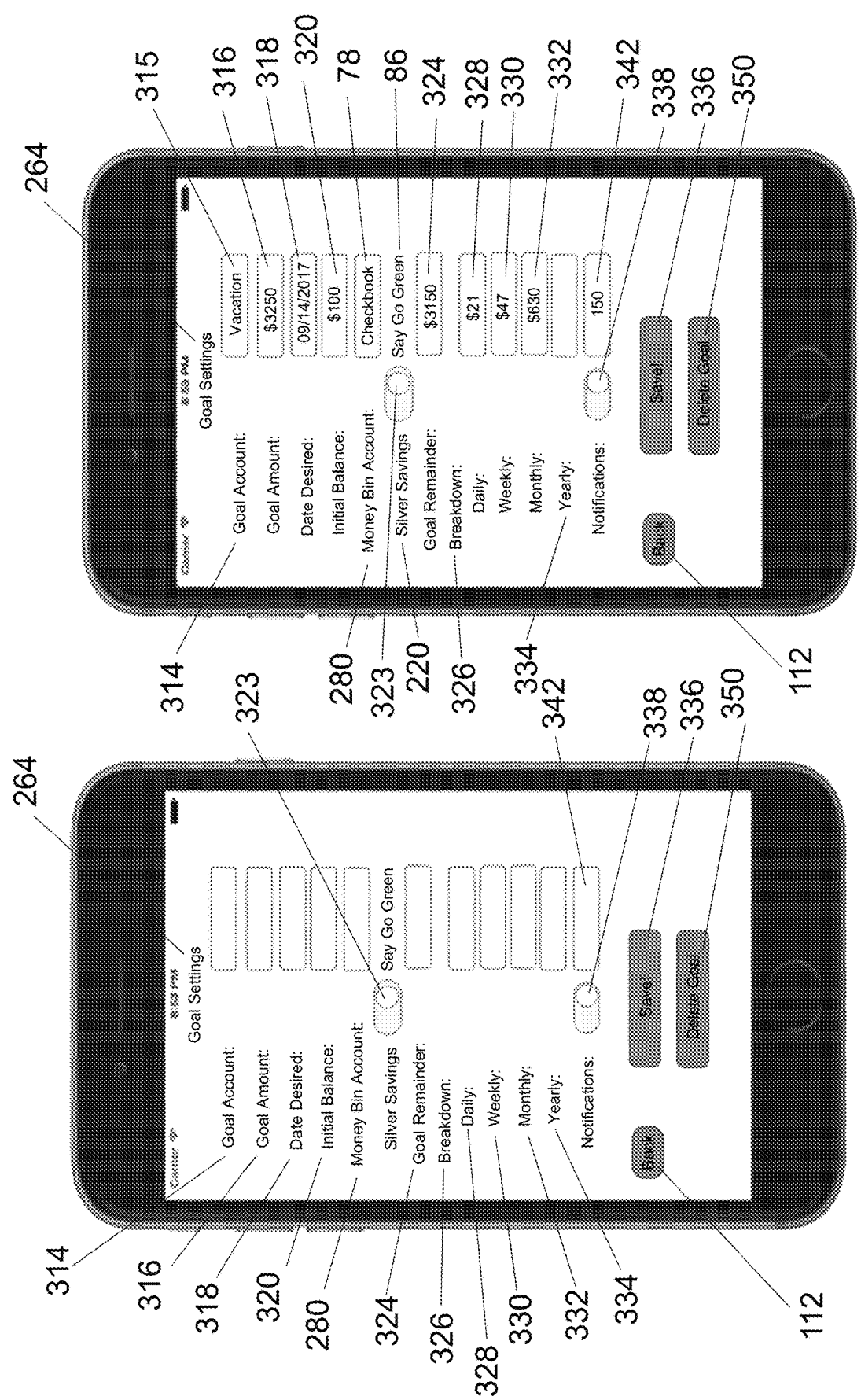

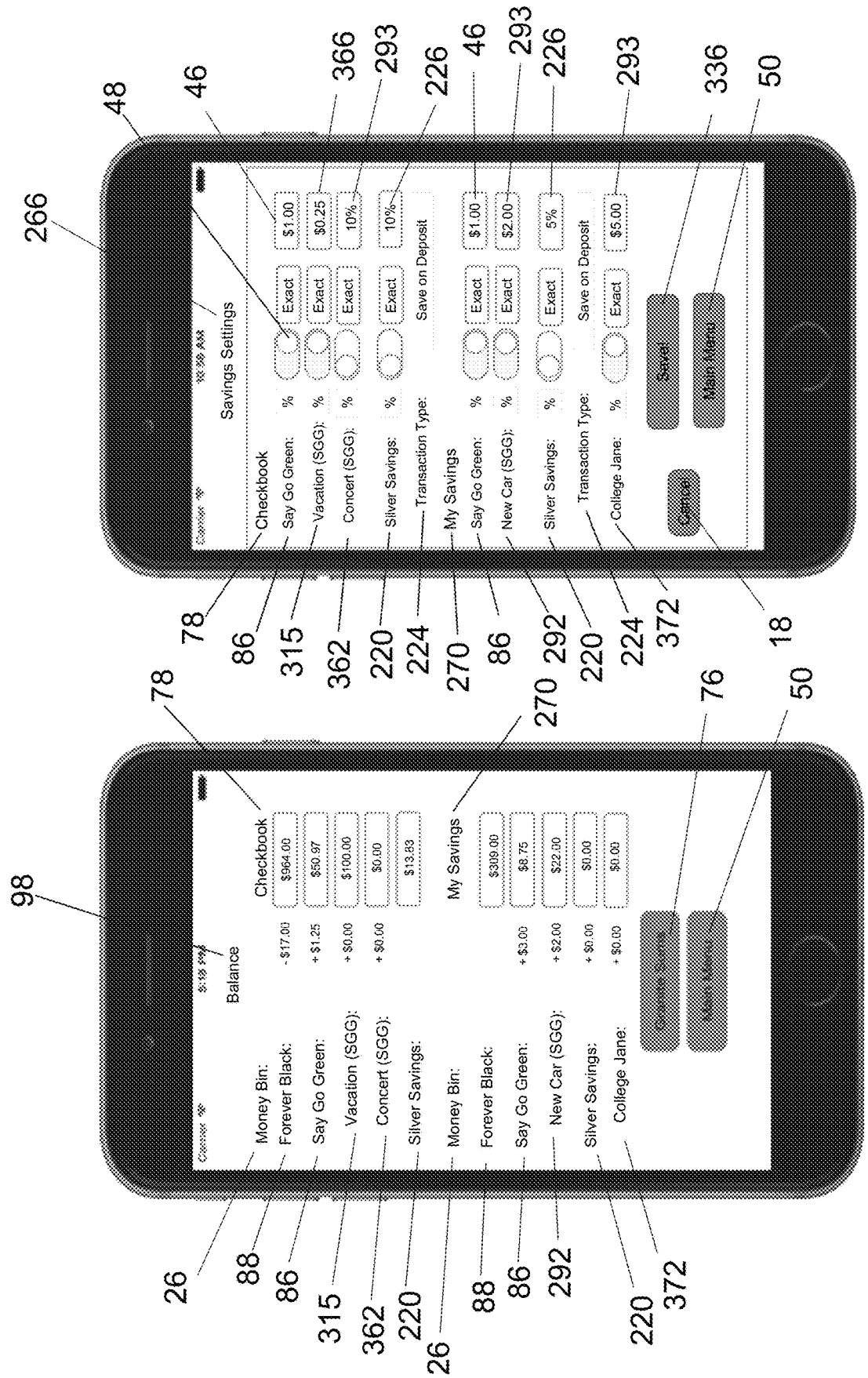

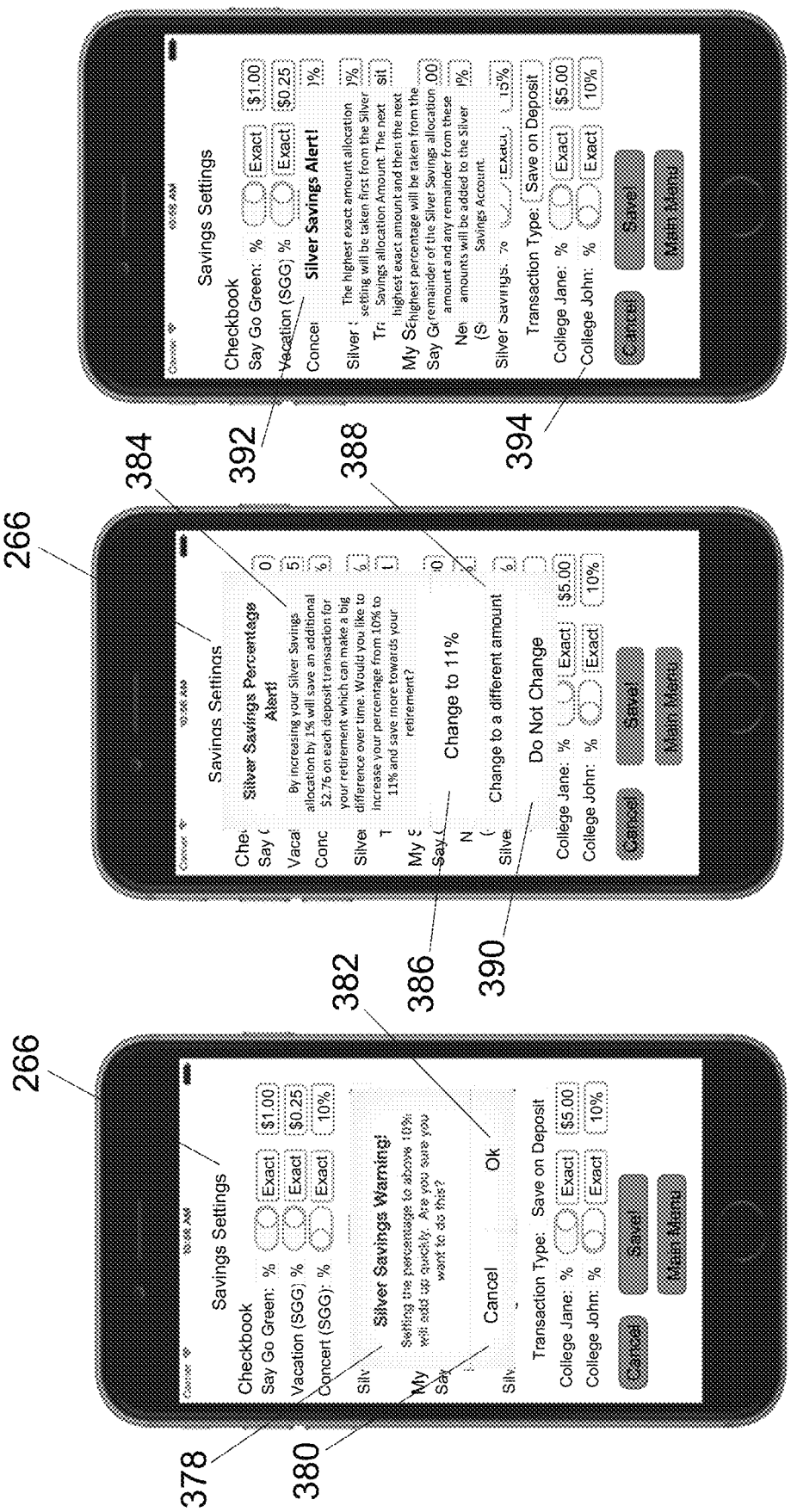

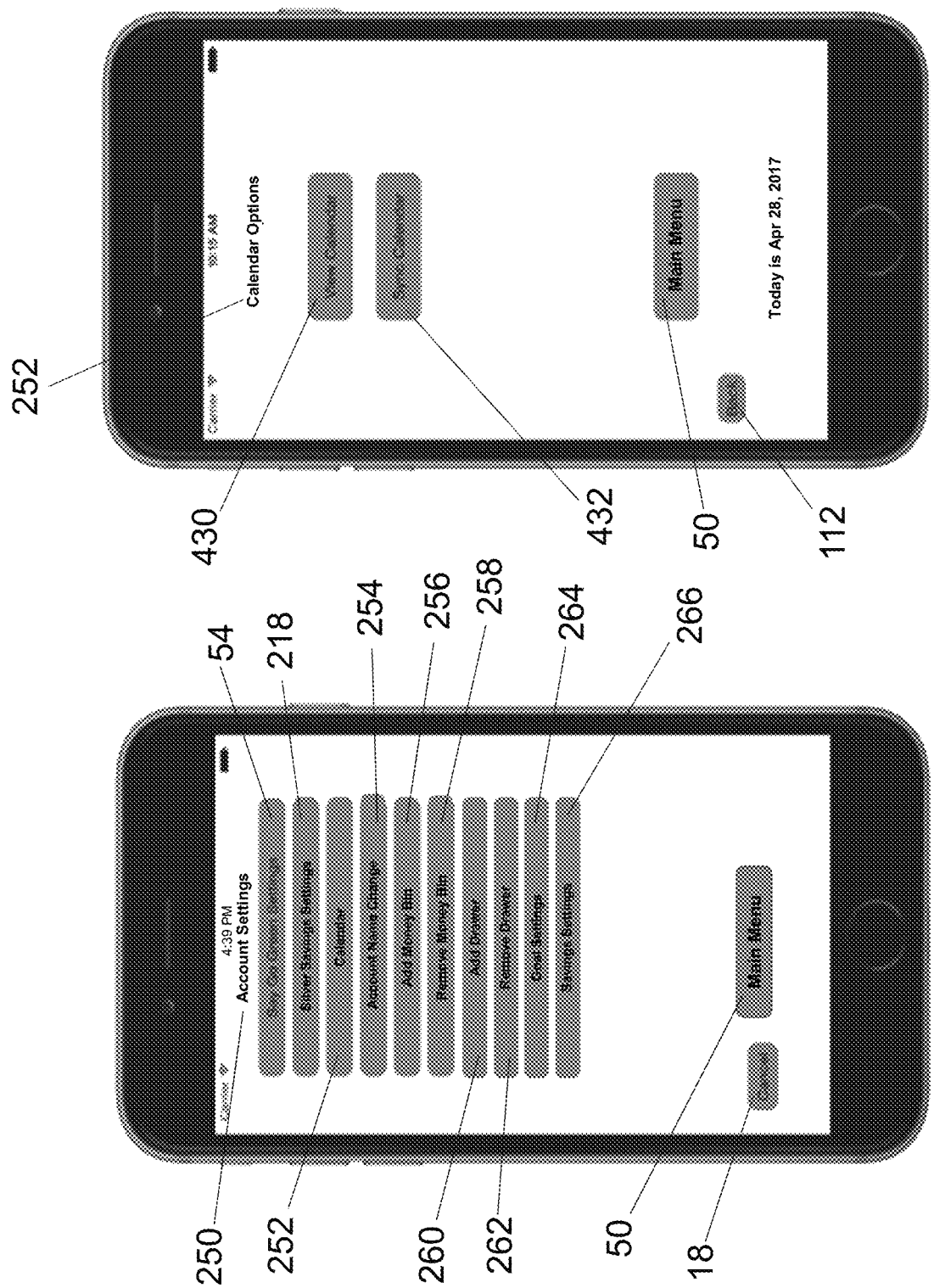

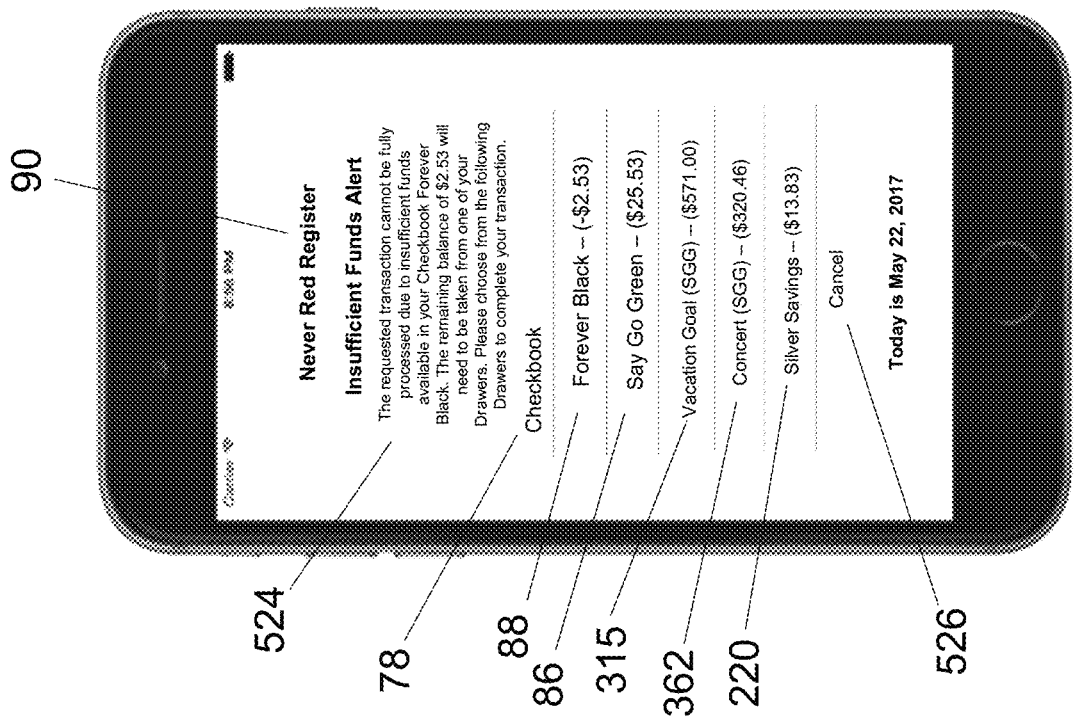

548 — THIS IS THE VACATION (SGG) REGISTER

| Code | Date | Description | Withdrawal | Deposit | Balance |
|------|------|-------------|------------|---------|---------|
|      |      |             |            |         | $0.00   |
| DEP  | 4/12/2017 | Coffee |       | $0.44   | $0.44   |
| DEP  | 4/12/2017 | Pay Day Deposit (Phase 3) |  | $0.38 | $0.82 |
| DEP  | 4/12/2017 | Pay Day Deposit (Phase 3) (FINAL EXAMPLE) |  | $0.16 | $0.98 |

| Vacation (SGG) Balance | $0.98 |

FIG. 45F

550 — THIS IS THE COLLEGE JOHN (SGG) REGISTER

| Code | Date | Description | Withdrawal | Deposit | Balance |
|------|------|-------------|------------|---------|---------|
|      |      |             |            |         | $0.00   |
| DEP  | 4/12/2017 | Pay Day Deposit (Phase 3) (FINAL EXAMPLE) |  | $0.16 | $0.16 |

| College John (SGG) Balance | $0.16 |

FIG. 45G

552 — THIS IS THE SAVING (SGG) REGISTER

| Code | Date | Description | Withdrawal | Deposit | Balance |
|------|------|-------------|------------|---------|---------|
|      |      |             |            |         | $0.00   |
| DEP  | 4/12/2017 | Pay Day Deposit (Phase 3) (FINAL EXAMPLE) |  | $0.36 | $0.36 |

| Saving (SGG) Balance | $0.36 |

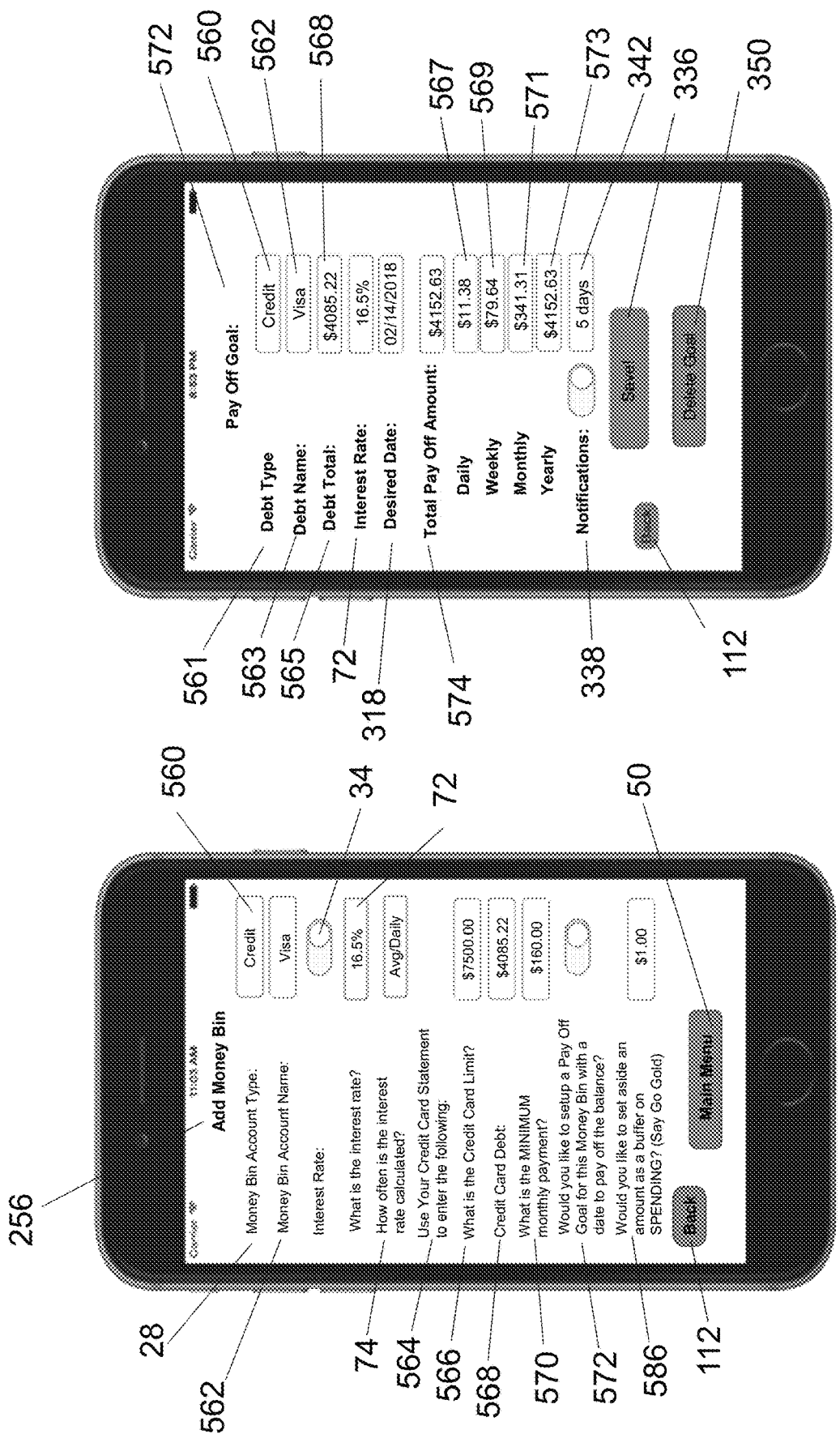

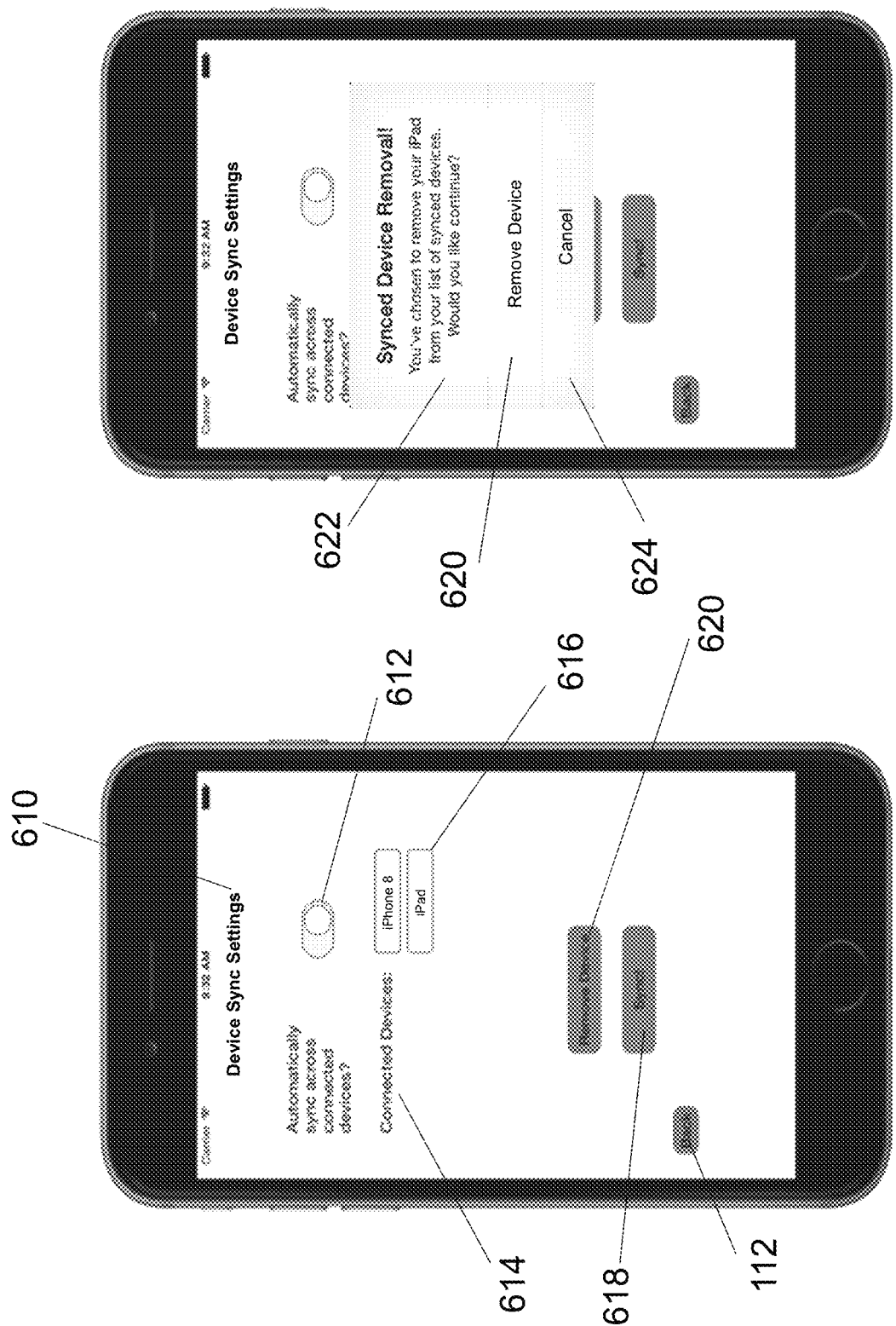

METHOD AND APPARATUS FOR THE OPTIMIZATION OF ASSETS AND AN ASSET ALLOCATION REGISTER FOR PERSONAL USE, ENTERPRISE OR BUSINESS USE, AND SAVINGS AND RETIREMENT

FIELD OF THE INVENTION

The present invention relates to a method and apparatus for the optimization of asset allocation and an asset allocation register using sub-value indicators and designations to optimize the utilization and availability of assets without the transfer of actual assets. The present invention may be used as shown in the following examples to allocate personal and business enterprise finances or to allocate and designate the utilization of valuables such as heirlooms, jewelry and other items. The allocation register of the present invention also provides to a user or business optimization of assets for savings, retirement, special events or purchases of desired tangible items. Importantly, the asset allocation register supports the user in a way that allows them to pay themselves first by embracing the way they may already think about the assets in their account.

BACKGROUND OF THE INVENTION

Management of finances, savings and retirement is approached by individuals and businesses in many varied ways. Some individuals prefer to create budgets to predetermine the allocation of funds to required expenses, retirement and savings. Data is carefully entered on a daily, weekly or monthly basis to track income and expenditures and maintain strict control of every dollar spent. At an alternative end of the spectrum and perhaps more commonly a person may simply check their bank balance prior to an expenditure and then make the decision to pay a bill or purchase an item with only a careless glance at their monthly statement. A number of software applications through mobile apps and spreadsheet type templates provide for tracking of income and expenditures, with some providing charts and graphs to visually determine the allocation of funds and adherence to a budget. Some of these applications require the user to become a subscriber of a provider account that uses a network of financial institutions, payees such as utility companies or merchant systems, and charitable organizations within a network to automatically transfer a portion of a total transaction performed at a point of sale system to a savings account, a payee or to a charity as described in METHOD AND SYSTEM TO CREATE AND DISTRIBUTE EXCESS FUNDS FROM CONSUMER SPENDING TRANSACTIONS to Burke, U.S. Pat. No. 6,112,191. Other patents describe an automated withdrawal of funds to an investment account and a calculated estimate of return on the amount invested over a period of years as described in SYSTEMS AND METHODS FOR MANAGING CONSUMER TRANSACTION-BASED INVESTMENTS to Cruttenden et al. in U.S. Pat. No. 8,781,906. The financial management system, to Ryder in U.S. Pat. No. 8,099,350 entitled, PERSONAL OR FAMILY FINANCIAL ACCOUNTING AND MANAGEMENT SYSTEM, determines the state of personal finances from data collected or entered based on personal income, assets, and expenditures. Through analysis and projections from the collected data, the system may provide recommendations and guidelines for the allocation of funds to expenditures, savings, and retirement in order to meet a person's desired goals. Importantly, these systems as well as most other budgetary management systems depend on the fiscal behavior of the individual or business to have sufficient funds that may be automatically withdrawn without causing account overage fees. These systems also require the individual to follow provided guidelines in order to successfully allocate funds to meet goals. However, these systems fail to provide a means for an individual or business to easily understand how better to manage their money. These systems also fail and poorly perform in helping the user to understand when it is good time to allocate those funds and how much should be allocated to create savings or reach a financial goal for a specific purpose such as a vacation or new car. These systems further fail to provide safe guards and buffers that assist in preventing the user from incurring overage charges that are imposed for insufficient balances and late payments on bills and credit cards. The present invention provides a unique methodology with safe guards to prevent overages in order to help an individual or business save for retirement and meet other desired financial needs and goals.

SUMMARY OF THE INVENTION

The present invention relates to a method and apparatus for asset allocation to assist a user in managing their valuables, finances, savings, and retirement by embracing the way an individual generally already thinks about their assets. The present invention uses sub-value indicators transactional allocations to display the user's assets as available, as useable or spendable, and as allocated to meet the user's personal and financial objectives. Using the present invention, the user may save for retirement, as well as save for special events such as vacation, wedding, holiday, college, and save for other desired tangible items such as a new car, appliance, or latest electronic device. The present invention breaks down personal and financial objectives into targets and time intervals and uses a unique automated recurrent accrual process to provide to allocate and designate assets without the transfer of any actual assets. Through the recurrent accrual process, assets are designated as useable meaning that these assets may be transferred or spent without impacting personal and financial obligations or objectives. At appropriate time intervals and as these objectives are met, the user is provided with details on how much and when to apportion the indicated assets appropriately such as to transfer the assets to a retirement account, bank account, investment fund, sell a tangible asset such as an heirloom or other valuable item, or make a purchase of tickets to a special event or of a desired item.

The asset allocation method and apparatus referred to herein as the Never Red Register is described using financial asset examples but the asset register of the present invention could be used for any type of asset such as heirlooms, jewelry or other items of value. In using the Never Red Register, assets are designated and accrued as transactions occur without the transfer of any actual assets to thereby demonstrate to the user the optimization of assets if indicators within the Never Red Register are followed. In the financial examples shown which are used only for demonstration and not to in any way limit the invention, the Never Red Register provides for tracking all transactions made through deposits, transfers, or withdrawals, prevents the user from paying service or overage charges on the bank account due to withdrawals or payments that exceed available funds and accrues a spending allowance that if adhered to may be spent without impacting expenses or other financial goals. While not specifically intended to track interest and service charges of a credit card or to track cash on hand, using the Never Red Register, a user is more engaged and effective in the management of their money. The Never Red Register may be implemented as a downloadable software application or as a web based application that is stored or accessible through any digital device such as a computer system, laptop, an iPhone, iPad, tablet, smart phone, or through other mobile devices. The user's financial data is secure by requiring a login, password or access pin known only to the user to gain access to the Never Red Register and data is stored in an encrypted format and may be saved locally and accessible only on a single digital device or be stored remotely from the digital device and be accessible from a number of digital devices using a secure web-native software application delivery model or SaaS (Software as a Service) to be hosted and operated as an on demand computing service such as a cloud or shared resource database through a web browser.

It is an object and advantage of the present invention to provide computational circuitry and a user interface operable and comprising instructions to transmit, receive and display data associated with one or more asset accounts that may be named by the user and be designated for specific purposes. The asset accounts are referred to herein as Money Bin Accounts and comprise asset data in the form of account balances and transaction amounts that correspond to one or more actual bank account balances that the user has in a bank, credit union, or other financial institutions and the withdrawal, deposit and transfer transactions within the actual bank account.

It is an object and advantage of the present invention to prevent the payment by a user of overage charges by determining and displaying sub-value indicators.

It is an object and advantage of the present invention to assist the user in optimizing asset allocation by determining and displaying sub-value indicators.

It is an object and advantage of the present invention to using the computational circuitry of a computer processing system or a digital device, through data entry or transmission receive within the Never Red Register an amount equal to the minimum balance required to maintain a user's bank account without being charged bank fees or overage charges. The minimum balance amount is set by a bank or other financial institution to cover operational costs of maintaining the bank account. It is a further object and advantage of the present invention that the Never Red Register determines a minimum balance buffer referred to herein as the Never Red Number, as a value that is greater than or equal to the minimum balance required to maintain a bank account without being charged bank fees or overage charges.

It is an object and advantage of the present invention to provide computational circuitry and a user interface operable and comprising instructions to transmit, receive and display asset data in an amount equal to the actual cash asset balance within a user's actual bank account. It is a further object and advantage of the present invention to determine a sub-value indicator which within the Never Red Register is designated as available assets, referred to herein as the Forever Black Account balance, that is equal to an amount remaining from the subtraction of the actual cash balance within the user's actual bank account, minus the Never Red Number for the bank account.

It is an object and advantage of the present invention to provide computational circuitry and a user interface operable and comprising instructions to transmit, receive and display asset data designated within the Never Red Register with a specific purpose within each Money Bin Account. The asset data may be specified for a tangible item, special event such as a vacation, wedding, graduation, for education, retirement, or as any other type of goal for any purpose. A specific purpose account may be referred to as a Drawer Account and be named for that specific purpose. An account with the specific purpose of the allocation of funds for retirement is referred to herein as a Silver Savings Account. An account with the specific purpose that has a required date of completion is referred to herein as a Goal Account. In the Never Red Register each specific purpose account is associated with rules for recurrent accrual to optimize the allocation of total assets within the Money Bin Account. The Never Red Register provides for the optimization of asset allocation towards any number of Drawer, Silver Savings, and Goal Accounts associated with a Money Bin and optimizes the allocation of assets while still providing useable assets designated as spendable for the user.

It is an object and advantage of the present invention to provide computational circuitry and a user interface operable and comprising instructions to transmit, receive and display asset data designated as spendable assets referred to herein as the Say Go Green Account that accrues using the Never Red Register as i.e. "free spending money" that may be spent without impacting asset allocation to retirement, goals or drawer accounts setup by a user and associated with a Money Bin Account in the Never Red Register.

It is an object and advantage of the present invention to determine and display of a sub-value indicator, referred to herein as the Granite Sum which is the sum of the Forever Black Account balance and the sum of all Silver Savings Accounts, Goal Accounts, Drawer Accounts and Say Go Green Accounts associated with a Money Bin Account. The Granite Sum is therefore equal to the actual cash balance within a user's bank account minus the Never Red Number associated with that bank account. In this manner, the Never Red Register displays to the user a sub-value indicator of assets available for expenses, savings, and spending which as long as the user spends less than this balance, the user will not go below the minimum balance and be charged overage charges.

It is an object and advantage of the Never Red Register to provide the recurrent accrual of assets to transfer a transactional allocation amount from the Forever Black Account balance to the Say Go Green Account balance. The recurrent accrual referred to herein as the Say Go Green Transactional Allocation. The Say Go Green Transactional Allocation may be any preset amount such as $1.00 or any percentage such as 0.5%.

It is an object and advantage of the present invention using computational circuitry and a user interface operable and comprising instructions to identify a transaction of assets or funds as a deposit, a transfer or a withdrawal and to perform an automated recurrent accrual transferring assets from the Forever Black Account balance to the Say Go Green Account in an amount equal to the Say Go Green Transactional Allocation at a point in time when a transaction is entered in to the Never Red Register and the transaction is identified as a deposit, a withdrawal or a transfer of funds within the bank account.

It is an object and advantage of the present invention to provide computational circuitry and a user interface operable and comprising instructions to subtract the Say Go Green Transactional Allocation from the Forever Black Account balance, and add the Say Go Green Transactional Allocation to the Say Go Green Account balance at a point in time when a transaction of funds is made within the bank account such as a transaction of funds comprising a deposit, a transfer, or a withdrawal of funds from the bank account.

It is an object and advantage of the present invention to provide computational circuitry and a user interface operable and comprising instructions to transmit, receive and display asset data associated with a Say Go Green Transactional Allocation, the amount of the Say Go Green Transactional Allocation equal to a preset percentage multiplied by a transaction amount equal to a deposit amount, a transfer amount or a withdrawal amount for a transaction being performed in the Money Bin Account that the Say Go Green Account is associated with.

It is an object and advantage of the present invention to provide computational circuitry and a user interface operable and comprising instructions to transmit, receive and display data associated with an interval of currency such as $1.00 and to determine a rounded down remainder equal to funds that are in this example in cents and are more than the interval of currency so are subtracted from an asset to have the asset be rounded down to the interval of currency.

It is an object and advantage of the present invention to provide computational circuitry and a user interface operable and comprising instructions to transmit, receive and display data associated with an interval of currency such as $1.00 and to determine a rounded up amount equal to funds that are in this example in cents that are less than the interval of currency so are added to an asset to round up the asset to the interval of currency.

It is an object and advantage of the present invention to provide computational circuitry and a user interface operable and comprising instructions to transmit, receive and display data to add the amount subtracted by rounding down or by rounding-up to the interval of currency to the Say Go Green Account balance at the point in time when a recurring accrual is performed.

It is an object and advantage of the present invention to provide computational circuitry and a user interface operable and comprising instructions to transmit, receive and display data associated with a transaction of assets or funds comprising a withdrawal. The withdrawal amount in a currency, the currency having an interval of currency such as the currency in dollars and having an interval of currency of one dollar with cents as portions of the interval of currency. The Never Red Register performs a recurrent accrual withdrawal transaction process by in a first embodiment rounding-up the withdrawal amount to the interval of currency. The withdrawal amount, the rounded-up amount and the Say Go Green Transactional Allocation are subtracted from the available balance, the Forever Black Account balance. The rounded-up amount and the Say Go Green Transactional Allocation are added to the Say Go Green Account cash balance. Alternatively, the Say Go Green Transactional Allocation could be first added to the withdrawal amount and the balance of the withdrawal amount and the Say Go Green Transactional Allocation be rounded-up to the interval of currency. The withdrawal amount, rounded-up amount and the Say Go Green Transactional Allocation are subtracted from the available balance, the Forever Black Account balance, and the rounded-up amount and the Say Go Green Transactional Allocation are added to the Say Go Green Account cash balance. A withdrawal transaction is entered into the Never Red Register when funds have been withdrawn from the user's actual bank account for example as payment for a purchase or expenses.

It is an object and advantage of the present invention to provide computational circuitry and a user interface operable and comprising instructions to transmit, receive and display data associated with a transaction of assets or funds comprising a deposit. The deposit amount in a currency, the currency having an interval of currency such as the currency in dollars and having an interval of currency of one dollar with as noted herein cents as portions of the interval of currency. The Never Red Register performs a recurrent accrual deposit transaction process by in a first embodiment rounding down the deposit amount to the interval of currency. A rounded down remainder equal to funds subtracted from the deposit amount, to round down the deposit amount to the interval of currency and the Say Go Green Transactional Allocation is subtracted from the deposit amount. The deposit amount is added to the available balance, the Forever Black Account balance, and the rounded down remainder and the Say Go Green Transactional Allocation are added to the Say Go Green Account cash balance. Alternatively, the Say Go Green Transactional Allocation could be first subtracted from the deposit amount and the balance of the deposit amount minus the Say Go Green Transactional Allocation be rounded-down to the interval of currency. The deposit amount is added to the Forever Black Account balance. The rounded-down remainder and the Say Go Green Transactional Allocation are subtracted from the Forever Black Account balance, and the rounded-down remainder and the Say Go Green Transactional Allocation are added to the Say Go Green Account cash balance. A deposit transaction is entered into the Never Red Register when funds have been deposited into the user's actual bank account for example from a pay check.

It is an object and advantage of the present invention to provide computational circuitry and a user interface operable and comprising instructions to transmit, receive and display data associated with a transaction of assets or funds comprising a transfer having a transfer amount, a withdrawal cash account, and a receiving cash account. The transfer amount in a currency, the currency having an interval of currency such as the currency in dollars and having an interval of currency of one dollar with as noted herein cents as the lowest denomination of the interval of currency. The Never Red Register performs a recurrent accrual transfer transaction process by in a first embodiment rounding up the transfer amount to the interval of currency. The rounded-up amount equal to funds added to the transfer amount, to round up the transfer amount to the interval of currency and the Say Go Green Transactional Allocation are added to the transfer amount. A transfer warning prompt that the transfer amount has been increased to an amount that includes the rounded-up amount and the Say Go Green Transactional Allocation is displayed within the Never Red Register. The Never Red Register user interface and computational circuitry receives, transmits, and displays data with one of at least an instruction to continue and perform the transfer or an instruction to stop the transfer. If the instruction is to continue the transfer the transfer amount, the rounded-up amount and the Say Go Green Transactional Allocation are subtracted from the cash balance of the withdrawal cash account and the transfer amount is added to the cash balance of the receiving cash account. The rounded-up amount and the Say Go Green Transactional Allocation are added to the Say Go Green Account cash balance. Alternatively, a rounded-down remainder equal to funds subtracted from the transfer amount, to round down the transfer amount to the interval of currency and a transfer warning prompt that the transfer amount has been decreased to an amount that includes the rounded-down remainder and the Say Go Green Transactional Allocation is displayed. The Never Red Register user interface and computational circuitry receives, transmits, and displays data with one of at least an instruction to continue and perform the transfer or an instruction to stop the transfer. If the instruction is to continue the transfer, the transfer amount, the rounded-down remainder and the Say Go Green Transactional Allocation are subtracted from the cash balance of the withdrawal cash account and the transfer amount minus the rounded-down remainder and Say Go Green Transactional Allocation is added to the cash balance of the receiving cash account. The rounded-down remainder and the Say Go Green Transactional Allocation are added to the Say Go Green Account cash balance.

It is an object and advantage of the present invention to provide computational circuitry and a user interface operable and comprising instructions to transmit, receive and display data associated with a transaction of funds comprising a transfer from the available balance, Forever Black Account balance, to the Say Go Green Account cash balance. The transfer having a transfer amount in a currency, the currency having an interval of currency such as the currency in dollars and having an interval of currency of one dollar with as noted herein cents as of the lowest denomination of the interval of currency. The Never Red Register performs an internal accrual transfer transaction process by in a first embodiment rounding up the transfer amount to the interval of currency. The rounded-up amount equal to funds added to the transfer amount to round up the transfer amount to the interval of currency and the Say Go Green Transactional Allocation are added to the transfer amount. A transfer warning prompt that the transfer amount has been increased to an amount that includes the rounded-up amount and the Say Go Green Transactional Allocation is displayed. The Never Red Register user interface and computational circuitry receives, transmits, and displays data with one of at least an instruction to continue and perform the transfer or an instruction to stop the transfer. If the instruction is to continue the transfer, the transfer amount, the rounded-up amount and the Say Go Green Transactional Allocation are subtracted from the available balance, Forever Black Account balance and the transfer amount, the rounded-up amount and the Say Go Green Transactional Allocation are added to the Say Go Green Account cash balance.

It is an object and advantage of the present invention to provide computational circuitry and a user interface operable and comprising instructions to transmit, receive and display data associated with a transaction of assets or funds comprising a transfer from the Say Go Green account to the available balance, Forever Black Account balance. The transfer having a transfer amount, in a currency, the currency having an interval of currency such as the currency in dollars and having an interval of currency of one dollar with as noted herein cents as portions of the interval of currency. The Never Red Register performs an internal accrual transfer transaction process by in a first embodiment rounding down the transfer amount to the interval of currency. The rounded down remainder equal to funds subtracted from the transfer amount to round down the transfer amount to the interval of currency and Say Go Green Transactional Allocation are subtracted from the transfer amount. A transfer warning prompt that the transfer amount has been decreased by an amount equal to the rounded down remainder and the Say Go Green Transactional Allocation is displayed. The Never Red Register user interface and computational circuitry receives, transmits, and displays data with one of at least an instruction to continue and perform the transfer or an instruction to stop the transfer. If the instruction is to continue the transfer the transfer amount minus the rounded down remainder and the Say Go Green Transactional Allocation is subtracted from the Say Go Green Account cash balance and is added to the available balance, Forever Black Account balance.

It is an object and advantage of the present invention to provide computational circuitry and a user interface operable and comprising instructions to transmit, receive and display data associated with one of a plurality of asset accounts designated as a Silver Savings Account. A Silver Savings Account has the specific purpose of saving for retirement. When a Silver Savings Account is associated with a Money Bin Account, the Never Red Register performs a retirement accrual transaction process based on a selected or designated transaction, such as a withdrawal, deposit, or transfer and a percentage or preset Silver Savings Retirement Allocation. The Silver Savings Retirement Allocation may for example, be in an amount of 5% or in a preset amount of $5.00, or in any other suitable amount. In an exemplary embodiment, the designated transaction in the retirement accrual transaction process is a deposit transaction having a deposit amount. In a first embodiment, if the Silver Savings Retirement Allocation is a percentage, the Never Red Register provides computational circuitry and a user interface operable and comprising instructions to multiply the deposit amount by the Silver Savings Retirement Allocation to determine a Silver Savings amount. The Silver Savings amount is subtracted from the deposit amount to determine a deposit remainder and the Silver Savings amount is added to the Silver Savings Account balance. After the retirement accrual transaction process, the Never Red Register performs a recurrent accrual deposit transaction process by in a first embodiment rounding down the deposit remainder to the interval of currency to determine a rounded down remainder equal to funds subtracted from the deposit remainder amount to round down the deposit remainder amount to the interval of currency. The rounded down remainder and the Say Go Green Transactional Allocation are subtracted from the deposit remainder amount. The rounded down remainder and the Say Go Green Transactional Allocation are added to the Say Go Green Account cash balance, and the deposit remainder amount minus the rounded down remainder and the Say Go Green Transactional Allocation is added to the available balance, Forever Black Account balance. The Silver Savings Account balance may be an actual separate savings or retirement account setup by the user in a financial institution. The Never Red Register indicates to the user the amount of funds that may be periodically added to their actual savings or retirement account without affecting their financial obligations or goals. The actual transfer of funds is performed by the user when indicated by the Never Red Register.

It is an object and advantage of the present invention to provide computational circuitry and a user interface operable and comprising instructions to transmit, receive and display data associated with a plurality of asset accounts designated as Drawer Accounts or Goal Accounts. Drawer Accounts identified as asset accounts having specific financial objectives such as for example the purchase of tangible items or education. Goal Accounts identified as asset accounts having specific financial objectives with due dates such as, for example, saving for a special event, vacation or other financial objective that must be met by a specific date. The Never Red Register performs a recurrent allocation process to determine a Designated Transactional Allocation to allocate assets to the Drawer Accounts and Goal Accounts. The Drawer Accounts and Goal Accounts may be associated with a Money Bin Account, a Say Go Green Account, or a Silver Savings Account. The association of the Drawer Account or Goal Account with a specific type of account determines the order of allocation in the recurrent allocation process. The order of allocation may be based on when each account is associated with an account or may be selected by the user. The implementation of the recurrent allocation process by the Never Red Register is based on the selection of a single transaction, multiple transactions or on the selection of all transactions.

For example, a Money Bin Account may have a Silver Savings Account, a Say Go Green Account, a Drawer Account designated as a New Car Account and a Goal Account designated as a Vacation Account. With a number of accounts associated with the Money Bin Account, the Never Red Register performs a series of transactional allocations based on the transaction settings and allocation order. In this example, when a deposit transaction is entered, the Never Red Register performs the retirement accrual transaction process allocating the Retirement Transactional Allocation to the Silver Savings Account, the recurring accrual process allocating the Say Go Green Transactional Allocation to the Say Go Green Account, a first recurrent allocation process allocating a first Designated Transactional Allocation to the New Car Drawer Account, and a second recurrent allocation process allocating a second Designated Transactional Allocation to the Vacation Goal Account. The allocation amounts are subtracted from the deposit amount and each specific allocation is added to each of the accounts. The remainder of the deposit amount is added to the available balance, Forever Black Account balance.

A Drawer Account and/or Goal Account may also or alternatively be associated with a Say Go Green Account so that the Designated Transactional Allocation is subtracted from the Say Go Green Transactional Allocation in the amount specified in each recurrent allocation process to allocate the specific Designated Transactional Allocation to each Drawer Account and Goal Account. A Drawer Account and/or Goal Account may also or alternatively be associated with a Silver Savings Account so that the Designated Transactional Allocation is subtracted from the Retirement Transactional Allocation in the amount specified in each recurrent allocation process to allocate the specific Designated Transactional Allocation to each Drawer Account and Goal Account. The Never Red Register therefore provides a plurality of unique allocation processes to effectively use assets to meet the varied financial objectives of a user while providing a spendable asset account that may be used without affecting these financial objectives.

It is an object and advantage of the present invention to provide computational circuitry and a user interface operable and comprising instructions to determine that a balance of at least one of the plurality of Goal Accounts being equal to the financial goal amount, and to display a notification indicating that the Goal Account's balance is equal to the financial goal amount.

It is an object and advantage of the present invention to provide computational circuitry and a user interface operable and comprising instructions to determine if the target date of a Goal Account is the current date, and to transmit, receive and display a notification that the Goal Account target date is the current date.

It is an object and advantage of the present invention to provide computational circuitry and a user interface operable and comprising instructions to determine, transmit, receive and display the accruals and debits of the transaction of all assets comprising the actual bank account balance, the remaining cash balance (Granite Sum Account balance), the available balance (Forever Black Account balance), the Say Go Green Account balance, the plurality of asset accounts designated as Silver Savings Accounts, Drawer Accounts and Goal Accounts.

The present invention is related to an asset register useful in a digital device to optimize the utilization and availability of assets without the transfer of actual assets, the asset register comprising a digital device containing data for each of a plurality of assets; a sub-value indicator designating a portion of the plurality of assets as available; a transactional allocation designating a portion of the plurality of available assets as spendable; a plurality of visually perceptible elements which visually perceptible elements correspond to the plurality of assets designated as available and the plurality of assets designated spendable.

The present invention is also related to one or more non-transitory computer-readable media for the registration of assets to optimize the utilization and availability of assets without the transfer of actual assets, including computer instructions for performing a method comprising receiving asset data in a computer with a memory having storage; receiving minimum balance requirement data; designating asset data that is equal to the asset data decreased by the minimum balance requirement data as a sub-value indicator; displaying the sub-value indicator. The one or more media for the registration of assets may comprise receiving an electronic communication containing a transaction of asset data and comprising a transaction amount; creating a transactional allocation; adjusting the transaction amount by the transactional allocation; designating the transactional allocation as spendable assets; adjusting the sub-value indicator by the transactional allocation and the remaining transaction amount; designating the adjusted sub-value indicator as available assets. The one or more media for the registration of assets to optimize the utilization and availability of assets without the transfer of actual assets may comprise receiving an electronic communication containing a transaction amount designated as a withdrawal amount; creating a currency interval allocation as the withdrawal amount rounded-up to an interval of currency; adjusting the withdrawal amount by the currency interval allocation and the transactional allocation; combining the transactional allocation and the currency interval allocation with the assets designated as spendable assets; adjusting the sub-value indicator by the remaining withdrawal amount; designating the adjusted sub-value indicator as available assets.

The one or more non-transitory computer-readable media for the registration of assets to optimize the utilization and availability of assets without the transfer of actual assets of may comprise receiving an electronic communication containing a transaction amount designated as a deposit amount; creating a currency interval allocation as the deposit amount rounded-down to an interval of currency; adjusting the deposit amount by the currency interval allocation and the transactional allocation; combining the transactional allocation and the currency interval allocation with the assets designated as spendable assets; adjusting the sub-value indicator by the remaining deposit amount; designating the adjusted sub-value indicator as available assets. The one or more media for the registration of assets may comprise creating the transactional allocation as a fixed asset amount or as a fixed percentage multiplied by a transaction amount. The one or more media for the registration of assets may comprise displaying one of at least the assets designated as available; displaying the assets designated as spendable; and displaying the sub-value indicator. The one or more media for the registration of assets may comprise receiving an electronic communication containing a transaction amount designated as a transfer amount and comprising the transfer of assets from assets designated as available assets to the assets designated as spendable assets; creating a currency interval allocation as the transfer amount rounded-up to an interval of currency; adjusting the transfer amount by the currency interval allocation and the transactional allocation; combining the transactional allocation and the currency interval allocation with the assets designated as spendable assets; adjusting the sub-value indicator by the remaining transfer amount; designating the adjusted sub-value indicator as available assets.

The one or more non-transitory computer-readable media for the registration of assets to optimize the utilization and availability of assets without the transfer of actual assets may comprise receiving an electronic communication containing a transaction amount designated as a transfer amount and comprising the transfer of assets from the assets designated as spendable assets to the assets designated as available assets; creating a currency interval allocation as the transfer amount rounded-down to an interval of currency; adjusting the transfer amount by the currency interval allocation and the transactional allocation; adjusting the sub-value indicator by the remaining transfer amount; designating the adjusted sub-value indicator as available assets. The one or more media for the registration of assets may comprise creating an asset register; the asset register comprising the date, time and description of a plurality of transactions of the sub-value indicator, the assets designated as available assets, and the assets designated as spendable assets; storing the asset register; displaying the asset register; transmitting the asset register. The one or more media for the registration of assets may comprise receiving an electronic communication containing a transaction of asset data and comprising a transaction amount; creating a retirement allocation; adjusting the transaction amount by the retirement allocation; designating the retirement allocation as a retirement asset; creating a currency interval allocation as the remaining transaction amount rounded-down to an interval of currency; adjusting the remaining transaction amount by the transactional allocation and the currency interval allocation; combining the transactional allocation and the currency interval allocation with the assets designated as spendable assets; adjusting the sub-value indicator by the total remaining transaction amount; designating the adjusted sub-value indicator as available assets. The one or more media for the registration of assets may comprise receiving an electronic communication containing a transaction of asset data and comprising a transaction amount; creating a drawer allocation; adjusting the transaction amount by the drawer allocation; designating the drawer allocation as a drawer asset; creating a currency interval allocation as the remaining transaction amount rounded-up to an interval of currency; adjusting the remaining transaction amount by the transactional allocation and the currency interval allocation; combining the transactional allocation and the currency interval allocation with the assets designated as spendable assets; adjusting the sub-value indicator by the total remaining transaction amount; designating the adjusted sub-value indicator as available assets. The one or more media for the registration of assets may comprise receiving an electronic communication containing a transaction of asset data and comprising a transaction amount; adjusting the transaction amount by the transactional allocation; creating a drawer allocation; adjusting the transactional allocation by the drawer allocation; designating the drawer allocation as a drawer asset; combining the remaining transactional allocation with the assets designated as spendable assets; adjusting the sub-value indicator by the remaining transaction amount; designating the adjusted sub-value indicator as available assets.

The one or more non-transitory computer-readable media for the registration of assets to optimize the utilization and availability of assets without the transfer of actual assets may comprise receiving an electronic communication containing a transaction of asset data and comprising a transaction amount; creating a goal allocation comprising a goal amount and a date desired; adjusting the transaction amount by the goal allocation; designating the goal allocation as a goal asset; receiving an electronic communication containing a transactional allocation; adjusting the remaining transaction amount by the transactional allocation; combining the transactional allocation with the assets designated as spendable assets; adjusting the sub-value indicator by the total remaining transaction amount; designating the adjusted sub-value indicator as available assets. The one or more media for the registration of assets may comprise creating a retirement allocation as a fixed asset amount; creating a drawer allocation as a fixed asset amount; creating a goal allocation as a fixed asset amount. The one or more media for the registration of assets may comprise creating a retirement allocation as a fixed percentage multiplied by a transaction amount;

creating a drawer allocation as a fixed percentage multiplied by a transaction amount; creating a goal allocation as a fixed percentage multiplied by a transaction amount. The one or more media for the registration of assets to optimize the utilization and availability of assets without the transfer of actual assets may comprise receiving an electronic communication containing a goal target and desired date; determining a goal allocation by dividing the goal target by the number of days from the current date to the desired date. The one or more media for the registration of assets may comprise receiving an electronic communication containing a transaction of asset data and comprising a transaction amount; creating a retirement allocation; adjusting the transaction amount by the retirement allocation; creating a drawer allocation; adjusting the retirement allocation by the drawer allocation; designating the drawer allocation as a drawer asset; designating the remaining retirement allocation as a retirement asset; adjusting the remaining transaction amount by the transactional allocation; combining the transactional allocation with the assets designated as spendable assets; adjusting the sub-value indicator by the total remaining transaction amount;

designating the adjusted sub-value indicator as available assets. The one or more media for the registration of assets to optimize the utilization and availability of assets without the transfer of actual assets may comprise receiving an electronic communication containing a transaction of asset data and comprising a transaction amount; creating a retirement allocation; adjusting the transaction amount by the retirement allocation; creating a goal allocation; adjusting the retirement allocation by the goal allocation; designating the goal allocation as a goal asset; designating the remaining retirement allocation as a retirement asset; adjusting the remaining transaction amount by the transactional allocation; combining the transactional allocation with the assets designated as spendable assets; adjusting the sub-value indicator by the total remaining transaction amount;

designating the adjusted sub-value indicator as available assets. The one or more media for the registration of assets may comprise receiving an electronic communication containing a transaction of asset data and comprising a transaction amount; creating a retirement allocation;

adjusting the transaction amount by the retirement allocation; designating the retirement allocation as a retirement asset; adjusting the remaining transaction amount by the transactional allocation;

creating a drawer allocation; adjusting the transactional allocation by the drawer allocation; designating the drawer allocation as a drawer asset; combining the remaining transactional allocation with the assets designated as spendable assets; adjusting the sub-value indicator by the total remaining transaction amount; designating the adjusted sub-value indicator as available assets. The one or more media for the registration of assets may comprise receiving an electronic communication containing a transaction of asset data and comprising a transaction amount; creating a retirement allocation; adjusting the transaction amount by the retirement allocation; creating a first drawer allocation; adjusting the retirement allocation by the first drawer allocation;

designating the first drawer allocation as first drawer asset; designating the remaining retirement allocation as a retirement asset; adjusting the remaining transaction amount by the transactional allocation; creating a second drawer allocation; adjusting the transactional allocation by the second drawer allocation; designating the second drawer allocation as a second drawer asset; combining the remaining transactional allocation with the assets designated as spendable assets; adjusting the sub-value indicator by the total remaining transaction amount; designating the adjusted sub-value indicator as available assets. The one or more media for the registration of assets may comprise receiving an electronic communication containing a transaction of asset data and comprising a transaction amount; creating a retirement allocation; adjusting the transaction amount by the retirement allocation; creating a drawer allocation; adjusting the retirement allocation by the drawer allocation; designating the remaining retirement allocation as a retirement asset; adjusting the remaining transaction amount by the transactional allocation; adjusting the transactional allocation by the drawer allocation; designating the total drawer allocation from the retirement allocation and the transactional allocation as a drawer asset; combining the remaining transactional allocation with the assets designated as spendable assets; adjusting the sub-value indicator by the total remaining transaction amount; designating the adjusted sub-value indicator as available assets.

The present invention is further related to one or more non-transitory computer-readable media for the registration of credit card accounts to optimize the utilization and availability of assets without the transfer of actual assets, including computer instructions for performing a method comprising receiving credit card limit data in a computer with a memory having storage; receiving interest rate date; receiving credit card debt data; designating a sub-value credit limit as equal to the credit card limit data multiplied by the interest rate; designating a sub-value indicator as the credit card limit decreased by the sub-value credit limit combined with the credit card debt; displaying the sub-value indicator as the maximum available charge amount. The one or more non-transitory computer-readable media for the registration of credit card accounts to optimize the utilization and availability of assets without the transfer of actual assets may comprise receiving an electronic communication containing a charge transaction of credit card data and comprising a charge amount; creating a transaction allocation; creating a currency interval allocation as the charge amount rounded-up to an interval of currency; adjusting the charge amount by the currency interval allocation and the transaction allocation; combining the transaction allocation and the currency interval allocation with the sub-value indicator to decrease the maximum available charge amount.

The one or more media for the registration of credit card accounts to optimize the utilization and availability of assets without the transfer of actual assets may comprise receiving an electronic communication containing a payment transaction of credit card data and comprising a payment amount; creating a transaction allocation; creating a currency interval allocation as the payment amount rounded-down to an interval of currency; adjusting the payment amount by the currency interval allocation and the transaction allocation; combining the transaction allocation and the currency interval allocation with the sub-value indicator to increase the maximum available charge amount.

Other objects and advantages of the present invention will become obvious to the reader and it is intended that these objects and advantages are within the scope of the present invention. To the accomplishment of the above and related objects and advantages, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 5A is an embodiment of a flowchart showing steps for an allocation transaction in an embodiment of the Never Red Register of the present invention;

FIG. 5B is an embodiment of a display of assets designated as available and spendable in an embodiment of the Never Red Register of the present invention;

FIG. 6 is an embodiment of main menu screen in an embodiment of the Never Red Register of the present invention;

FIG. 8A is an embodiment of a display of a balance screen to review assets designated as available and spendable with the most recent transactions in an embodiment of the Never Red Register of the present invention;

FIG. 8B is an embodiment of a sub-value indicator account balance screen in an embodiment of the Never Red Register of the present invention;

FIG. 9A is an embodiment of a withdrawal transaction with example data in an embodiment of the Never Red Register of the present invention;

FIG. 9B is an embodiment of a flowchart showing the sub-value indicator account balance screen before and after the withdrawal transaction of FIG. 9A in an embodiment of the Never Red Register of the present invention;

FIG. 9C is an embodiment of a sub-value indicator account balance screen in an embodiment of the Never Red Register of the present invention;

FIG. 11A is an embodiment of a display of a balance screen to review assets designated as available and spendable with the most recent transactions in an embodiment of the Never Red Register of the present invention;

FIG. 11B is an embodiment of a sub-value indicator account balance screen in an embodiment of the Never Red Register of the present invention;

FIG. 12A is an embodiment of a deposit transaction with example data in an embodiment of the Never Red Register of the present invention;

FIG. 12B is an embodiment of a flowchart showing the sub-value indicator account balance screen before and after the deposit transaction of FIG. 12A in an embodiment of the Never Red Register of the present invention;

FIG. 12C is an embodiment of a sub-value indicator account balance screen in an embodiment of the Never Red Register of the present invention;

FIG. 13A is an embodiment of transaction screen for a transfer in an embodiment of the Never Red Register of the present invention;

FIG. 13B is an embodiment of an entered transaction with example data for a transfer in an embodiment of the Never Red Register of the present invention;

FIG. 13G is an embodiment of a display of a balance screen to review assets designated as available and spendable with the most recent transactions in an embodiment of the Never Red Register of the present invention;

FIG. 13H is an embodiment of a sub-value indicator account balance screen in an embodiment of the Never Red Register of the present invention;

FIG. 14A is an embodiment of a transfer transaction entered with example data in an embodiment of the Never Red Register of the present invention;

FIG. 14B is an embodiment of a flowchart showing the sub-value indicator account balance screen before and after the transfer transaction of FIG. 14A in an embodiment of the Never Red Register of the present invention;

FIG. 14C is an embodiment of a sub-value indicator account balance screen in an embodiment of the Never Red Register of the present invention;

FIGS. 17A-17D are embodiments of statements showing the balance of accounts in an embodiment of the Never Red Register of the present invention;

FIG. 21A is an embodiment of a deposit transaction with example data entered with an allocation to the retirement account of FIG. 20A in an embodiment of the Never Red Register of the present invention;

FIG. 21B is an embodiment of a flowchart showing the sub-value indicator account balance screen before and after the deposit transaction of FIG. 20A in an embodiment of the Never Red Register of the present invention;

FIG. 21C is an embodiment of a sub-value indicator account balance screen in an embodiment of the Never Red Register of the present invention;

FIGS. 22A-22E are embodiments of statements showing the balance of accounts in an embodiment of the Never Red Register of the present invention;

FIG. 23A is an embodiment of a settings menu in an embodiment of the Never Red Register of the present invention;

FIG. 23B is an embodiment of an account settings menu in an embodiment of the Never Red Register of the present invention;

FIG. 25B is an embodiment of add drawer settings to an account in an embodiment of the Never Red Register of the present invention;

FIG. 25C is an embodiment of add drawer settings to an account with example data in an embodiment of the Never Red Register of the present invention;

FIG. 26 is an embodiment of an account deletion screen in an embodiment of the Never Red Register of the present invention;

FIG. 27 is an embodiment of a drawer deletion screen in an embodiment of the Never Red Register of the present invention;

FIG. 29A is an embodiment of a goal settings screen in an embodiment of the Never Red Register of the present invention;

FIG. 29B is an embodiment of a goal settings screen with example data in an embodiment of the Never Red Register of the present invention;

FIG. 30A is an embodiment of a display of a balance screen to review assets designated as available, spendable and as allocated to retirement accounts, drawer accounts, and goal accounts with the most recent transactions of the accounts in an embodiment of the Never Red Register of the present invention;

FIG. 30B is an embodiment of a savings settings screen with example data in an embodiment of the Never Red Register of the present invention;

FIG. 31A is an embodiment of an allocation notification in an embodiment of the Never Red Register of the present invention;

FIG. 31B is a further embodiment of an allocation notification in an embodiment of the Never Red Register of the present invention;

FIG. 31C is a still further embodiment of an allocation notification in an embodiment of the Never Red Register of the present invention;

FIG. 36A is an embodiment of an account settings screen in an embodiment of the Never Red Register of the present invention;

FIG. 36B is an embodiment of a calendar option screen in an embodiment of the Never Red Register of the present invention;

FIG. 44A is an embodiment of insufficient funds alert in an embodiment of the Never Red Register of the present invention;

FIG. 44B is an embodiment of a flowchart showing the allocation steps for a transfer transaction to cover insufficient funds in an account that has a spendable account, a goal account and a drawer account associated with the account in an embodiment of the Never Red Register of the present invention;

FIGS. 45A-45G are embodiments of statements showing the balance of accounts in an embodiment of the Never Red Register of the present invention;

FIG. 46A is an embodiment of an add account settings screen with example data for a credit card account in an embodiment of the Never Red Register of the present invention;

FIG. 46B is an embodiment of pay off goal screen with example data in an embodiment of the Never Red Register of the present invention;

FIG. 47A is an embodiment of a flowchart showing the allocation steps in setting up a credit card account and the creation of sub-value indicators to prevent overage charges in an embodiment of the Never Red Register of the present invention;

FIG. 47B is an embodiment of a display of assets designated as available, spendable and available to charge on a credit card in an embodiment of the Never Red Register of the present invention;

FIG. 48 is an embodiment of main menu screen in an embodiment of the Never Red Register of the present invention;

FIG. 49 is an embodiment of enter charge screen with example data in an embodiment of the Never Red Register of the present invention;

FIG. 50A is an embodiment of a flowchart showing the allocation steps in entering a charge in a credit card account in an embodiment of the Never Red Register of the present invention;

FIG. 50B is an embodiment of a display of assets designated as available, spendable and available to charge on a credit card in an embodiment of the Never Red Register of the present invention;

FIG. 51 is an embodiment of enter payment screen with example data in an embodiment of the Never Red Register of the present invention;

Figure 52A:
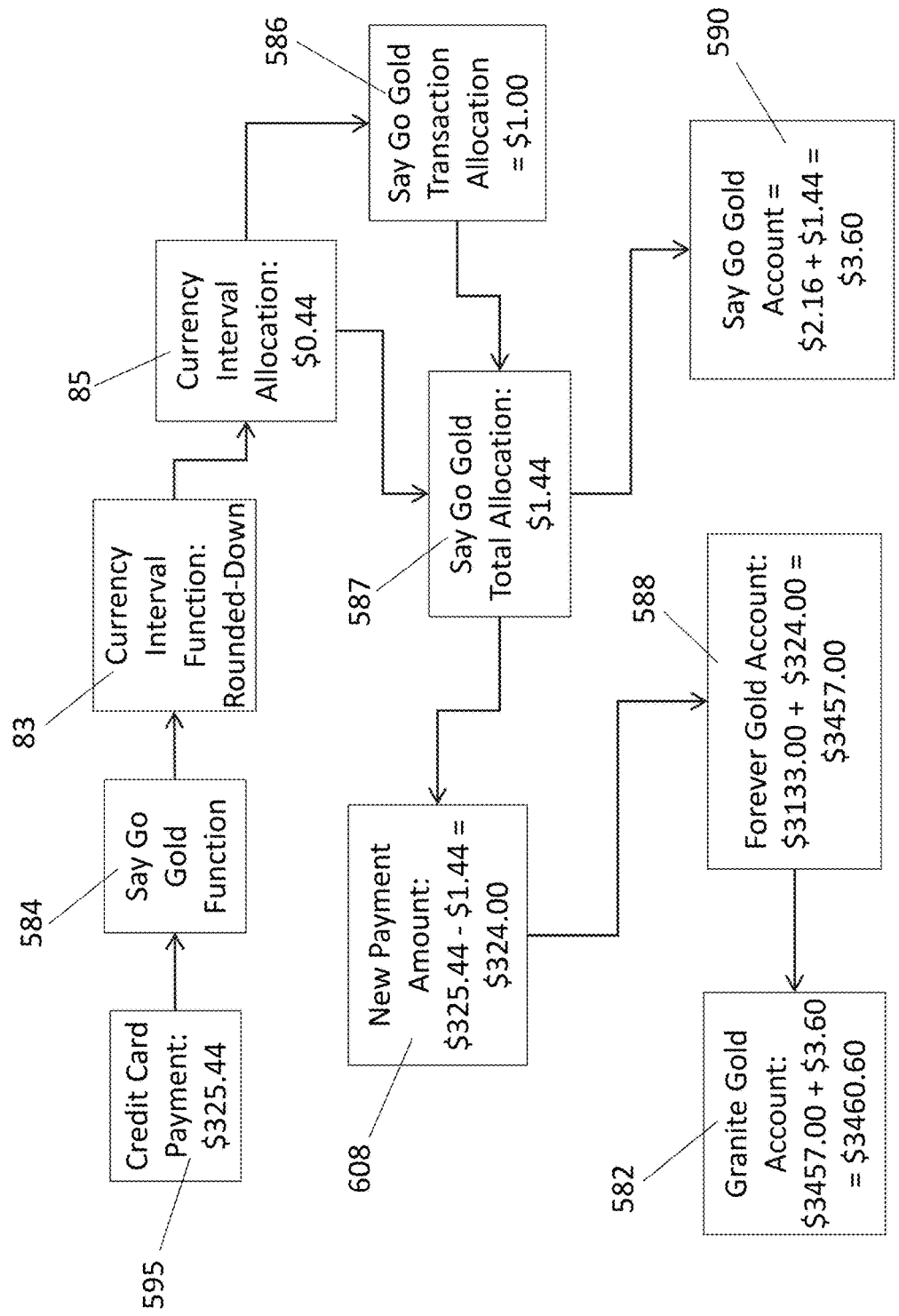
Figure 52B:
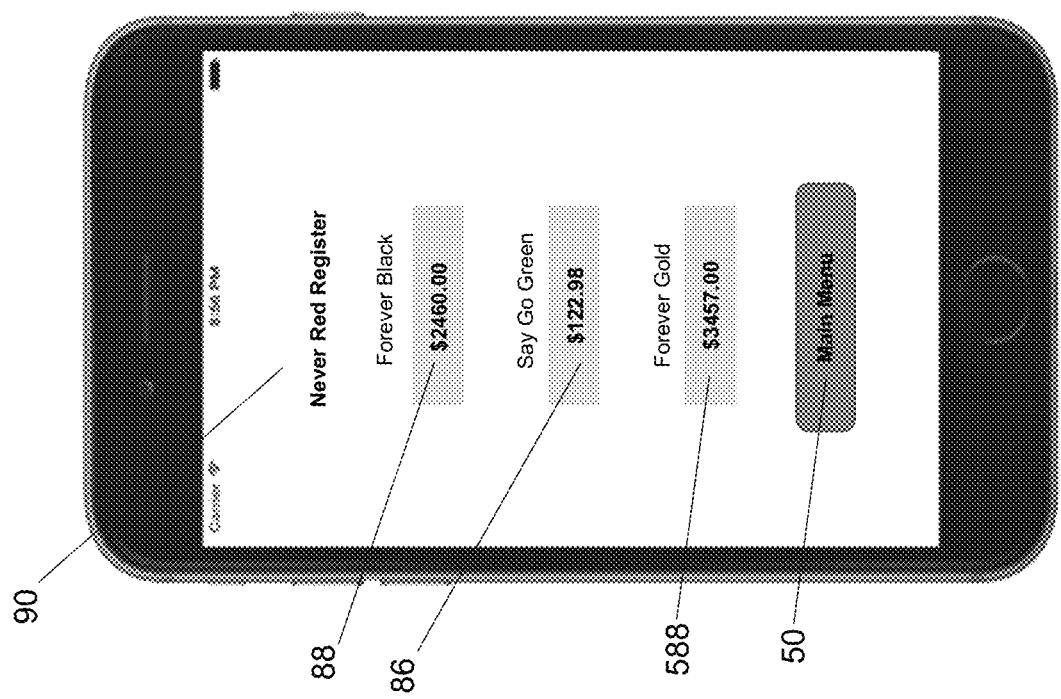
Figure 53A:
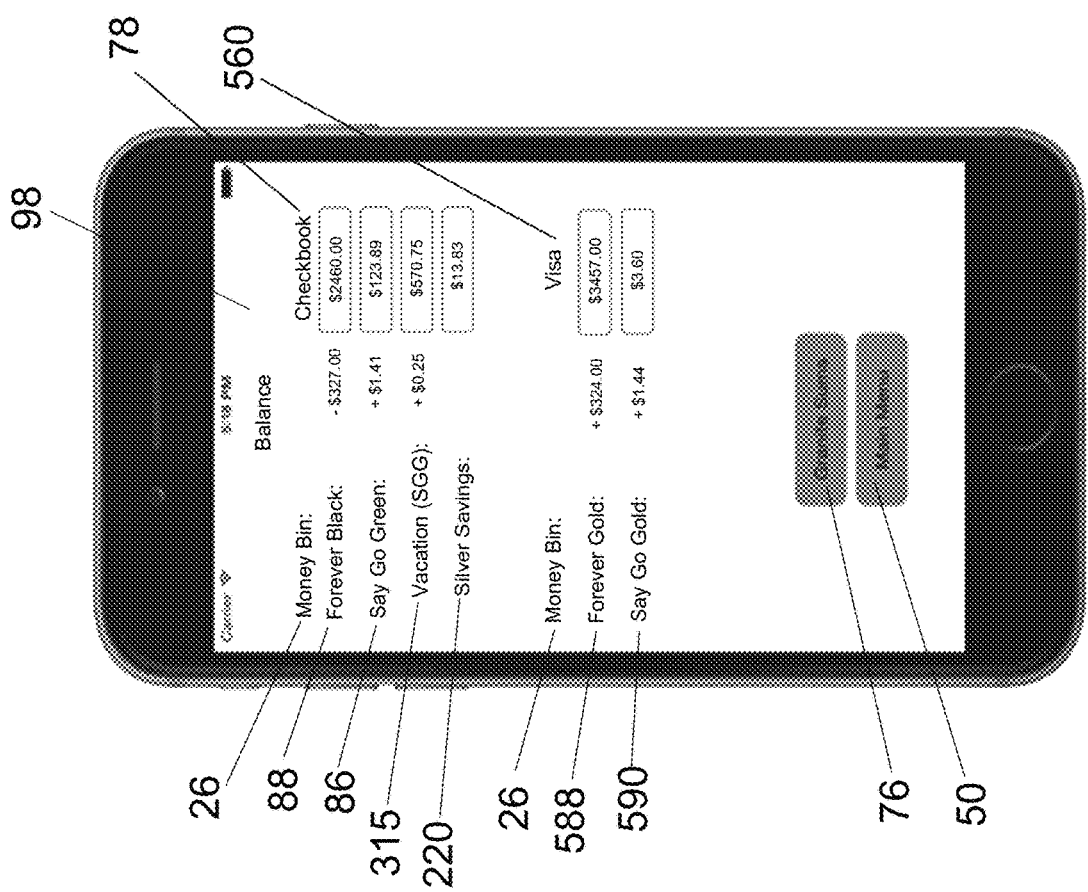
Figure 53B:
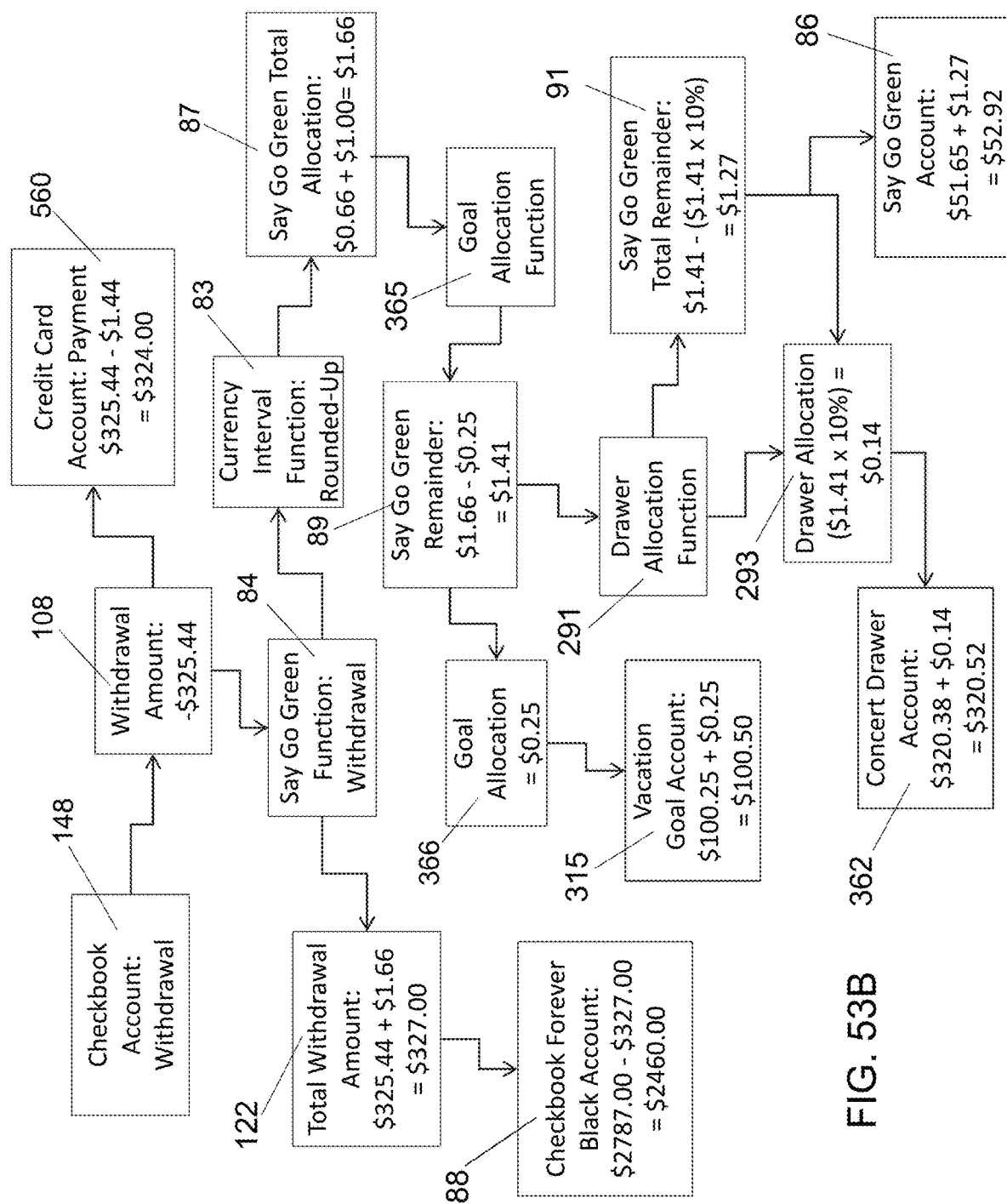
Figures 54A, 54B:
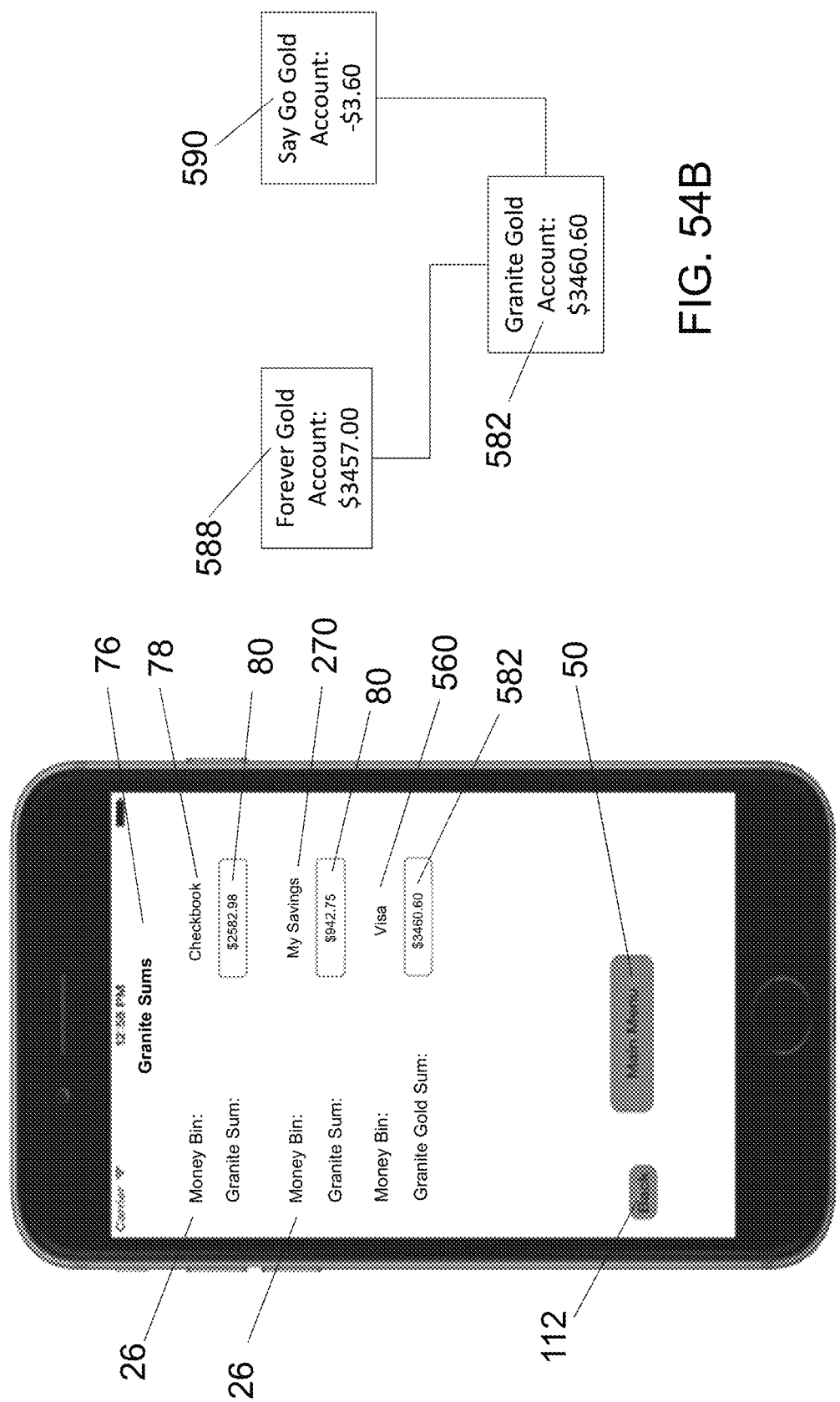
Figure 56B:
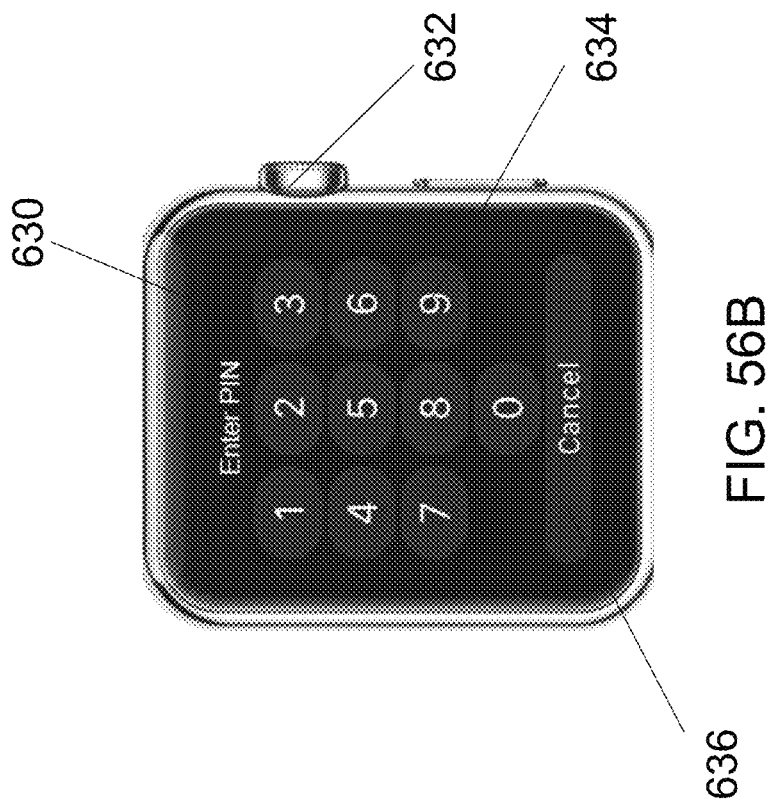
Figure 56A:
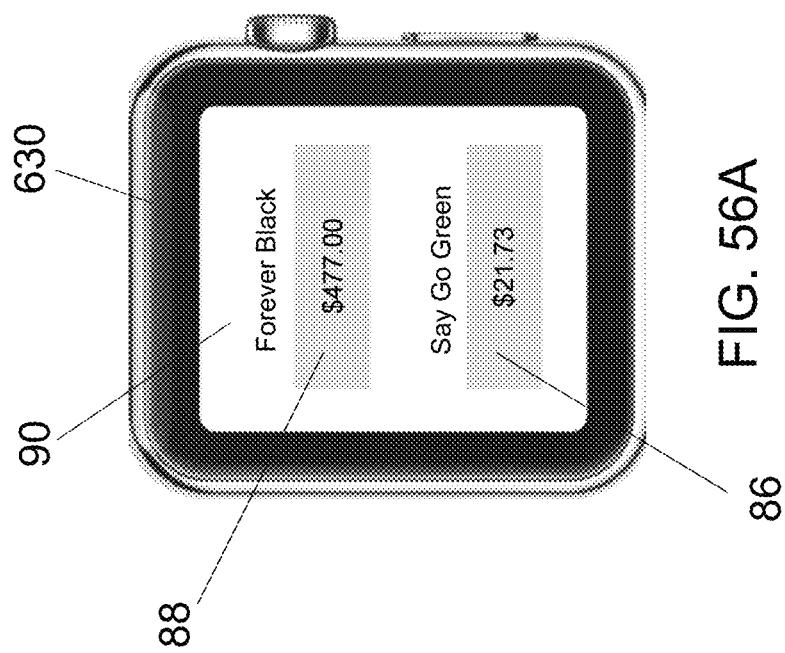
Figure 57B:
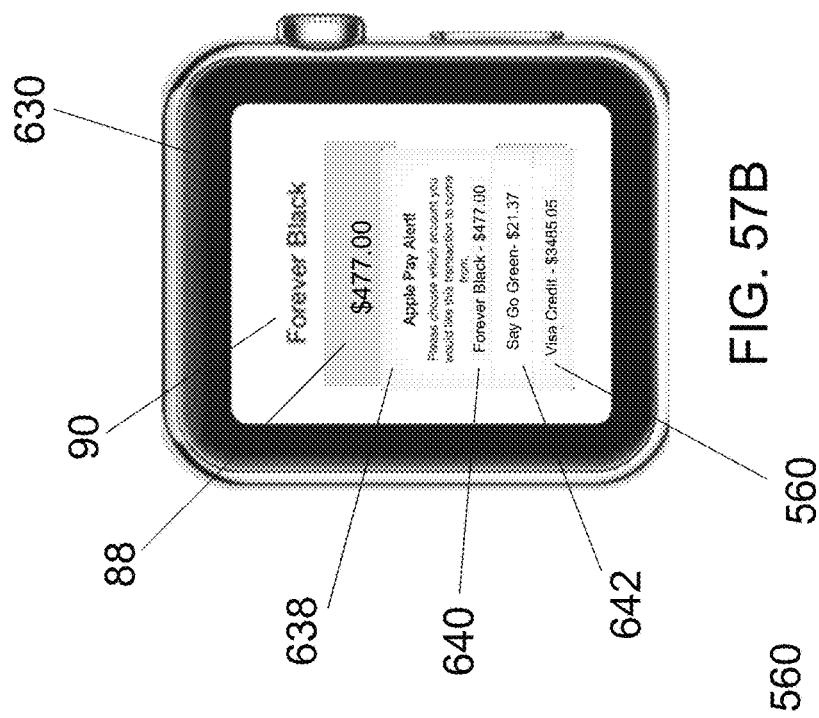
Figure 57A:
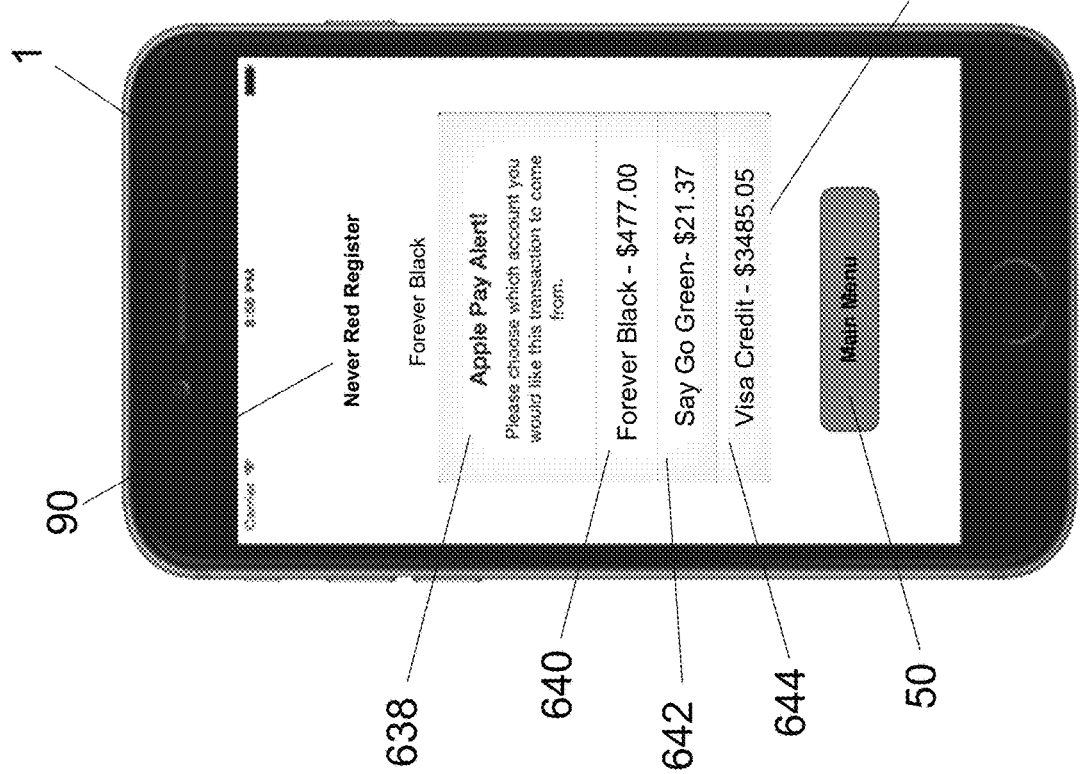

FIG. 52A is an embodiment of a flowchart showing the allocation steps in entering a payment in a credit card account in an embodiment of the Never Red Register of the present invention;

FIG. 52B is an embodiment of a display of assets designated as available, spendable and available to charge on a credit card in an embodiment of the Never Red Register of the present invention;

FIG. 53A is an embodiment of a display of a balance screen to review assets designated as available, spendable, and as allocated to a retirement account in one account with the spendable account having a goal account and assets allocated as available to charge within a credit card account with the most recent transactions of the accounts in an embodiment of the Never Red Register of the present invention;

FIG. 53B is an embodiment of a flowchart showing the allocation steps in entering a payment from one account to a credit card account in an embodiment of the Never Red Register of the present invention;

FIG. 54A is an embodiment of a sub-value indicator account balance screen in an embodiment of the Never Red Register of the present invention;

FIG. 54B is an embodiment of a flowchart showing the sub-value indicator account balance in an embodiment of the Never Red Register of the present invention;

FIG. 55A is an embodiment of a sync settings screen in an embodiment of the Never Red Register of the present invention;

FIG. 55B is an embodiment of a sync device removal notification in an embodiment of the Never Red Register of the present invention;

FIG. 56A is an embodiment of a wearable device with a display of assets designated as available and spendable in an embodiment of the in an embodiment of the Never Red Register of the present invention;

FIG. 56B is an embodiment of a wearable device with a pin code display for secure access in an embodiment of the Never Red Register of the present invention;

FIG. 57A is an embodiment of automated entering of transactions using a mobile payment system in an embodiment of the Never Red Register of the present invention; and FIG. 57B is an embodiment of automated entering of transactions using a mobile payment system implemented on a wearable device with a pin code display for secure access in an embodiment of the Never Red Register of the present invention.

DETAILED DESCRIPTION OF THE INVENTION

Figure 1:
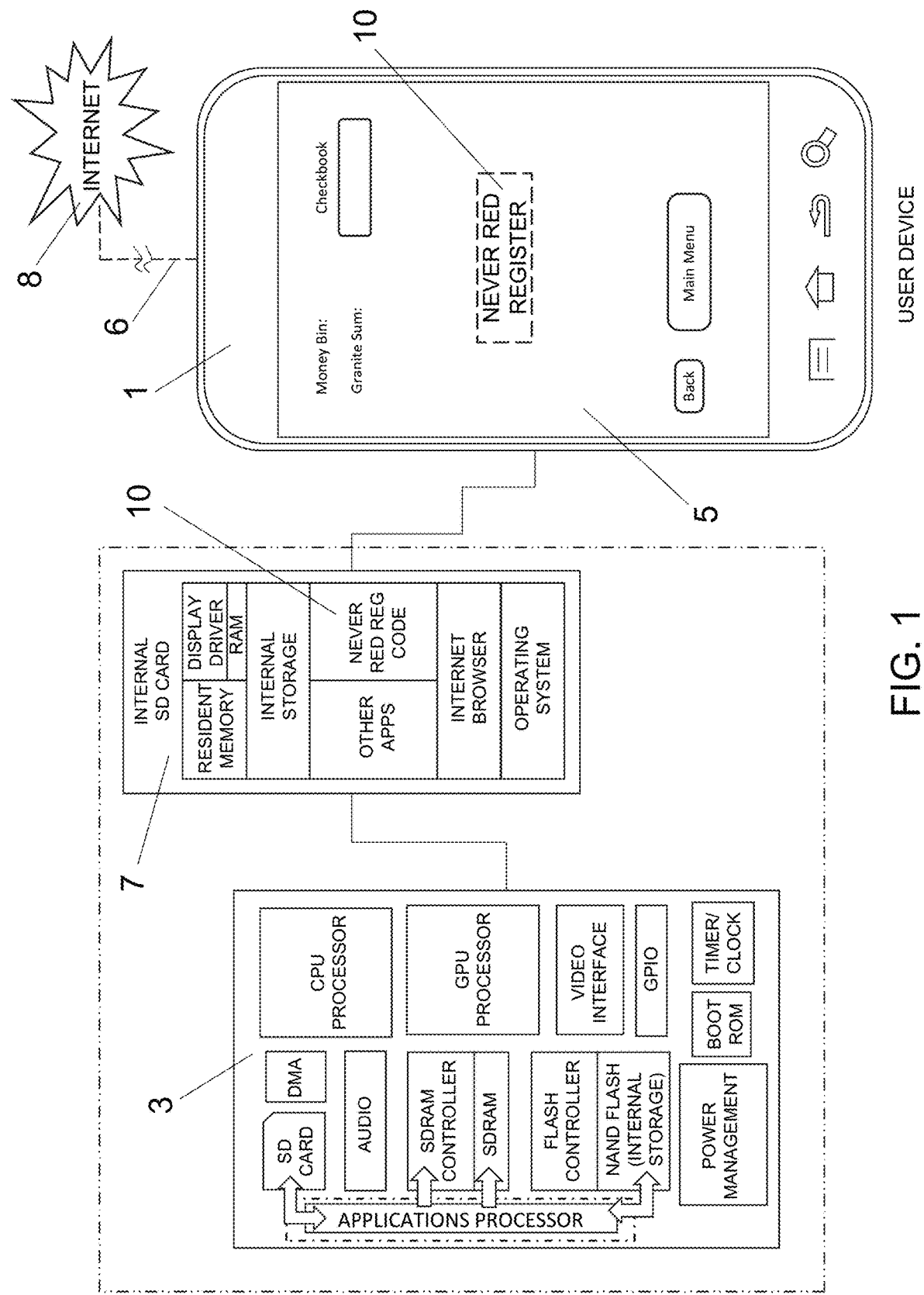
FIG. 1 is an embodiment of a digital device with an embodiment of computational circuitry and the Never Red Register of the present invention.

As shown in FIG. 1, there is illustrated an embodiment of a user device 1 in the form of a smart phone or tablet computer that comprises one or more computer processors and other computational circuitry 3 that is coupled to a user interface 5 and to one or more data storage systems 7 for implementing the Never Red Register 10 that may be implemented within a software application using computational algorithms to transform data and provide concrete useful results. The computational circuitry 3 operable and comprising instructions including administrative controls, configuration files, notifications, and transactional components of the Never Red Register 10 to access, transmit, receive and display data, perform transactional alterations of the data, develop transformed content and alert a user to changes in the transformed content including the attainment of predetermined goals and timelines. The Never Red Register 10 may be used with any computational circuitry 3 used on any electronic processing system within a digital device such as found in digital communications devices, smart phones, cellular phones and other mobile devices, home computers, laptop computers, tablet computers, or any other system for the processing of digital data.

In a first embodiment, the Never Red Register 10 may be offered as a downloadable software application through a wired or wireless connection 6 to the internet 8 to a single user device 1. Access to the Never Red Register 10 may be through a secure login using a password or pin number for example to view the Never Red Register 10. All data and content stored within the user device 1 is encrypted and the transfer of data and content may in a first embodiment be restricted requiring administrative privileges and authorization to transmit the content of the Never Red Register 10 to another digital device. Access to user data and transformed content in this first embodiment may therefore be limited to the user interface 5 of the user device 1. In this way content is secure and accessible only to a user having the appropriate password or pin, so that the financial information of the user is secure and only accessible on the specific user device 1. The computational circuitry 3 of the user device 1 shown in FIG. 1 is provided for the purpose of illustrating this first embodiment. However, the operation and implementation of the Never Red Register 10 is not limited to this first embodiment and in further embodiments the Never Red Register 10 may be implemented and encrypted data may be transferred through one of more intranet or internet connections 6.

Figure 2:
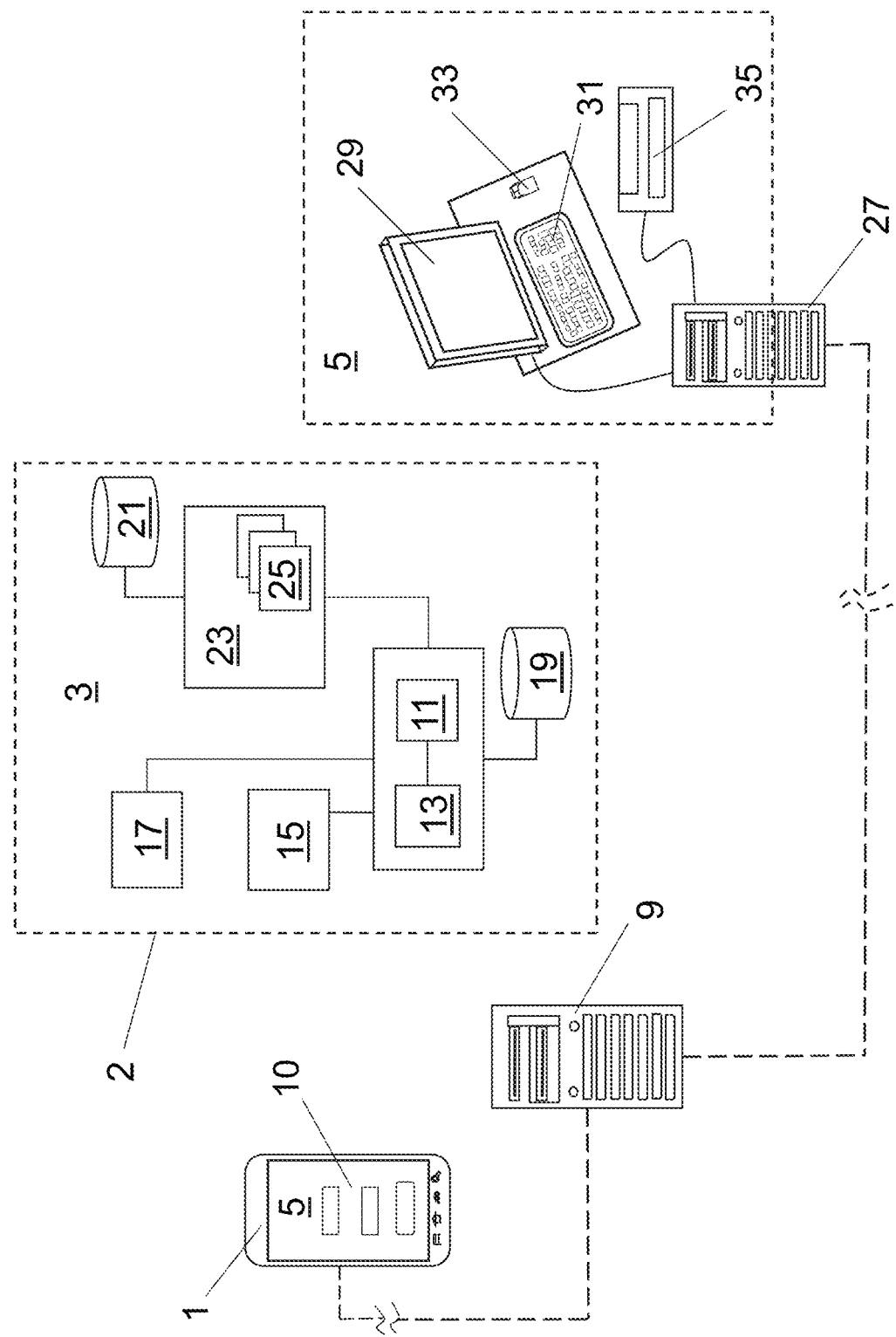
FIG. 2 is an embodiment of the digital device within a computer network with an embodiment of computational circuitry and the Never Red Register of the present invention.

In a further embodiment as shown in FIG. 2, the Never Red Register 10 may be integrated within a network through a wired or wireless connection 6 to transfer data and transformed content between one or more digital devices. The Never Red Register 10 may be implemented through a network having one or more server computers 9 or other digital devices that include computational circuitry 3 including a microprocessor-based unit 11 and memory 13 for receiving and processing data and content associated with the Never Red Register 10 implemented through software applications stored and operable on the digital device. The Never Red Register 10 may be built using a combination of HTML, CSS, Java Script, JQuery, and PHP or other software languages where those skilled in the art will readily recognize that the equivalent of such software may also be constructed in computer, electrical and communications hardware. The Never Red Register 10 includes a communications interface 15, code related to software applications 17, one or more databases 19 and administrative tools 21. The communications interface 15 may be an email or text messaging server to transmit messages and notifications to users of the Never Red Register 10. The administrative tools 21 set prioritize access and features to users based on requirements of use. An encryption module 23 secures data records 25 in an encrypted format that is accessible only to user's having appropriate administrative privileges, and matching login and password or pin codes to open the Never Red Register 10 and access the data and transformed content. The data recorded may include user information, descriptive account information, statements of cash totals within each account and other information that may be accessible to some or all users as determined by settings for administrative access established for each user using the administrative tools 21. The Never Red Register 10 may be subscription based and if a user fails to make timely payments, their access to the Never Red Register 10 may be terminated using the administrative tools 21. Because data manipulation algorithms and systems are well known, the present description emphasizes algorithms and features forming part of, or cooperating more directly with the method and hardware of the presently disclosed invention. General features of databases, digital communications devices, email, text messaging and computerized systems are likewise well known, and the present description is generally limited to those aspects directly related to the method and related hardware of the invention. Other aspects of such algorithms and apparatus, and hardware and/or software for producing and otherwise processing the data and transforming the content involved therewith, not specifically shown or described herein may be selected from such systems, algorithms, components, and elements known in the art.

Implementation of the Never Red Register 10 may be in conjunction with one or more database management systems (DBMS) such as Oracle, IBM DB2, Microsoft SQL Server, PostageSQL, MySQL, or others using widely supported database languages such as SQL to define and manipulate data and perform data queries. Other aspects of such algorithms and apparatus, and hardware and/or software for producing and otherwise processing the data involved therewith, not specifically shown or described herein may be selected from any such systems, algorithms, components, and elements known in the art. The software application and computer platform may be hosted on a SSL, SSL 256, SHTTP bit secured server as a fully redundant data center. The platform may have multiple levels of security and layers of redundancy built in to make sure that all data and user information is secured and not open to the public. Data replication and redundancy may be performed automatically and all servers may be secured in optimal conditions. The implementation may further provide synchronization of local and remote desktop clients using virtual machine check in and check out operations to maintain access to the most recently updated local or remote copies that reflect user changes to software programs and accessed data files.

In each context, the invention may be stand alone or may be a component of a larger system solution. Furthermore, user interfaces 5, e.g., the input, the digital processing, the display to a user, the input of user requests or processing instructions, the output, can each be on the same or different devices and physical locations, and communication between the devices and locations can be via public or private network connections, or media based communication. Where consistent with the foregoing disclosure of the present invention, aspects of the method of the invention can be fully automatic, may have user input (be fully or partially manual), may have user or operator review to accept/reject the result, or may be assisted by data or metadata (data or metadata that may be user supplied, supplied by another computer program or database from a different application or determined by an algorithm). Moreover, the algorithm(s) may interface with a variety of workflow user interface 5 schemes.

The Never Red Register 10 of the present invention may be implemented through application software 17 downloaded to the server 9 and/or as a web-native software application delivery model or SaaS (Software as a Service) to be hosted and operated as an on-demand computing service such as a cloud or shared resource database through a web browser using the internet 8 through an internet connection 6. The Never Red Register 10 may include policies and protocols in cloud description language (CDL) and domain specific languages (DSL) for this implementation to manage and monitor secure access and system usage to one or more domains to provide multiple virtual servers 2 with each server serving one or more instantiations of the Never Red Register 10. In some embodiments, security of the virtual server 2 is provided by having a separate virtual server 2 setup for each user which may be an individual or a business with each having using a unique domain name that may be active solely based on administrative controls and adherence to use and payment requirements, and may be immediately deactivated at any time. Each virtual server 2 has data storage where unique data records 25 specific to the individual or business are secured. The Never Red Register 10 and data records 25 may in some embodiments be accessed through a single digital device with restrictions on data and content transfer or be accessible through one or more digital devices such as a computer system 27 separate from the user device 1. As shown in FIG. 2, the computer system 27 may include a user interface 5 through a monitor 29, keyboard 31, and mouse 33 and an output device such as a printer 35 to print out bank statements and other information from the Never Red Register 10 as desired by the user. Other input and output devices such as a touch screen may also be used to access, operate, enter and review data using the Never Red Register 10. At all times, the transactional data and transformed content of the user or business is protected from unauthorized access and copying through the secure management and encryption protocols of the Never Red Register 10. The Never Red Register 10 may further provide a backup of the data and transformed content of the user or business to a storage unit to provide a record of the stored transactions to the user or business when the Never Red Register 10 is inactivated. The data may be stored in an unencrypted format or an encryption code may be provided to access the data for review, but features of the Never Red Register 10 to transform or manipulate the data may not be provided.

Components of the user interface 5 provide visually to the user transactional data that has been subject to transformations using the Never Red Register 10 of the present invention implemented on computational circuitry 3 of one or more computer systems. The user interface 5 can be a monitor 29, a tablet computer, or other visual computer screen or graphical user interface (GUI) a printer 35 or other digital device that provides a visual or other type representation of a final output from the computational circuitry 3 of the digital device. The user interface 5 can also be an output device that provides the transactional data as a digital file. The microprocessor-based unit 11 provides means for processing the transactional data to produce readily discernible, informational and organized images and data on the intended user interface 5 or media. The present invention can be used with a variety of other output devices that can include, but are not limited to, a digital photographic printer and soft copy display. Those skilled in the art will recognize that the present invention is not limited to just these mentioned data processing functions.

The server computer 9 shown in FIG. 2 can store computer programs by having a program stored in an internal or external computer readable storage medium 7, which may include, for example: magnetic storage media such as a magnetic disk or magnetic tape; optical storage media such as an optical disc, optical tape, or machine-readable bar code; solid state electronic storage devices such as random-access memory (RAM), read only memory (ROM) or flash memory or other data storage devices. The associated computer programs may be stored locally and or remotely on a virtual machine (VM) or data center using any other physical device or medium employed to store a computer program indicated by offline memory device. For example, the method can be performed using a system including one or more digital communications devices and/or one or more personal computer systems 27. One or more digital devices may be connected wirelessly, using Wi-Fi, Bluetooth, cellular, radio-frequency and other bandwidths for communication between digital devices, and it is to be appreciated that such devices can be mobile devices (e.g., iPod, iPad, tablet computer, notebook, laptop, smart phone, or cell phone that can be used as a processing unit, a display unit, and/or a unit to give processing instructions), and access to the Never Red Register 10 may be offered as a service through a network connection 6 via the internet 8.

To initially setup an embodiment of the Never Red Register 10, the user creates a pin code to restrict access to users that know the pin code. As shown in FIG. 3A, the Create Pin 12 screen for the Never Red Register 10 provides for the user a number keypad 14 to enter a pin code that may be of any sequence and length but preferably a pin code of between four and twelve digits to be easily remembered by the user. When first opening the Never Red Register 10, the user selects a pin code and selects the Create Pin 16 key that encrypts and stores the pin code within the administrative tools 21 to be associated with the user to allow access to the Never Red Register 10 on the user device 1. If the user makes a mistake when creating their pin code, they may select the Cancel 18 key to reset the keypad 14 and then create their pin code.

Additional user information including a login name, password, email, personal question or other information specific to the user may be entered by the user or captured and stored by the Never Red Register 10 from the user device 1 during the download to provide information for the user to take steps to recover or recreate the pin code if necessary. Settings features within the Never Red Register 10 further provide for the user to change or delete their pin code if desired. After the initial setup, the Never Red Register Start 20 screen prompts the user to enter their pin code to open the Never Red Register 10. In other embodiments, the user may gain access to the Never Red Register 10 by entering a login name and password, by answering a personal question, or by using other methods known in the art to securely access a software application. In some embodiments, the user may simply select an icon and the Never Red Register 10 will be accessible without a requirement for a pin code or password. This may be a preference for the user, since while the Never Red Register 10 provides financial information, preferred embodiments of the software do not provide communication or access to assets or funds within the user's actual bank account, so transactions that involve the deposit, withdrawal or transfer of actual assets or funds in the form of cash money are performed separately from the Never Red Register 10. In such preferred embodiments, the Never Red Register 10 provides allocation and tracking of funds and allows for financial goal setting, notification and alerts when financial goals are met, but the user must then take steps to move assets or funds between accounts or withdraw funds from their actual bank account when alerted.

Figure 3B:
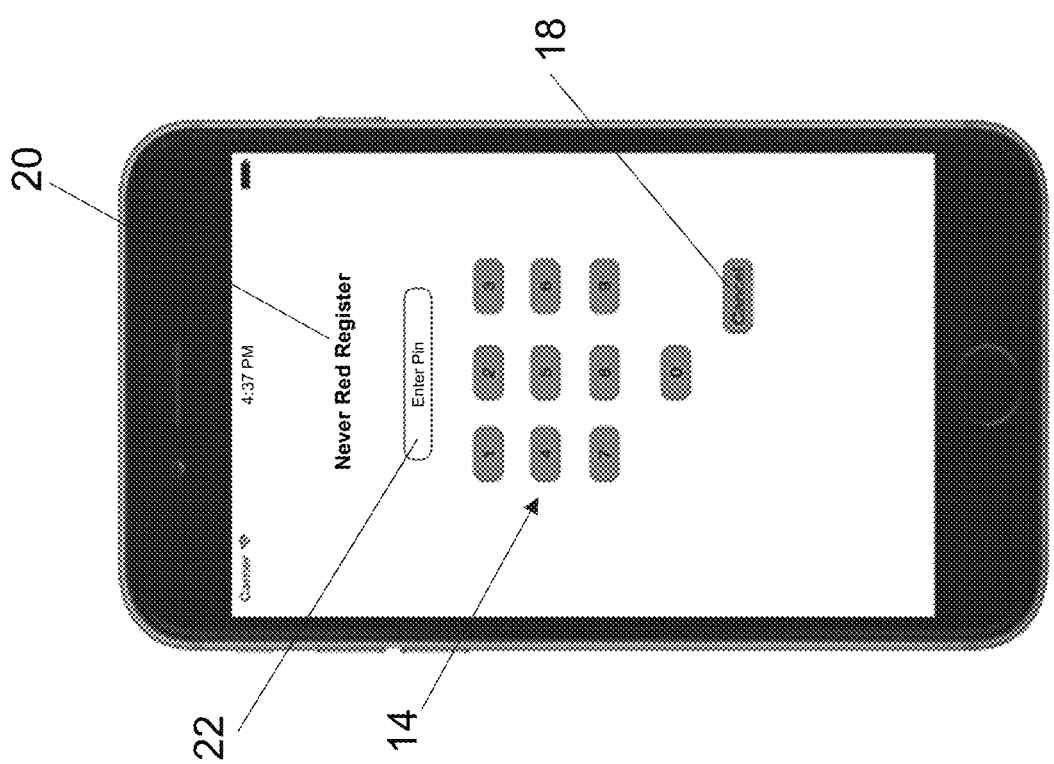
FIG. 3B is an embodiment of a start screen in an embodiment of the Never Red Register of the present invention.
Figure 3A:
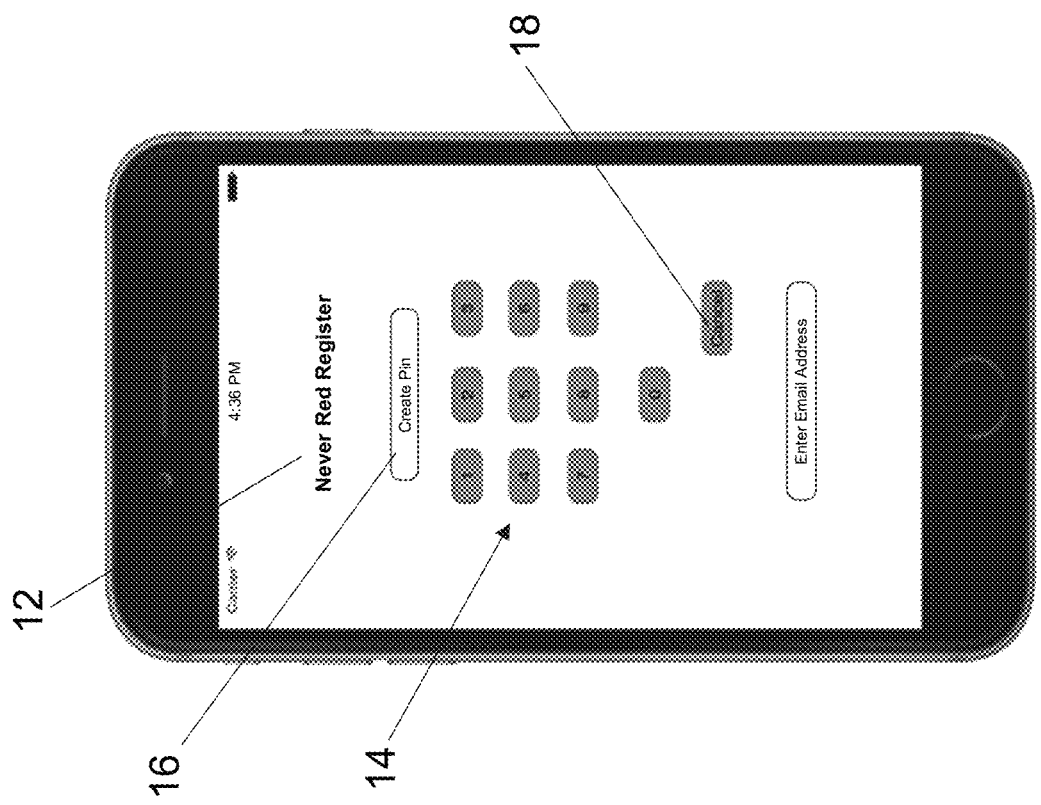
FIG. 3A is an embodiment of a create pin code screen in an embodiment of the Never Red Register of the present invention.
Figure 4A:
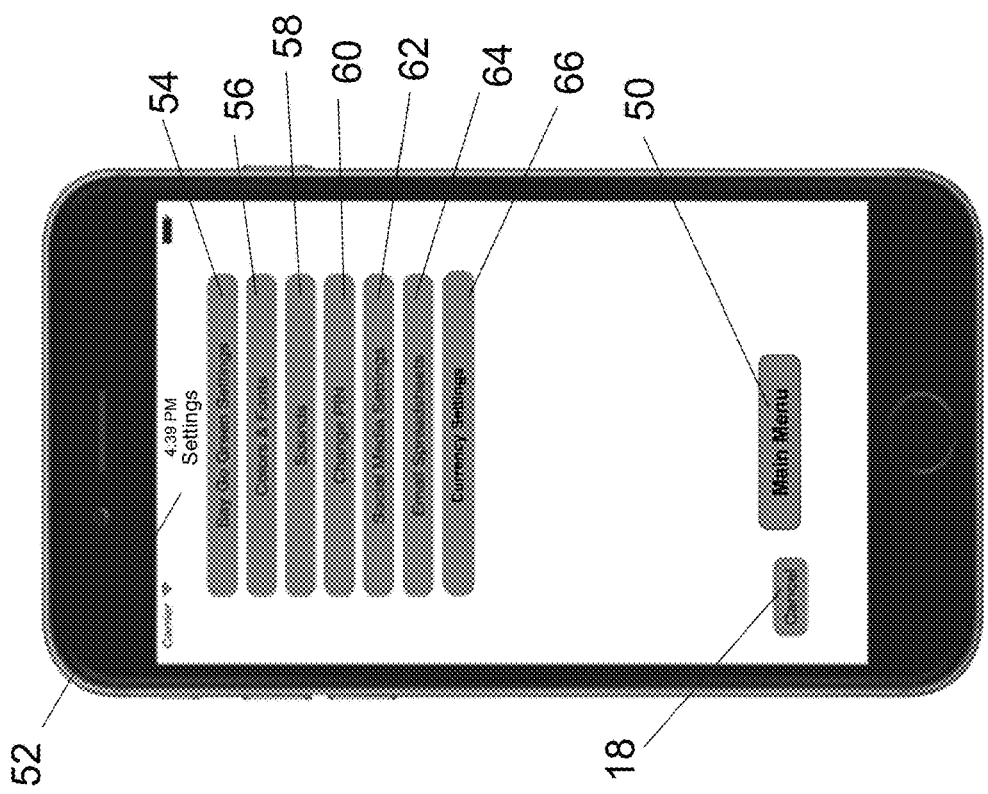
FIG. 4A is an embodiment of an initial setup screen in an embodiment of the Never Red Register of the present invention.

Once the pin code has been created the Never Red Register 10 is accessed as shown in the Never Red Register Start 20 screen in FIG. 3B by entering the pin code in the keypad 14 and selecting the Enter Pin 22 key. If the pin code is entered incorrectly, the Cancel 18 key may be selected to reset the keypad 14 and have the user reenter the pin code. Once the pin code has been confirmed, the Initial Setup 24 screen launches, prompting the User for the information needed to begin running the Never Red Register 10. As shown in FIG. 4A, the user must first enter information regarding their actual bank account, for example an operating account for a business that receives deposits in revenue from sales and makes withdrawals to pay overhead expenses, or as another example, a checking account for an individual that receives deposits from the user's paycheck and makes withdrawals to pay cost of living and entertainment expenses. The user may in some embodiments make transfers from the checking account to for example a savings account to save for vacation, retirement or costly tangible items such as wedding ring, car, or boat. Each individual or business may have their financial habits and methods of tracking their finances, but regardless of these, the Never Red Register 10 teaches structure and commitment to better understand savings, expenditures and achieving financial goals.

The Initial Setup 24 screen, as shown in FIG. 4A, prompts the user to enter information on their actual bank account referred to herein as the Money Bin Account 26. The Money Bin Account Type 28, an Account Name 30, and the Actual Balance 32 is entered. An Interest Rate 34 toggle button may be selected as "On" if the account provides interest and the interest rate may be entered. An important feature of the Never Red Register 10 is the prevention of overdrawing the account and therefore provides the benefit to the user of not ever having to pay bank overdraft charges or possible monthly service charge fees if the user follows the indicators provided by the Never Red Register 10. In the What is the Minimum Balance that your bank requires for this account? 36 prompt the user enters a cash value of the minimum balance that must be in the account to prevent monthly fees. Alternatively, the amount of an overage charge for withdrawing more funds than are available in the account may be entered. The amount entered is the Never Red Number 38 which is subtracted from the entered Actual Balance 32. If no minimum balance is required in the account, an amount of $1.00 will be entered as a default amount to prevent the Actual Balance 32 from going below zero.

Another important feature of the present invention is the Say Go Green Account 86 which as described herein is "free spending money" that may be spent without impacting budgets or financial goals. As shown in FIG. 4A, a Say Go Green Savings Prompt 40 that asks the user for an amount to be entered for spending is provided. The amount is an amount chosen by the user for the initial balance 42 of the Say Go Green Account 86 for the user to designate a portion of their Money Bin Account 26 as free spending money. The Say Go Green Transactional Allocation 46 prompt allows the user to enter an amount that is referred to herein as the Say Go Green Transactional Allocation 46. In embodiments of the Never Red Register 10, the Say Go Green Transactional Allocation 46 is an amount set aside whenever a transaction such as a deposit, transfer or withdrawal of assets is performed within the Money Bin (or other settings specified?) Account 26 in order to build savings and achieve financial goals as described herein. A Percent or Exact Amount 48 toggle button provides for the Say Go Green Transactional Allocation 46 to be set as a percentage of the transaction amount such as a percentage of a deposit, transfer or withdrawal amount, or be set as an exact amount to be set aside during a transaction. If a percentage is chosen a warning may be provided if a user exceeds a certain percentage such as 10% since the transfer of funds to the Say Go Green Account 86 will add up quickly. As a result, a lower percentage may be recommended depending on the user's income. The Say Go Green Transactional Allocation 46 has a default setting of $1.00 if the user does not enter an amount. A Start Saving! 70 key may be selected to save the account and transactional allocation information.

Figure 4B:
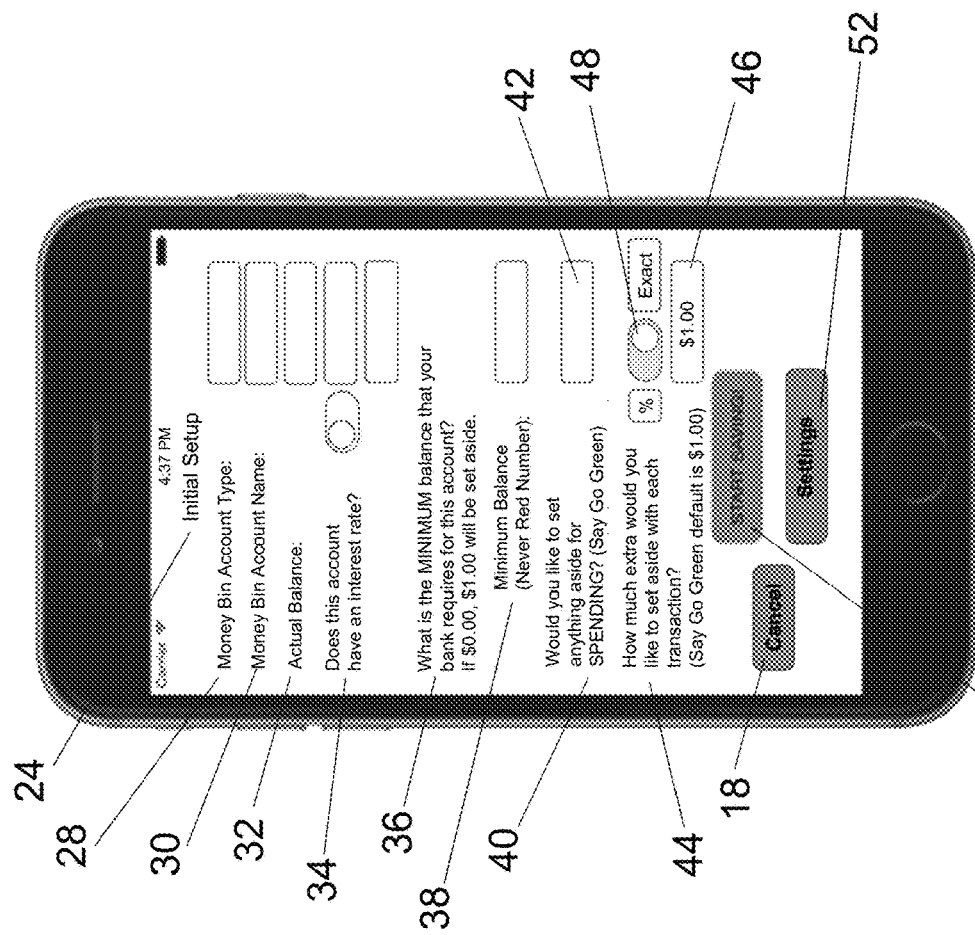
FIG. 4B is an embodiment of a settings screen in an embodiment of the Never Red Register of the present invention.

A Settings 52 screen as shown in FIG. 4B provides to the user options to adjust the Say Go Green Settings 54 to change the amount of the Say Go Green Transactional Allocation 46 or make changes to the Say Go Green Account Balance 42. Other settings may be provided to change Colors & Fonts 56, change Sounds 58, Change PIN 60 to change the access pin code, adjust Social Media Settings 62 or change an email address that is used to Email Spreadsheets 64 showing account balances within the Never Red Register 10. The Sounds settings 58 may for example provide for a cash register ringing sound or the dropping of coins during a transaction to indicate to the user that funds are being allocated to their financial goals or have other sounds for each transaction as desired and configured by the user with a volume setting to adjust the level of sound. Using the Colors & Fonts Settings 56, the font color, background color, colors of keys and buttons, and other personalization options for the screens of the Never Red Register 10 may be configured by the user.

A Currency Settings 66 option may be provided to enter a type of currency and a currency interval to be used to round down or round up from a transactional amount to determine a rounded down or rounded-up amount. For example, if the currency is entered as US dollars, the currency interval is entered by default as one dollar. A rounded-up amount is determined by adding an amount to a transactional amount to reach the currency interval, such as by adding 59 cents to a transactional amount of $385.41 to determine a transactional amount of $386.00. A rounded down remainder is determined by subtracting an amount from the transactional amount to reach the currency interval, such as subtracting 62 cents from a transactional amount of $89.62 to determine a transactional amount of $89.00. The rounded down or rounded-up amount may then be allocated to spending or financial goals using the Never Red Register 10.

Figures 4C, 4D:
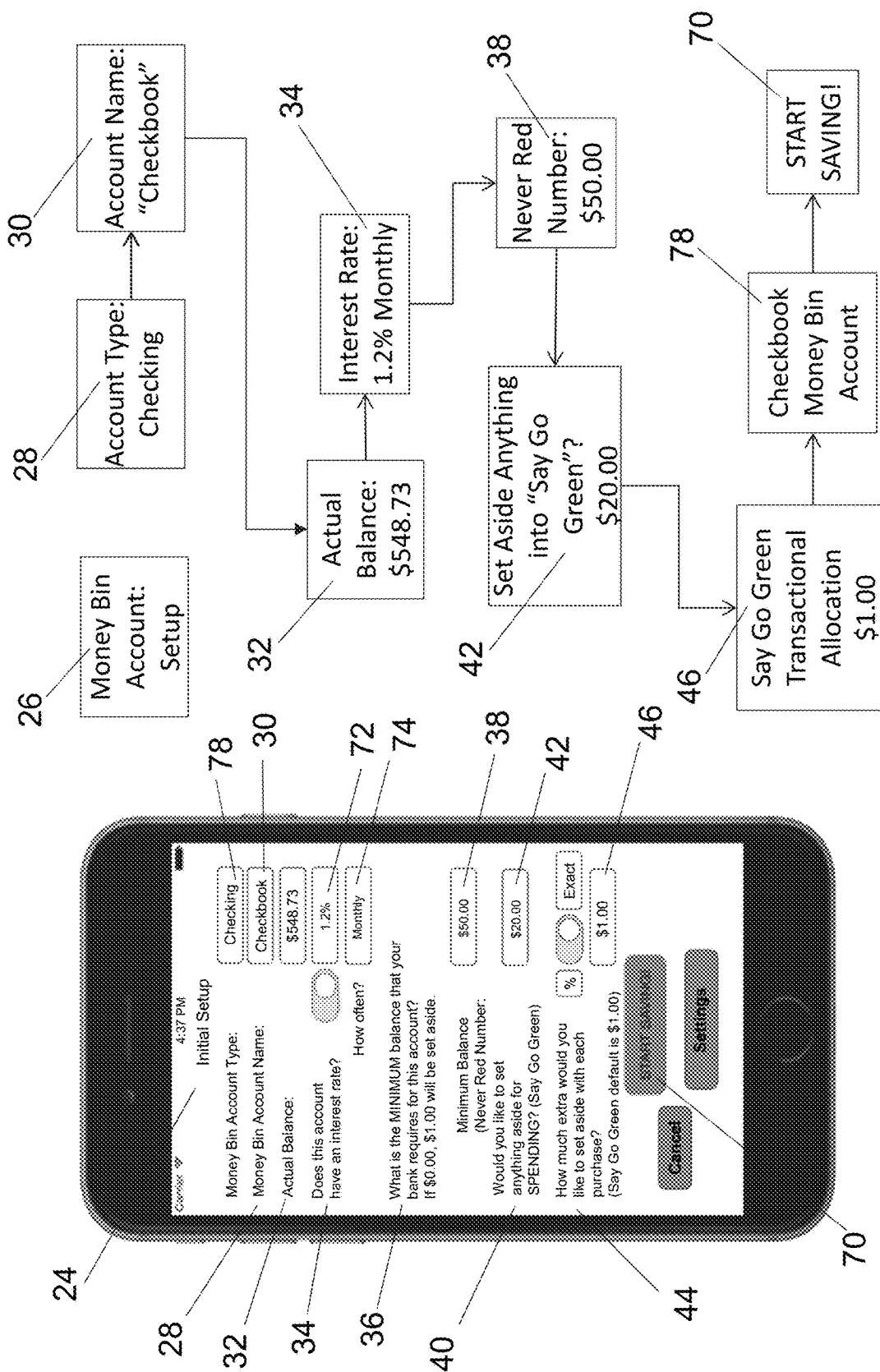
FIG. 4C is an embodiment of an initial setup screen in an embodiment of the Never Red Register of the present invention.
FIG. 4D is an embodiment of a flowchart with the initial setup information in an embodiment of the Never Red Register of the present invention.

As shown in FIG. 4C and in the flow chart in FIG. 4D, once the information is entered in the initial setup 24 screen, the Start Saving! 70 key may be selected to save the account and transactional allocation information. In this example, the Account Type 28 has been entered as a Checking Account and the Account Name 30 has been entered as "Checkbook". The Actual Balance 32 for the Checking Money Bin Account 78 has been entered as $548.73 and Interest Rate 34 toggle button has been selected and a 1.2% interest rate 72 has been entered. A How Often 74 prompt provides for entering the frequency of when the interest rate 72 is calculated. The Never Red Register 10 will adjust the Actual Balance 32 based on the interest rate 72 and frequency entered 74. The Never Red Number 38 is entered by the user as the minimum account balance required by the financial institution to prevent the user from paying overage charges. The Never Red Number 38 in this example is $50 and an initial balance 42 for the Say Go Green account of $20 which are assets designated as spending money is entered in this example in an amount of $20. The Say Go Green Transactional Allocation 46 is entered or set for example at a default amount of $1.00. The Start Saving! 70 button is selected to initialize and add these saved settings into the Never Red Register 10.

Figures 4E, 4F:
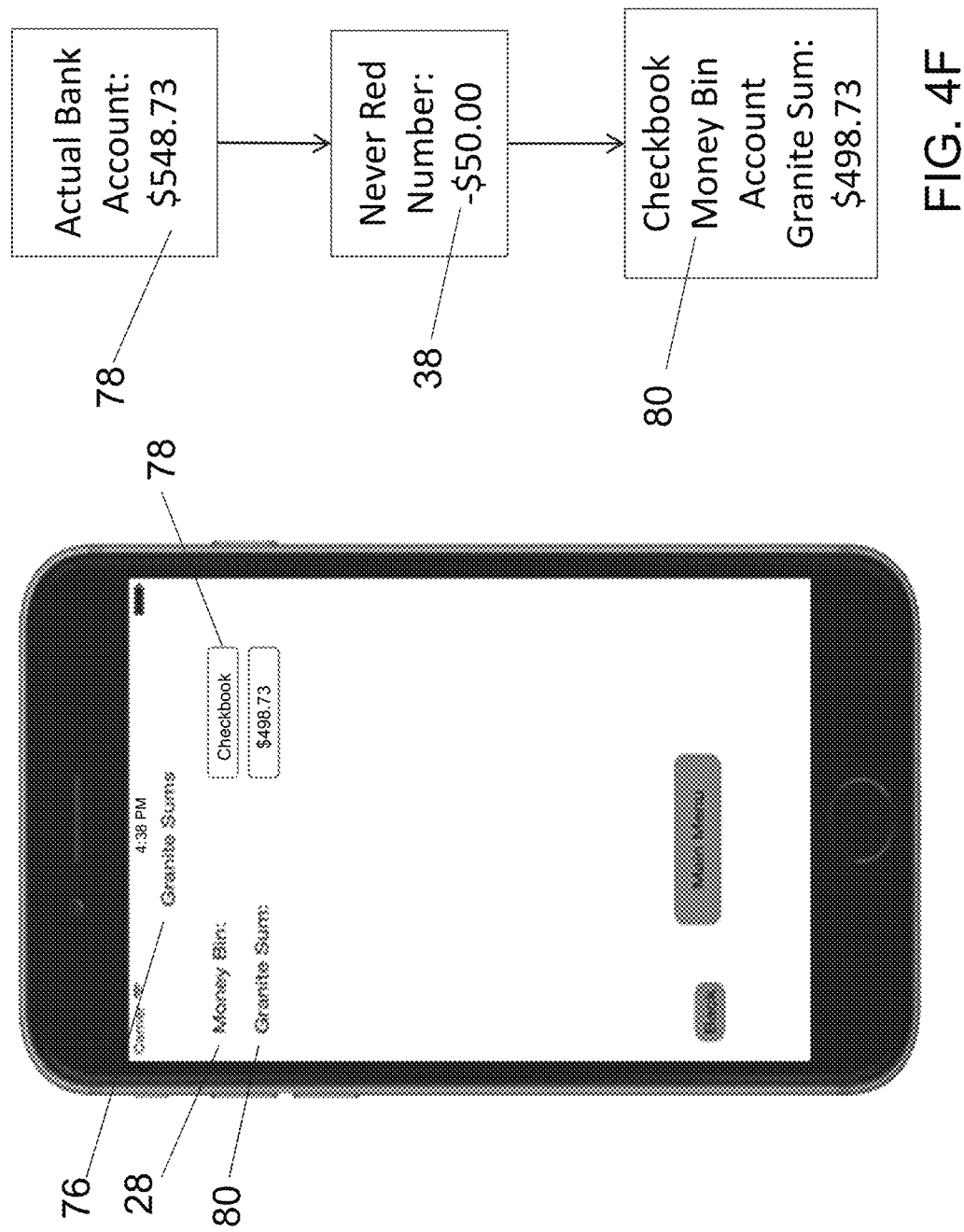
FIG. 4E is an embodiment of a sub-value indicator account balance screen in an embodiment of the Never Red Register of the present invention.
FIG. 4F is an embodiment of a flowchart showing steps to derive the sub-value indicator account balance in an embodiment of the Never Red Register of the present invention.

As shown in FIG. 4E, by selecting the Start Saving! 70 button, the account information entered about the user's bank account and allocation settings is stored and a sub-value indicator that is referred to herein as the Granite Sum 80 is displayed in the Granite Sums 76 screen. In this embodiment, a user's actual bank account, referred to herein as a Money Bin Account 78, is the initial account that the user will manage transactions based on the allocations and recommendations made using the Never Red Register 10. As described herein, the Never Red Register 10 in this embodiment does not require communication or control of the user's bank account and instead manages assets based on entries made by the user. The Granite Sums 76 screen as shown in FIG. 4E provides the Account Name 30 that is "Checkbook" of the Money Bin Account 78 and the sub-value indicator or Granite Sum 80 that in this example has a balance of $498.73. As shown in FIG. 4F, the Granite Sum 80 is equal to the Actual Balance 32 of $548.73 of the user's actual bank account, minus the Never Red Number 38 of $50.00. The Never Red Number 38 is the minimum balance required by the user's actual bank account to avoid overage charges or monthly fees.

As shown in FIG. 5A, using the Never Red Register 10, the initial spending balance 42 of the Say Go Green Account 86 is withdrawn from the Granite Sum Account 80 and deposited to the Say Go Green Account 86 which invokes a deposit transaction in the Never Red Register 10. In a first embodiment, for a deposit transaction the Never Red Register 10 determines a Granite Sum Remainder 82 by providing instructions to implement a Currency Interval Function 83 and a Say Go Green Function 86. Within the Never Red Register 10, the Currency Settings 66 are entered for the type of currency being used and a currency interval provides for a Currency Interval Function 83 to determine one of either a rounded-up amount or rounded down remainder based on the type of transaction. One of either the rounded down remainder or rounded-up amount referred to herein as the Currency Interval Allocation 85 is allocated when a transaction within the Money Bin Account 78 is performed. The Never Red Register 10 invokes the Currency Interval Function 83 by providing instructions to implement the Say Go Green Transactional Allocation Function 84 when a transaction within the Money Bin Account 78 is performed. In this example, the transaction of depositing the Say Go Green Account Initial Balance 42 from the Granite Sum Account 80 triggers the Say Go Green Function 84 which implements the Currency Interval Function 83. Based on settings in the Never Red Register 10, if for example the transaction is a deposit, the Say Go Green Account Initial Balance 42 is withdrawn from the Granite Sum Account 80 leaving a Granite Sum Remainder 82. The Currency Interval Function 83 determines a Currency Interval Allocation 85 by rounding down Granite Sum Remainder 82. The Say Go Green Function 84 then withdraws the Say Go Green Transactional Allocation 46 from the Granite Sum Remainder 82 and allocates Currency Interval Allocation 85 and the Say Go Green Transactional Allocation 46 to the Say Go Green Account 86 thereby increasing the spendable assets of the user. In this example, the Currency Interval Allocation 85 of $0.73 and the Say Go Green Transactional Allocation 46 of $1.00 is withdrawn from the Granite Sum Remainder 82 and deposited into the Say Go Green Account 86 to increase the balance to $21.73. The Granite Sum Remainder 82 with the Say Go Green Total Allocation 87 of $1.73 withdrawn is designated as available assets that are stored within the Never Red Register 10 in an available asset account referred to herein as the Forever Black Account 88. As shown in the Quick Check 90 screen in FIG. 5B of the Never Red Register 10, the user is provided with the Forever Black Account 88 balance showing assets designated as available in the Forever Black Account 88 and assets designated as spendable in the Say Go Green Account 86 in the associated Checkbook Money Bin Account 78. Spendable assets, in this example, indicate money that may be spent by a user without impacting their financial goals. In this way, a user may easily see and understand that if they exceed their Say Go Green Account 86 balance, their available balance and funds allocated to savings, retirement and their financial goals will be affected. This may mean not enough money to cover expenses or simply less money will be allocated to savings, retirement and it will take longer for them to reach their financial goals, all because they chose to spend more than was allocated for spending by the Never Red Register 10. The feature of automatically allocating money to spend for the user is very different from the inventions of the prior art that automate allocations for savings or retirement and that may provide to the user extrapolations of what the user may do to achieve their financial goals, but not help them manage their spending. Very differently than the prior art, the Never Red Register 10 helps to affect a change in the financial habits of the user by providing them an amount to spend and then automatically allocating additional funds to that amount and to savings, retirement and financial goals as transactions are performed within their actual bank account. The premise of invention of "Pay Yourself First" provides for a user to better learn spending habits by requiring the user to manage the funds allocated for spending while automatically allocating funds to the user's savings, retirement and financial goals. If the user exceeds their Say Go Green Account 86 balance, their spending allotment, the Never Red Register 10 automatically allocates funds to the Say Go Green account 86 when a transaction is performed to rebuild the available cash for spending. By using the Never Red Register 10 and adhering to and spending less than the Say Go Green account 86 balance, the user will learn to better manage their money. As described herein, the Never Red Register 10 will also provide notifications and alerts as financial goals are reached to provide incentive to the user to maintain their good financial habits.

As shown in FIG. 5B, the Quick Check 90 screen also provides access to the Main Menu 50 for a user to log transactions that occur within their bank account. In a first embodiment, the Never Red Register 10 is downloaded to the user device 1 and transactions within the bank account must be entered by the user on a daily, weekly or monthly basis. In other embodiments, the Never Red Register 10 provides a secure link and access to the user's bank account and each transaction is captured when recorded by the banking institution so that the user does not have to enter the transactional data. In another embodiment, the Never Red Register 10 provides a calendar function to automatically enter withdrawals, deposits, and transfers that are repetitive on for example a weekly, bi-weekly, monthly or annual basis. While removing the requirement that the user enter the transactional information for the bank account may save time and resources particularly for a business, in the preferred embodiment, by having the user enter the transactional data, they become more familiar with and gain an understanding of their financial status which may help them to better achieve their financial goals. To enter a financial transaction of the bank account a user may select the Main Menu 50 and from their bank statement, checkbook or a receipt provided from a purchase enter the information.

The Main Menu 50, as shown in FIG. 6, provides for the user to enter a Withdrawal 92, a Deposit 94, a Transfer 96, check a Balance 98, select Settings 52 or Exit 100 the Main Menu 50. A user may select to enter a withdrawal transaction by selecting Withdrawal 92 from the Main Menu 50. In some embodiments, a withdrawal transaction may be automatically entered through a secure connection of the Never Red Register 10 with the user's bank account. In other embodiments, as described herein the Never Red Register 10 may provide a calendar feature that may be setup to register a repetitive withdrawal such as the payment of rent or mortgage, or utility bill for the same amount on a weekly, biweekly, monthly, or yearly basis. Alternatively, using the calendar feature, the user may be prompted on for example a monthly basis to enter the amount of a utility bill that may change from month to month.

Figure 7A:
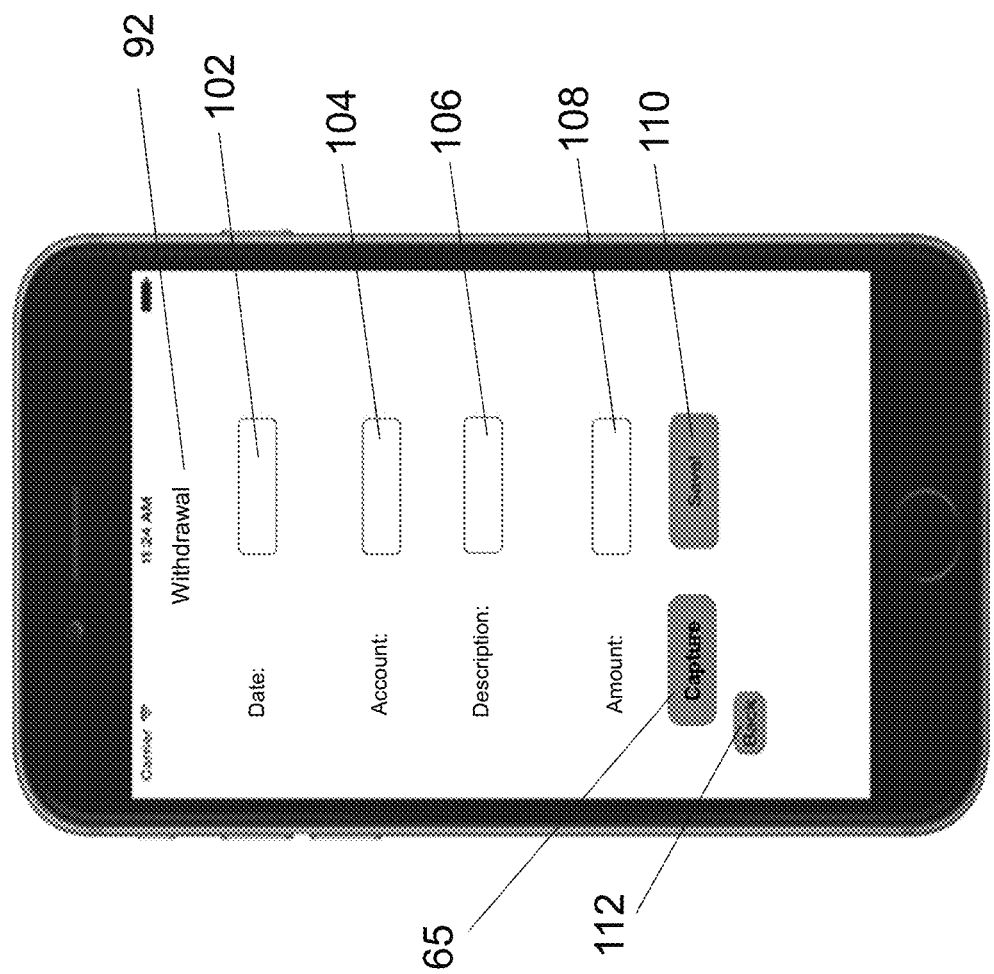
FIG. 7A is an embodiment of transaction screen for a withdrawal in an embodiment of the Never Red Register of the present invention.
Figure 7C:
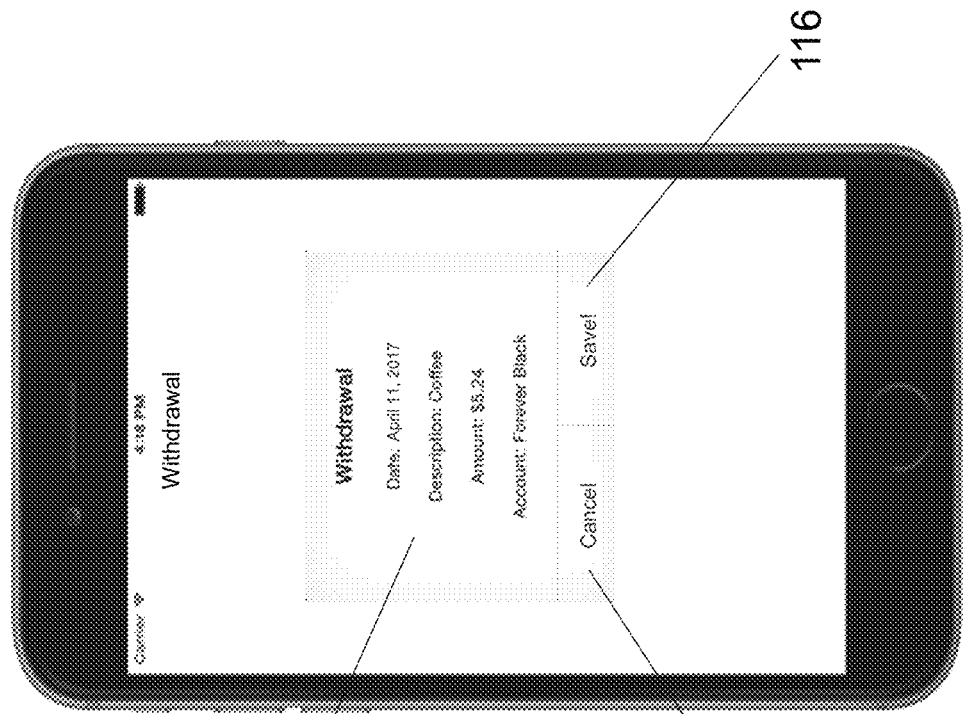
FIG. 7C is an embodiment of a withdrawal notification in an embodiment of the Never Red Register of the present invention.
Figure 7B:
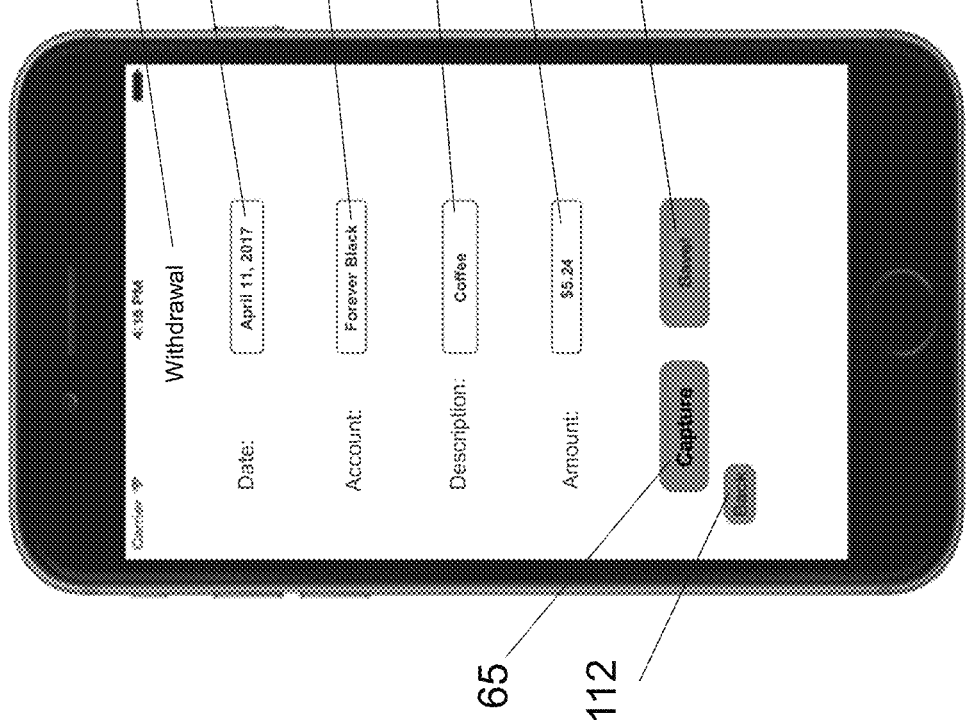
FIG. 7B is an embodiment of an entered transaction for a withdrawal with example data in an embodiment of the Never Red Register of the present invention.

As shown in FIG. 7A, when a user selects to enter a withdrawal the Withdrawal 92 screen prompts the user to enter the Withdrawal Date 102, the Withdrawal Account 104 that the withdrawal is being taken out of, the Withdrawal Description 106, and the Withdrawal Amount 108. A calendar may be provided for the user to enter the date and pull-down menus may provide a list of descriptions and the available accounts including for example the Checkbook Money Bin Account 78 for the user to choose from. Using the Never Red Register calendar feature, the user may be prompted to enter an amount for a withdrawal on a preset day or on a day of the month that is determined by the Never Red Register 10 to have a repetitive withdrawal such as for a utility bill. For a repetitive withdrawal, the user may be prompted on the preset or predetermined Date 102 with the Withdrawal Account 104 and the Withdrawal Description 106 so that the user must only enter the Withdrawal Amount 108 which for example for a utility bill may change from month to month. The Withdrawal Amount 108 cannot exceed the balance of the Withdrawal Account 104 and a notification is provided to the user if a Withdrawal Amount 108 entered is larger than the account balance. After the Withdrawal Date 102, Withdrawal Account 104, Withdrawal Description 106 and Withdrawal Amount 108 are entered the user selects the Save! 110 button. Alternatively, the user may select the Back 112 button to exit the Withdrawal 92 screen without entering the withdrawal transaction. As shown in FIG. 7B, when the Save! 110 button is selected, a Withdrawal Summary 114 of the withdrawal transaction as shown in FIG. 7C is provided. The user may select Save 116 to enter the withdrawal transaction or Cancel 118 to reenter the withdrawal information.

Figure 7D:
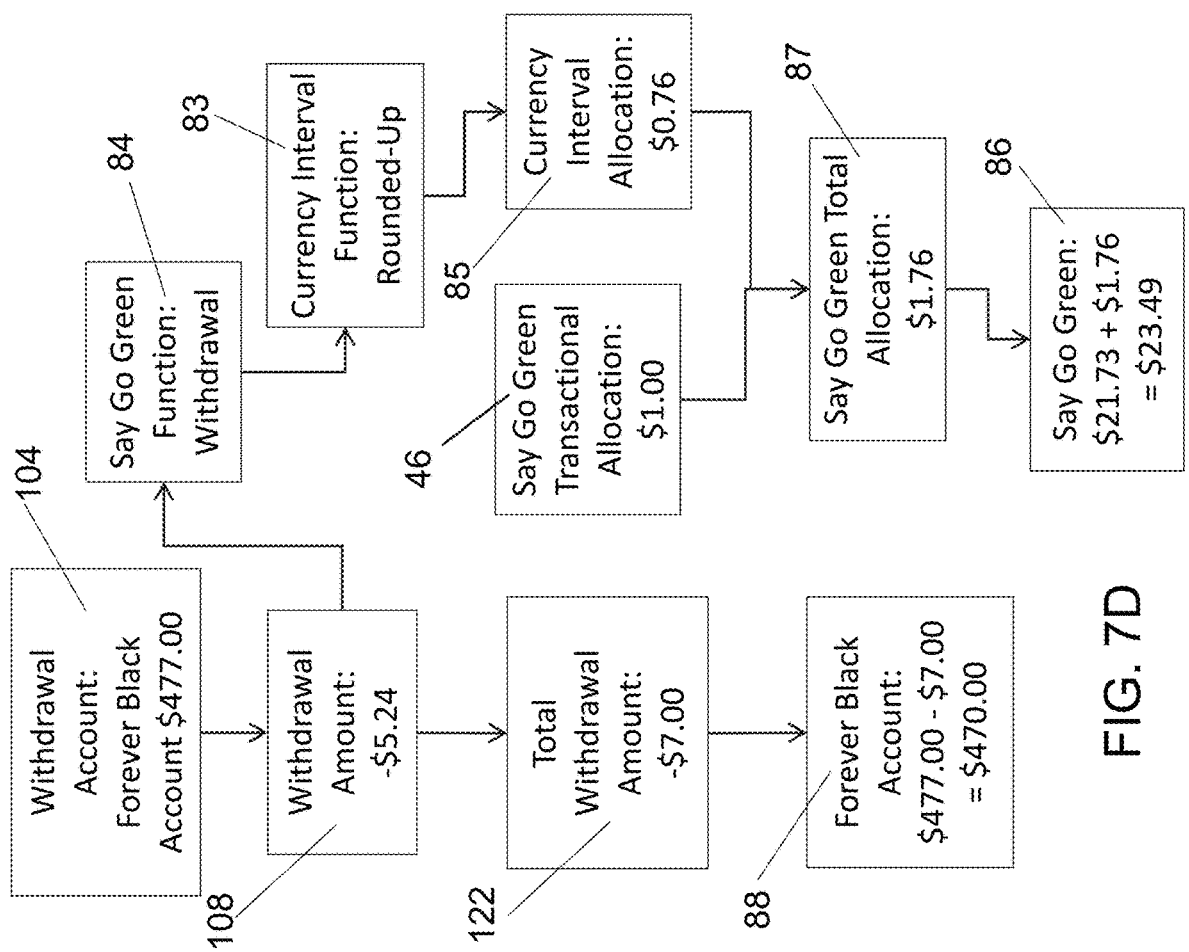
FIG. 7D is an embodiment of a flowchart showing steps for an allocation transaction for a withdrawal in an embodiment of the Never Red Register of the present invention.

As shown in FIG. 7D, when the withdrawal transaction is entered, the Never Red Register 10 provides instructions for the computational circuitry 3 of the digital device to automatically implement the Say Go Green Function 84 for a withdrawal which invokes the Currency Interval Function 83. The Currency Interval Function 83 determines the Currency Interval Allocation 85 as the Withdrawal Amount 108 rounded-up to the interval of currency. The Currency Interval Allocation 85 and the Say Go Green Transactional Allocation 46 are withdrawn from the Withdrawal Account 104 and deposited into the Say Go Green Account 86. The Total Withdrawal Amount 122 of the Withdrawal Amount 108 and the Say Go Green Total Allocation 87 of the combined sum of the Currency Interval Allocation 85 and the Say Go Green Transactional Allocation 46 is withdrawn from the available balance of the Withdrawal Account 104.

Figure 7E:
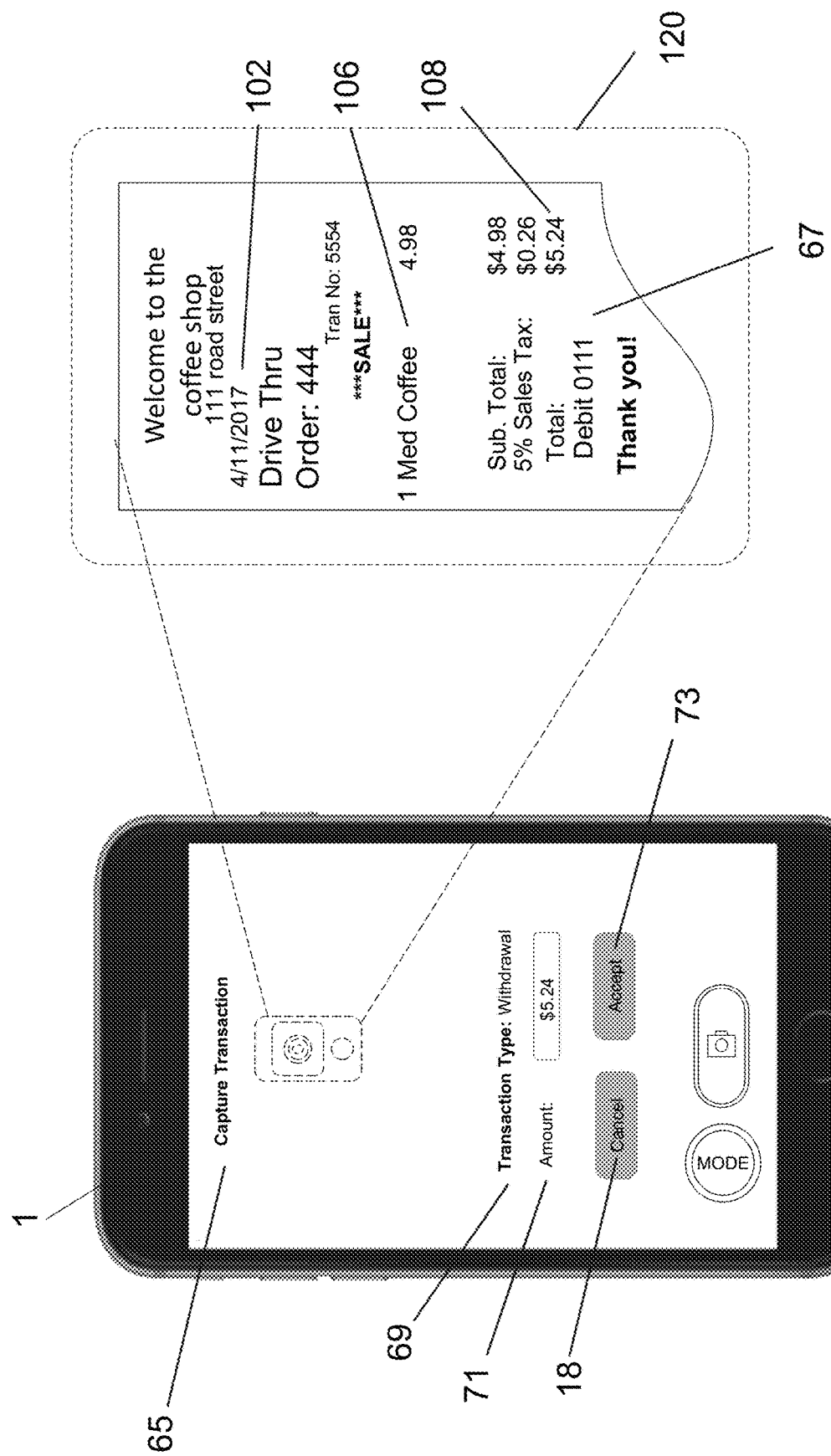
FIG. 7E is an embodiment of a capture transaction screen in an embodiment of the Never Red Register of the present invention.

In this example, the Forever Black Account 88 is the Withdrawal Account 104 and the Withdrawal Amount 108 is $5.24. The Currency Interval Function 83 rounds-up the Withdrawal Amount 108 of $5.24 to determine the Currency Interval Allocation 85 of $0.76. The Say Go Green Function 84 withdraws the Currency Interval Allocation 85 of $0.76 and the Say Go Green Transactional Allocation 46 set at $1.00 from the Forever Black Account 88 and deposits the Say Go Green Total Allocation 87 amount of $1.76 into the Say Go Green Account 86 to increase the balance to $23.49 and decrease the Forever Black Account 88 to a balance of $470.00. By entering the withdrawal transaction, the Never Red Register 10 has provided an indicator to the user of additional assets for the user to spend. In embodiments of the Never Red Register 10, instructions are implemented to automatically enter transaction into a Money Bin Account 26 to make use of the Never Red Register 10 more efficient. As shown in FIG. 7A, in some embodiments, the Never Red Register 10 provides a Capture Transaction 65 option that provides for a user take a picture of for example a receipt 67 in order to enter a transaction, as shown in FIG. 7E. The Capture 65 option when selected accesses the camera on the digital device 1. The user points the camera at the receipt and takes a picture. The Never Red Register 10 may provide a Transaction Menu 69 for the user to select the type of transaction that is being entered and an Amount 71 data entry box to type in the total value of the receipt 67. The picture 120 of the receipt 67 or other transactional item is saved within the Never Red Register 10 as a record of the transaction. An Accept 73 button to save the transaction is also provided. Alternatively, the user may select the Cancel 18 button to not have the transaction entered in the Never Red Register 10. In other embodiments, the Never Red Register 10 performs a text analysis of the picture and extracts data to enter for the transaction such as the information shown in FIG. 7B, the Date 102, Description 106 and Amount 108 to have the transaction automatically entered from the picture 120 of the receipt 67.

Figure 7F:
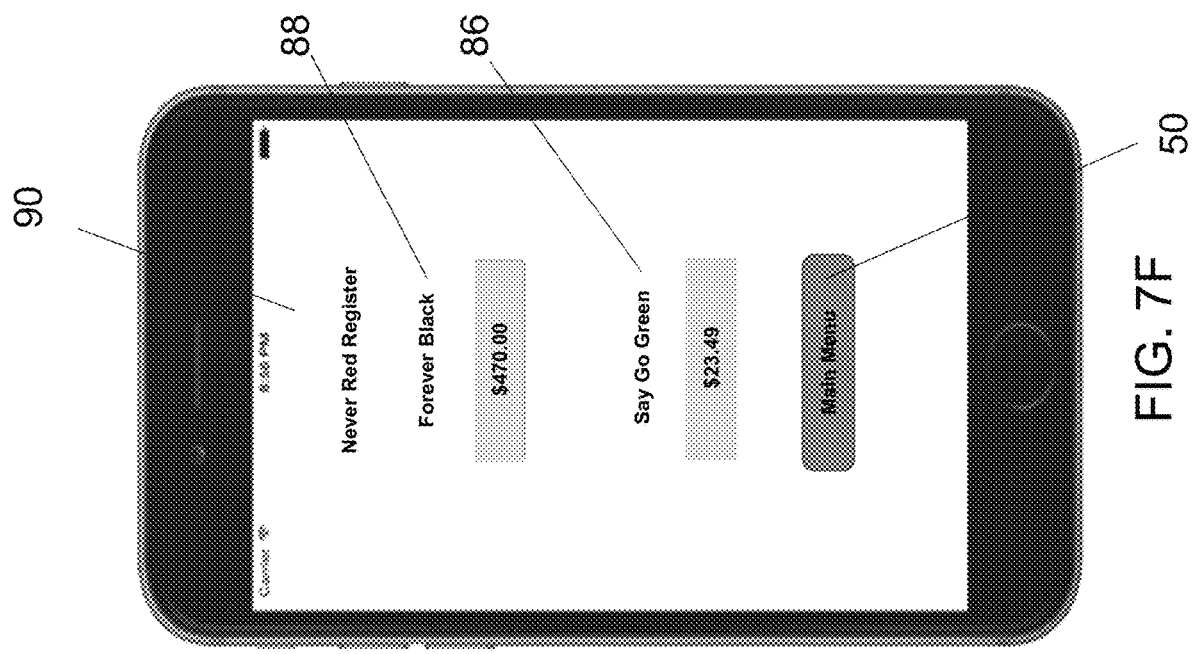
FIG. 7F is an embodiment of a display of assets designated as available and spendable in an embodiment of the Never Red Register of the present invention.

From the Quick Check 90 screen as shown in FIG. 7F, the user may select the Main Menu 50 key and select Balance 98 to review the account balances after the withdrawal transaction. The Balance 98 screen shows the balances designated using the Never Red Register 10 as available assets in the Forever Black Account 88 and as spendable assets in the Say Go Green Account 86 with the most recent transaction shown as the withdrawal transaction that has been completed. As shown in FIG. 8A, the last transaction showing the Total Withdrawal Amount 122 of −$7.00 is provided with the Forever Black Account 88 balance. The Forever Black Account 88 balance has had $7.00 withdrawn which in this example is equal to the sum of the Withdrawal Amount 108, and the Say Go Green Total Allocation 87. The last transaction showing the Say Go Green Total Allocation 87 amount of +$1.76 is provided with the Say Go Green Account 86 balance which in this example is $23.49 with the deposit of the Say Go Green Total Allocation 87 which is the combined Currency Interval Allocation 85 and Say Go Green Transactional Allocation 46. The Granite Sums 76 screen may be accessed and show that the Granite Sum Account 80 balance displaying the sub-value indicator is equal to the sum of the Forever Black Account 88 and Say Go Green Account 86 balances as shown in FIG. 8B. As shown in the Withdrawal 92 screen in FIG. 9A and flow chart in FIG. 9B, the Granite Sum Account 80 balance is equal to the Granite Sum Account 80 balance of $498.73 prior to the withdrawal minus the Withdrawal Amount 108 of $5.24 for the new Granite Sum Account 80 balance of $493.49 where the Withdrawal Amount 108 was the only amount taken out of the balance of the user's actual bank account and while the total cash balances within the Never Red Register 10 reflect this withdrawal, the amount of the Say Go Green Transactional Allocation 46 has been deposited into the Say Go Green Account 86 to designate a portion of the deposited assets as spendable thereby providing an indicator to the user that more is available for spending. By uniquely providing to the user a designated amount for spending, the Never Red Register 10 designates the remaining assets to obligations and objectives such as savings, retirement and other financial goals.

Figure 10A:
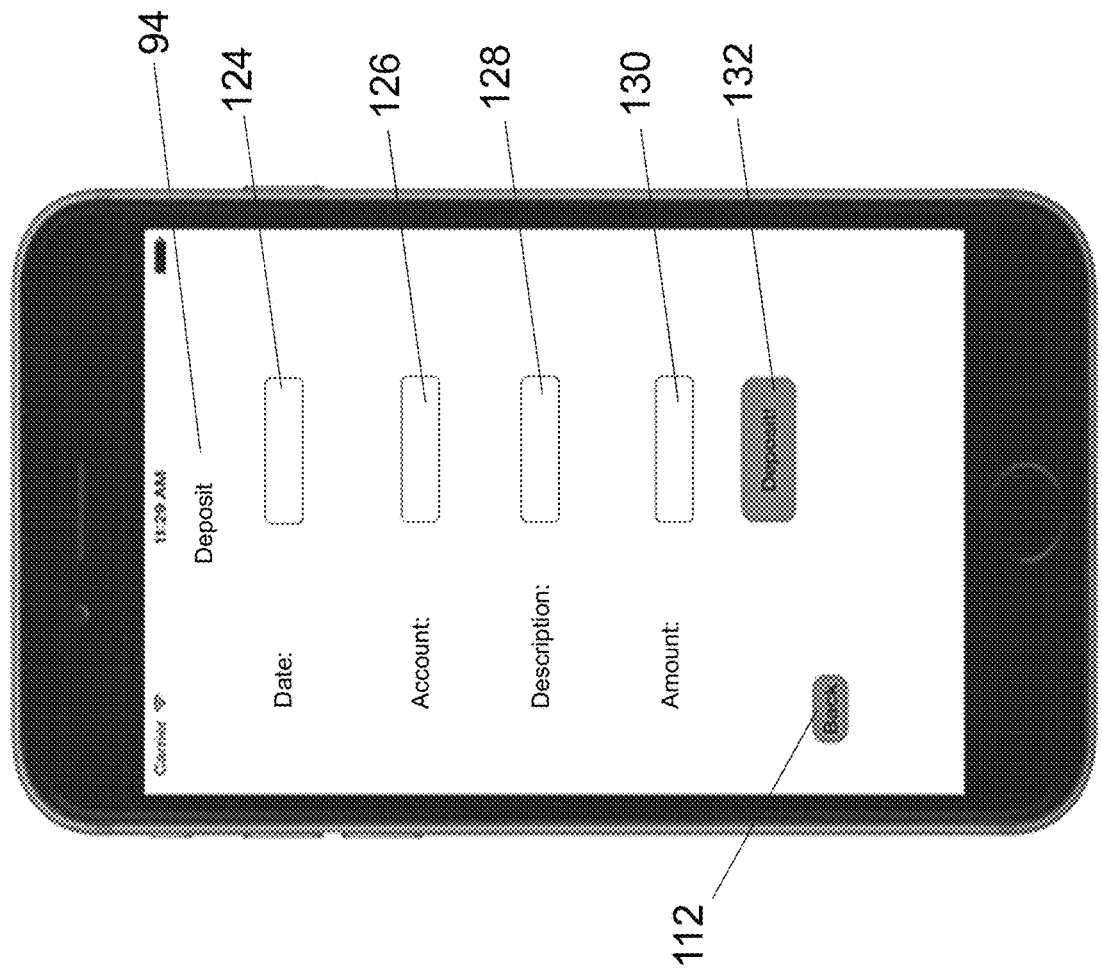
FIG. 10A is an embodiment of transaction screen for a deposit in an embodiment of the Never Red Register of the present invention.
Figures 10B, 10C:
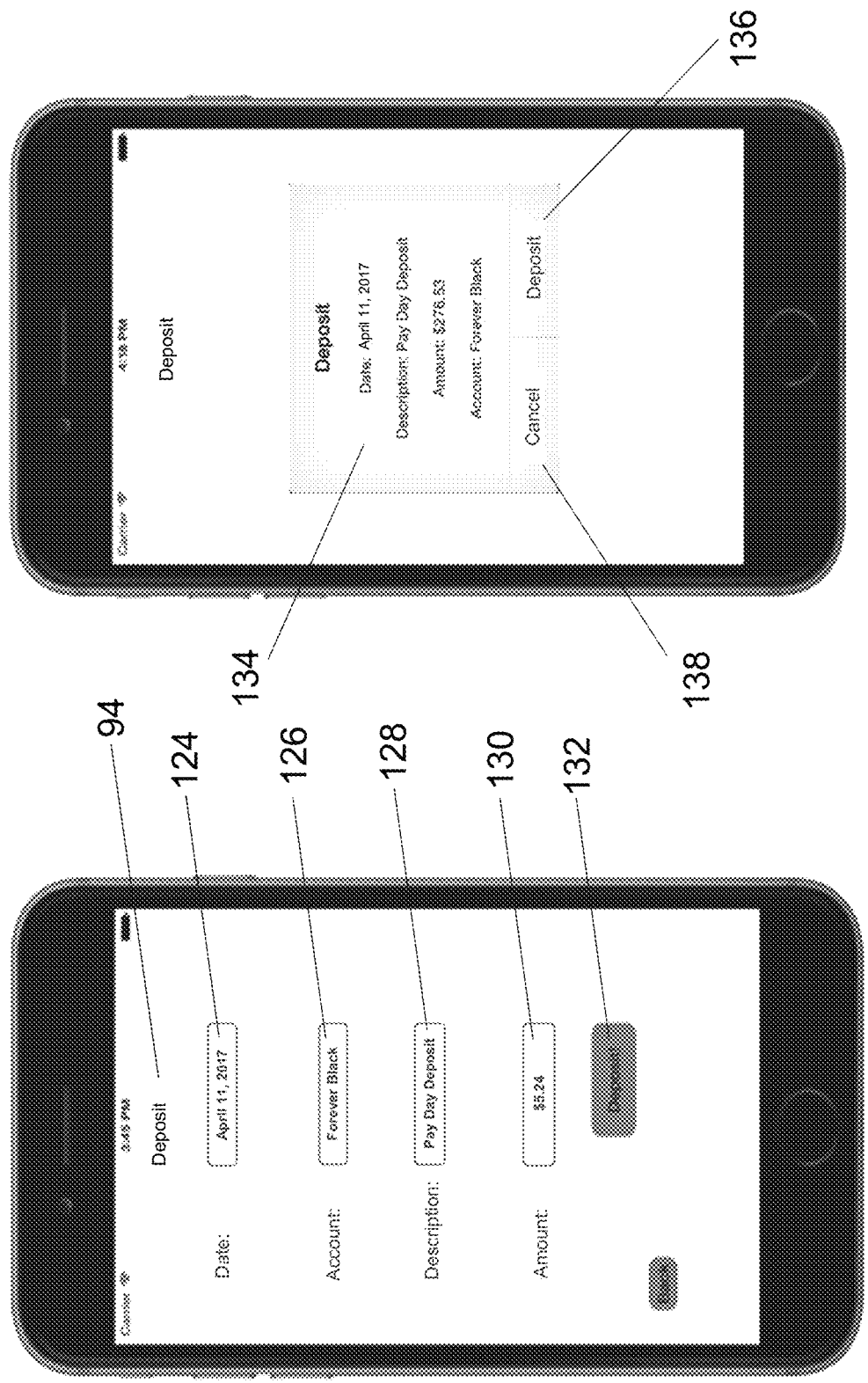
FIG. 10B is an embodiment of an entered transaction with example data for a deposit in an embodiment of the Never Red Register of the present invention.
FIG. 10C is an embodiment of a deposit notification in an embodiment of the Never Red Register of the present invention.

A user may also select to enter a deposit transaction by selecting Deposit 94 from the Main Menu 50. In some embodiments, a deposit transaction may be automatically entered through a secure connection of the Never Red Register 10 with the user's bank account. In other embodiments, as described herein the Never Red Register 10 may provide a calendar feature that may be setup to register a repetitive deposit such as a paycheck for the same amount on a weekly, biweekly, monthly, or yearly, etc. basis. Alternatively, the user may be prompted to enter the amount of their paycheck on a particular day for example on a weekly basis. As shown in FIG. 10A, when a user selects to enter a Deposit 94, the user is prompted to enter the Deposit Date 124, the Deposit Account 126 that the deposit is being put into, the Deposit Description 128, and the Deposit Amount 130. A calendar may be provided for the user to enter the date and pull-down menus may provide a list of descriptions and the available accounts including as an example the Checkbook Money Bin Account 78 for the user to choose from. Using the Never Red Register calendar feature, the user may be prompted on a preset date or on a date predetermined by the Never Red Register 10 to have a repetitive deposit. On that Date 124 the user must only enter the Deposit Amount 130 where for example for a paycheck the prompt provides the Deposit Account 126 and Deposit Description 128 such as "Pay Day Deposit" for the user. After the Deposit Date 124, Deposit Account 126, Deposit Description 128 and Deposit Amount 130 are entered the user selects the Deposit! 132 key or button. Alternatively, the user may select the Back 112 key or button to exit the Deposit 94 screen without entering the deposit transaction. The values entered for an example deposit transaction are shown in FIG. 10B. When the Deposit! 132 button is selected, a Deposit Summary 134 of the deposit transaction as shown in FIG. 10C is provided. The user may select Deposit 136 to enter the deposit transaction or Cancel 138 to reenter the deposit information.

Figure 10E:
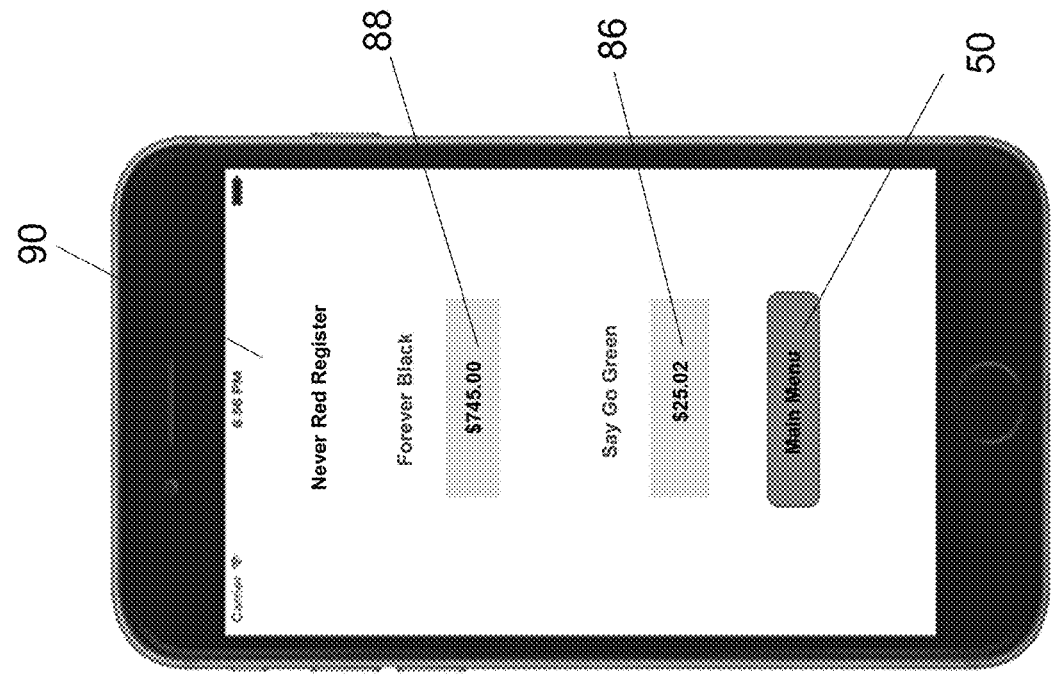
FIG. 10E is an embodiment of a display of assets designated as available and spendable in an embodiment of the Never Red Register of the present invention.
Figure 10D:
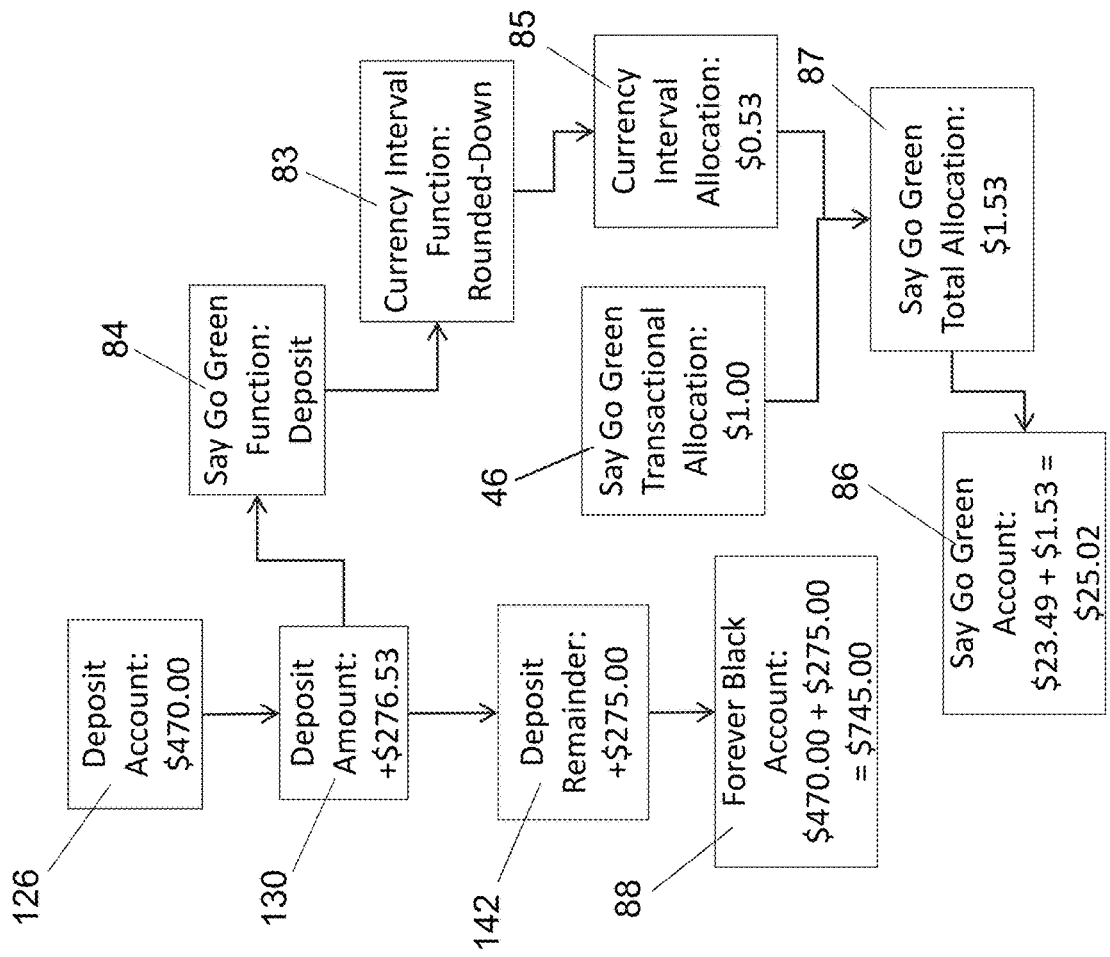
FIG. 10D is an embodiment of a flowchart showing steps for an allocation transaction for a deposit in an embodiment of the Never Red Register of the present invention.

As shown in FIG. 10D, when the deposit transaction is entered, the Never Red Register 10 provides instructions for the computational circuitry 3 of the digital device to automatically implement the Say Go Green Function 84 to invoke the Currency Interval Function 83 to determine a Currency Interval Allocation 85. In this example, the Currency Interval Allocation 85 is the Deposit Amount 130 rounded down to the interval of currency. The Currency Interval Allocation 85 and the Say Go Green Transactional Allocation 46 are withdrawn from the Deposit Amount 130 and deposited into the Say Go Green Account 86. The Deposit Remainder 142 with the Say Go Green Total Allocation 87 withdrawn is deposited to the Deposit Account 126. In this example, for a Deposit Amount 130 of $276.53 the Currency Interval Allocation 85 is the rounded down amount of $0.53 and the Say Go Green Transactional Allocation 46 is set at $1.00 so the Say Go Green Total Allocation 87 is $1.53. The Say Go Green Total Allocation 87 of $1.53 is withdrawn from the Deposit Amount 130 leaving a Deposit Remainder 142 of $275.00. The Deposit Remainder 142 of $275.00 is deposited into the Deposit Account 126 which in this example is the Forever Black Account 88 for a balance of $745.00. The Say Go Green Total Allocation 87 of $1.53 is deposited into the Say Go Green Account 86 for a balance of $25.02. By entering the deposit transaction, the Never Red Register 10 has provided an indicator to the user of additional spendable assets within the Say Go Green Account 86.

The Quick Check 90 screen as shown in FIG. 10E shows the new balances for the Forever Black Account 88 and Say Go Green Account 86 after the deposit transaction. The user may select Balance 98 from the Main Menu 50 to review the account balances after the deposit transaction. As shown in FIG. 11A, the last transaction showing the Deposit Remainder Amount 142 of +275.00 is provided with the Forever Black Account 88 balance and the last transaction showing the Say Go Green Total Allocation 87 in the amount of +$1.53 is provided with the Say Go Green Account 86 balance. As shown in FIG. 11B, the Granite Sums 76 screen may be accessed and show that the Granite Sum Account 80 balance is equal to the sum of the Forever Black Account 88 and Say Go Green Account 86 balances. As shown in the Deposit 94 screen in FIG. 12A and flow chart in FIG. 12B, the Granite Sum Account 80 balance showing the sub-value indicator is equal to $493.49 prior to the deposit transaction plus the Deposit Amount 130 of $276.53 for the new Granite Sum 80 balance of $770.02, as shown in FIG. 12C. The Deposit Amount 130 is added to the balance of the user's actual bank account. Using the Say Go Green Function 84 assets that are designated as spendable are increased to indicate that more spending money is available for the user. The remaining assets are designated as available to be designated to other financial obligations and objectives such as savings, retirement and financial goals.

Figure 13D:
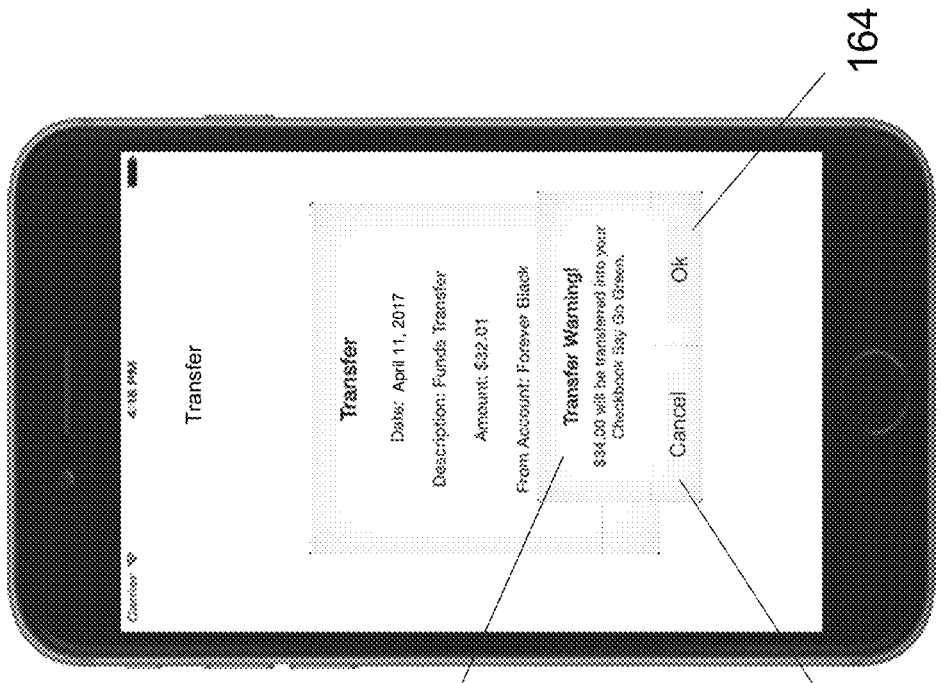
FIG. 13D is an embodiment of a transfer warning in an embodiment of the Never Red Register of the present invention.
Figure 13C:
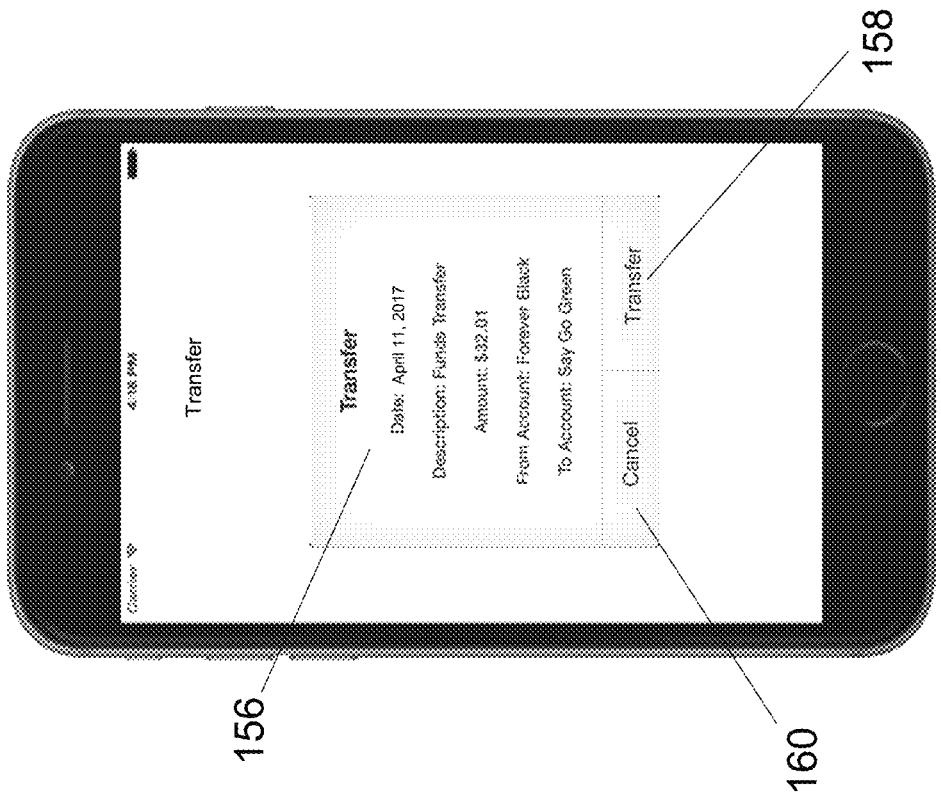
FIG. 13C is an embodiment of a transfer notification in an embodiment of the Never Red Register of the present invention.

A user may also select to enter a transfer transaction to transfer funds from one account to another by selecting Transfer 96 from the Main Menu 50. As shown in FIG. 13A, when a user selects to enter a transfer transaction the Transfer 96 screen prompts the user to enter the Transfer Date 146, the Transfer From Account 148 that the transfer is being taken out of, the Transfer To Account 150, and the Transfer Amount 152. A calendar may be provided for the user to enter the date and pull-down menus may provide a list of available accounts for the user to choose from. The Transfer Amount 152 cannot exceed the balance of the Transfer From Account 148 and a notification is provided to the user if a Transfer Amount 152 entered is larger than the Transfer From Account 148 balance. After the Transfer Date 146, the Transfer From Account 148, the Transfer To Account 150 and the Transfer Amount 152 are entered, as shown in FIG. 13B, the user selects the Transfer! 154 button. Alternatively, the user may select the Back 112 button to exit the Transfer 96 screen without entering the transfer transaction. When the Transfer! 154 button is selected, a Transfer Summary 156 of the transfer transaction as shown in FIG. 13C is provided. The user may select Transfer 158 to enter the transfer transaction or Cancel 160 to reenter the transfer information. If the Transfer 158 option is selected a Warning Message 162 is displayed indicating that the amount to be transferred is more than the entered Transfer Amount 152 as shown in FIG. 13D. The transfer amount is more than the entered Transfer Amount 152 because the Never Red Register 10 implements the Say Go Green Function 84 which increases the transfer amount as described herein. The user must select the Ok 164 key or button to complete the transfer or select the Cancel 160 key or button to reenter or abort the transfer transaction.

Figure 13F:
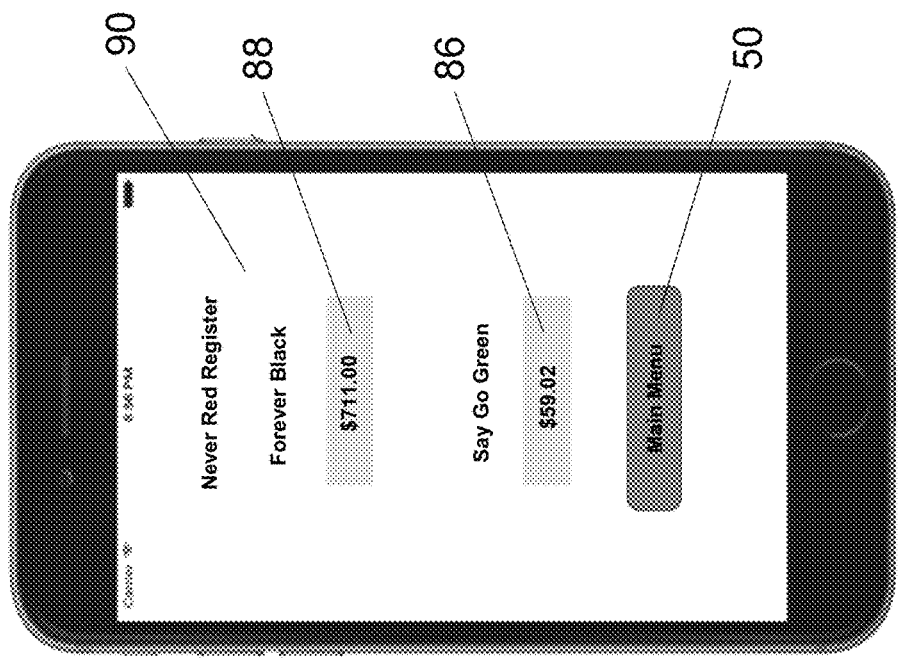
FIG. 13F is an embodiment of a display of assets designated as available and spendable in an embodiment of the Never Red Register of the present invention.
Figure 13E:
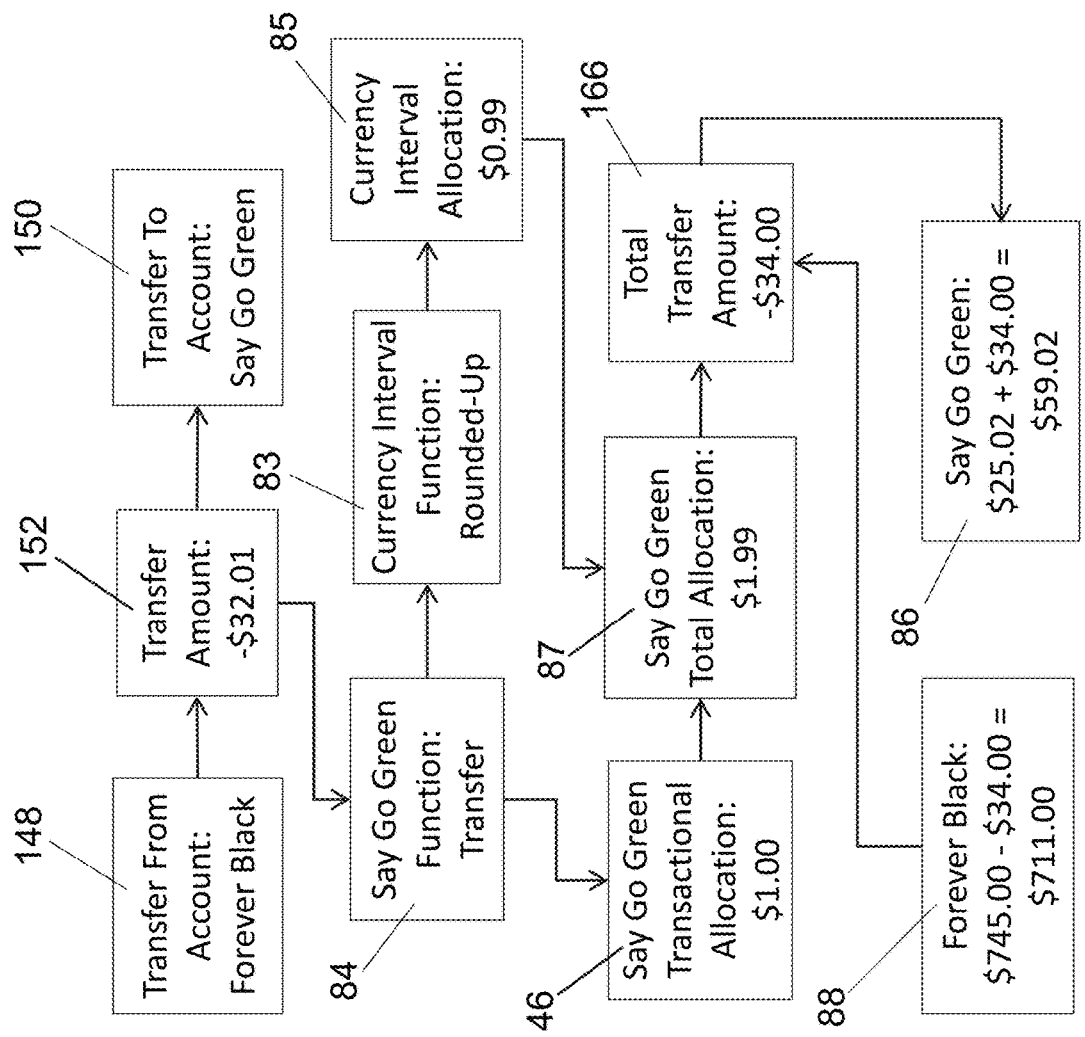
FIG. 13E is an embodiment of a flowchart showing steps for an allocation transaction for a transfer in an embodiment of the Never Red Register of the present invention.

As shown in FIG. 13E, in a first example the Transfer From Account 148 is the Forever Black Account 88, the available assets, and the Transfer To Account 150 is the Say Go Green Account 86, the spendable assets. When the transfer transaction to transfer funds is entered, the Never Red Register 10 provides instructions for the computational circuitry 3 of the digital device to automatically implement the Say Go Green Function 84 for a withdrawal. The Say Go Green Function 84 invokes the Currency Interval Function 83 to determine a Currency Interval Allocation 85 as a rounded-up amount equal to the Transfer Amount 152 rounded-up to the interval of currency. The Say Go Green Function 84 determines a Total Transfer Amount 166 as the sum of Transfer Amount 152 plus the Currency Interval Allocation 85 and the Say Go Green Transactional Allocation 46. The Total Transfer Amount 166 is withdrawn from Transfer From Account 148 and deposited in the Transfer To Account 150.

In this example, for a Transfer Amount 152 is $32.01 the Say Go Green Function 84 invokes the Currency Interval Function 83 to determine a Currency Interval Allocation 85 of $0.99 by rounding-up the Transfer Amount 152 to the interval of currency. The Say Go Green Function 84 combines the Currency Interval Allocation 85 of $0.99 with Say Go Green Transactional Allocation 46 of $1.00 for a Say Go Green Total Allocation 87 of $1.99. The Say Go Green Total Allocation 87 of $1.99 is combined with the Transfer Amount 152 of $32.01 and a Total Transfer Amount 166 of $34.00 is withdrawn from the Forever Black Account 88 leaving a balance of $711.00. The Total Transfer Amount 166 of $34.00 is deposited into the Say Go Green Account 86 for a balance of $59.02. In this example funds were transferred from the available assets in the Forever Black Account 88 to the spendable assets in the Say Go Green Account 86 and using the Say Go Green Function 84 additional assets are determined and designated as spendable assets increasing the amount the user may spend.

The Quick Check 90 screen as shown in FIG. 13F shows the new balances for the Forever Black Account 88 and Say Go Green Account 86 after the transfer transaction. The user may select Balance 98 from the Main Menu 50 to review the account balances after the transfer transaction. As shown in FIG. 13G, the last transaction showing the Total Transfer Amount 166 of −$34.00 that was withdrawn is provided with the Forever Black Account 88 balance. The last transaction showing the Total Transfer Amount 166 of +$34.00 that was deposited is provided with the Say Go Green Account 86 balance which in this example is $59.02. The Granite Sums 76 screen may be accessed and show that the Granite Sum 80 balance is equal to the sum of the Forever Black Account 88 and Say Go Green Account 86 balances as shown in FIG. 13H. As shown in the Transfer 96 screen in FIG. 14A and flow chart in FIG. 14B, the Granite Sum Account 80 remains at a balance of $770.02, as shown in FIG. 14C, because the transfer was made internally within the Never Red Register 10 not within the user's actual bank account and while the account balances within the Never Red Register 10 reflect this transfer from the Forever Black Account 88 to the Say Go Green Account 86 to designate more assets as spendable, the user's actual bank account balance is the same before and after the transfer transaction.

Figures 15A, 15B:
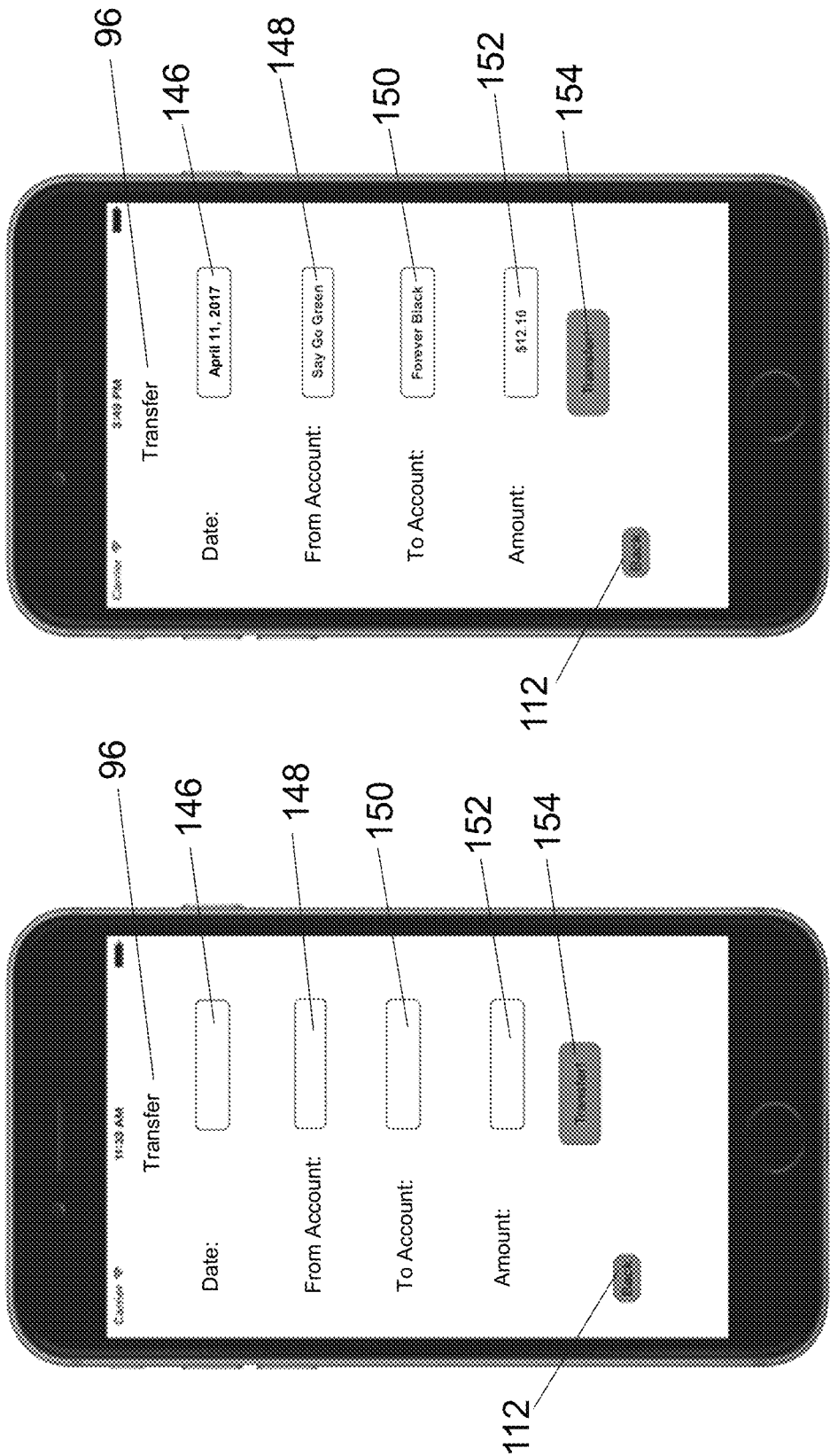
FIG. 15A is an embodiment of transaction screen for a transfer in an embodiment of the Never Red Register of the present invention.
FIG. 15B is an embodiment of an entered transaction with example data for a transfer in an embodiment of the Never Red Register of the present invention.
Figure 15D:
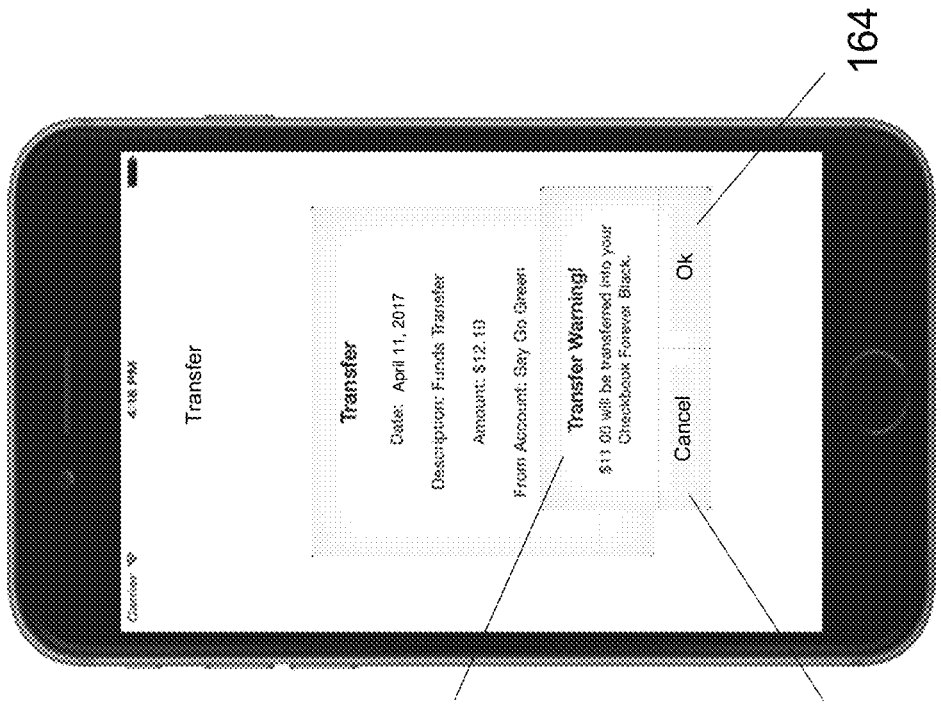
FIG. 15D is an embodiment of a transfer warning in an embodiment of the Never Red Register of the present invention.
Figure 15C:
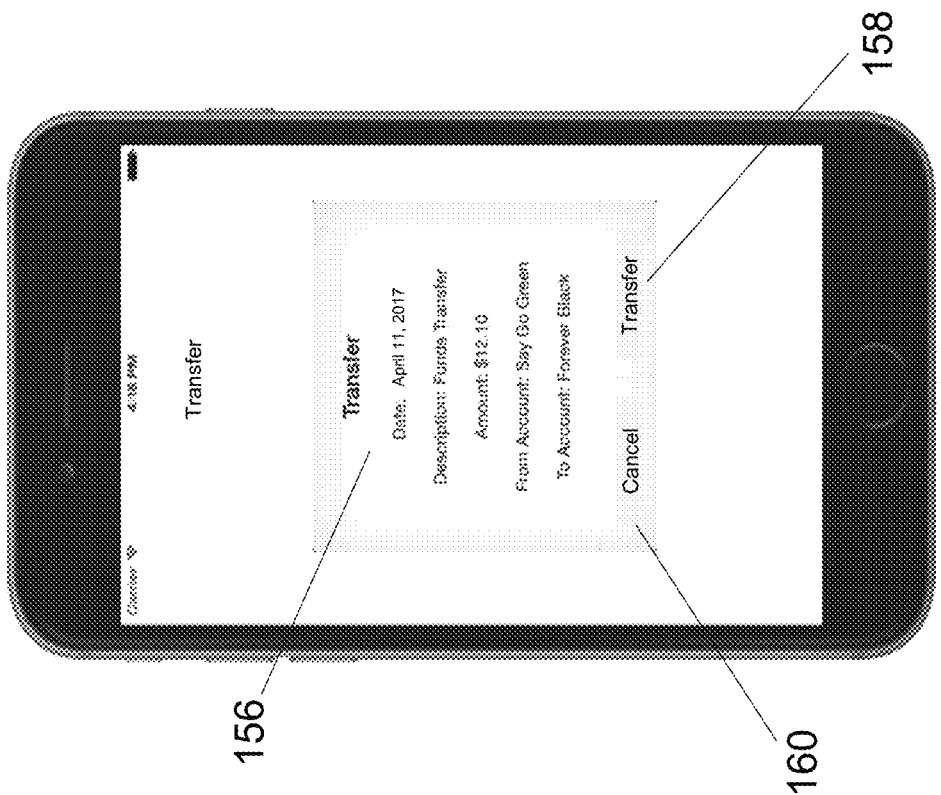
FIG. 15C is an embodiment of a transfer notification in an embodiment of the Never Red Register of the present invention.

In another example, a transfer transaction is entered with the Say Go Green Account 86, the spendable assets, as the Transfer From Account 148 and the Forever Black Account 88, the available assets, as the Transfer To Account 150 by selecting Transfer 96 from the Main Menu 50. As shown in FIG. 15A, the Transfer 96 screen prompts the user to enter the Transfer Date 146, the Transfer From Account 148 that the transfer is being taken out of, the Transfer To Account 150, and the Transfer Amount 152. The Transfer From Account 148 is entered in this example as the Say Go Green Account 86, the Transfer To Account 150 is entered as the Forever Black Account 88 and the Transfer Amount 152 is entered as $12.10, as shown in FIG. 15B. When the Transfer! 154 button is selected, a Transfer Summary 156 of the transfer transaction as shown in FIG. 15C is provided. The user may select Transfer 158 to enter the transfer transaction or Cancel 160 to reenter the transfer information. If the Transfer 158 option is selected a Warning Message 162 is displayed indicating that the amount to be transferred is less than the entered Transfer Amount 152, as shown in FIG. 15D. The user must select the Ok 164 button to complete the transfer or select the Cancel 160 key to reenter or abort the transfer transaction.

Figure 15F:
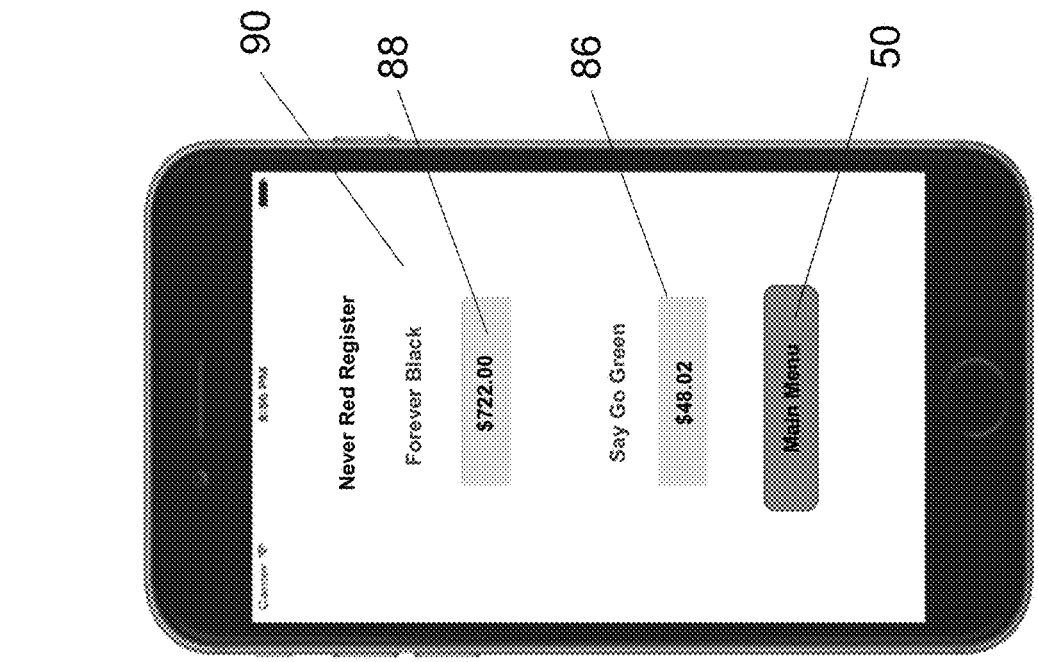
FIG. 15F is an embodiment of a display of assets designated as available and spendable in an embodiment of the Never Red Register of the present invention.
Figure 15E:
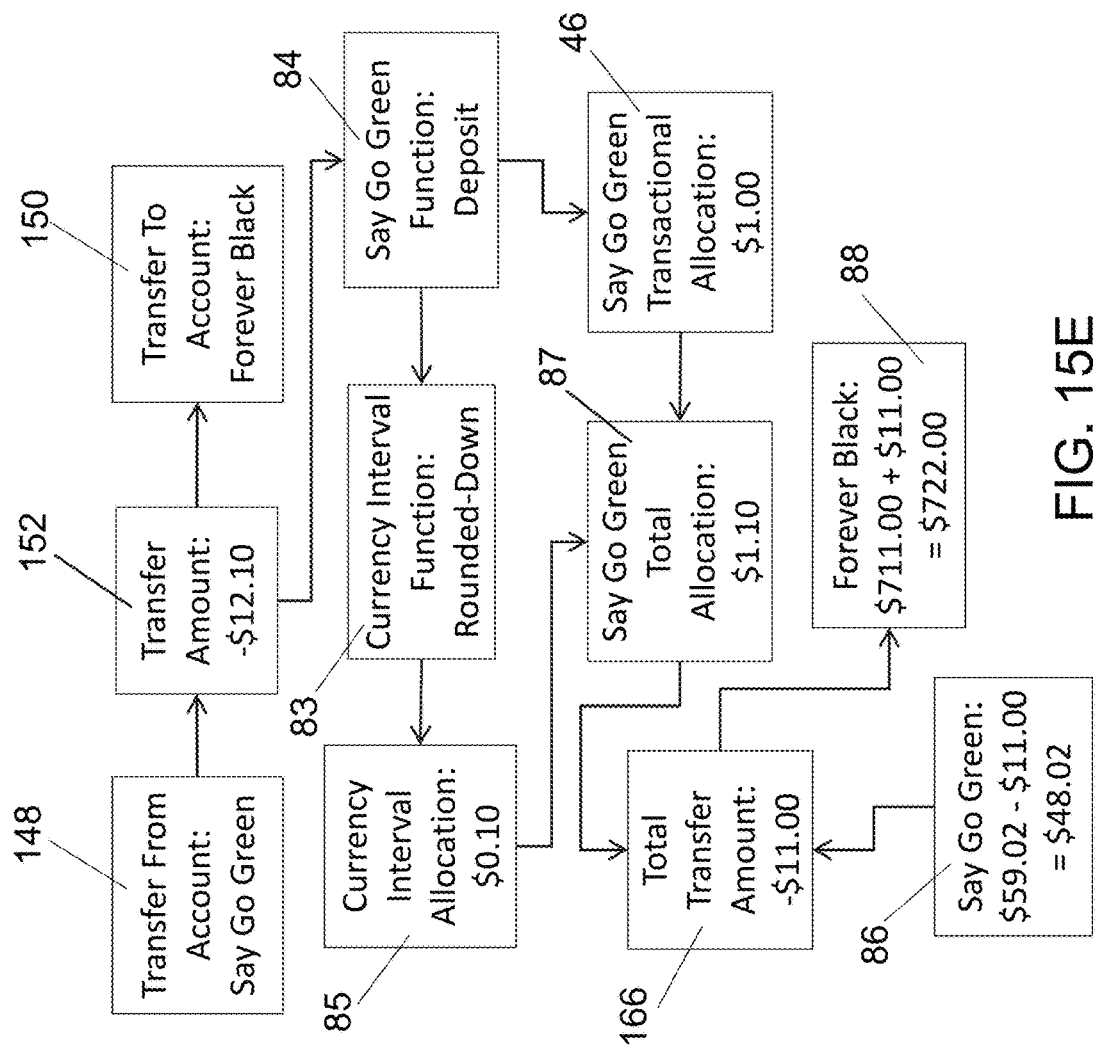
FIG. 15E is an embodiment of a flowchart showing steps for an allocation transaction for a transfer in an embodiment of the Never Red Register of the present invention.

As shown in FIG. 15E, when the transfer transaction to transfer funds from the Say Go Green Account 86 to the Forever Black Account 88 is entered, the Never Red Register 10 provides instructions for the computational circuitry 3 of the digital device to automatically implement the Say Go Green Function 84 for a deposit even though funds are being withdrawn from the Say Go Green Account 86. This is because the Say Go Green Account 86 is designated as a spendable asset account with any type of transaction invoking the Say Go Green Function 84. In order to always "Pay the user first" and retain a portion designated as spendable assets any withdrawal from the spendable asset account is reduced by the Say Go Green Function 84. In performing the transfer transaction, the Say Go Green Function 84 invokes the Currency Interval Function 83 to determine a Currency Interval Allocation 85 as the rounded-down remainder equal to the Transfer Amount 152 rounded down to the interval of currency. The Say Go Green Function 84 withdraws from the Transfer Amount 152 the Currency Interval Allocation 85 and the Say Go Green Transactional Allocation 46 and deposits a Total Transfer Amount 166 that is less than the original Transfer Amount 152, thereby retaining the Say Go Green Total Allocation 87 in the Say Go Green Account 86. In this example, the Currency Interval Function 83 determines a Currency Interval Allocation 85 of $0.10 by rounding-down the Transfer Amount 152 of $12.10 to the interval of currency. The Currency Interval Allocation 85 of $0.10 is combined with the Say Go Green Transactional Allocation 46 set at $1.00 for a Say Go Green Total Allocation 87 of $1.10. The Say Go Green Total Allocation 87 of $1.10 is retained in the Say Go Green Account 86 leaving a Total Transfer Amount 166 of $11.00. The Total Transfer Amount 166 of $11.00 is withdrawn from the Say Go Green Account 86 balance which in this example of a balance of $59.02 and is deposited into the Forever Black Account 88 balance which in this example is $711.00 for a total of $722.00 in the Forever Black Account 88 and $48.02 in the Say Go Green Account 86. In this example assets were transferred from the Say Go Green Account 86 to the Forever Black Account 88 with a portion of the assets being retained within the spendable assets account to retain a portion of the assets for the user to spend.

Figure 15H:
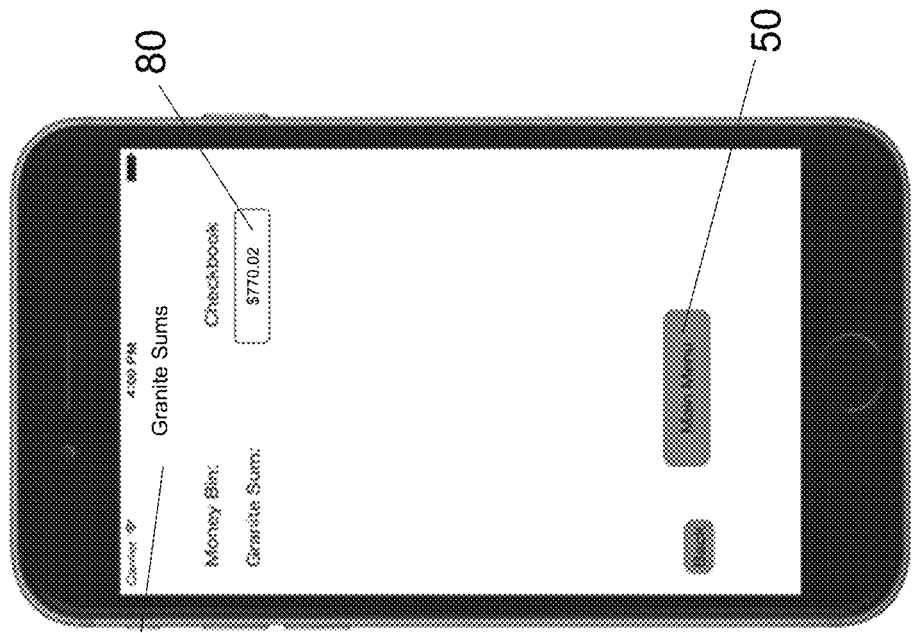
FIG. 15H is an embodiment of a sub-value indicator account balance screen in an embodiment of the Never Red Register of the present invention.
Figure 15G:
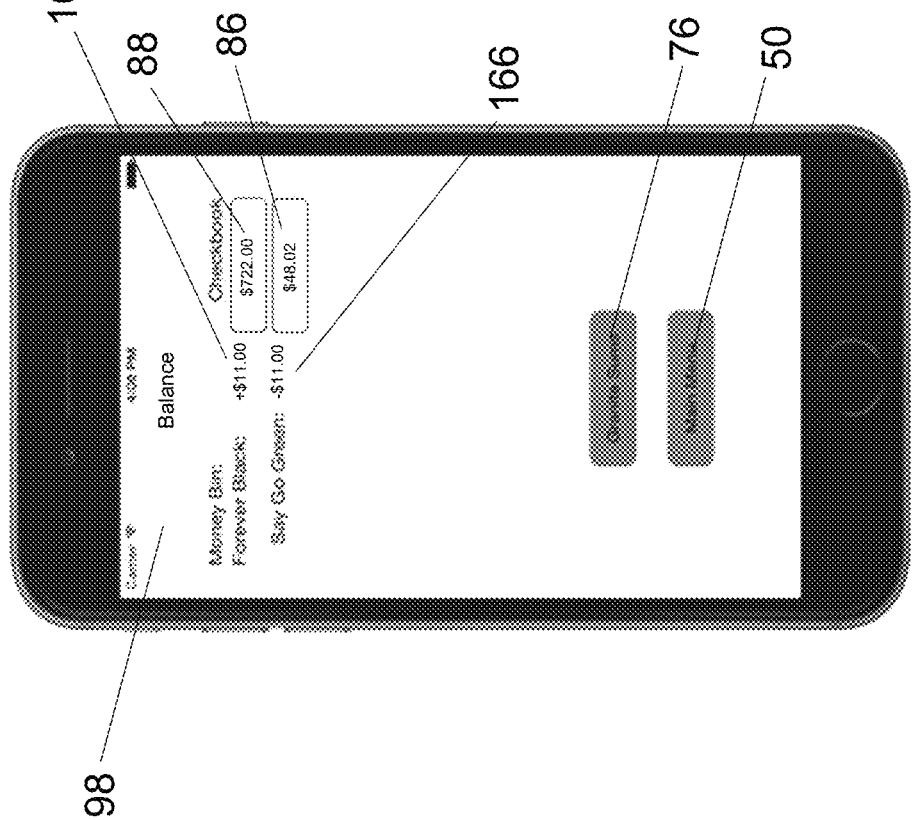
FIG. 15G is an embodiment of a display of a balance screen to review assets designated as available and spendable with the most recent transactions in an embodiment of the Never Red Register of the present invention.
Figures 16A, 16B, 16C:
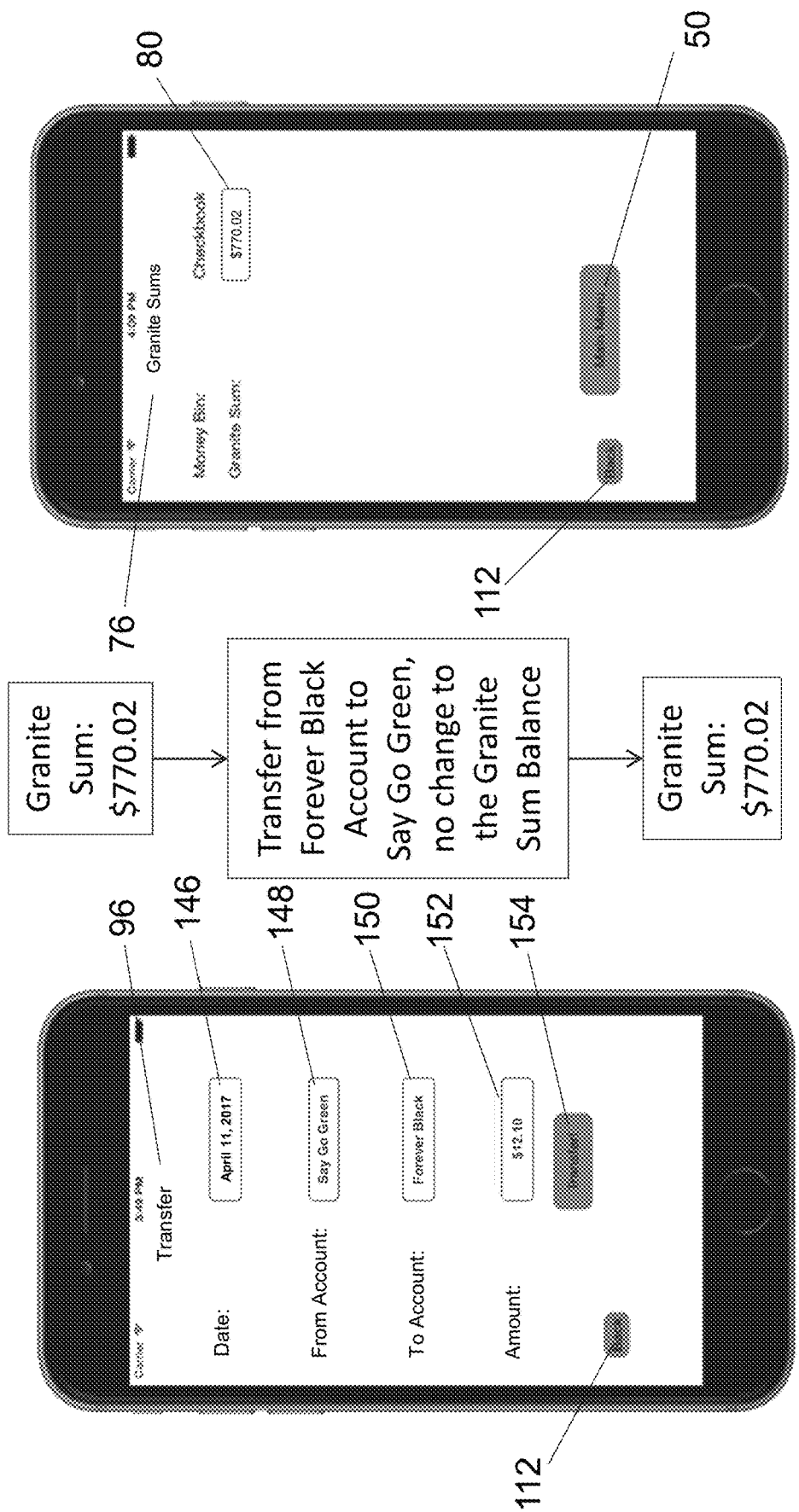
FIG. 16A is an embodiment of a transfer transaction with example data in an embodiment of the Never Red Register of the present invention.
FIG. 16B is an embodiment of a flowchart showing the sub-value indicator account balance screen before and after the transfer transaction of FIG. 16A in an embodiment of the Never Red Register of the present invention.
FIG. 16C is an embodiment of a sub-value indicator account balance screen in an embodiment of the Never Red Register of the present invention.

The Quick Check 90 screen as shown in FIG. 15F shows the new balances for the Forever Black Account 88 and Say Go Green Account 86 after the transfer transaction. The user may select Balance 98 from the Main Menu 50 to review the cash account balances after the transfer transaction. As shown in FIG. 15G, the last transaction showing the Total Transfer Amount 166 of +$11.00 is provided with the Forever Black Account 88 balance. The last transaction showing the Total Transfer Amount 166 of −$11.00 that was withdrawn from the Say Go Green Account 86 is provided with the Say Go Green Account 86 balance. The Currency Interval Allocation 85 and Say Go Green Transactional Allocation 46 were not transferred with the Total Transfer Amount 166, but instead were retained as spendable assets. The Granite Sums 76 screen may be accessed and show that the Granite Sum Account 80 balance is equal to the sum of the Forever Black Account 88 balance and Say Go Green Account 86 balance as shown in FIG. 15H. As shown in the Transfer 96 screen in FIG. 16A and flow chart in FIG. 16B, the Granite Sum Account 80 remains at a balance of $770.02, as shown in FIG. 16C, because the transfer was made internally within the Never Red Register 10 not within the user's actual bank account and while the total cash balances within the Never Red Register 10 reflect this transfer from the Say Go Green Account 86 to the Forever Black Account 88 to change the designation of funds from spendable assets to available assets, the user's actual bank account balance is the same before and after the transfer transaction.

Figures 17C, 17D:
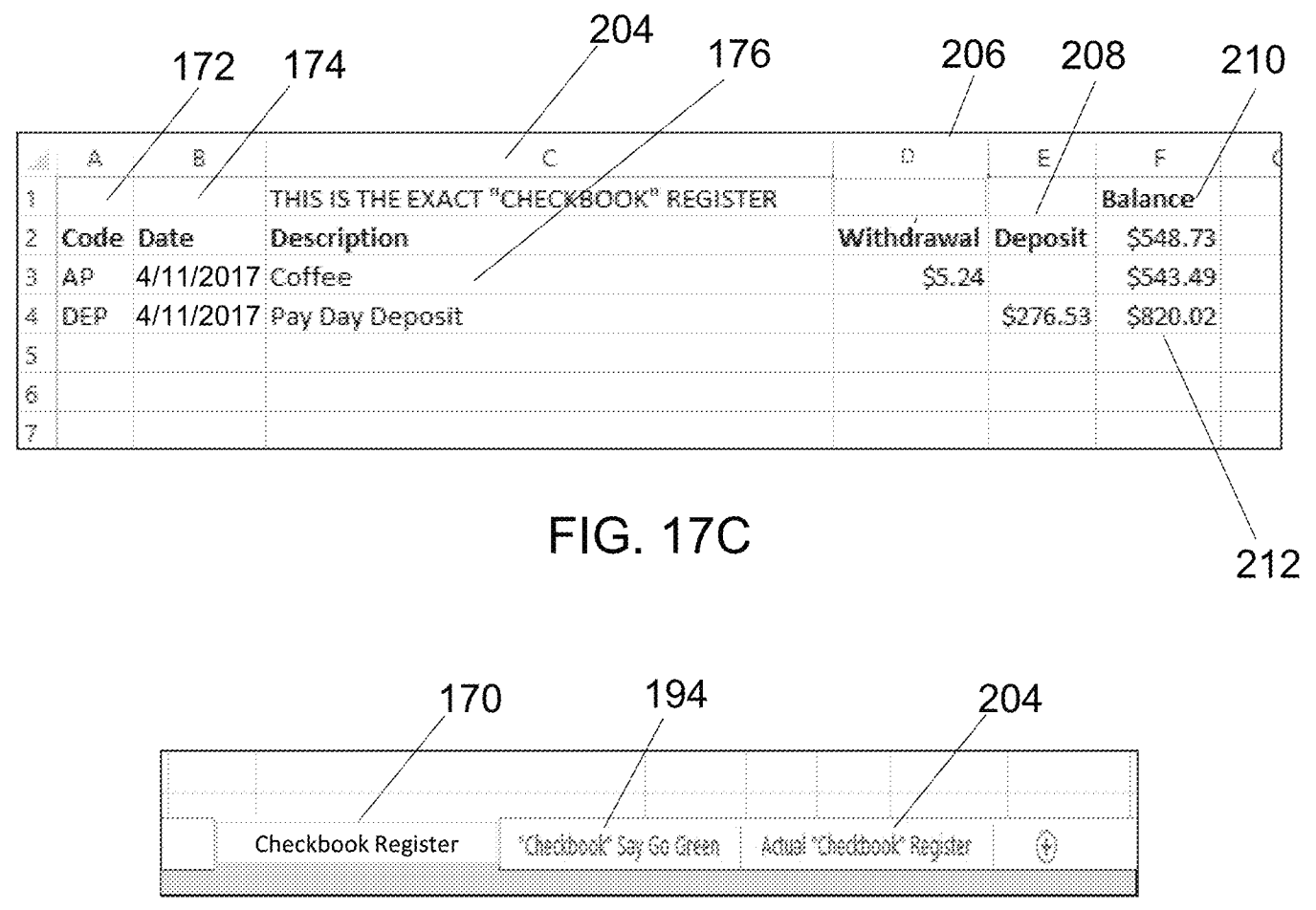

As shown in FIGS. 17A-17D, the transactions are summarized for the user through a statement of the Never Red Register 10 which may be in the form of a spreadsheet, timeline, or using icons or other graphics for a user to easily access and review. In a first embodiment, a daily ledger 170 showing a transaction code 172, the date 174, a description of the transaction 176, a withdrawal 178, a deposit 180, and a transfer 182, a transfer of funds to the Say Go Green Account 184 for the assets that have been put towards spending, the removal of funds 186, the deposit of funds 188 and the Forever Black Balance 190 designated as available funds is shown in FIG. 17A. A balance statement 192 including the initial balance and the balance of each account may also be provided. As shown in FIG. 17B, a Say Go Green Account statement 194 may include a transaction code 172, the date 174, the description of a transaction 176, withdrawals 196 from the Say Go Green Account 86 and deposits 198 to the Say Go Green Account 86, the Say Go Green Account 86 running balance 200 and the Say Go Green Account 86 current balance 202. The user's actual checkbook statement 204, as shown in FIG. 17C, may be provided and include a transaction code 172, the date 174, a description of the transaction 176, withdrawals from the user's actual bank account 206, deposits to the user's actual bank account 208, the running balance 210 and the current balance 212 of the user's actual bank account. The internal transactions to and from the Say Go Green Account 86 and other accounts in the Never Red Register 10 are not included within the user's actual bank account statement 204. The user's actual bank account balance is always equal to the sum of the Granite Sum Account 80 balance and the Never Red Number 38. The statements may be accessible through pull down menus, icons, tabs as shown in FIG. 17D or using other display methods.

Figure 18:
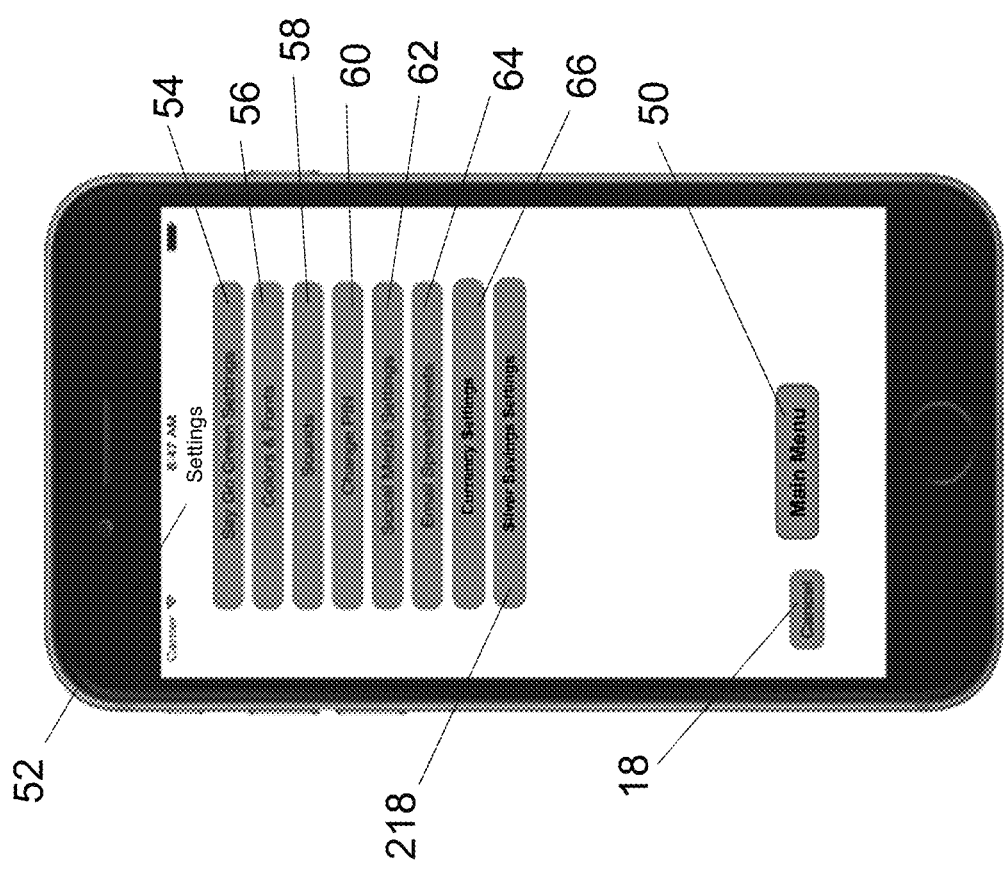
FIG. 18 is an embodiment of a settings menu in an embodiment of the Never Red Register of the present invention.

As shown in FIG. 18, the Settings Menu 52 of the Never Red Register 10 provides access to setup email addresses and issue email notifications to the user to verify statements within the Never Red Register 10 with statements from the user's actual bank account and to send statements from the Never Red Register 10 to the user on a periodic basis which may be preset by the user using the Never Red Register 10 calendar function. An email address is configured by selecting the Email spreadsheets 64 option in the Settings Menu 52. In some embodiments for security, a single email may be entered to restrict access to the statements and the statements may be encrypted and/or accessible only by using a secure login, password or pin code to be viewed within the Never Red Register 10 or other compatible applications such as in a pdf, xls, csv, doc or other format. Notifications and warnings may be provided within the Never Red Register 10 when statements have been emailed. Notifications of reaching financial goals, access to periodic statements or other information on the status and success in saving funds using the Never Red Register 10 may also be distributed through social media by configuring the link and permissions to access the Never Red Register information through the Social Media Settings 62 option provided in the Settings Menu 52.

Figure 19:
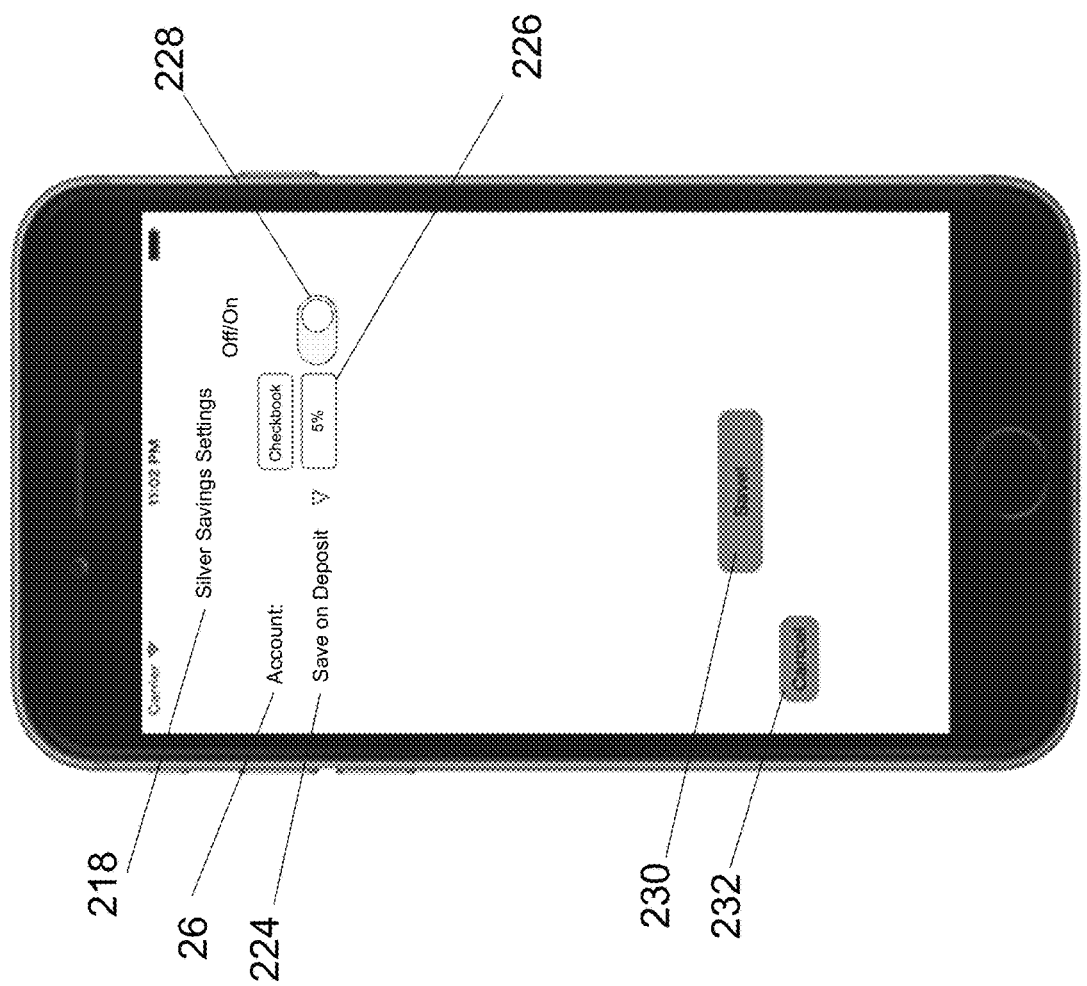
FIG. 19 is an embodiment of a settings screen to designate assets for allocation to a retirement account in an embodiment of the Never Red Register of the present invention.

The Settings Menu 52 provides access for the user to configure an additional account to allocate funds within the Never Red Register 10 to retirement. In this embodiment the user may select, the Silver Savings Account Settings 218 option to configure a retirement account that is the referred to herein as the Silver Savings Account 220. The Silver Savings Settings 218 screen, as shown in FIG. 19, provides for the user to select a Money Bin Account 26 to associate with the Silver Savings Account 220. The user then selects a transaction type 224 for the allocation of funds to the Silver Savings Account 220. In some embodiments, the default transaction type is on a deposit transaction since assets are being added, however if the user prefers, a pull-down menu may provide for the user to select one of a withdrawal, deposit or transfer as a transaction type or select all to have an allocation of funds made to the Silver Savings Account 220 on every transaction. The user must also enter the Silver Savings Retirement Allocation 226 that may be a present amount such as $10.00 as a specific amount of funds to be allocated or select a transactional percentage that multiplies the transaction amount by the percentage to determine the Silver Savings Retirement Allocation 226. A Silver Savings Account Activation Setting 228 provides for the user to turn on or off the allocation to the Silver Savings Account 220 as desired. If set to an on position, the allocation will occur every time the transaction type occurs and must be set to an on position during the transaction to have the Never Red Register 10 determine the allocation amount and transfer funds from the associated Money Bin Account 26 to the Silver Savings Account 220. When the user has selected the appropriate settings, the Save! 230 button may be selected to configure the settings within the Never Red Register 10. The Cancel 232 key may be selected to exit the Silver Savings Account 220 settings screen without saving changes.

Figure 20A:
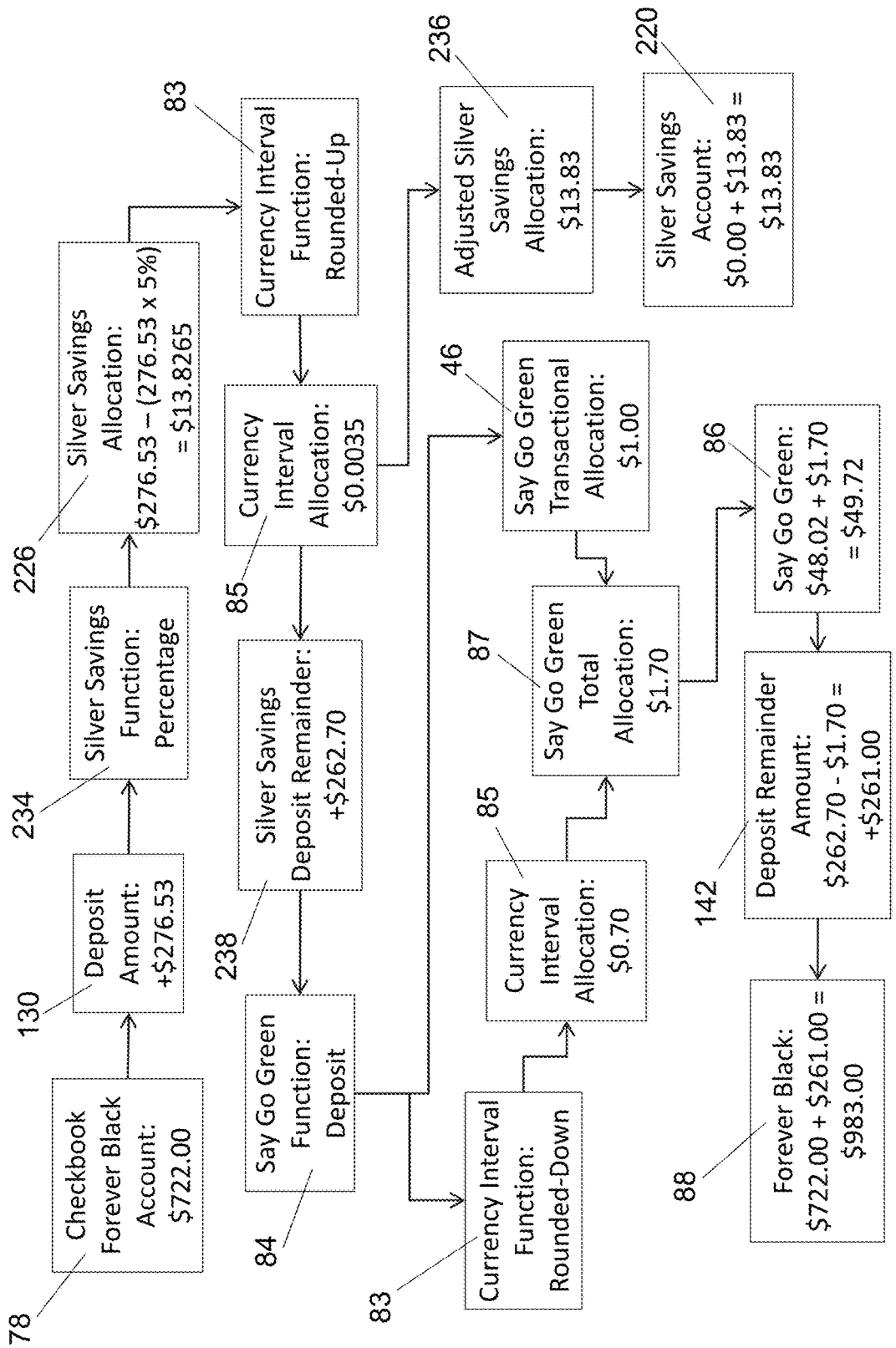
FIG. 20A is an embodiment of a flowchart showing the allocation steps to designate assets to a retirement account in an embodiment of the Never Red Register of the present invention.

As shown as an example in FIG. 20A, when the Silver Savings activation setting 228 is "On" and based on the account settings a deposit transaction is entered or is automatically transacted using a calendar function of the Never Red Register 10, or other automated, function, the Never Red Register 10 provides instructions for the computational circuitry 3 of the digital device to automatically implement the Silver Savings Function 234. The Silver Savings Function 234 determines the Silver Savings Retirement Allocation 226. If the Silver Savings Function 234 is set to a percentage, the Silver Savings Retirement Allocation 226 is determined by multiplying the Silver Savings Retirement Allocation 226 by the Deposit Amount 130. The Silver Savings Function 234 then invokes the Currency Interval Function 83 to determine a Currency Interval Allocation 85 by rounding-up the Silver Savings Retirement Allocation 226 to the lowest denomination of currency. The Currency Interval Allocation 85 is added to the Silver Savings Retirement Allocation 226 to adjust the Silver Savings Retirement Allocation 226 to the lowest denomination of currency. The Adjusted Silver Savings Retirement Allocation 236 is withdrawn from the Deposit Amount 130 to determine a Silver Savings Deposit Remainder 238. The Never Red Register 10 then implements the Say Go Green Function 84 for a deposit which invokes the Currency Interval Function 83 to determine a Currency Interval Allocation 85 by rounding down the Silver Savings Deposit Remainder 238 to the interval of currency. Using the Say Go Green Function 84, the Say Go Green Total Allocation 87 equal to the combined Currency Interval Allocation 85 and the Say Go Green Transactional Allocation 46 is withdrawn from the Silver Savings Deposit Remainder 238 leaving a Deposit Remainder 142. The Say Go Green Total Allocation 87 is deposited into the Say Go Green Account 86, the Silver Savings Retirement Allocation 226 is deposited into the Silver Savings Account 220, and the Deposit Remainder 142 is deposited in the Forever Black Account 88.

In the example shown in FIG. 20A, for a Deposit Amount 130 of $276.53, the Silver Savings Function 234 determines a Silver Savings Retirement Allocation 226 of $13.8265 which is rounded-up to the lowest denomination of currency using the Currency Interval Function 83 to determine the Currency Interval Allocation 85 of $0.0035. The Currency Interval Allocation 85 is added to Silver Savings Retirement Allocation 226 to determine an Adjusted Silver Savings Allocation 236 in the amount of $13.83. The Adjusted Silver Savings Allocation 236 of $13.83 is withdrawn from the Deposit Amount 130 of $276.53 and deposited in the Silver Savings Account 220 leaving the Silver Savings Deposit Remainder 238 of $262.70. The Say Go Green Function 84 for a deposit invokes the Currency Interval Function 83 to determine a Currency Interval Allocation 85 of $0.70 by rounding down the Silver Savings Deposit Remainder 238 to the interval of currency. Using the Say Go Green Function 84, the Say Go Green Total Allocation 87 of $1.70 equal to the combined total of the Currency Interval Allocation 85 and the Say Go Green Transactional Allocation 46 is withdrawn from the Silver Savings Deposit Remainder 238 leaving a Deposit Remainder 142 of $261.00 which is deposited in the Forever Black Account 88 for a total balance of $983.00. The Say Go Green Total Allocation 87 of $1.70 is deposited into the Say Go Green Account 86 for a total balance of $49.72. The Silver Savings Retirement Allocation 226 is deposited as an initial deposit in the Silver Savings Account 220 setting a balance of $13.83. Using the Never Red Register 10 and activating the Silver Savings Account 220 option, a portion of the deposited assets are designated for retirement and a portion of the deposited assets are designated as spendable funds for the user to better manage both long range and short term financial objectives.

Figure 20C:
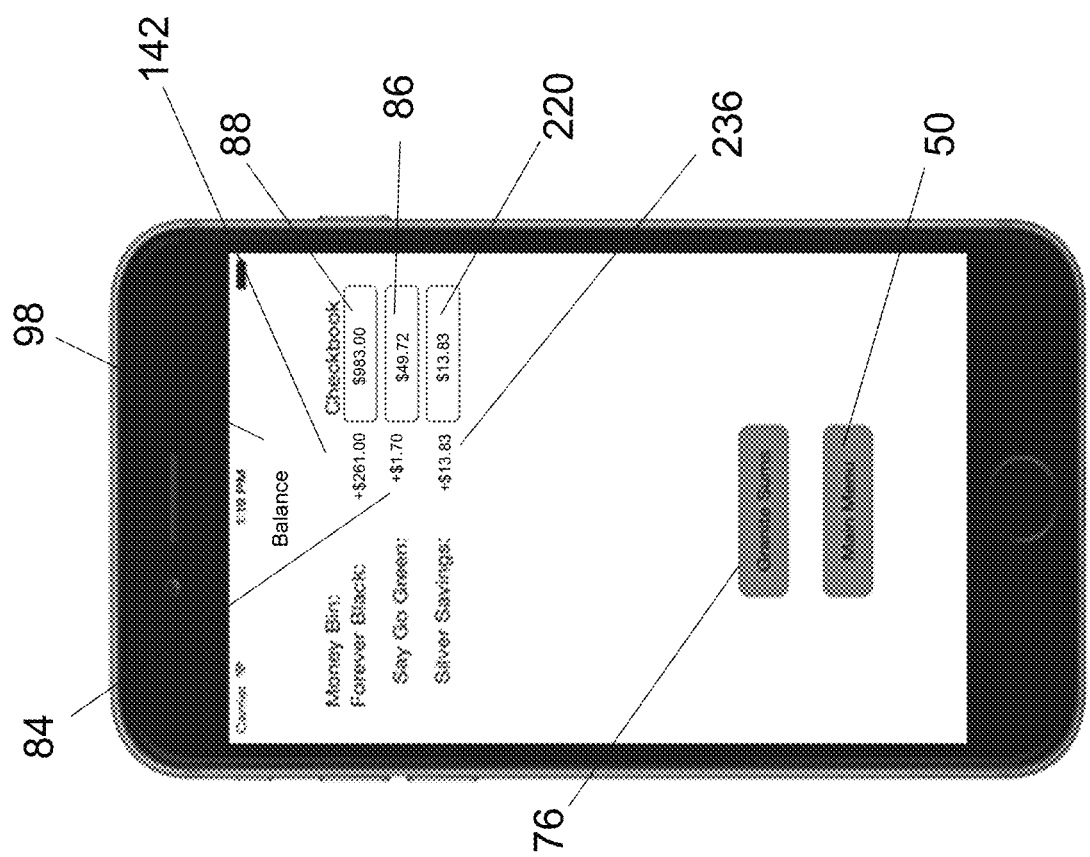
FIG. 20C is an embodiment of a display of a balance screen to review assets designated as available, spendable and as allocated to a retirement account with the most recent transactions in an embodiment of the Never Red Register of the present invention.
Figure 20B:
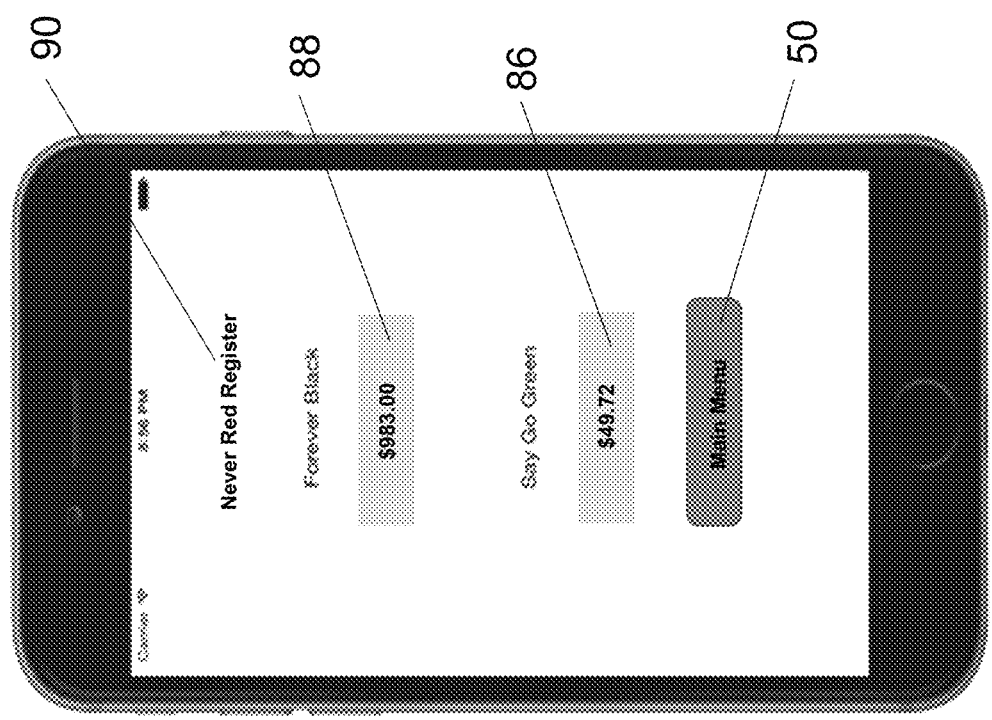
FIG. 20B is an embodiment of a display of assets designated as available and spendable in an embodiment of the Never Red Register of the present invention.

The Quick Check 90 screen as shown in FIG. 20B shows the new balances for the Forever Black Account 88 and Say Go Green Account 86 after the deposit transaction. The user may select Balance 98 from the Main Menu 50 to review the account balances after the deposit transaction. As shown in FIG. 20C, the last transaction showing the Deposit Remainder Amount 142 of +$261.00 is provided with the Forever Black Account 88 balance. The last transaction showing the Say Go Green Function 84 amount of $+1.70 is provided with the Say Go Green Account 86 balance. The Silver Savings Account 220 balance is displayed with the adjusted Silver Savings Retirement Allocation Amount 236 of +$13.83. As shown in the Deposit 94 screen in FIG. 21A and flow chart in FIG. 21B, the Granite Sum 80 is equal to the Granite Sum Account 80 of $770.02 as shown in FIG. 21C plus the Deposit Amount 130 of $276.53 for the new Granite Sum Account 80 balance of $1046.55 where the Deposit Amount 130 was deposited into the user's actual bank account. The account balances within the Never Red Register 10 reflect this deposit with the funds from the deposit being designated as available assets within the Forever Black Account 88, spendable assets within the Say Go Green Account 86, and as retirement assets within the Silver Savings Account 220. Therefore, the account balances of the Forever Black Account 88 of $983.00, the Say Go Green Account 86 of $49.72, and the Silver Savings Account 220 of $13.83 sum up to the Granite Sum Account 80 balance of $1046.55.

As shown in FIGS. 22A-22E, the transactions including the Silver Savings Account 220 are summarized for the user through a statement of the Never Red Register 10 which may be in the form of a spreadsheet, timeline, or using icons or other graphics for a user to easily access and review. As shown in FIG. 22A, the daily ledger 170 shows the transaction code 172, the date 174, the description of the transaction 176, and if the transaction is a withdrawal 178, deposit 180, or transfer 182, a transfer of funds to the Say Go Green Account 184 for the cash that has been put towards spending, and the transactions of the Silver Savings Account 185. The removal of funds 186, the deposit of funds 188 and the Forever Black Balance 190 of the Forever Black Account 88 of available funds are also shown. The daily ledger lists the first Deposit "Pay Day Deposit (Phase 1)" without the activation of the Silver Savings Function 234 and second Deposit "Pay Day Deposit (Phase 2)" with the activation of the Silver Savings Function 234. A balance statement 192 including the initial balance and the balance of each account including the Say Go Green Account 86, the Silver Savings Account 220, the Forever Black Account 88 and the Granite Sum Account 80 may be provided. As shown in FIG. 22B, the Say Go Green Account statement 194 includes the transaction code 172, the date 174, the description of a transaction 176, withdrawals 196 from the Say Go Green Account 86 and deposits 198 to the Say Go Green Account 86 including both the Phase 1 and Phase 2 deposits. The Say Go Green Account running balance 200 and the Say Go Green Account current balance 202 is also provided. The user's actual checkbook statement 204, as shown in FIG. 22C includes the transaction code 172, the date 174, the description of the transaction 176, withdrawals from the user's actual bank account 206, deposits to the user's actual bank account 208 including both the Phase 1 and Phase 2 deposits, and the running balance 210 and the current balance 212 of the user's actual bank account. Because the Never Red Register 10 performs internal transactions to assist the user in better managing their finances the asset transfers to and from the Say Go Green Account 86, the Silver Savings Account 220 and other accounts in the Never Red Register 10 are not included within the user's actual bank account statement 204. However, the balance of all accounts within the Never Red Register 10 associated with the user's actual bank account are always equal to the sum of the balance of the Granite Sum Account 80 and the Never Red Number 38. As shown in FIG. 22D, the Silver Savings Account statement 240 includes the transaction code 172, the date 174, the description of a transaction 176, withdrawals 242 from the Silver Savings Account 220 and deposits 244 to the Silver Savings Account 220 including the Phase 2 deposit. The Silver Savings Account running balance 246 and the Silver Savings Account current balance 248 may also be provided. The statements including the Silver Savings Account Statement 240 are accessible through pull down menus, icons, or tabs as shown in FIG. 22E.

In some embodiments of the Never Red Register 10 the Settings Menu 52 may provide an Account Settings 250 option as shown in FIG. 23A. By selecting the Accounts Settings 250 option the user is provided with a menu of options within the Account Settings 250 screen as shown in FIG. 23B to adjust the Say Go Green Settings 54, to adjust the Silver Savings Settings 218 or add a Silver Savings Account 220, to setup or adjust settings in the Never Red Register Calendar Option 252, and to make changes to Account Names 254 as desired by the user. The Account Settings 250 menu may also provide for the user to add an account using the Add Money Bin 256 option, remove an account using the Remove Money Bin 258 option, add a sub-account or drawer using the Add Drawer 260 option, remove a drawer using the Remove Drawer 262 option, setup a financial goal using the Goal Settings 264 or review the allocation parameters for all accounts using the Savings Settings 266 option. Any or all of these features may be provided in specific embodiments of the Never Red Register 10.

Figures 24A, 24B:
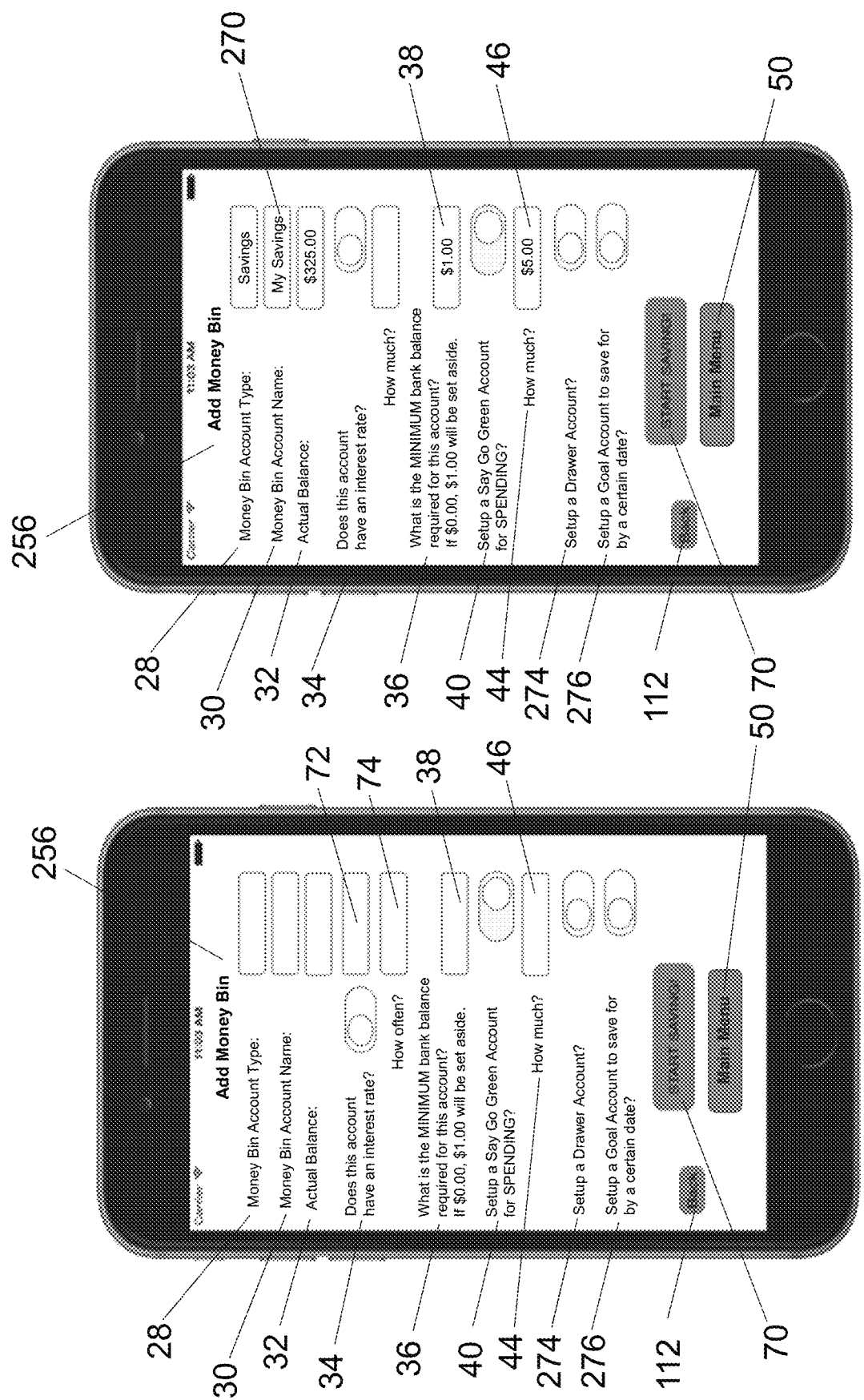
FIG. 24A is an embodiment of an add account settings screen in an embodiment of the Never Red Register of the present invention.
FIG. 24B is an embodiment of an add account settings screen with example data in an embodiment of the Never Red Register of the present invention.

As shown in FIG. 24A, the user may select to add an account to the Never Red Register 10 by selecting the Add Money Bin 256 option which opens the Add Money Bin 256 screen. A Money Bin Account 26 is an actual bank asset account such as a checking or savings account that the user as an individual or business has setup in a bank, credit union or other financial institution. While a first Money Bin Account 26 may be a checking account as described in earlier embodiments, the Never Red Register 10 may provide for additional Money Bin Accounts to track balances and allocate funds in other actual bank accounts of the user to provide a single access point to all of the user's financial data, even if the accounts are in different financial institutions to assist the user in meeting their savings, retirement, and other financial goals.

The Add Money Bin 256 screen prompts the user to enter information on the Account Type 28, an Account Name 30, and the Actual Balance 32. An Interest Rate 34 prompt with a toggle button may be selected as "On" if the account provides interest and the Interest Rate 72 may be entered. A How Often 74 prompt provides for entering the frequency of when the Interest Rate 72 is calculated. As noted herein, Never Red Register 10 provides the important feature of providing sub-value indicators to prevent overdrawing the account. If the user follows the indicators, the user will not exceed their minimum balance or overcharge fee requirements and thereby prevent having to pay for example overdraft charges or monthly service charge fees. In the What is the Minimum Balance that your bank requires for this account? 36 prompt the user enters a cash value of for example $250 if that is the minimum balance that must be in the account to prevent monthly fees or of for example $35 if that is the overage charge for withdrawing more funds than are available in the account. The amount entered is the Never Red Number 38 which is subtracted from the entered Actual Balance 32 and the remainder of the Actual Balance 32 is displayed within the Never Red Register 10 as the Granite Sum Account 80 for this additional Money Bin Account 26. If no minimum balance is required in the account, an amount of $1.00 will be entered as a default amount to prevent the Actual Balance 32 from going below zero. A Setup a Say Go Green Account 40 prompt with a toggle button and a How much? 44 prompt provides for the user to associate a Say Go Green Account 86 with the Money Bin Account 26 and enter the amount of the Say Go Green Transactional Allocation 46.

The Add Money Bin 256 feature also provides for a user to setup sub-accounts that are designated as drawers for expensive or long range financial objectives and goals that require the user to meet a specific financial objective by a certain date. Assets are automatically allocated to the drawers and goals as transactions are performed within the associated Money Bin Account 26. A Setup Drawer Account 274 prompt and a Setup Goal Account 276 prompt are provided with toggle buttons to select.

As shown in FIG. 24B, the user may choose to add an Account Type 28 of Savings, give the Money Bin Account 26 an Account Name 30 of "My Savings", and enter an Actual Balance 32 of $325.00. If the Interest Rate 34 toggle button is off on the account that option is not selected and if no minimum balance 36 is required by the financial institution the Never Red Number 38 is set to the default of $1.00. In this example, the user selects to have a Say Go Green Account 86 associated with the Money Bin Account 26 and enters the Say Go Green Transactional Allocation 46 in the amount of $5.00. The options to set up a Drawer Account 282 or a Goal Account 314 in this example are not selected. The user selects the Start Saving! 70 option to save these settings or selects the Back 112 button to exit without adding the Money Bin Account 26. With these settings, the sub-value indicator is shown in the Granite Sum Account 80 balance which for this new My Savings Money Bin Account 270 is $324.00 equal to the Actual Balance 32 minus the Never Red Number 38 equal to $1.00.

The Never Red Register 10 provides for the user to track their balance in a Money Bin Account 26 and perform transactions by selecting the Main Menu 50. Because all Money Bin Accounts 26 are within the Never Red Register 10 any transaction that transfers money to or from one Money Bin Account 26 to another such as from the Checkbook Money Bin Account 78 to the new My Savings Money Bin Account 270 are subject to the Say Go Green Transactional Allocation 46 if the user has selected to have one or both accounts associated with a Say Go Green Account 86. For example, when a transfer transaction to transfer funds from the Checkbook Money Bin Account 78 to the My Savings Money Bin Account 270 is entered or automatically updated from a connection to the user's actual bank account, the Never Red Register 10 provides instructions for the computational circuitry 3 of the digital device to automatically implement the Say Go Green Function 84 for a withdrawal for the Checkbook Money Bin Account 78 and for a deposit for the My Savings Money Bin Account 270. The Say Go Green Function 84 for a withdrawal invokes the Currency Interval Function 83 to determine a Currency Interval Allocation 85 by rounding-up the Transfer Amount 152. The Currency Interval Allocation 85 is combined with the Say Go Green Transactional Allocation 46 to determine the Say Go Green Total Allocation 87. The Say Go Green Total Allocation 87 with the Transfer Amount 152 is withdrawn from the Transfer From Account 148, the Checkbook Money Bin Account 78. The Say Go Green Total Allocation 87 is deposited in the Say Go Green Account 86 associated with the Checkbook Money Bin Account 78.

With the depositing of the Transfer Amount 152 in the Transfer To Account 150, the My Savings Money Bin Account 270, the Never Red Register 10 invokes the Say Go Green Function 84 for a deposit which invokes the Currency Interval Function 83 to determine a Currency Interval Allocation 85 by rounding-down the Transfer Amount 152. The Currency Interval Allocation 85 is combined with the Say Go Green Transactional Allocation 46 to determine the Say Go Green Total Allocation 87. The Say Go Green Total Allocation 87 is withdrawn from the Transfer Amount 152 and deposited in the Say Go Green Account 86 associated with the Transfer to Account 150, the My Savings Money Bin Account 270, leaving the Deposit Remainder 142 that is deposited in the Transfer To Account 150, the My Savings Money Bin Account 270.

In performing the transfer transaction from Checkbook Money Bin Account 78 to the My Savings Money Bin Account 270 for a Transfer Amount 152 of $15.75, the Never Red Register 10 implements the Say Go Green Function 84 for a withdrawal to invoke the Currency Interval Function 83 to determine a Currency Interval Allocation 85 of $0.25 by rounding-up the Transfer Amount 152. In the example shown in FIG. 24C for simplicity, the Say Go Green Function 84 is shown only with the Say Go Green Total Allocation 87 of $1.25 that is determined by the combined Currency Interval Allocation 85 of $0.25 and the Say Go Green Transactional Allocation 46 set at $1.00. The Say Go Green Total Allocation 87 of $1.25 and the Transfer Amount 152 of $15.75 are combined for a Total Transfer Amount 166 of $17.00. The Total Transfer Amount 166 of $17.00 is withdrawn from the Forever Black Account 88 balance associated with the Checkbook Money Bin Account 78 leaving a balance of $964.00. The Say Go Green Total Allocation 87 amount of $1.25 is deposited in the Say Go Green Account 86 associated with the Checkbook Money Bin Account 78 to increase the balance to $50.97.

Figure 24C:
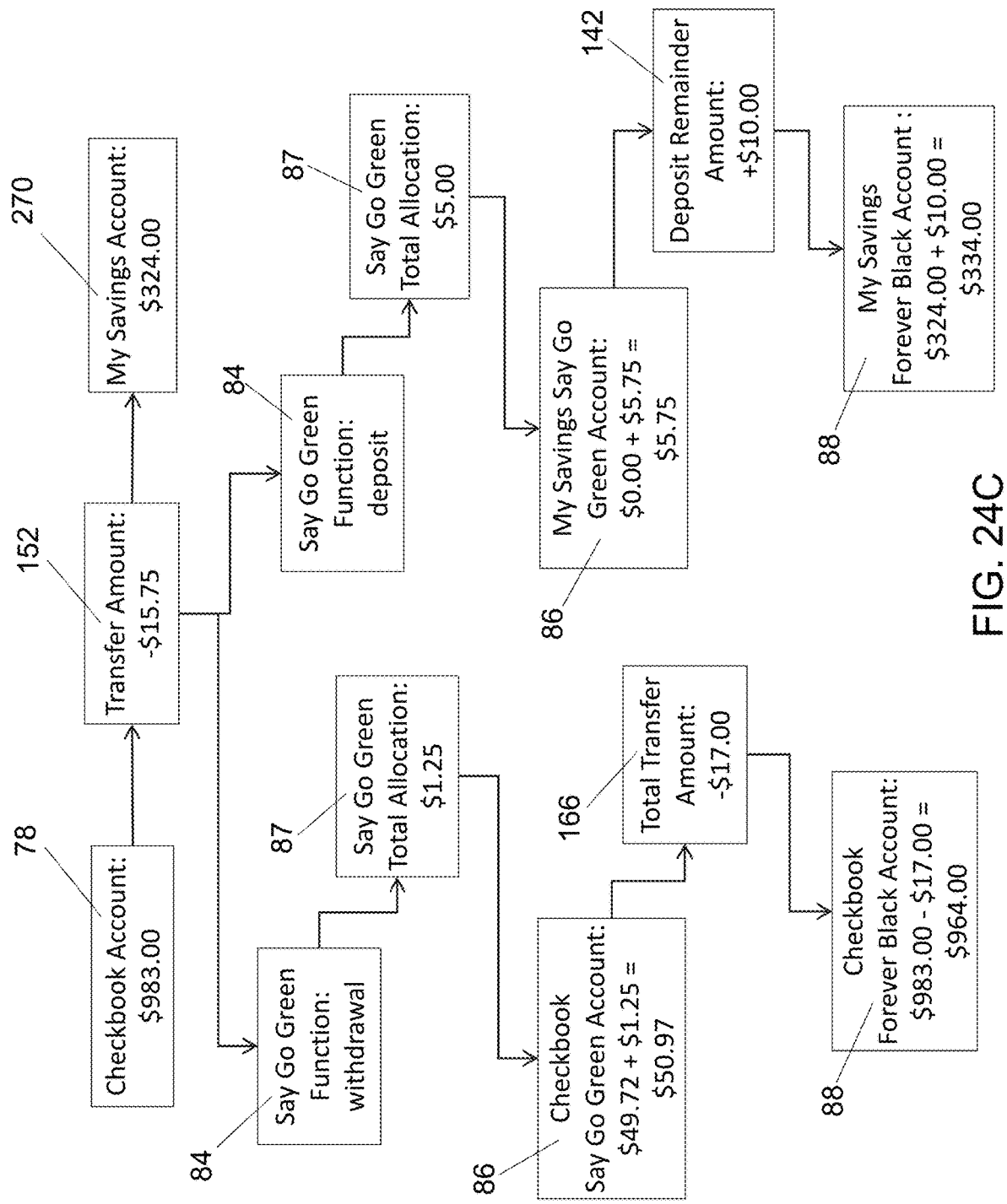
FIG. 24C is an embodiment of a flowchart showing the allocation steps in entering a transaction for a transfer from one account to another account in an embodiment of the Never Red Register of the present invention.

With the Transfer Amount 152 of $15.75 being deposited in the My Savings Account 270, the Never Red Register 10 invokes the Say Go Green Function 84 for a deposit. The Say Go Green Function 84 for a deposit invokes the Currency Interval Function 83 to determine a Currency Interval Allocation 85 of $0.75 by rounding-down the Transfer Amount 152 of $15.75. The Currency Interval Allocation 85 is combined with the Say Go Green Transactional Allocation 46 of $5.00 to determine a Say Go Green Total Allocation 87 of $5.75 as shown in FIG. 24C. The Say Go Green Total Allocation 87 of $5.75 is deposited as an initial deposit in the Say Go Green Account 86 associated with the My Savings Money Bin Account 270 leaving a Deposit Remainder 142 of $10.00 that is deposited in the My Savings Money Bin Account 270. In some embodiments, in performing a transaction the Never Red Register 10 may invoke the Say Go Green Function 84 to withdraw or combine the Say Go Green Transactional Allocation 46 with the withdrawal, deposit, or transfer amount and then perform the Currency Interval Function 83 to round-up or round-down, depending on the transaction type, the combined total transaction amount to determine the Currency Interval Allocation 85.

In this example, the Never Red Register 10 increased the Transfer Amount 152 to allocate funds to the Say Go Green Account 86 associated with the Checkbook Account 78. The Never Red Register 10 also allocated a portion of the Transfer Amount 152 to the Say Go Green Account 86 associated with the My Savings Account 270 thereby designating a portion of the funds as spendable assets. In further examples, any number of Say Go Green Accounts 86, Silver Savings Accounts 270, Drawer Accounts 274 and/or Goal Accounts 276 may be associated with a Money Bin Account 26 to have accounts designated for specific financial purposes. Assets are allocated to these designated accounts based on the account and allocation settings so that within one transaction assets may be allocated to one or more of these designated accounts within the Never Red Register 10.

Figure 24E:
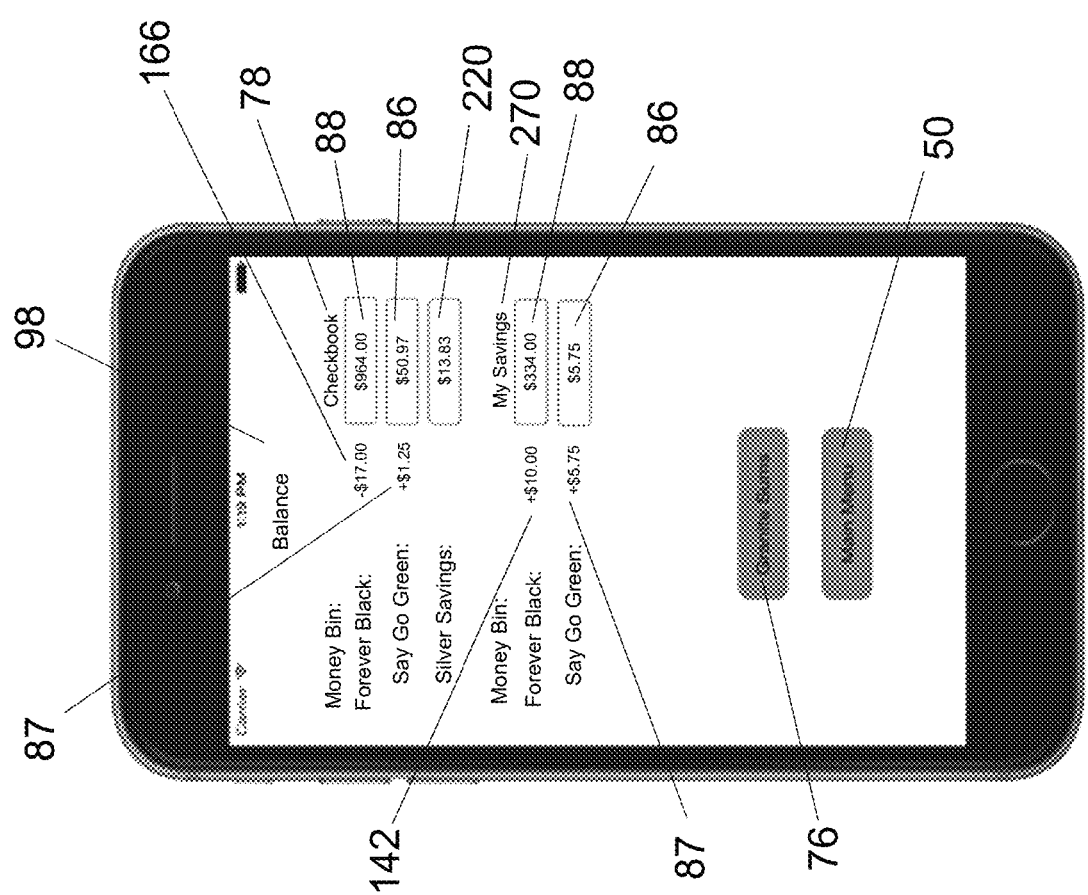
FIG. 24E is an embodiment of a display of a balance screen to review assets within an account designated as available, spendable and as allocated to a retirement account and assets within an account designated as available and spendable with the most recent transactions of the accounts in an embodiment of the Never Red Register of the present invention.
Figure 24D:
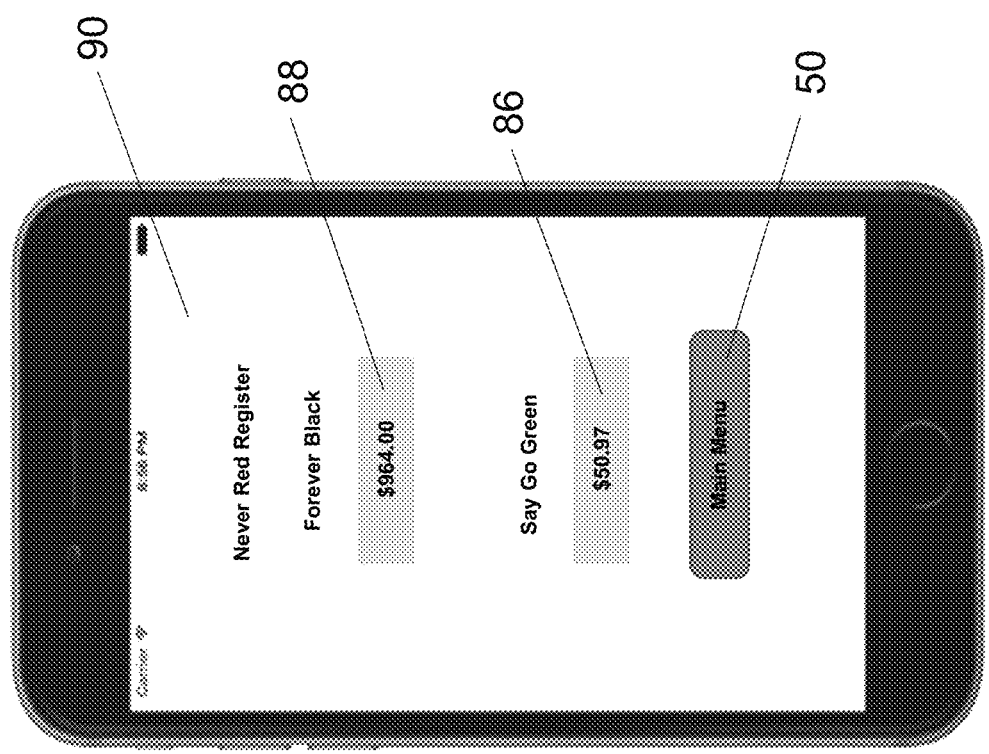
FIG. 24D is an embodiment of a display of assets designated as available and spendable in an embodiment of the Never Red Register of the present invention.

The Quick Check 90 screen, as shown in FIG. 24D, shows the new balances for the Forever Black Account 88 and Say Go Green Account 86 for the Checkbook Money Bin Account 78 that is setup as the default account for the Quick Check 90 screen display. The user may select Balance 98 from the Main Menu 50 to review the cash account balances for the Forever Black Account 88 and the Say Go Green Account 86, the Silver Savings Account 220 associated with the Checkbook Account 78. The Balance 98 screen also displays the Forever Black Account 88, balance, for the My Savings Account 270 after the transfer transaction with the balance of the Say Go Green Account 86 associated with the My Savings Account 270. In the Balance 98 screen, the My Savings Money Bin Account 270 is listed separately from the Checkbook Money Bin Account 78 with each Money Bin Account 26 having a separate available balance referred to herein as the Forever Black Account 88. Importantly, because a Money Bin Account 26 is an actual bank account of the user, there may be a transaction that involves only one Money Bin Account 26, so with the exception of a transfer of funds between two Money Bin Accounts 26, the balance of one Money Bin Account 26 may be unchanged from a transaction in another Money Bin Account 26. As shown in FIG. 24E, the last transaction showing the Total Transfer Amount 166 of −$17.00 may be provided with the Forever Black Account 88 balance associated with the Checkbook Account 78. The last transaction showing the Say Go Green Total Allocation 87 of $1.25 is provided with the Say Go Green Account 86 balance for the Say Go Green Account 86 associated with the Checkbook Money Bin Account 78. Because the transaction in this example was not a deposit, the Silver Savings Account 220 balance is unchanged. The Deposit Remainder 142 of +$10.00 is listed as the last transaction with the Forever Black Account 88 balance associated with the My Savings Account 270. The last transaction of +$5.75 in the Say Go Green Account 86 associated with the My Savings Account 270 with the Say Go Green Account 86 balance is also displayed. The Balance 98 option gives a quick and easy way for a user to review all of their accounts balances, as well as savings, retirements and financial goals.

Figure 24F:
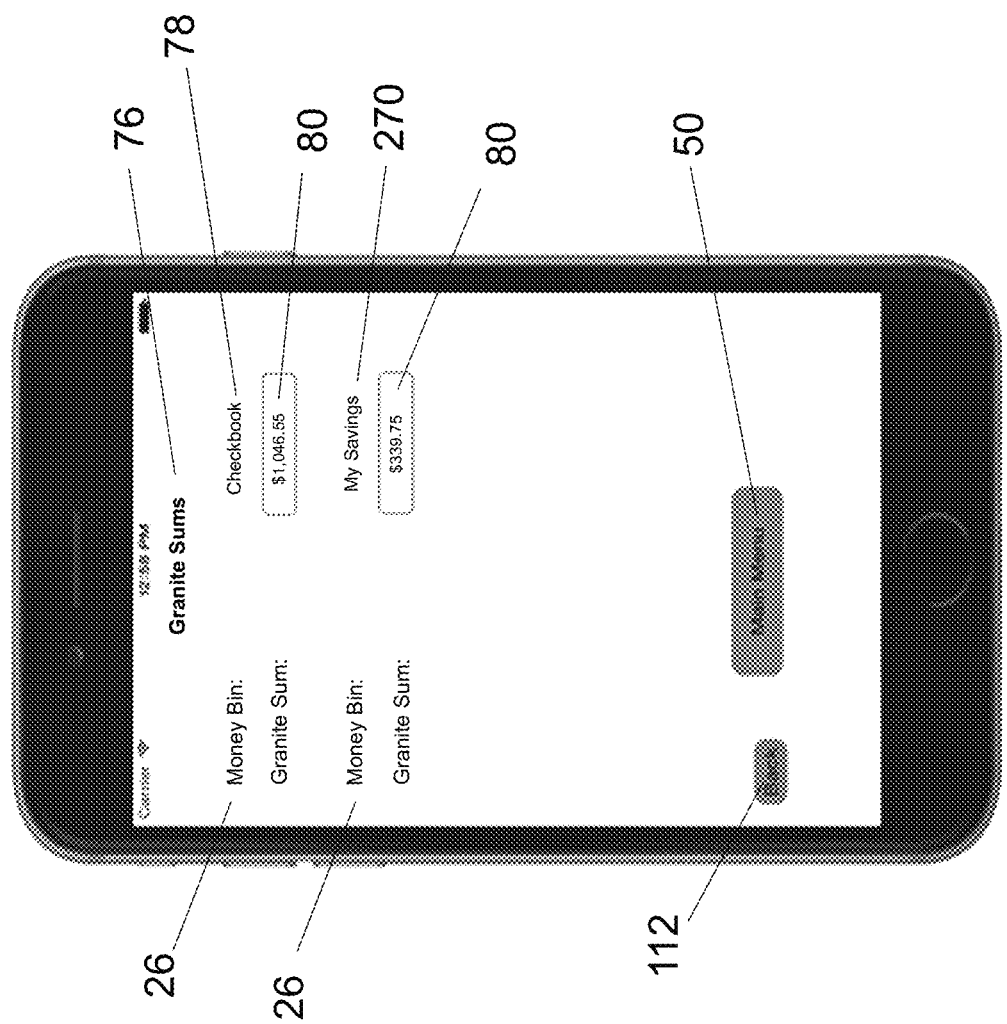
FIG. 24F is an embodiment of a sub-value indicator account balance screen in an embodiment of the Never Red Register of the present invention.

As shown in FIG. 24F, the Granite Sums 76 screen for each Money Bin Account 26 may be accessed and show that the Granite Sum Account 80 balance for any Money Bin Account 26 is equal to the sum of the Actual Balance 32 of the user's bank account, the Say Go Green Account 86 balance if setup for the Money Bin Account 26, and the balance of any Silver Savings Account 220, and drawers or sub-accounts that are associated with that Money Bin Account 26. Therefore, each Money Bin Account 26 may have separate settings for a Say Go Green Transactional Allocation 46, for a Silver Savings Retirement Allocation 226 and for any allocations to other drawer accounts or goal accounts the user chooses to setup for savings, retirement or other financial objectives. In this way, a user may have financial management settings in one account that may only be accessible by them and different financial management settings in another account that may be a joint account that is accessible by the user and one or more other persons such as a business account, with the transactions and savings allocations in any number of accounts being accessible and managed using the Never Red Register 10. In this example, the Granite Sum Account 80 balance is $1046.55 for the Checkbook Money Bin Account 78 and the Granite Sum Account 80 balance is $339.75 for the My Savings Money Bin Account 270. The Granite Sum Account 80 balance for each Money Bin Account 26 provides the actual cash balance of a user's bank account minus the Never Red Number 38 associated with that particular Money Bin Account 26 to prevent the user from incurring bank account or overage charges. Each Money Bin Account 26 is provided with the current balance and a summary of all transactions in the form of a spreadsheet, timeline, or using icons or other graphics for a user to easily access and review.

Figure 25A:
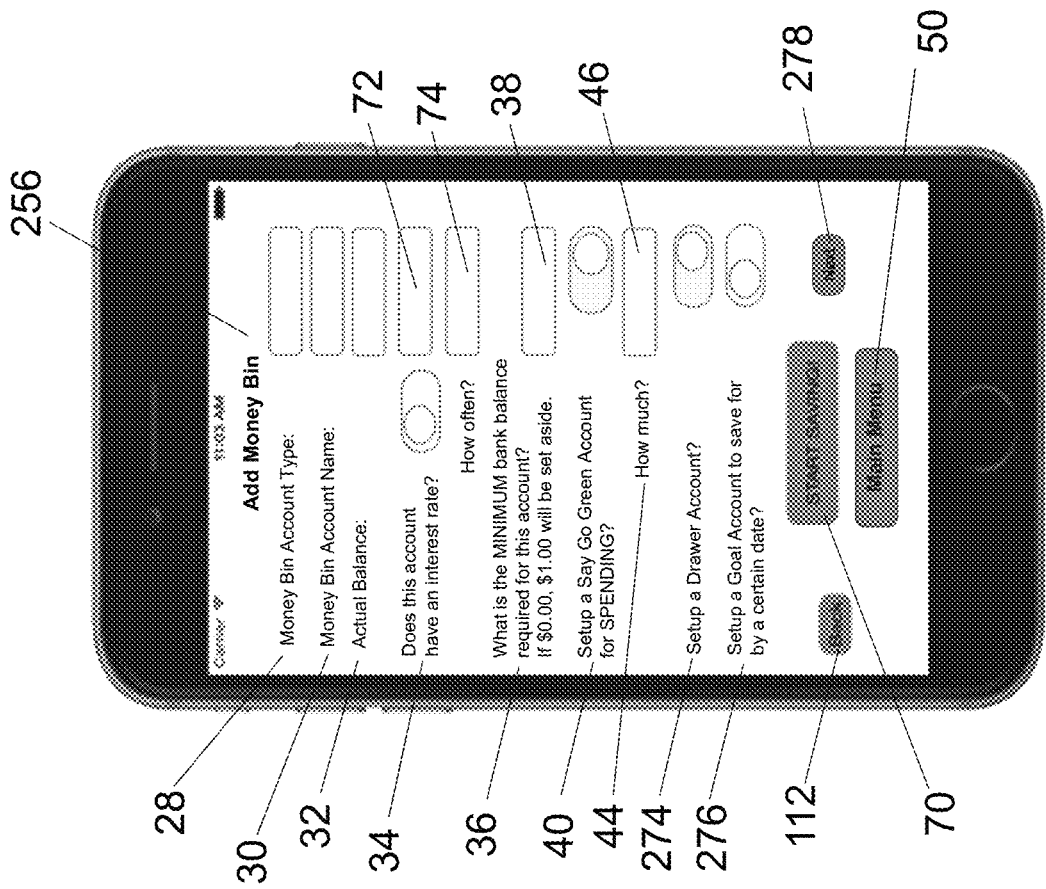
FIG. 25A is an embodiment of add account settings in an embodiment of the Never Red Register of the present invention.

As shown in FIG. 25A, if the Setup Drawer Account 274 option is selected by adjusting its toggle button to the "On" position within the Add Money Bin 256 settings, the user selects the Next 278 button to open the Add Drawer 260 screen. The user may alternatively select the Add Drawer 260 option from the Account Settings 250 menu to open the Add Drawer 260 screen. In the Add Drawer 260 screen, the user enters into the Money Bin Account Name 280 prompt the Money Bin Account 26 that the drawer will be associated with. In this example as shown in FIG. 25B, the Money Bin Account Name 280 for the My Savings Account 270 is automatically entered, because the user setup the drawer through the Add Money Bin 256 screen. At the Drawer Account 282 prompt the user enters a name that may designate the purpose of the allocation of funds, such as for a vacation or wedding. The Initial Balance 284 prompt asks the user for how much money to initially set aside in this new Drawer Account 282. The user may then be prompted to select a Transaction Account as either the Say Go Green Account 86 or the Silver Savings Account 220. If the Say Go Green Transaction Option 286 is selected as "On" the Drawer Account 282 will be associated with the Say Go Green Account 86 and an allocation will be made to the Drawer Account 282 on every transaction that is performed in the associated Money Bin Account 26. Alternatively, if the Silver Savings Transaction Account 288 option is selected as "On" the Drawer Account 282 will be associated with Silver Savings Account 220 and an allocation to the Drawer Account 282 will only be made when the specific transaction set in the account settings for Silver Savings Account 220 is performed in the associated Money Bin Account 26. The Drawer Allocation Request 290 prompt provides for the user to select the Percent or Exact Amount 48 toggle button and enter the amount of the Drawer Allocation 293. A default amount equal to for example $1.00 to fund the Drawer Account 282 may be provided.

To guide the user to better manage and meet their financial objectives, the Never Red Register 10 designates Drawer Accounts 282 to allocate assets within the associated Money Bin Account 26. The designations and allocations are only within the Never Red Register 10 not in the user's actual bank account, but if the user adheres and limits spending to only the spendable assets designated within the Say Go Green Account 86, the balances within the designated Drawer Accounts 282 will grow to a point where the user may withdraw assets within their actual bank account and have enough to meet the designated financial objectives. A Drawer Account 282 therefore provides for a user to designate assets to a specific expense such as a mortgage, heating bill, or utility bill and/or designate assets to longer range financial objectives like the purchase of a new car.

In the example shown in FIG. 25C, the Drawer Account 282 is designated as "New Car" 292 with an Initial Balance 284 of $20.00. The New Car Drawer Account 292 is associated with the Say Go Green Account 86 within the My Savings Money Bin Account 270, so that assets will be allocated to the New Car Drawer Account 292 on every transaction such as a withdrawal, deposit or transfer that is made to or from the My Savings Money Bin Account 270. With the withdrawal of the initial balance from the My Savings Account 270 in setting up the New Car Drawer Account 292, the Never Red Register 10 provides instructions for the computational circuitry 3 of the digital device to automatically implement the Say Go Green Function 84 for a withdrawal that invokes the Currency Interval Function 83 to determine the Currency Interval Allocation 85 by rounding-up the Withdrawal Amount 108 which is the Initial Balance 284 for the New Car Drawer Account 292. The Currency Interval Allocation 85 is combined with the Say Go Green Transactional Allocation 46 to determine a Say Go Green Total Allocation 87. The Withdrawal Amount 108 is combined with the Say Go Green Total Allocation 87 to determine the Total Withdrawal Amount 122 that is withdrawn from the My Savings Forever Black Account 88. Because the New Car Drawer Account 292 is associated with the Say Go Green Account 86, for every transaction within the associated My Savings Money Bin Account 270, the Say Go Green Function 84 invokes a Drawer Allocation Function 291 to withdraw the Drawer Allocation 293 from the Say Go Green Total Allocation 87 and deposit the Drawer Allocation 293 into the Drawer Account 282. If the Say Go Green Total Allocation 87 is less than the Drawer Allocation 293, or Drawer Allocations if there is more than one Drawer Account 282 associated with the Say Go Green Account 86, then the Drawer Allocation Function 291 evenly divides one half of the Say Go Green Total Allocation 87 between all Drawer Accounts 282. Alternatively, the half portion may be divided into each Drawer Account 282 based on the allocation parameters set for each Drawer Account 282 within the Savings Settings 266 as described herein. The Say Go Green Allocation Remainder 89 is then deposited in the Say Go Green Account 86.

Figures 25D, 25E:
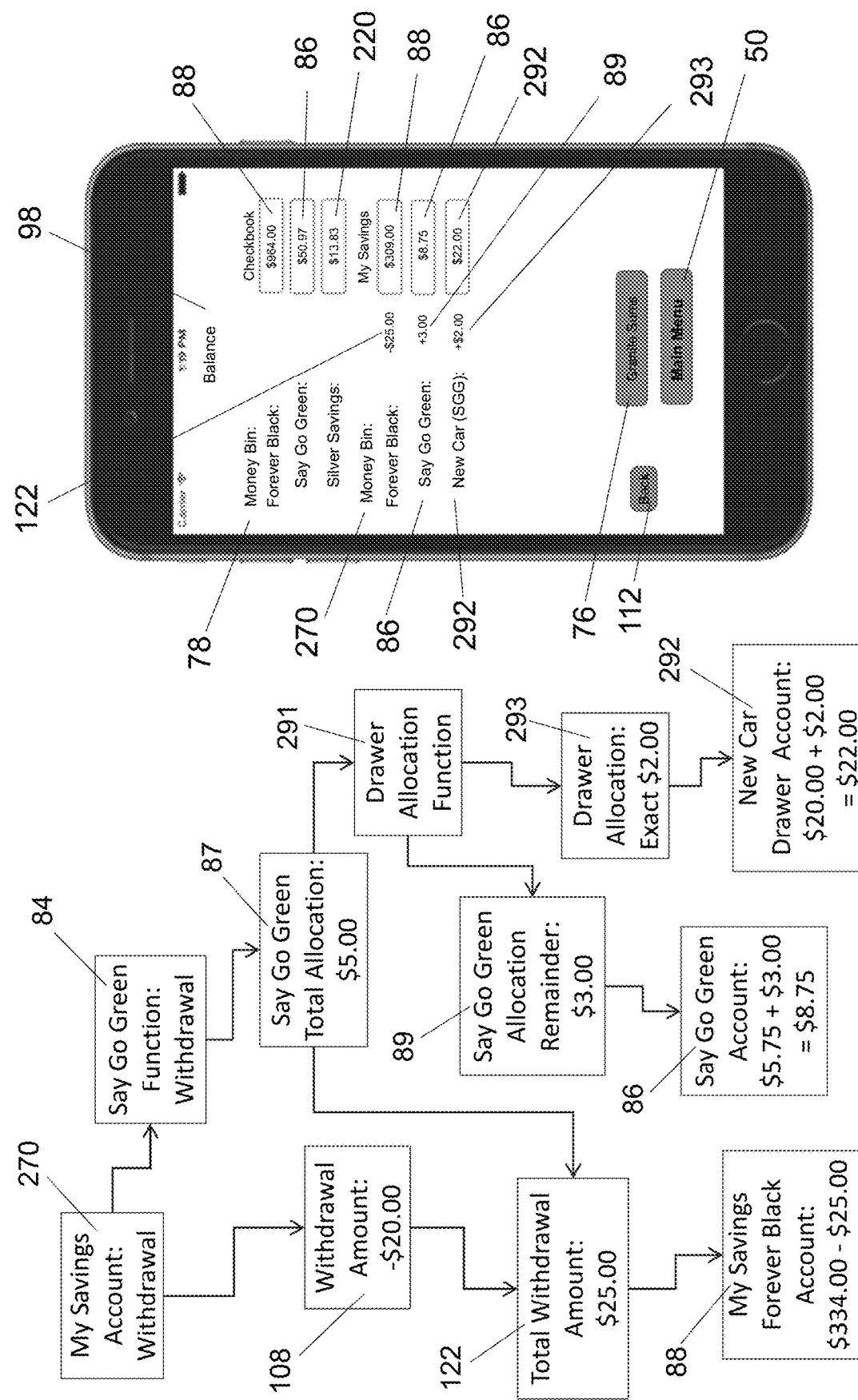
FIG. 25D is an embodiment of a flowchart showing the allocation steps for a withdrawal transaction from an account that has a drawer account associated with the account in an embodiment of the Never Red Register of the present invention.
FIG. 25E is an embodiment of a display of a balance screen to review assets designated as available, spendable, and as allocated to a retirement account in one account and as available, spendable and as allocated to a drawer account in another account with the most recent transactions of the accounts in an embodiment of the Never Red Register of the present invention.

In the example as shown in FIG. 25D, for a Withdrawal Amount 108 of $20.00 Currency Interval Allocation 85 is $0.00 and the Say Go Green Transactional Allocation 46 is set at $5.00 so when combined, the Total Withdrawal Amount 122 is $25.00. The Total Withdrawal Amount 122 is withdrawn from the My Savings Forever Black Account 88. The Say Go Green Function 84 then invokes the Drawer Allocation Function 291 which determines if there are sufficient funds in the Say Go Green Total Allocation 87. If as in this example, the funds are sufficient, the Drawer Allocation Function 291 withdraws the Drawer Allocation 293 set at an exact amount of $2.00 from the Say Go Green Total Allocation 87 amount of $5.00 leaving a Say Go Green Total Allocation Remainder 89 of $3.00. The Say Go Green Total Allocation Remainder 89 of $3.00 is deposited into the Say Go Green Account 86. The Drawer Allocation 293 of $2.00 and the Withdrawal Amount 108 of $20.00 are deposited in the New Car Drawer Account 292 for a balance of $22.00. The Say Go Green Account 86 balance is $8.75 and the Forever Black Account 88 balance for the My Savings Account 270 is $334.00. In the Balance 98 screen shown in FIG. 25E, the My Savings Money Bin Account 270 is listed with the Forever Black Account 88 balance of $309.00 and the Total Withdrawal Amount 122 of the last transaction of −$25.00, the Say Go Green Account 86 balance $8.75 is listed with the Say Go Green Allocation Remainder 89 of $+3.00 and the New Car Drawer Account 292 is listed with the balance of $22.00 and the Drawer Allocation 293 of +$2.00. The Granite Sums 76 screen for the Checkbook Money Bin Account 78 and the My Savings Money Bin Account 270 may be accessed and show that the Granite Sum Account 80 balance is equal to the sum of the Forever Black Account 88, the Say Go Green Account 86 and the sum of the account balances of all Drawer Accounts 282 and Silver Savings Accounts 220 associated with each Money Bin Account 26.

Figure 25F:
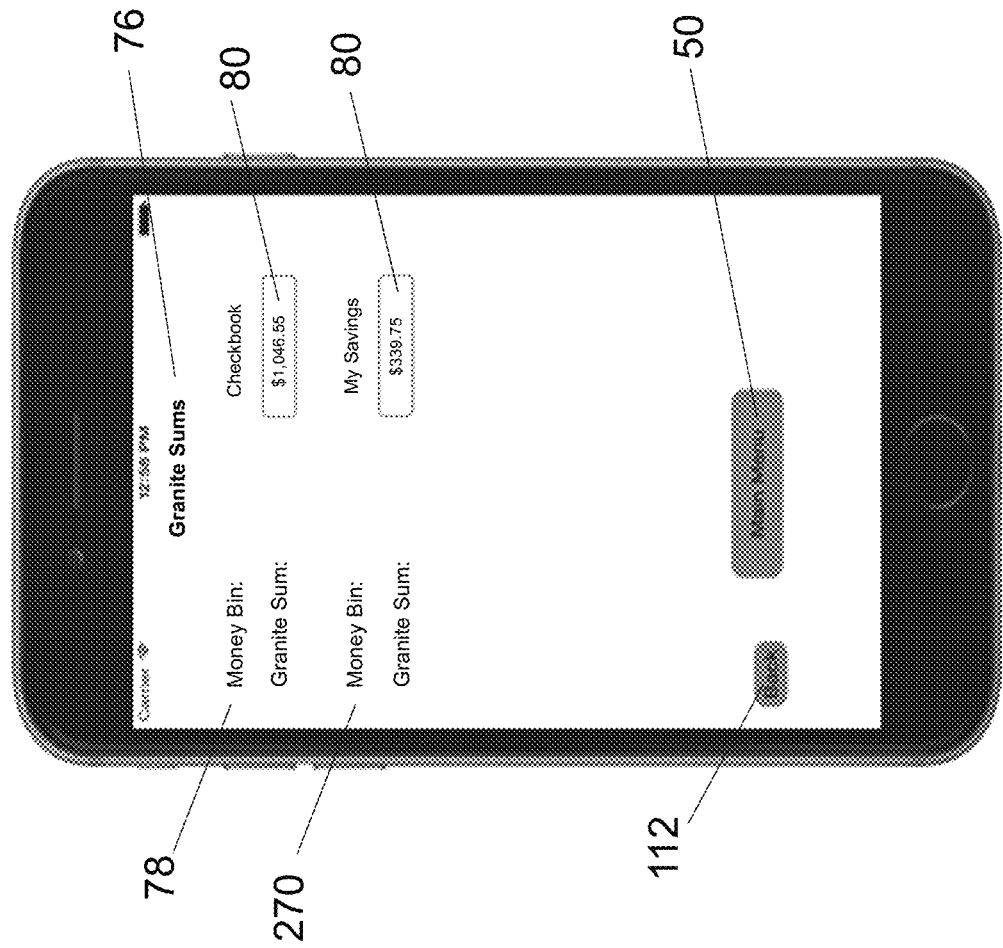
FIG. 25F is an embodiment of a sub-value indicator account balance screen in an embodiment of the Never Red Register of the present invention.

As shown in FIG. 25F, in this example, the Granite Sum Account 80 balance is $1046.55 for the Checkbook Money Bin Account 78 and the Granite Sum Account 80 balance is $339.75 for the My Savings Money Bin Account 270 because the allocation of funds to the New Car Drawer Account 292 and the Say Go Green Account 86 with the Forever Black Account 88 for the My Savings Account 270 is an internal allocation within the Never Red Register 10 so the total sum of the accounts remains at the sum of $339.75 from the earlier transfer from the Checkbook Money Bin Account 78. By entering the withdrawal transaction, the Never Red Register 10 has allocated assets to the New Car Drawer Account 292 for the user to apply towards their goal of saving money to buy a new car while allocating assets to a Say Go Green Account 86 associated with the My Savings Account 270 for the user to spend. By allocating both to the New Car Drawer Account 292 and to the Say Go Green Account 86 the Never Red Register 10 follows the objective of "Pay Yourself First" for the user to better manage their finances and more easily reach their financial objectives.

As shown in FIG. 26, the user may select the Remove Money Bin 258 option from the Account Settings 250 menu to delete a Money Bin Account 26 from the Never Red Register 10. Because a Money Bin Account 26 is the actual account in the user's bank account, the user may be withdrawing all funds from the bank and closing the account with the bank, so may also delete the account from the Never Red Register 10. The Remove Money Bin 258 screen prompts the user to enter or select the Money Bin Account 26 that they want to remove. The Actual Balance 32 that is equal to the Granite Sum Account 80 balance and the Never Red Number 38 that was entered when the user initially setup the Money Bin Account 26 to prevent overage or bank charges from the bank credit union or other financial institution is provided. In this example, if the My Savings Money Bin Account 270 is selected the Actual Balance 32 is the initial balance of $339.75 plus the default Never Red Number 38 of $1.00 for a total Actual Balance 32 of $340.75. The user may delete the Money Bin Account 26 by selecting the Delete Money Bin 294 option which displays a Money Bin Deletion 296 confirmation dialog box with the options to either select to the Delete Money Bin 298 or Cancel 300. The Money Bin Deletion 296 confirmation dialog box also provides a prompt notifying the user that if there is a remaining balance within the Money Bin Account 26, that the user should update the accounts in the Never Red Register 10 if these funds are transferred to another Money Bin Account 26. If the user selects to Delete Money Bin 298, the Money Bin Account 26 is removed from the Balance 98 screen and Granite Sum 76 screen, but the financial history of all transactions within the account are secured and may remain on the statements for the Never Red Register 10. The financial information in the form of spreadsheet, timeline, or using icons or other graphics for the deleted Money Bin Account 26 may be exported from the Never Red Register 10 for the user to review and keep.

While the deletion of a Money Bin Account 26 may be infrequent because the Money Bin Account 26 is the user's actual bank account, the deletion of a Drawer Account 282 from a Money Bin Account 26 may occur more often as the user obtains their financial objective or decides on a new financial objective. The Remove Drawer Account 262 option may be selected from the Account Settings 250 menu and the user may enter or select a Money Bin Account 26 and the associated Drawer Account 282 which is displayed with its Actual Balance 32. In this example, as shown in FIG. 27, the My Savings Money Bin Account 270 is selected and the associated New Car Drawer Account 292 is selected as the Drawer Account 282 that will be removed. The user may delete the Drawer Account 282 by selecting the Delete Drawer 302 option which displays a Drawer Deletion 304 confirmation dialog box with the option to either select the Delete Drawer 306 key or the Cancel 300 key. The Drawer Deletion 304 confirmation dialog box also provides a prompt notifying the user that if there is a remaining balance within the Drawer Account 282 that remaining balance will be transferred to Money Bin Account 26 associated with the Drawer Account 282. If the user selects to Delete Drawer 306, the Drawer Account 282 is removed from the Balance 98 screen and Granite Sum 76 screen, but the financial history of all transactions within the account are secured and remain on the statements for the Never Red Register 10. Alternatively, a Drawer Account 282 may be associated with a different Money Bin Account 26 if there are sufficient assets in the Money Bin Account 26 equal to the balance of the Drawer Account 282 to designate those assets to the Drawer Account 282.

Figure 28:
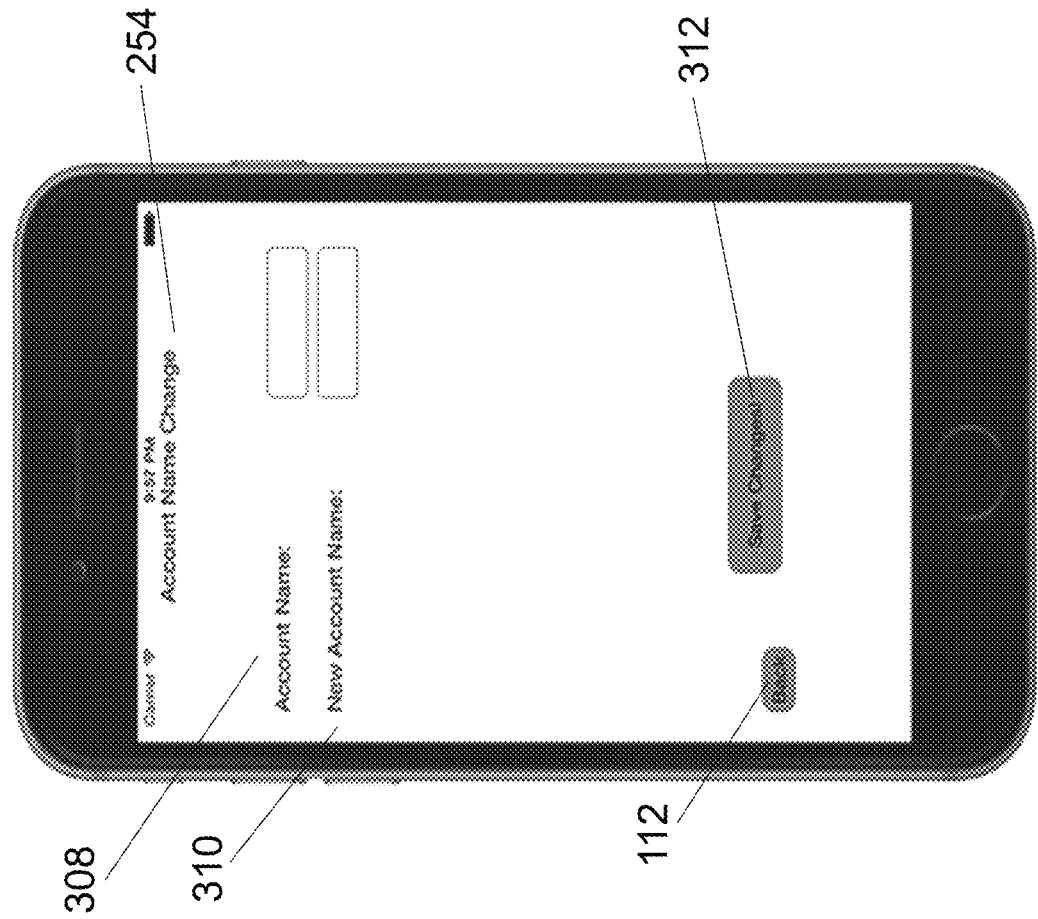
FIG. 28 is an embodiment of an account name change screen in an embodiment of the Never Red Register of the present invention.

While a user may delete a Money Bin Account 26 or a Drawer Account 282 or associate the Drawer Account 282 with a different Money Bin Account 26, for example if the user moves their actual account to a new financial institution, the user may particularly if the user changed their mind about a financial objective, and there are funds in the Drawer Account 282, instead change only the name of the account by selecting the Account Name Change 254 option from the Account Settings 250 menu. As shown in FIG. 28, the Account Name Change 254 screen provides for the user to enter or select an Account Name 308 and enter a New Account Name 310 and select the Save Changes 312 option to change the name of either a Money Bin Account 26 or a Drawer Account 282.

In addition to setting up or changing the name of a Drawer Account 282, the user may choose to set parameters to have sufficient funds allocated within a set period of time to achieve a financial objective by a specific date such as for a wedding, vacation or other event. As shown in FIG. 29A, by selecting the Goal Settings 264 option from the Account Settings 250 menu, the user is provided with prompts to designate the purpose of the name of the Goal Account 314 which may provide the purpose of the goal, a Goal Target 316, the amount of funds needed, a Date Desired 318 for completion of the goal, for example, the day of the event, and an Initial Balance 320 for the user to set aside initial funds to start saving towards the goal.

A Money Bin Account Name 280 prompt is provided for the user to select the Money Bin Account 26 associated with the Goal Account 314 and a Transaction Setting 323 provides for the user to select to have the Goal Account 314 associated with the Silver Savings Account 220 or the Say Go Green Account 86. As noted above, if the Say Go Green Account 86 is selected, an allocation will be made to the Goal Account 314 on every transaction that is performed in the associated Money Bin Account 26. Alternatively, if the Silver Savings Account 220 is selected an allocation to the Goal Account 314 will be made only when the specific transaction set in the account settings for Silver Savings Account 220 is performed in the associated Money Bin Account 26.

The Never Red Register 10 determines the Goal Remainder 324 by subtracting the Initial Balance 320 from the Goal Target 316. The Never Red Register 10 also provides an Allocation Breakdown 326 for the user to see how much of an allocation is needed if a repeated amount of funds is allocated on a Daily 328, Weekly 330, Monthly 332, or Yearly 334 basis. In embodiments of the Never Red Register 10, the Allocation Breakdown 326 is determined by dividing the Goal Remainder 324 by the total amount of time to the Date Desired 318. In some embodiments, a Goal Notifications 338 option is provided that may be turned "On" or "Off" to have the Days Remaining 342 be displayed in periodic notifications within the Never Red Register 10. By selecting the Save! 336 option the Money Bin Account 26 associated with the Goal Account 314 is configured to begin allocating funds to the Goal Account 314 based on the transactional settings within the selected Money Bin Account 26. If the user decides not to initiate the Goal Account 314, the Back 112 button is selected to display the Account Settings 250 menu.

As shown in the example in FIG. 29B, a Vacation Goal Account 315 is setup by entering the name "Vacation" for the Goal Account 314. A Goal Target 316 of $3250 and a Date Desired 318 of Sep. 14, 2017 are entered. From an Initial Balance 320 of $100 the Never Red Register 10 software application 17 provides instructions to determines the Goal Remainder 324 as $3150 equal to the Goal Target 316 of $3250 minus the Initial Balance 320 of $100. The Never Red Register 10 populates the Days Remaining 342 by determining in this example that the Date Desired is 150 days away from the current date. The Allocation Breakdown 326 for a Daily Allocation 328 is determined by the Never Red Register 10 as the Goal Remainder 324 divided by the remaining days to the Date Desired 318 which in this example is a Daily Allocation 328 of $21 equal to the Goal Remainder 324 of $3150 divided by the remaining 150 days. A Weekly Allocation 330 of $147 is determined by the Never Red Register 10 by multiplying the Daily Allocation 328 of $21 by seven for the seven days in a week. A Monthly Allocation 332 of $630 is determined by multiplying the Daily Allocation 328 by thirty based on the most common total number of days in a month. A Yearly Allocation 334 may be determined by multiplying the Daily Allocation 328 by three hundred and sixty-five the total number of days in a year to provide the user with an estimate of what they must save to achieve their goal by the Date Desired 318. However, in this example, because it is less than a year to the Date the Yearly Allocation 334 may remain empty or not be displayed. If it is less than a month to the due date of the goal, the Monthly Allocation 332 will remain empty or not be displayed, and if it is less than a week to the Date Desired 318 the Weekly Allocation 330 may remain empty or not be displayed. Other methods to determine the Allocation Breakdown 326 from the Date Desired 318 for the allocation of funds are within the scope of the present invention.

Figure 29D:
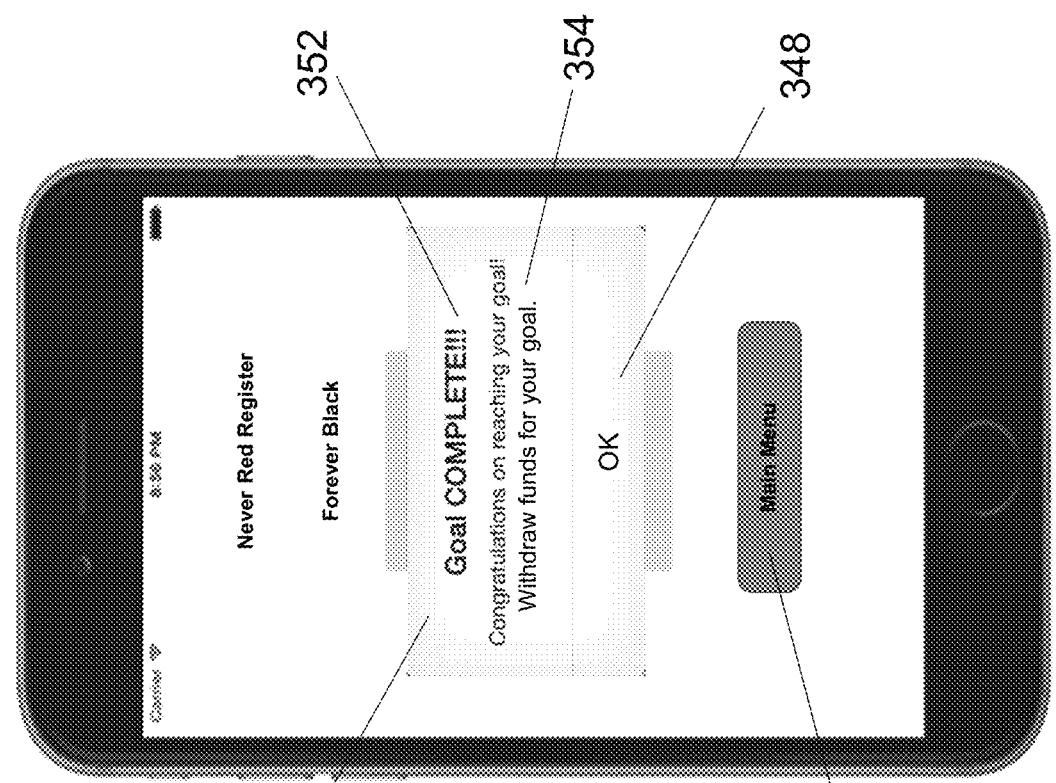
FIG. 29D is an embodiment of a goal completion notification in an embodiment of the Never Red Register of the present invention.
Figure 29C:
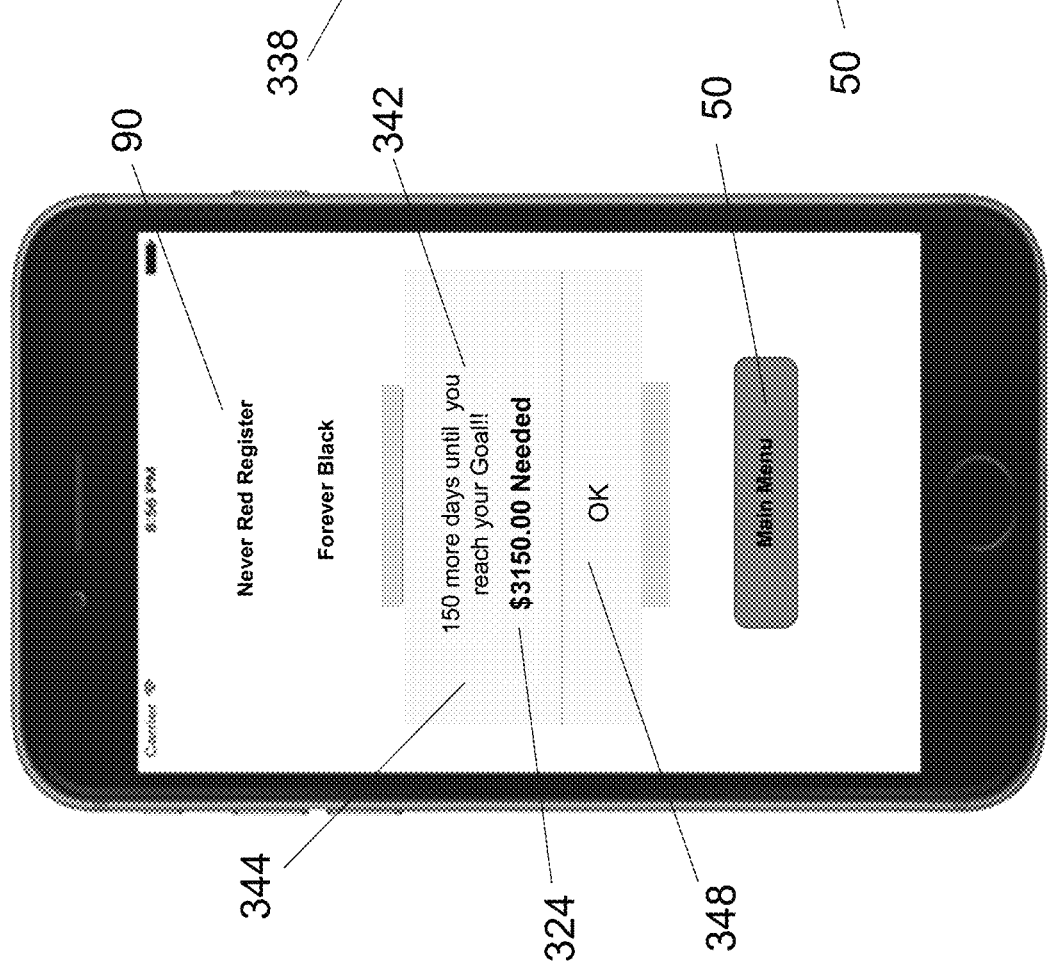
FIG. 29C is an embodiment of a goal status notification in an embodiment of the Never Red Register of the present invention.

As shown in FIG. 29C, if the Goal Notification 338 option is "On", a Goal Status 344 notification is provided with the Days Remaining 342 and the Goal Remainder 324 to display the funds that are needed to reach the Goal Target 316. The Goal Status 344 may be displayed on each transaction that allocates funds to the Goal Account 314 with a Close 348 option to exit. The Goal Status 344 notification may be displayed in the Quick Check 90 display which may be continually displayed or may be set as the default display when the Never Red Register 10 is opened. In addition to the Goal Status 344, the user may access the Goal Settings 264 display to review their Goal Remainder 324 and the Allocation Breakdown 326 of daily, weekly, monthly and yearly amounts needed to be allocated to achieve their goal. The Goal Settings 264 also provide for a user to change and update the settings of their goal or select the Delete Goal 350 option to remove the Goal Account 314. By selecting Delete Goal 350, the user is provided with a notification that the current Goal Remainder 324 will be transferred to the Forever Black Account 88 associated with the Money Bin Account 26 associated with the Goal Account 314 which initiates the Say Go Green Function 84 to transfer a portion of the Goal Remainder 324 to the Say Go Green Account 86.

The Goal Notification 338 may also provide a Goal Complete 352 notification when the Goal Target 316 is reached, as shown in FIG. 29D. Preferably, the Goal Complete 352 notification may include a fanfare of sounds and colorful graphics to demonstrate to the user their success in achieving their goal. In some embodiments of the Never Red Register 10, there is no automated link to the user's actual bank account, and therefore when a goal is reached the user must access their actual bank account to transfer or withdraw funds in the amount of the Goal Target 316. If the user has adhered to limiting their spending to the Say Go Green Account 86 and have entered all transactions including deposits, withdrawals and transfers into the Never Red Register 10, there should be available funds within the user's actual bank account for the user's desired goal and the Goal Complete 352 notification provides a Withdrawal Instruction 354 for the user to remove these funds from the Money Bin Account 26 associated with the goal.

Any number of Goal Accounts 314 or Drawer Accounts 282 may be configured to be associated with a Money Bin Account 26 with a Goal Account 314 having a specific Goal Target 316 and a Date Desired 318 and either a Goal Account 314 or a Drawer Account 282 providing for the allocation of assets for a specific expense or financial objective. As shown in FIG. 30A, the Vacation Goal Account 315 and a Concert Drawer Account 362 are associated with the Checkbook Money Bin Account 78. The New Car Account 292 is associated with the My Savings Account 270 which also has a Silver Savings Account 220. A College Jane Drawer Account 372 is associated with the Silver Savings Account 220 of the My Savings Account 270. The funds allocated to each of the Say Go Green Accounts 86, the Silver Savings Accounts 220, the Drawer Accounts 282 and the Goal Accounts 314 are determined by the Savings Settings 266, as shown in FIG. 30B. If a Goal Account 314 or a Drawer Account 282 is setup to be associated with the Say Go Green Account 86 designated with the initials SGG within the Savings Settings 266, a portion of the Say Go Green Total Allocation 87 is allocated to that Goal Account 314 and/or Drawer Account 282 on every transaction within the Money Bin Account 26. If a Drawer Account 282 or a Goal Account 314 is associated with a Silver Savings Account 220 an allocation is made only when the specific Transaction Type 224 as shown in the Savings Settings 266 is performed in the associated Money Bin Account 26.

The Savings Settings 266, as shown in FIG. 30B, provide for setting up or editing the amount to be allocated for each account by selecting the Percent or Exact Amount 48 toggle button. In this example, the Say Go Green Transactional Allocation 46 in the Checkbook Money Bin Account 78 is set to an exact amount of $1.00, the Vacation Goal Account 315 has a Goal Allocation 366 of an exact amount of $0.25 and the Concert Drawer Account 362 has a Drawer Allocation 293 as a percentage setting of 10%. In some embodiments for a Goal Account 314, the Never Red Register 10 automatically adjusts the Goal Allocation 366 based on the Goal Remainder 324, the Days Remaining 342 and an estimation of the number of transactions that will be performed within the Money Bin Account 26 prior to the Date Desired 318. The Goal Allocation 366 may be adjusted by the user within the Savings Settings 266.

When a transaction of a deposit, withdrawal, or transfer occurs in the Checkbook Money Bin Account 78, the Never Red Register 10 implements the Say Go Green Function 84 which invokes the Currency Interval Function 83 to determine a Currency Interval Allocation 85. The Currency Interval Allocation 85 is combined with the Say Go Green Transactional Allocation 46 to determine a Say Go Green Total Allocation 87. The Say Go Green Total Allocation 87 is withdrawn from the Forever Black Account 88 balance of the Checkbook Money Bin Account 78. The Say Go Green Function 84 then invokes a Goal Allocation Function 365 to determine and withdraw one or more Goal Allocations 366 from the Say Go Green Total Allocation 87 depending upon how many Goal Accounts 314 are associated with the Say Go Green Account 86. The Say Go Green Function 84 then invokes the Drawer Allocation Function 291 to withdraw one or more Drawer Allocations 293 depending upon how many Drawer Accounts 282 are associated with the Say Go Green Account 86. A Say Go Green Allocation Remainder 89 is determined as the total of all Goal Allocations 366 and Drawer Allocations 293 withdrawn from the Say Go Green Total Allocation 87.

Figure 30C:
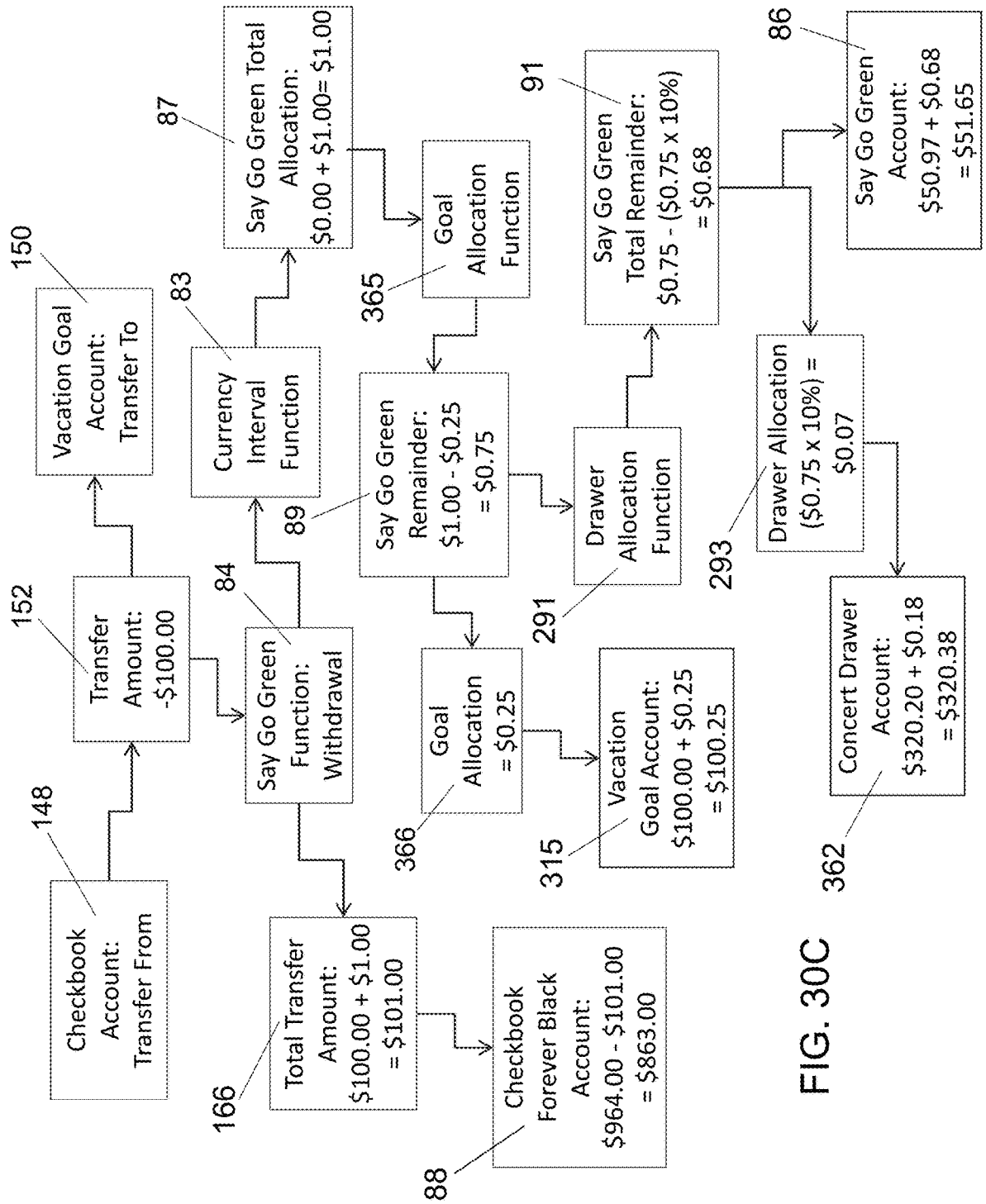
FIG. 30C is an embodiment of a flowchart showing the allocation steps for a transfer transaction from an account to a goal account, a spendable account and a drawer account that are all associated with the account in an embodiment of the Never Red Register of the present invention.

In an example as shown in the flow chart in FIG. 30C, when the Vacation Goal Account 315 is setup with an Initial Balance 320 of $100.00, a transfer transaction is performed in the Checkbook Money Bin Account 78. For the Transfer Amount 152 of $100.00, the Never Red Register 10 provides instructions for the computational circuitry of the digital device to automatically implement the Say Go Green Function 84 for a withdrawal. The Say Go Green Function 84 invokes the Currency Interval Function 83 to determine the Currency Interval Allocation 85 which in this example is $0.00, so the Say Go Green Total Allocation 87 is equal the Say Go Green Allocation 46 amount of $1.00. The Say Go Green Total Allocation 87 of $1.00 is combined with the Transfer Amount 152 of $100 for a Total Transfer Amount 166 of $101.00 that is withdrawn from the Checkbook Forever Black Account 88. The Say Go Green Function 84 invokes the Goal Allocation Function 365 to determine the Goal Allocation 366 which in this example is an exact amount of $0.25. The Goal Allocation Function 365 withdraws the Goal Allocation 366 from the Say Go Green Total Allocation 87 of $1.00 leaving a Say Go Green Allocation Remainder 89 of $0.75. The Goal Allocation of $0.25 is deposited with the Transfer Amount 152 of $100.00 in the Vacation Goal Account 315. The Say Go Green Function 84 invokes the Drawer Allocation Function 291 which determines and withdraws the Drawer Allocation 293 of 10% from the Say Go Green Allocation Remainder 89 of $0.75 leaving a Say Go Green Total Remainder 91 of $0.68 after invoking the Currency Interval Function 83 to round-down the Drawer Allocation 293 and round-up the Say Go Green Total Remainder 91 each to the lowest denomination of currency. The Drawer Allocation 293 of $0.07 is deposited in the Concert Drawer Account 362 and the Say Go Green Total Remainder 91 of $0.68 is deposited in the Say Go Green Account 86. The Checkbook Forever Black Account 88 balance in this example is $863.00, the balance in the Vacation Goal Account 315 is $100.25, the balance in the Concert Drawer Account 362 is $320.38, and the balance of the Say Go Green Account 86 is $51.65.

In some embodiments, a notification is provided if when setting up the Savings Settings 266, the Goal Allocation 366 to any Goal Accounts 314 and the Drawer Allocation 293 to any Drawer Accounts 282 exceeds the Say Go Green Transactional Allocation 46 to prevent the non-allocation of funds. The notification provides for the user an option to reset the Savings Settings 266 for that particular Money Bin Account 26. In other embodiments, if a Goal Allocation 366 or Drawer Allocation 293 is determined to exceed the Say Go Green Total Allocation 87 or the Say Go Green Allocation Remainder 89, the Goal Allocation Function 365 or Drawer Allocation Function 291 may invoke a division application to split all or any portion of one half of the Say Go Green Allocation 46 among one or more Goal Accounts 314 or Drawer Accounts 282. The remaining half portion is deposited in the Say Go Green Account 86 as spendable assets to always "Pay Yourself First."

For longer range financial objectives or planned expenses like retirement, a new car or a child's college fund, a Goal Account 314 or a Drawer Account 282 may be associated with a Silver Savings Account 220 with the option to set an allocation parameter that adds funds to the Silver Savings Account 220 and to each Goal Account 314 or Drawer Account 282 associated with the Silver Savings Account 220 only when a single type of transaction occurs therefore the allocation is made only when a deposit, a withdrawal or a transfer is made. The user may choose in the Savings Settings 266 which type of transaction and an exact amount or percentage of the transaction to be allocated to the Goal Account 314 or the Drawer Account 282. As shown in FIG. 30A, a Silver Savings Account 220 is associated with the Checkbook Money Bin Account 78. Silver Savings Retirement Allocation 226 is set as a percentage of 10% of the transaction amount and the Transaction Type 224 is a deposit, as shown in FIG. 30B.

A Money Bin Account 270 may have Goal Accounts 314 and Drawer Accounts 282 associated with its Say Go Green Account 86, its Silver Savings Account 220, or with other Drawer Accounts 282. A Drawer Account 282 may be setup for longer range expenses or other financial objectives and a Goal Account 314 may be setup with a specific date and amount to reach a financial goal. As a default for example, the Never Red Register 10 provides instructions to the computational circuitry 3 to associate a Drawer Account 282 or a Goal Account 314 with a Silver Savings Account 220 if the Say Go Green Option 286 is not selected when setting up the Drawer Account 282 or the Goal Account 314. As shown in FIG. 30A, the My Savings Account 270 has a New Car Drawer Account 292 associated with a My Savings Say Go Green Account 86 and a College Jane Drawer Account 372 associated with a My Savings Silver Savings Account 220. Whenever any type of transaction occurs such as a withdrawal, a deposit or a transfer of funds in the My Savings Account 270, assets are allocated to the Say Go Green Account 86 and the New Car Drawer Account 292. When a deposit transaction occurs, in the My Savings Account 270, a portion of that deposit is allocated to the Say Go Green Account 86 and the associated New Car Account 292 as well as to the Silver Savings Account 220 and the College Jane Drawer Account 372 that is associated with the Silver Savings Account 220.

For example, if in the My Savings Account 270, a deposit transaction is entered or is automatically transacted using the Calendar Option 252 of the Never Red Register 10, the Never Red Register 10 provides instructions for the computational circuitry 3 of the digital device to automatically implement the Silver Savings Function 234. If as in this example the Silver Savings Retirement Allocation 226 is set to a percentage, the Deposit Amount 130 is multiplied by the Silver Savings Retirement Allocation 226 and rounded-up to the lowest denomination of currency by invoking the Currency Interval Function 83 to determine the Adjusted Silver Savings Allocation 236. The Adjusted Silver Savings Allocation 236 is withdrawn from the Deposit Amount 130 to determine a Silver Savings Deposit Remainder 238. The Never Red Register 10 invokes the Drawer Allocation Function 291 to determine the Drawer Allocation 293 for in this example the College Jane Drawer Account 372 associated with the Silver Savings Account 220. The Drawer Allocation 293 is withdrawn from the Adjusted Silver Savings Allocation 236 and deposited into the College Jane Drawer Account 372 leaving the Silver Savings Allocation Remainder 376 that is deposited in the Silver Savings Account 220. The Never Red Register 10 provides instructions to implement the Say Go Green Function 84 that invokes the Currency Interval Function 83 to round-down the Silver Savings Deposit Remainder 238 to the interval of currency to determine the Currency Interval Allocation 85 that is combined with the Say Go Green Transactional Allocation 46 to determine the Say Go Green Total Allocation 87. The Say Go Green Total Allocation 87 is withdrawn from the Silver Savings Deposit Remainder 238. The Never Red Register 10 invokes the Drawer Allocation Function 291 to determine the Drawer Allocation 293 for in this example the New Car Drawer Account 292 associated with the Say Go Green Account 86. The Drawer Allocation 293 is withdrawn from Say Go Green Total Allocation 87 and deposited in the New Car Drawer Account 292 leaving the Say Go Green Allocation Remainder 89 that is deposited in the Say Go Green Account 86.

Figure 30D:
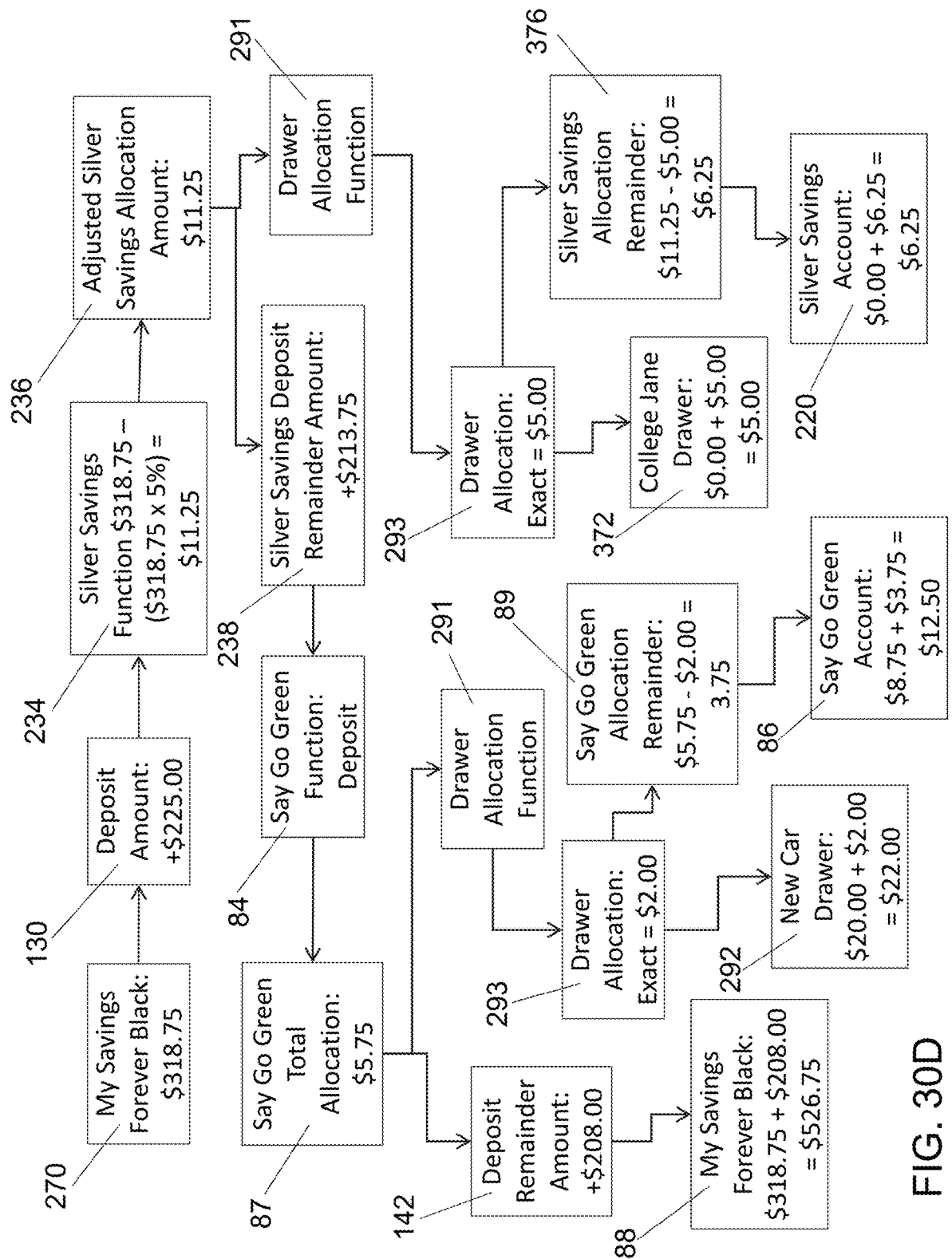
FIG. 30D is an embodiment of a flowchart showing the allocation steps for a deposit transaction to an account that has a retirement account with a drawer account associated with the retirement account and that has a spendable account with a drawer account associated with the spendable account in an embodiment of the Never Red Register of the present invention.

In this example as shown in FIG. 30D, for a Deposit Amount 130 of $225.00 in the My Savings Account 270, the Never Red Register 10 provides instructions to implement the Silver Savings Function 234 to determine a Silver Savings Retirement Allocation 226 of $11.25. The Currency Interval Function 83 determines that the Silver Savings Retirement Allocation 226 is at the lowest denomination of currency so the Adjusted Silver Savings Retirement Allocation 236 is equal to the Silver Savings Retirement Allocation 226. The Adjusted Silver Savings Retirement Allocation 236 of $11.25 is withdrawn from the Deposit Amount 130 leaving the Silver Savings Deposit Remainder 238 of $213.75. The Never Red Register 10 invokes the Drawer Allocation Function 291 to determine the Drawer Allocation 293 for the College Jane Drawer Account 372 associated with the Silver Savings Account 220 which in this example is the exact amount of $5.00. The Drawer Allocation 293 of $5.00 is withdrawn from the Adjusted Silver Savings Allocation 236 and deposited into the College Jane Drawer Account 372 leaving the Silver Savings Allocation Remainder 376 of $6.25 that is deposited in the Silver Savings Account 220. In this example, the College Jane Drawer Account 372 has a balance of $5.00 and the Silver Savings Account 220 has a balance of $6.25.

The Never Red Register 10 provides instructions to implement the Say Go Green Function 84 that invokes the Currency Interval Function 83 to round-down the Silver Savings Deposit Remainder 238 of $213.75 to the interval of currency to determine the Currency Interval Allocation 85 of $0.75 that is combined with the Say Go Green Transactional Allocation 46 of $5.00 to determine the Say Go Green Total Allocation 87 of $5.75. The Currency Interval Function 83 and Currency Interval Allocation 85 are not shown for clarity. The Say Go Green Total Allocation 87 is withdrawn from the Silver Savings Deposit Remainder 238 leaving the Deposit Remainder 142 of $208.00 that is deposited into the My Savings Forever Black Account 88. The Never Red Register 10 invokes the Drawer Allocation Function 291 to determine the Drawer Allocation 293 for the New Car Drawer Account 292 associated with the Say Go Green Account 86 which in this example an exact amount of $2.00. The Drawer Allocation 293 of $2.00 is withdrawn from Say Go Green Total Allocation 87 and deposited in the New Car Drawer Account 292 leaving the Say Go Green Allocation Remainder 89 of $3.75 that is deposited in the Say Go Green Account 86. The Forever Black Account 88 balance is $526.75, the Say Go Green Account 86 balance is $12.50 and the New Car Drawer Account 292 balance is $22.00.

While one or more Goal Accounts 314 or Drawer Accounts 282 may be associated with a Say Go Green Account 86 or a Silver Savings Account 220, the total allocation either as a percentage or as an exact amount cannot total more than a combined total percentage of 100% of the balance of the Say Go Green Total Allocation 87 associated with the transaction. If a user enters Savings Settings 266 that exceed 100%, a warning message will be displayed instructing the user to make changes to the allocations in the Savings Settings 266 to make them less than 100%. Similarly, an exact amount that is greater than the Say Go Green Transactional Allocation 46 cannot be entered for a Goal Account 314 or Drawer Account 282 that is associated with a Say Go Green Account 86 and a warning message will be displayed instructing the user to change the amount designated in the Savings Settings 266. In the event, a remainder from a transaction is less than an exact allocation amount for a Goal Account 314 or Drawer Account 282, a warning message will be displayed indicating that the user may choose to allocate the amount that is less than the exact amount to the Goal Account 314 or the Drawer Account 282 that has the exact amount allocation setting or to the Say Go Green Account 86 or to the Silver Savings Account 220. In some embodiments, a default setting may be selected to always allocate to a selected account in the event the transaction amount is less than an exact amount entered into the Savings Settings 266.

A Warning Message 378 may also be displayed if the Silver Savings Retirement Allocation 226 settings entered is greater than 10% to inform the user that a percentage of more than 10% will add up quickly. The Warning Message 378 will prompt the user to select either a Cancel Button 380 to cancel and change their entry or select an Ok Button 382 and confirm their choice of a higher percentage in the Savings Settings 266 as shown in FIG. 31A. A Percentage Alert may also be displayed periodically such as over a period of six months or when a Savings Settings 266 is changed to inform the user of suggested changes to optimize their savings. For example, a Silver Savings Percentage Alert 384 may be displayed to inform the user that a small increase in their percentage savings would provide for a better return over time in their Silver Savings Account 220 by changing their Silver Savings Retirement Allocation 226 setting from 10% to 11% which will be a minimum change in the total allocation amount but will impact and improve retirement funds overtime, as shown in FIG. 31B. A Change Percentage Option 386 to accept a change in the Silver Savings Retirement Allocation 226 setting, a Change to Different Amount Option 388, or a Do Not Change Option 390 may be provided in the Silver Savings Percentage Alert 384 for the user to choose to make a change to the Silver Savings Retirement Allocation 226 setting. If the option to change the Silver Savings Retirement Allocation 226 setting is selected the new setting will apply to the next indicated transaction within the Money Bin 26 that applies to the associated Silver Savings Account 220.

Any number of additional Goal Accounts 314 or Drawer Accounts 282 may be associated with a Silver Savings Account 220 within a Money Bin Account 26 and when entering the Savings Settings 266, a Silver Savings Alert Message 392 may be displayed explaining the order of allocation of funds, as shown in FIG. 31C. For example, the order may be based on the Goal Account 314 or Drawer Account 282 that has the highest exact amount which is withdrawn first from the allocation amount of the Silver Savings Account 220, then any smaller exact amount is withdrawn from the remainder of the allocation amount of the Silver Savings Account 220, and then any percentage is taken from the remainder of the allocation amount of the Silver Savings Account 220. The order of allocation may also be set by a user by designating an order of priority to determine which Goal Account 314 or Drawer Account 282 receives an allocation first and then the order of the allocation for any other Goal Account 314 or Drawer Account 282 with any remainder being allocated to the Silver Savings Account 220. The order of allocation may be shown within the Balance 98 display by listing the Goal Accounts 314 and Drawer Accounts 282 by their order of allocation.

Figure 32:
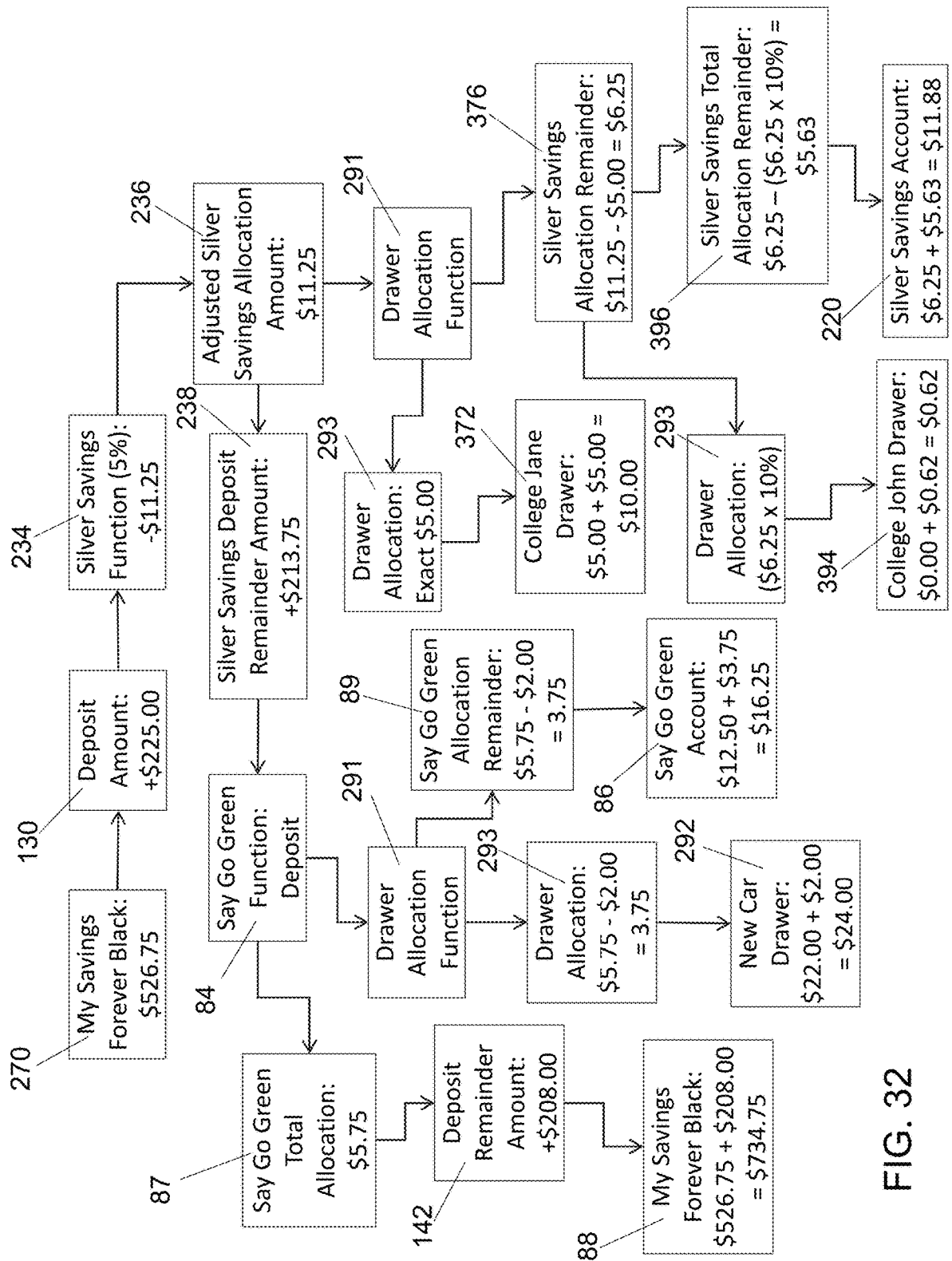
FIG. 32 is an embodiment of a flowchart showing the allocation steps for a deposit transaction to an account that has a retirement account with two drawer accounts associated with the retirement account and that has a spendable account with a drawer account associated with the spendable account in an embodiment of the Never Red Register of the present invention.

As shown in FIG. 31C, a second Drawer Account 282 may be associated with the Silver Savings Account 220 and be listed in the order of allocation as after the previously setup College Jane Drawer Account 372. An example of an allocation of funds to the second College John Drawer Account 394 is shown in FIG. 32. When a deposit occurs in the My Savings Account 270, the Silver Savings Function 234 determines a Silver Savings Retirement Allocation 226 that is withdrawn from the Deposit Amount 130 leaving the Silver Savings Deposit Remainder 238. In this example, from a Deposit Amount 130 of $225.00 the Silver Savings Retirement Allocation 226 of 5% is multiplied by the Deposit Amount 130 and the result as noted above is equal to the lowest denomination of currency, so the Adjusted Silver Savings Allocation 236 is $11.25. The Adjusted Silver Savings Allocation 236 is withdrawn from the Deposit Amount 130 leaving a Silver Savings Remainder 238 of $213.75. The Never Red Register 10 invokes the Drawer Allocation Function 291 to determine the Drawer Allocation 293 for the College Jane Drawer Account 372 and then for the College John Drawer Account 394 that are both associated with the Silver Savings Account 220. The Drawer Allocation 293 for the College Jane Drawer Account 372 in this example is an exact amount of $5.00 and the Drawer Allocation 293 for the College John Drawer Account is a percentage in the amount of 10%. In the order of allocations from the Savings Settings 266, the Drawer Allocation Function 291 first withdraws the Drawer Allocation 293 of $5.00 from the Adjusted Silver Savings Allocation 236 of $11.25 and deposits the $5.00 into the College Jane Drawer Account 372 leaving the Silver Savings Allocation Remainder 376 of $6.25. In this embodiment, the Drawer Allocation Function 291 then determines the Drawer Allocation 293 for the College John Drawer Account 394 in the amount of $0.62 by multiplying the Silver Savings Allocation Remainder 376 of $6.25 by 10% and by invoking the Currency Interval Function 83 to round-down the Drawer Allocation 293 and round-up the Silver Savings Allocation Total Remainder 376 to the lowest denomination of currency. The Drawer Allocation 293 for the College John Drawer Account 394 of $0.62 is withdrawn from the Silver Savings Allocation Remainder 376 and is deposited in the College John Drawer Account 394 leaving the Silver Savings Total Allocation Remainder 396 of $5.63 that is deposited in the Silver Savings Account 220. In this example after the deposit transaction, the College Jane Drawer Account 372 has a balance of $10.00, the College John Drawer Account 394 has a balance $0.62 and the Silver Savings Account 220 has a balance of $11.88.

The Never Red Register 10 provides instructions to implement the Say Go Green Function 84 that invokes the Currency Interval Function 83 to round-down the Silver Savings Deposit Remainder 238 of $213.75 to the interval of currency to determine the Currency Interval Allocation 85 of $0.75 that is combined with the Say Go Green Transactional Allocation 46 of $5.00 to determine the Say Go Green Total Allocation 87 of $5.75. The Currency Interval Function 83 and Currency Interval Allocation 85 are not shown for clarity. The Say Go Green Total Allocation 87 is withdrawn from the Silver Savings Deposit Remainder 238 leaving the Deposit Remainder 142 of $208.00 that is deposited in the My Savings Forever Black Account 88. The Never Red Register 10 invokes the Drawer Allocation Function 291 to determine the Drawer Allocation 293 for the New Car Drawer Account 292 associated with the Say Go Green Account 86 which in this example an exact amount of $2.00. The Drawer Allocation 293 of $2.00 is withdrawn from Say Go Green Total Allocation 87 and deposited in the New Car Drawer Account 292 leaving the Say Go Green Allocation Remainder 89 of $3.75 that is deposited in the Say Go Green Account 86. After the deposit transaction, the Forever Black Account 88 balance is $734.75, the Say Go Green Account 86 balance is $16.25 and the New Car Drawer Account 292 balance is $24.00.

By setting an allocation order, a user may choose to allocate to the most important Goal Accounts 314 and Drawer Accounts 282 first and prioritize their financial and savings goals. Importantly, the Never Red Register 10 is providing an easy method of designating assets to specific financial objectives, indicating the amount of assets that should be allocated and in this example how often these assets should be transferred between bank accounts within the user's financial institution or withdrawn when financial objectives and savings goals are reached. Importantly, in embodiments of the Never Red Register 10 the designations are only represented virtually with no actual transactions of assets. The Never Red Register 10 designates these virtual assets through the allocation to the Say Go Green Accounts 86, the Silver Savings Accounts 220, Goal Accounts 314, and Drawer Accounts 282. The user must review their actual balance in each of their bank accounts and move the appropriate funds to their checking, savings, retirement or other accounts as indicated by the Never Red Register 10 to achieve these financial objectives and goals. In some embodiments, the user may vigilantly check their bank account daily, but only need to transfer assets between their actual bank accounts when a transfer is indicated in the Never Red Register 10 between Money Bin Accounts 26. The user must then move the assets within their actual bank accounts to match the balances indicated by the Never Red Register. Preferably the Never Red Register 10 is used on a daily or weekly basis and by entering every transaction and spending only what is indicated in the Say Go Green Account 86, and by verifying the funds in their actual bank account the user will be able to reach their financial objectives.

Figures 33A, 33B:
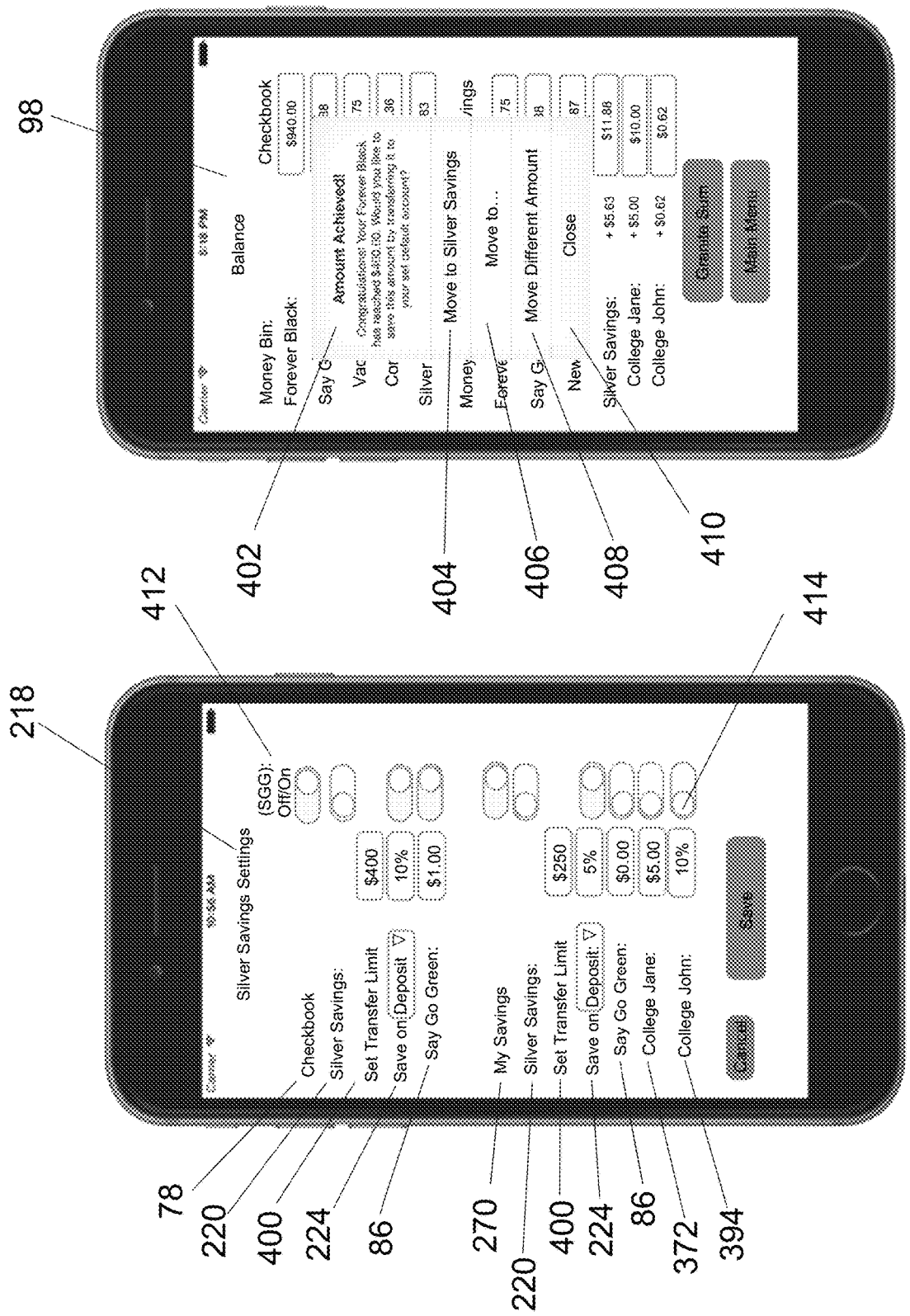
FIG. 33A is an embodiment of settings for a retirement account with example data in an embodiment of the Never Red Register of the present invention.
FIG. 33B is an embodiment of a transfer notification in an embodiment of the Never Red Register of the present invention.

The Never Red Register 10 also provides in the Silver Savings Settings 218 for the user to enter an amount in a Set Transfer Limit 400 option for each Money Bin Account 26 which in this example is $400 for the Checkbook Money Bin Account 78 and $250 or the My Savings Money Bin Account 270, as shown in FIG. 33A. When the Forever Black Account 88 balance in the Money Bin Account 26 meets, or exceeds the transfer limit an Amount Achieved Notification 402 is displayed as shown in FIG. 33B. The Amount Achieved Notification 402 prompts the user to make a choice to transfer funds within the Never Red Register 10 providing for the user to select a Move Funds to Silver Savings 404 option, transfer funds to another account with the Move To 406 option, transfer more than or less than the transfer limit by selecting the Move a Different Amount 408 option or take no action by selecting the Close 410 option. The Amount Achieved Notification 402 also reminds a user that they may also transfer funds in their actual bank account from for example a checking account to a savings account for their goals, savings and retirement.

Figures 34A, 34B:
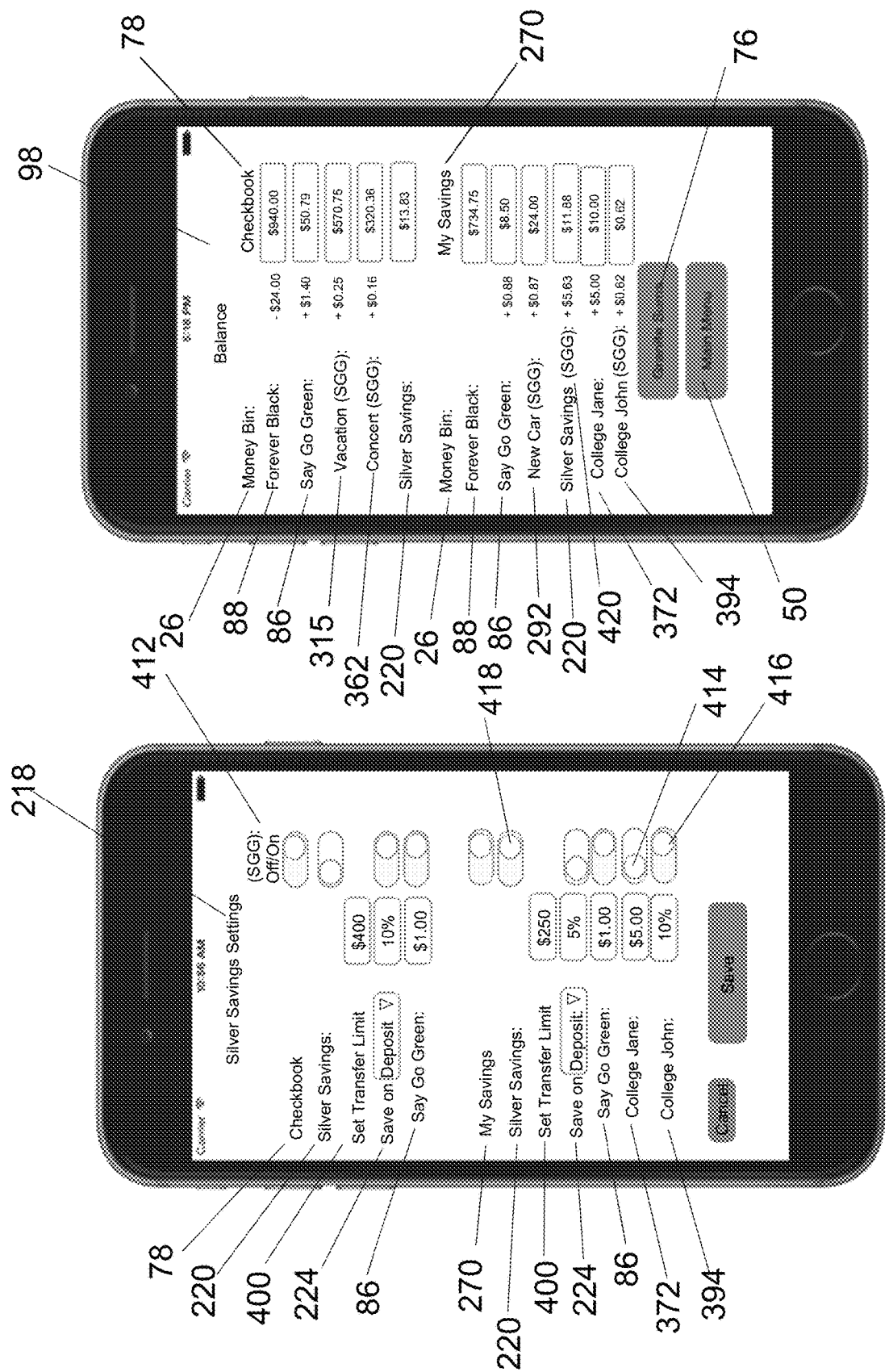
FIG. 34A is an embodiment of settings for a retirement account with example data in an embodiment of the Never Red Register of the present invention.
FIG. 34B is an embodiment of a display of a balance screen to review assets designated as available, spendable and as allocated to retirement accounts, drawer accounts, and goal accounts with the most recent transactions of the accounts in an embodiment of the Never Red Register of the present invention.
Figure 34C:
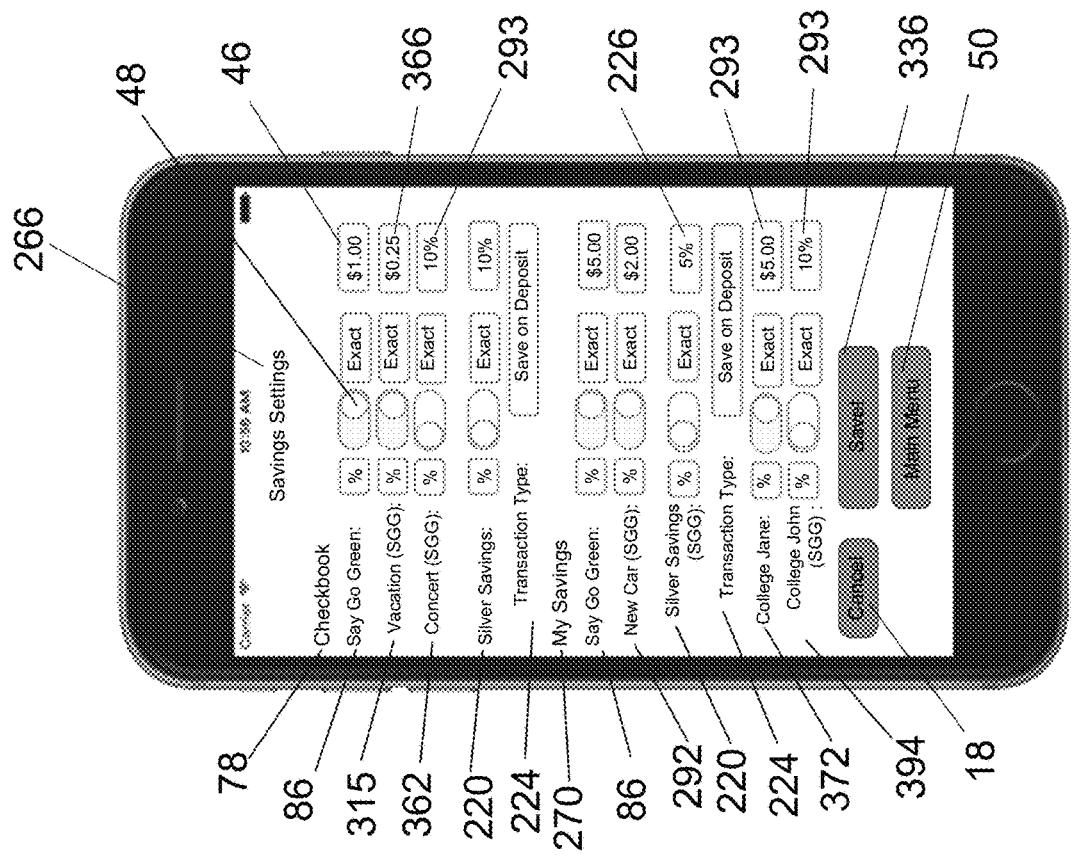
FIG. 34C is an embodiment of a savings settings screen with example data in an embodiment of the Never Red Register of the present invention.

In the Silver Savings Settings 218 in FIG. 33A, all Money Bin Accounts 26 that have Silver Savings Accounts 220 associated with them are shown with the Goal Accounts 314 and Drawer Accounts 282 that are associated with the Silver Savings Account 220. The Transaction Type 224 indicates when an allocation is made to the Silver Savings Account 220 and an option to change the Transaction Type 224 is provided as shown. A Selector Switch 412 provides for a user to select if the Silver Savings Account 220 and/or a Goal Account 314 or a Drawer Account 282 is only associated with a Silver Savings Account 220 by having the Selector Switch 412 set to an Off Position 414. In this example, the College John Account 394 is shown in an Off Position 416 in FIG. 33A meaning that the College John Account 394 is only associated with a Silver Savings Account 220 and receives an allocation only when the designated Transaction Type 224, a deposit, is made into the My Savings Account 270. Alternatively, if the Selector Switch 412 is set to an On Position 416 to associate the Silver Savings Account 220 with a Say Go Green Account 86, an allocation is made to the Say Go Green Account 86 from the Silver Savings Retirement Allocation 226 when the designated Transaction Type 224 is made into the My Savings Account 270. If the Selector Switch 412, is in the On Position 416 to associate a Goal Account 314 or a Drawer Account 282 associated with the Silver Savings Account 220 with a Say Go Green Account 86 a portion of the Say Go Green Allocation 86 will be made when the designated Transaction Type 224 is made into the My Savings Account 270. As shown in the example in FIG. 34A, the Silver Savings Account 220 and the College John Account 394 are associated with a Say Go Green Account 86 meaning when the Transaction Type 224, a deposit in this example, occurs a portion of the Silver Savings Retirement Allocation 226 is deposited in the Say Go Green Account 86 associated with the My Savings Account 270 and the Drawer Allocation Function 291 is invoked and a second Drawer Allocation 293 from the Say Go Green Total Allocation 87 is deposited in the College John Account 394. A Say Go Green Notation 420 is added to the College John Account 394 in the Balance 98 and is added to each Goal Account 314, Drawer Account 282 and Silver Savings Account 220 that is associated with a Say Go Green Account 86, as shown in FIG. 34B. The Say Go Green Notation 420 is also added to the Savings Settings 266 as shown in FIG. 34C to clearly designate that an account is associated with a Say Go Green Account 86.

Figure 35A:
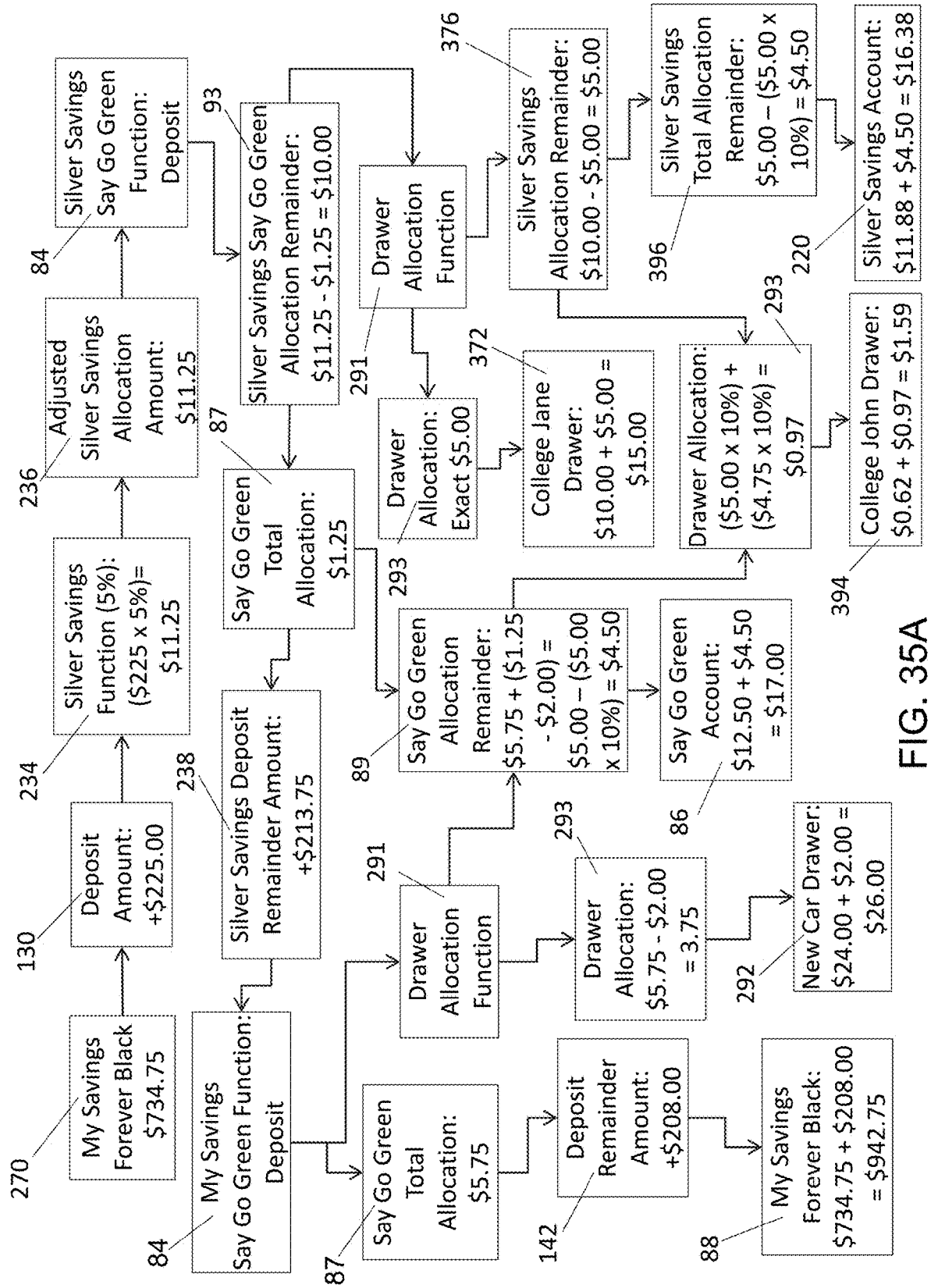
FIG. 35A is an embodiment of a flowchart showing the allocation steps for a deposit transaction to an account that has a retirement account with two drawer accounts associated with the retirement account, with one of the drawer accounts being associated with a spendable account and the spendable account has a different drawer account associated with the spendable account in an embodiment of the Never Red Register of the present invention.

As shown in FIG. 35A, in this example when a deposit occurs in the My Savings Account 270, the Silver Savings Function 234 determines a Silver Savings Retirement Allocation 226 that is withdrawn from the Deposit Amount 130 leaving the Silver Savings Deposit Remainder 238. In this example, from a Deposit Amount 130 of $225.00 the Silver Savings Retirement Allocation 226 of 5% is multiplied by the Deposit Amount 130 and the result as noted above is equal to the lowest denomination of currency, so the Adjusted Silver Savings Allocation 236 is $11.25. Because the Silver Savings Account 220 is associated with the My Savings Say Go Green Account 86, the Never Red Register 10 provides instructions to implement the Say Go Green Function 84 that invokes the Currency Interval Function 83 to round-down the Adjusted Silver Savings Allocation 236 is $11.25 to the interval of currency to determine the Currency Interval Allocation 85 of $0.25 that is combined with the Say Go Green Transactional Allocation 46 of $1.00 to determine the Say Go Green Total Allocation 87 of $1.25. The Currency Interval Function 83 and Currency Interval Allocation 85 is not shown for clarity. The Say Go Green Total Allocation 87 is withdrawn from the Silver Savings Allocation Amount of $11.25 leaving the Silver Savings Say Go Green Allocation Remainder 93. The Say Go Green Total Allocation 87 of $1.25 is deposited in the Say Go Green Account 86.

The Adjusted Silver Savings Allocation 236 which is the combined total of the Silver Savings Say Go Green Allocation Remainder 93 and the Say Go Green Total Allocation 87 is withdrawn from the Deposit Amount 130 leaving a Silver Savings Remainder 238 of $213.75. The Never Red Register 10 invokes the Drawer Allocation Function 291 to determine the Drawer Allocation 293 for the College Jane Drawer Account 372 and then for the College John Drawer Account 394 that are both associated with the Silver Savings Account 220 as noted above. The Drawer Allocation Function 291 withdraws the Drawer Allocation 293 for the College Jane Drawer Account 372 of $5.00 from the Silver Savings Say Go Green Allocation Remainder 93 of $10.00. The Drawer Allocation 293 of $5.00 is deposited into the College Jane Drawer Account 372 leaving the Silver Savings Allocation Remainder 376 of $5.00. The Drawer Allocation Function 291 then determines the Drawer Allocation 293 for the College John Drawer Account 394 in the amount of $0.50 by multiplying the Silver Savings Allocation Remainder 376 of $5.00 by 10% and by invoking the Currency Interval Function 83 to round-down the Drawer Allocation 293 and round-up the Silver Savings Allocation Total Remainder 396 to the lowest denomination of currency. The Drawer Allocation 293 for the College John Drawer Account 394 of $0.50 is withdrawn from the Silver Savings Allocation Remainder 376 and is deposited in the College John Drawer Account 394 leaving the Silver Savings Total Allocation Remainder 396 of $4.50 that is deposited in the Silver Savings Account 220.

The Never Red Register 10 provides instructions to implement the Say Go Green Function 84 that invokes the Currency Interval Function 83 to round-down the Silver Savings Deposit Remainder 238 of $213.75 to the interval of currency to determine the Currency Interval Allocation 85 of $0.75 that is combined with the Say Go Green Transactional Allocation 46 of $5.00 to determine the Say Go Green Total Allocation 87 of $5.75. The Currency Interval Function 83 and Currency Interval Allocation 85 is not shown for clarity. The Say Go Green Total Allocation 87 is withdrawn from the Silver Savings Deposit Remainder 238 leaving the Deposit Remainder 142 of $208.00 that is deposited in the My Savings Forever Black Account 88. The Never Red Register 10 invokes the Drawer Allocation Function 291 to determine the Drawer Allocation 293 of $2.00 for the New Car Drawer Account 292 associated with the Say Go Green Account 86. The Drawer Allocation 293 of $2.00 is withdrawn from Say Go Green Total Allocation 87 and deposited in the New Car Drawer Account 292 leaving the Say Go Green Allocation Remainder 89 of $3.75 that is combined with the Say Go Green Total Allocation 87 of $1.25 from the Silver Savings Account 220 for a total of $5.00.

Figure 35B:
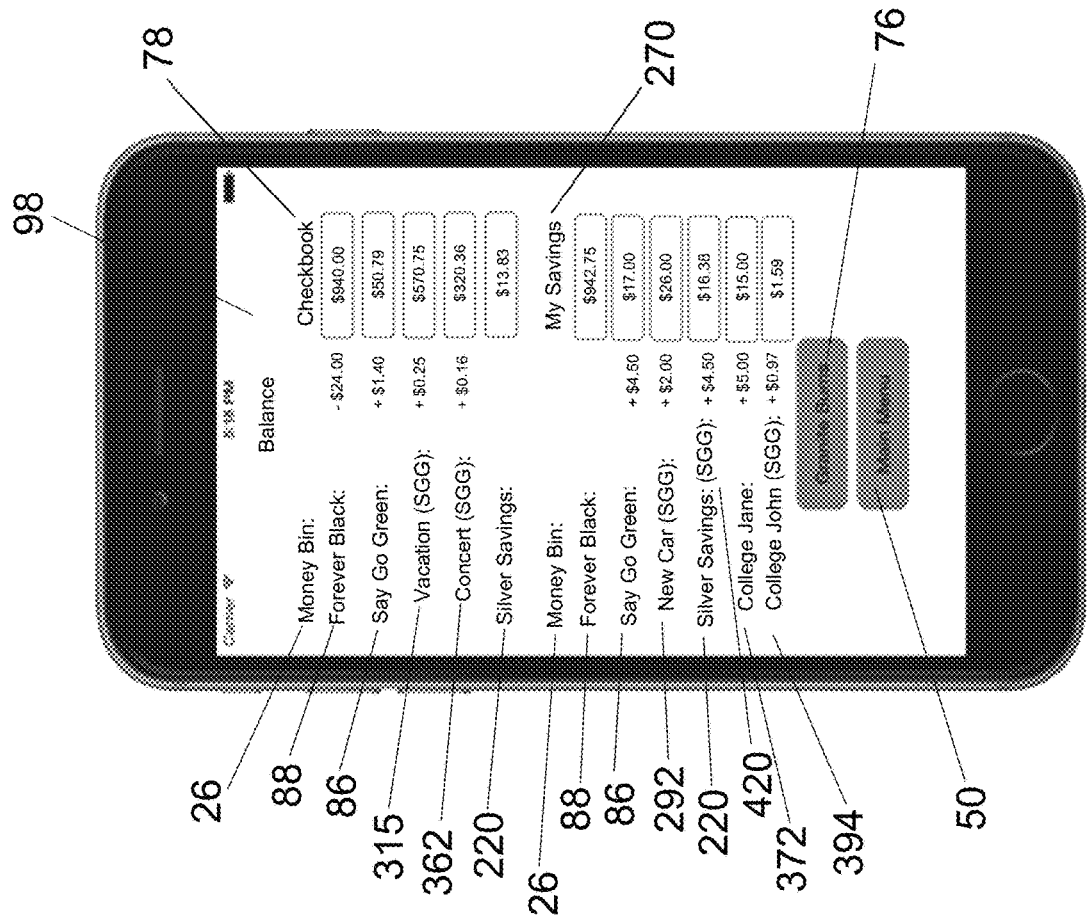
FIG. 35B is an embodiment of a display of a balance screen to review assets designated as available, spendable and as allocated to retirement accounts, drawer accounts, and goal accounts with the most recent transactions of the accounts in an embodiment of the Never Red Register of the present invention.

Because the College John Drawer 394 is also associated with the Say Go Green Account 86, the Never Red Register 10 invokes the Drawer Allocation Function 291 to determine the Drawer Allocation 293 for the College John Drawer 394 by multiplying the Say Go Green Allocation Remainder 89 of $5.00 by 10%. The Say Go Green Drawer Allocation 293 of $0.50 is withdrawn from the Say Go Green Allocation Remainder 89 and is combined with the Silver Savings Drawer Allocation 293 for a total of $0.97 that is deposited in the College John Drawer Account 394. The Say Go Green Allocation Remainder 89 of $4.50 is deposited in the Say Go Green Account 86. After the deposit transaction, the Forever Black Account 88 balance is $942.75, the Say Go Green Account 86 balance is $17.00 and the New Car Drawer Account 292 balance is $26.00 as shown in FIG. 35B. The balance of the College Jane Drawer Account 372 has a balance of $15.00, the College John Drawer Account 394 has a balance $1.59 and the Silver Savings Account 220 has a balance of $16.38.

Figures 37A, 37B:
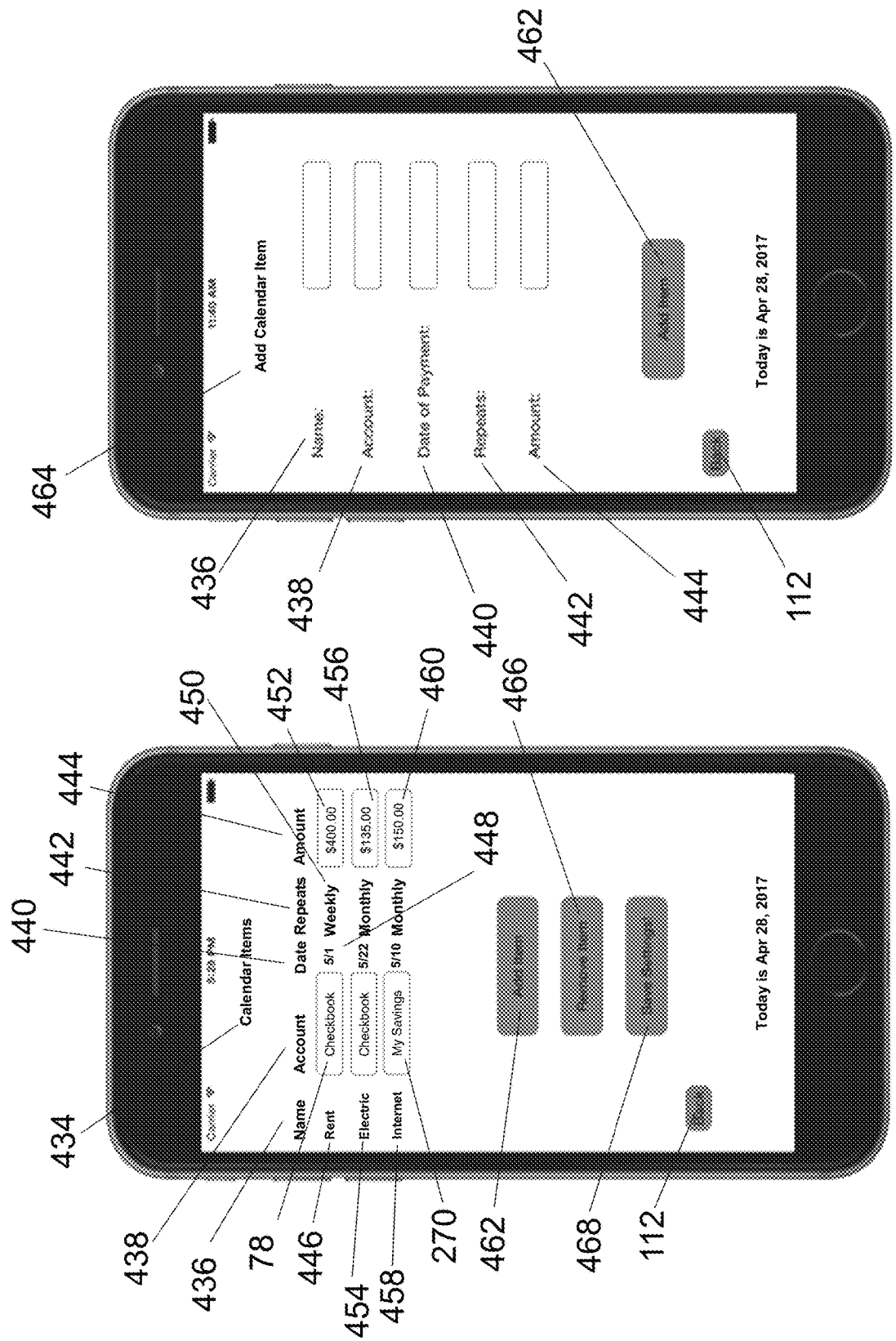
FIG. 37A is an embodiment of calendar item list screen with example data in an embodiment of the Never Red Register of the present invention.
FIG. 37B is an embodiment of an add calendar item screen in an embodiment of the Never Red Register of the present invention.

As shown in FIG. 36A, the menu of Account Settings 250 has a Calendar Option 252 to automatically enter repeated transactions such as rent or a mortgage payment, a utility payment, or credit card payment where a withdrawal from an account is transacted. Notifications are provided to indicate that a payment is due and confirm that there are adequate funds for the payment. The Calendar Option 252 may also automatically enter a repeated deposit such as a weekly, bi-monthly, or monthly pay check or automatically enter other repeated entries within a Money Bin Account 26. As shown in FIG. 36B, by selecting the Calendar Option 252 from Account Settings 250, options to View Calendar 430, and to Sync Calendar 432, access to the Main Menu 50 and an option to return to Account Settings 250. Selecting the View Calendar 430 option opens the display of Calendar Items 434 as shown in FIG. 37A that lists the Item Name 436, the Transaction Account 438 that the calendar item is withdrawn from or deposited to, a Transaction Due Date 440, the Transaction Time Interval 442 indicating how often the transaction repeats, and the Transaction Amount 444. The Transaction Account 438 may be a Money Bin Account 26, a Silver Savings Account 220, a Goal Account 314 or a Drawer Account 282. The Transaction Amount 444 as shown in FIG. 37B may be editable within the Calendar Item Display 434 to provide for entering a different amount and to select a different account as desired or if for example a selected account has insufficient funds. As shown in FIG. 37A, a Rent Calendar Item 446 withdrawn from the Checkbook Account 78, having a May $1^{st}$ Due Date 448, a Weekly Time Interval 450 for repeating the transaction, and a Transaction Amount 444 of $400 452 is shown. An Electric Payment 454 with an Amount 456 of $100 drawn from the Checkbook Account 78, and an Internet Payment 458 with an Amount 460 of $150 that uses the My Savings Account 270 are also shown. As many Calendar Items 434 as are necessary to include all of a user's monthly bills, credit card payments, paydays, and any other repeated transaction may be entered by selecting the option to Add Item 462 that opens the Add Calendar Item Display 464. As shown in FIG. 37B the display provides for a user to enter the Item Name 436, the Transaction Account 438, the Due Date 440, the Transaction Time Interval 442, and the Transaction Amount 444. Once the item information is entered, the Add Item button 462 may be selected to store the information within the display of Calendar Items 434. The Back Button 112 may be selected to return to the display of Calendar Items 434 without entering the new calendar item. A Calendar Item 434 may be deleted by selecting the option to Remove Item 466 or the Save Settings! Option 468 may be selected to save any changes that have been entered in the calendar items.

Figure 38B:
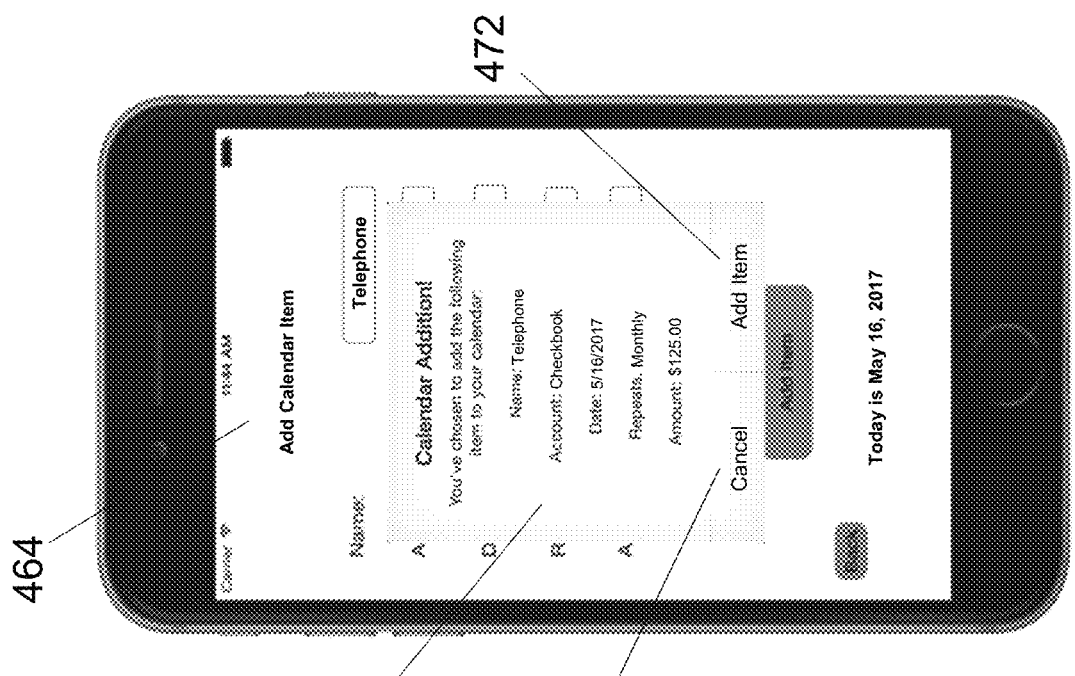
FIG. 38B is an embodiment of calendar item addition notification in an embodiment of the Never Red Register of the present invention.
Figure 38A:
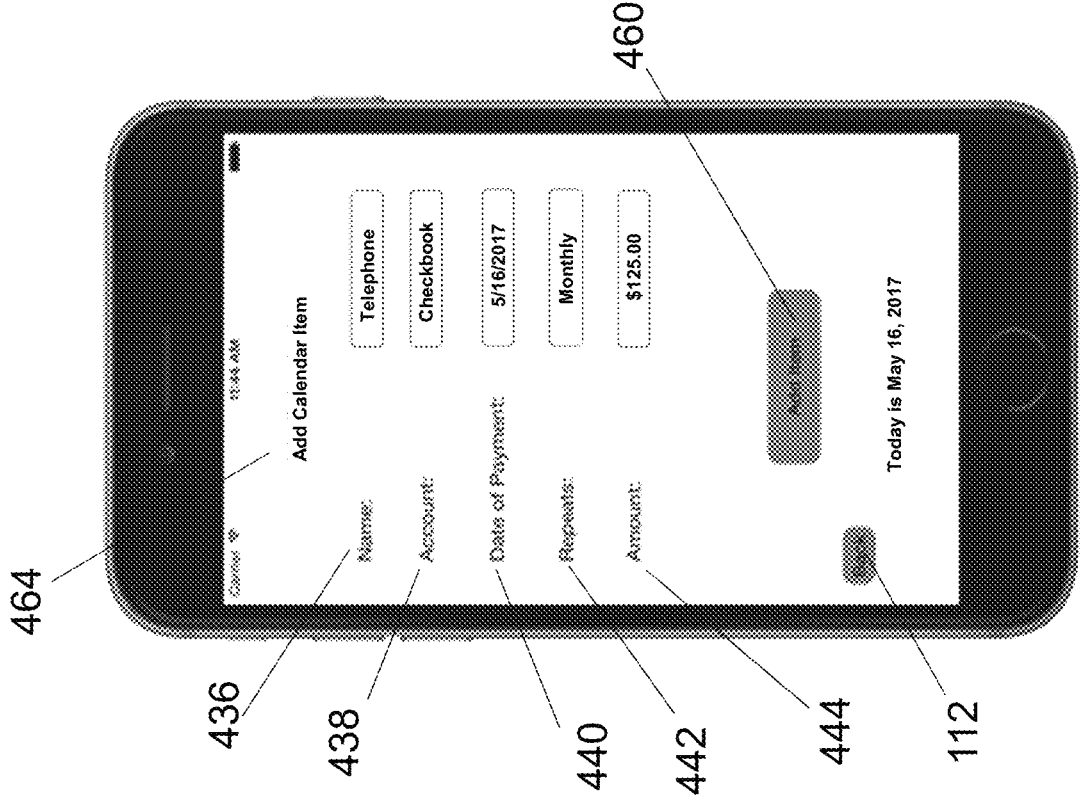
FIG. 38A is an embodiment of an add calendar item screen with example data in an embodiment of the Never Red Register of the present invention.
Figures 39A, 39B:
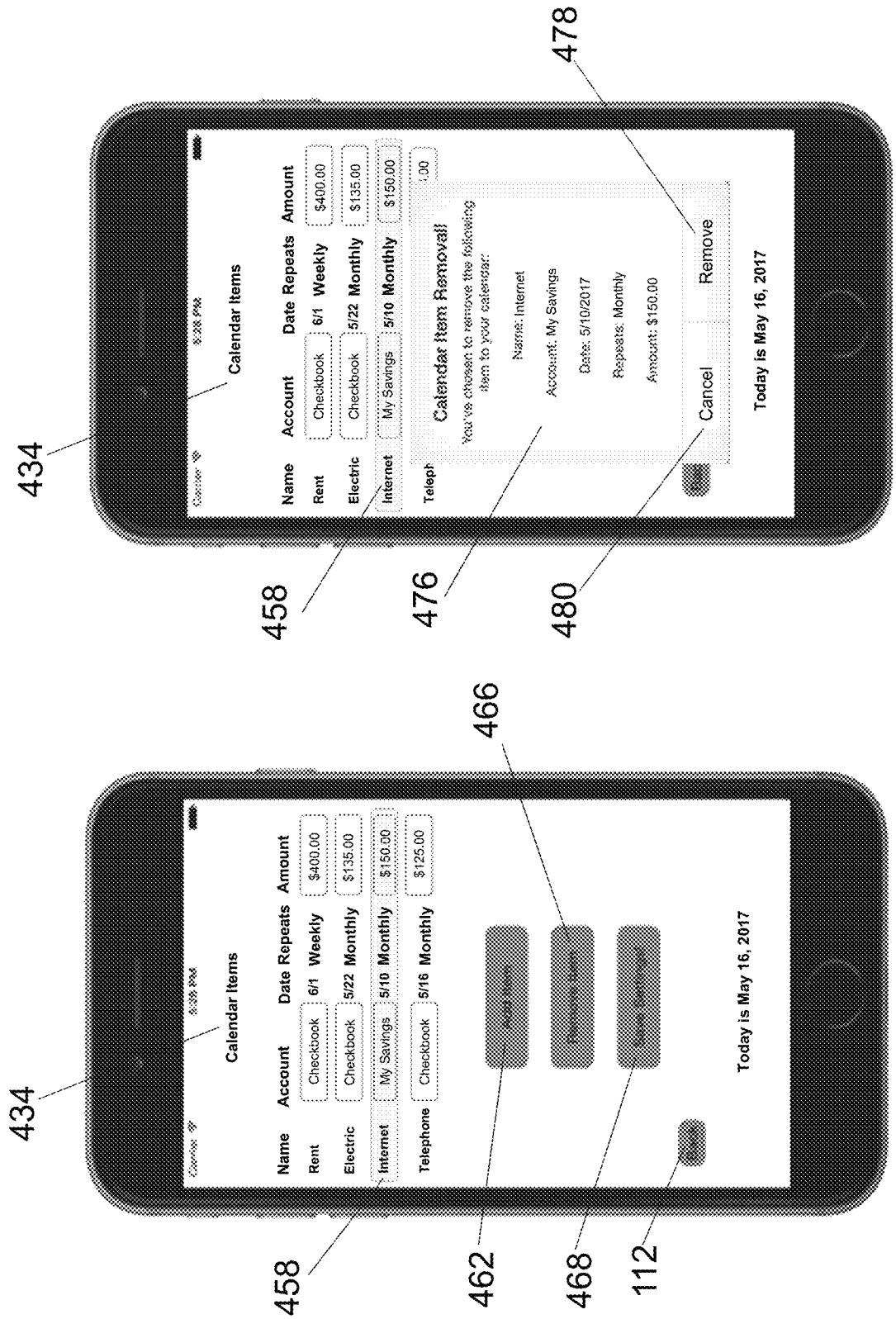
FIG. 39A is an embodiment of calendar item list screen with example data in an embodiment of the Never Red Register of the present invention.
FIG. 39B is an embodiment of calendar item removal notification in an embodiment of the Never Red Register of the present invention.

Once the information is entered for a new calendar item as shown in FIG. 38A, the Add Item Button 462 is selected and a Calendar Item Notification 470 prompts the user to review the entered calendar item information and select Add Item 472 to add the new calendar item or select Cancel 474 to go back to the Add Calendar Item Display 462 and make changes to the information entered as needed. A Calendar Item Notification 470 verification is displayed confirming the addition of the Calendar Item 434 as shown in FIG. 38B. The new Calendar Item 434 is listed, as shown in FIG. 39A. To remove a calendar item the option to Remove Item 466 is selected prompting the user to select and highlight an item where as shown in FIG. 39A the Internet Item 458 has been selected from the list. As shown in FIG. 39B, a prompt for Calendar Item Removal 476 is displayed and the user may review the item information and select the option to Remove 478 which removes the calendar item from the display of Calendar Items 434. The selection of the option to Cancel 480 returns the user to the list of Calendar Items 434.

Figures 40A, 40B:
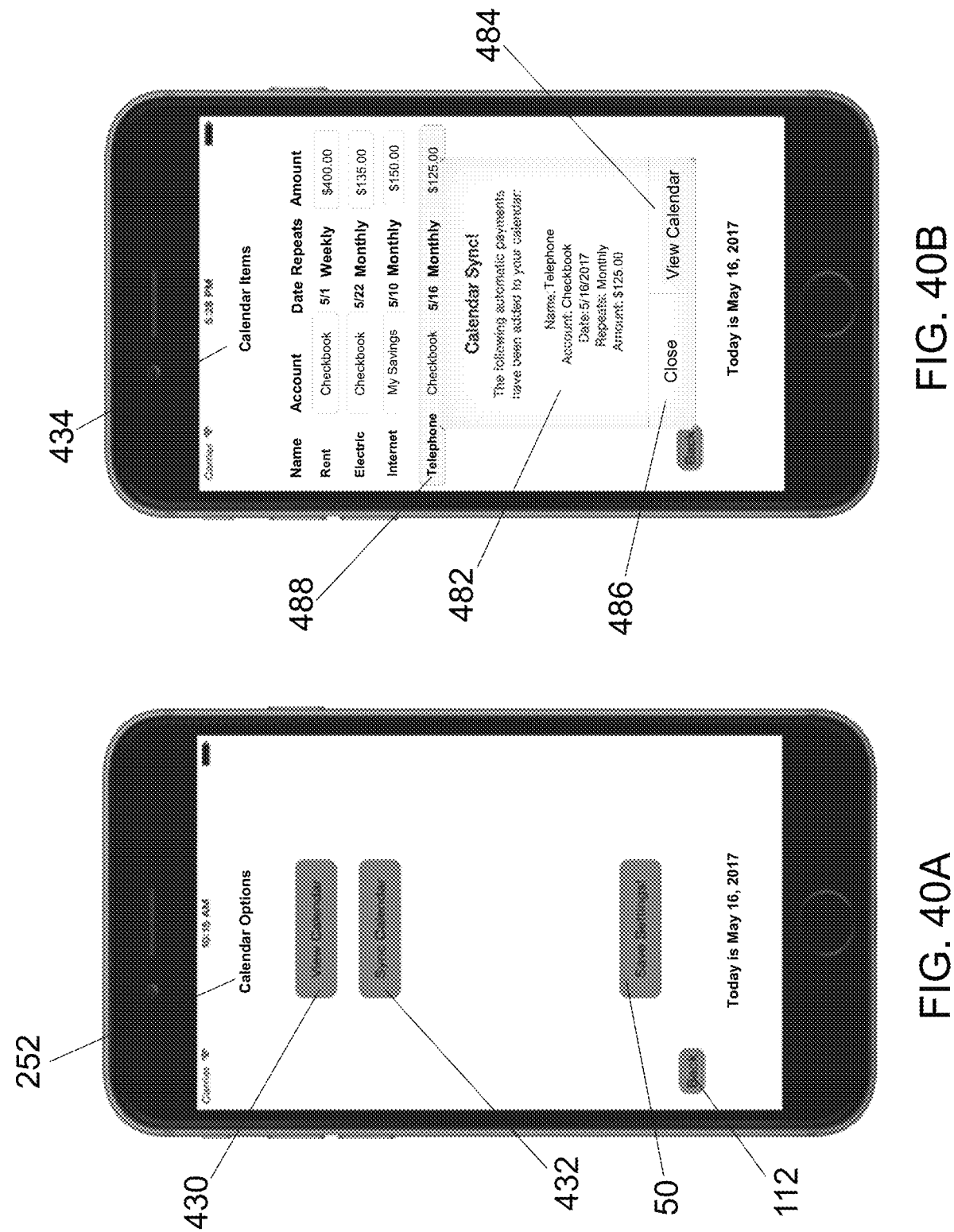
FIG. 40A is an embodiment of a calendar option screen in an embodiment of the Never Red Register of the present invention.
FIG. 40B is an embodiment of calendar sync notification in an embodiment of the Never Red Register of the present invention.
Figures 41A, 41B:
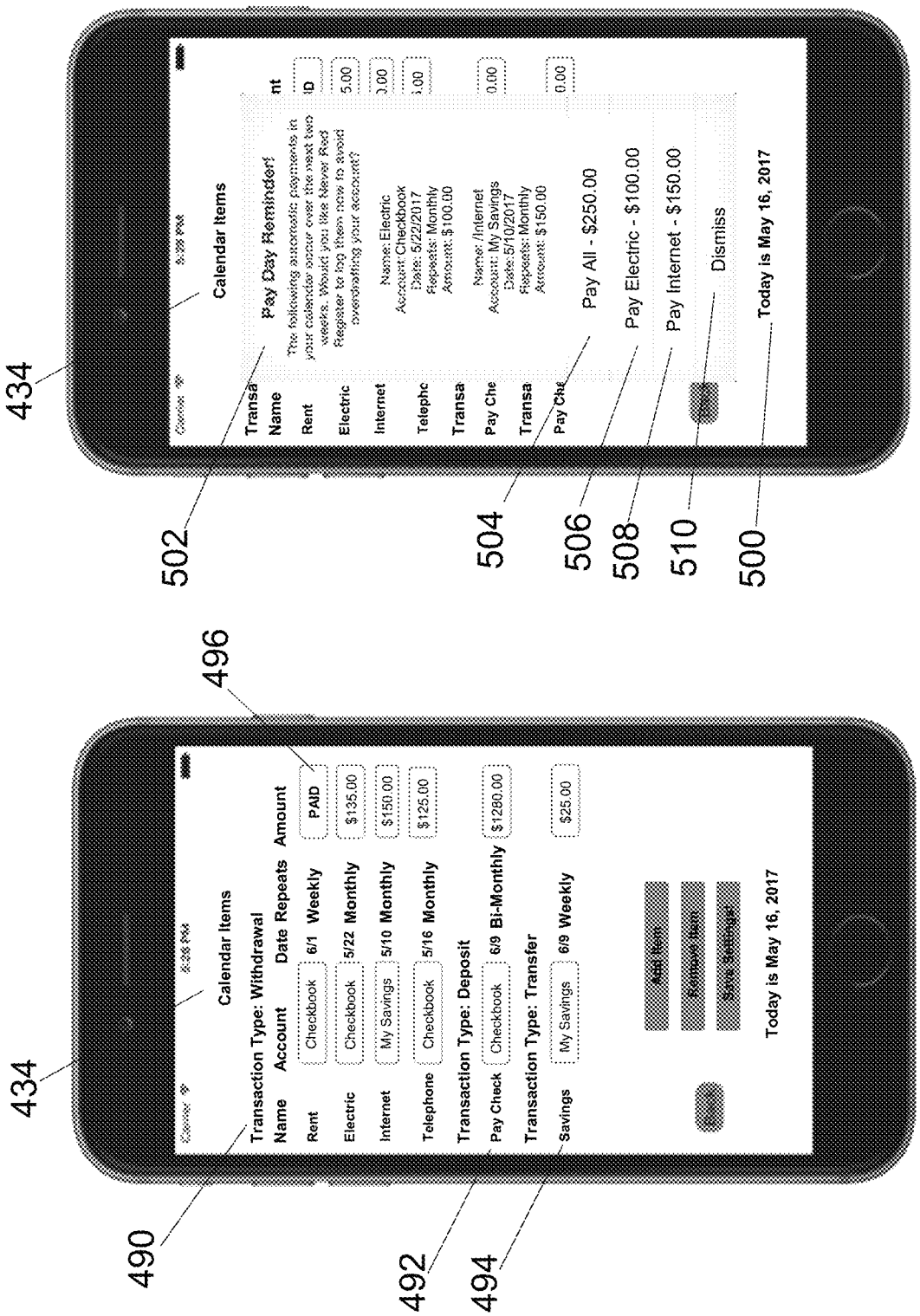
FIG. 41A is an embodiment of calendar item list screen with example data in an embodiment of the Never Red Register of the present invention.
FIG. 41B is an embodiment of pay day reminder notification in an embodiment of the Never Red Register of the present invention.
Figures 42A, 42B:
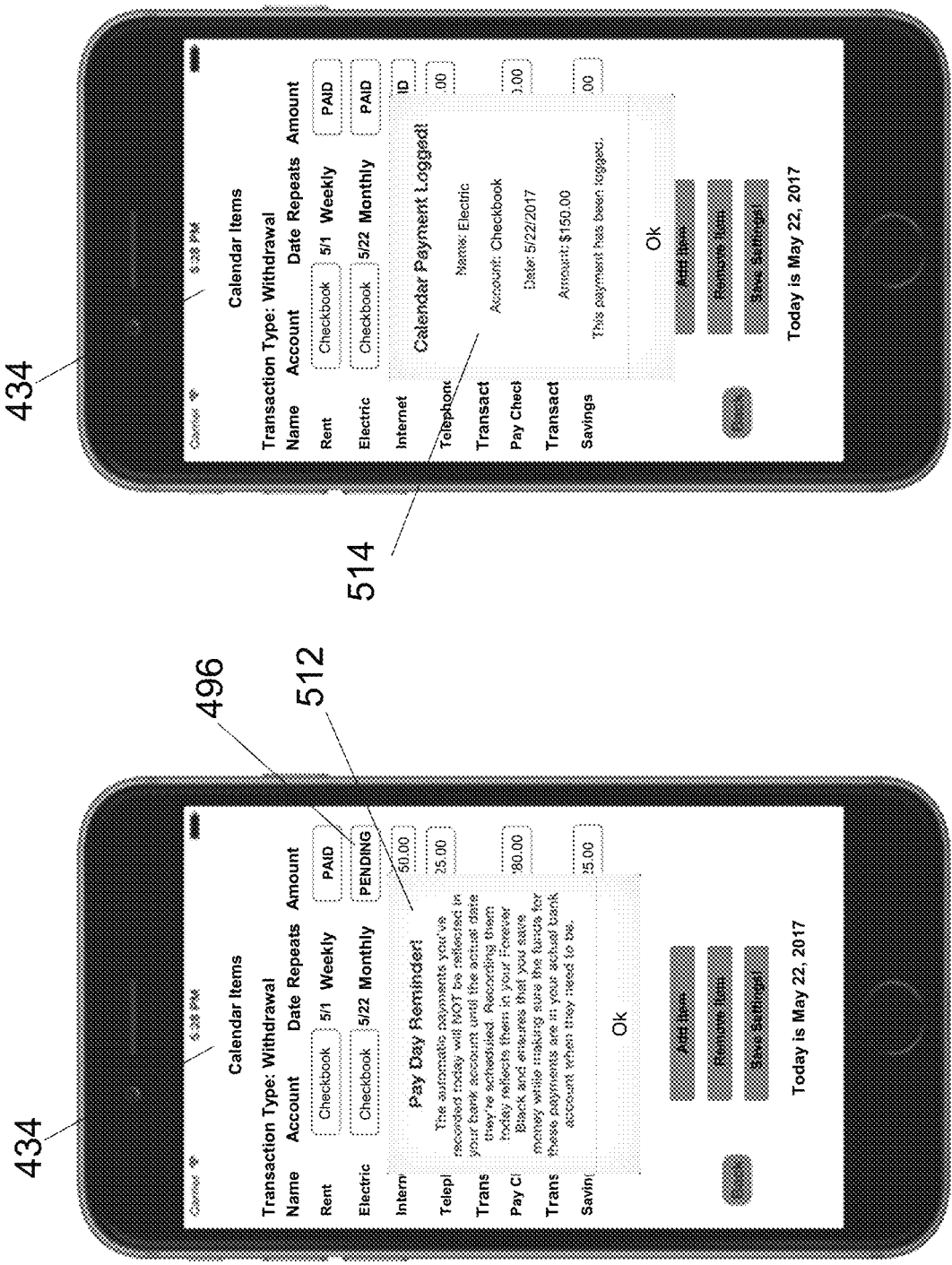
FIG. 42A is an embodiment of pay day reminder notification in an embodiment of the Never Red Register of the present invention.
FIG. 42B is an embodiment of calendar payment logged notification in an embodiment of the Never Red Register of the present invention.

As shown in FIG. 40A, the option to Sync Calendar 432 may be selected to view new calendar items that have been added. Once selected, a Calendar Sync Dialog Box 482 displays information for the most recently added calendar item and provides an option to View Calendar 484 or select Close 486 and return to the Calendar Option 252 display. When Sync Calendar 432 is selected, all newly added calendar items may be highlighted 488 within the display of Calendar Items 434 as shown in FIG. 40B. As shown in FIG. 41A, the calendar items may be grouped by the Transaction Type 490 showing a withdrawal transaction for payments, a deposit transaction for Pay Checks 492, and a transfer transaction for Savings 494. The display of Calendar Items 434 may also provide Indicators 496 to show that a Calendar Item 434 is Pending or is Paid only if the payment has been entered in the Never Red Register 10. Based on the Date 500, the Never Red Register 10 displays reminders to help a user manage their payments and make periodic transfers in their actual bank account for savings or when financial goals are achieved, as shown in FIG. 41B. A Pay Day Reminder 502 indicates upcoming payments that are due. A series of prompts give options for the user to choose to Pay All 504 and log or earmark all payments. Another option provides for the user to log or earmark only one or more than one payment by selecting the Calendar Item 434 of pay. In this example, the user selects the Pay Electric 506 or Pay Internet 508 or to log no payments to the Never Red Register 10 by selecting Dismiss 510. By selecting an option to log all payments or any one payment, a Payment Logged Prompt 512 is displayed as shown in FIG. 42A. By logging a payment, the money is earmarked for the payment and the payment scheduled is withdrawn from the Forever Black Account 88 balance for the Money Bin Account 26 for the user to see the amount of funds that are available after the money is set aside for the payment. The earmarked payment is noted in the Calendar display as pending indicating that the money has been withdrawn from the Forever Black Account 88. As shown in FIG. 42A, if Pay Electric 506 is selected, a Indicator 496 showing the payment as Pending is shown. The actual payment is not transacted within the Never Red Register 10 until the user enters the payment and funds are actually withdrawn from the user's actual bank account. To enter the payment as a withdrawal transaction the user selects the Calendar Item 434 for the payment and changes the Indicator 496 from pending to paid invoking the Never Red Register 10 to automatically enter the withdrawal transaction and implement the Say Go Green Function 84 and perform the steps of allocation based on the Savings Settings 266 of the associated Money Bin Account 26. In some embodiments, an Indicator 496 as Pending may mean the payment hasn't been withdrawn from the user's actual bank account, but the assets within the Never Red Register 10 have been designated as applied towards the payment and therefore are represented as not being available within the available assets indicated as the balance of the Forever Black Account 88. A Calendar Payment Logged 514 prompt shows the payment as entered in the user's actual bank account as shown in FIG. 42B and the removal of funds is reflected in the user's Granite Sum 80 in the Never Red Register 10. By using the Calendar Option 252 reminders and updates to the Forever Black Account 88 balance gives a user due dates for their living expenses and payment obligations and reminders to better budget and manage their money more effectively.

Figure 43B:
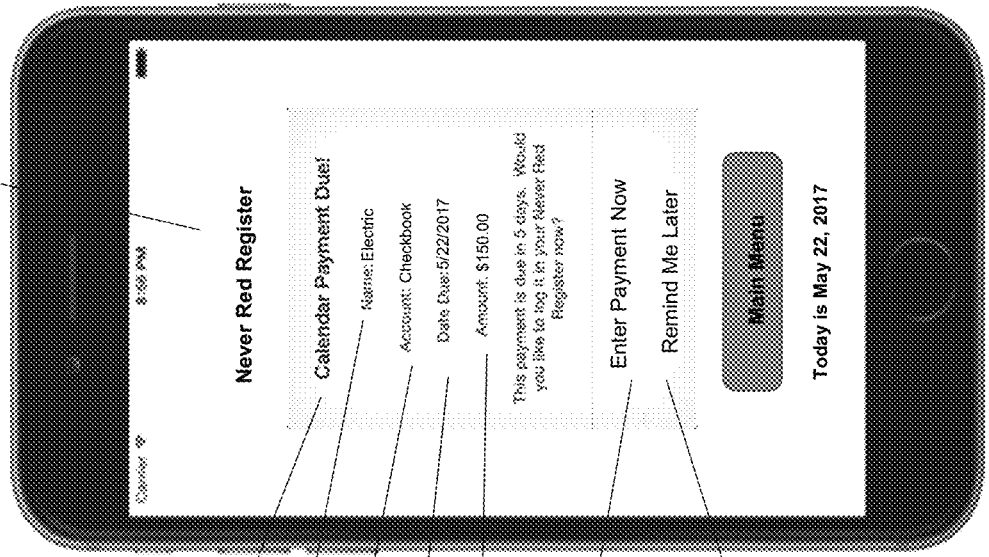
FIG. 43B is an embodiment of calendar payment due notification in an embodiment of the Never Red Register of the present invention.
Figure 43A:
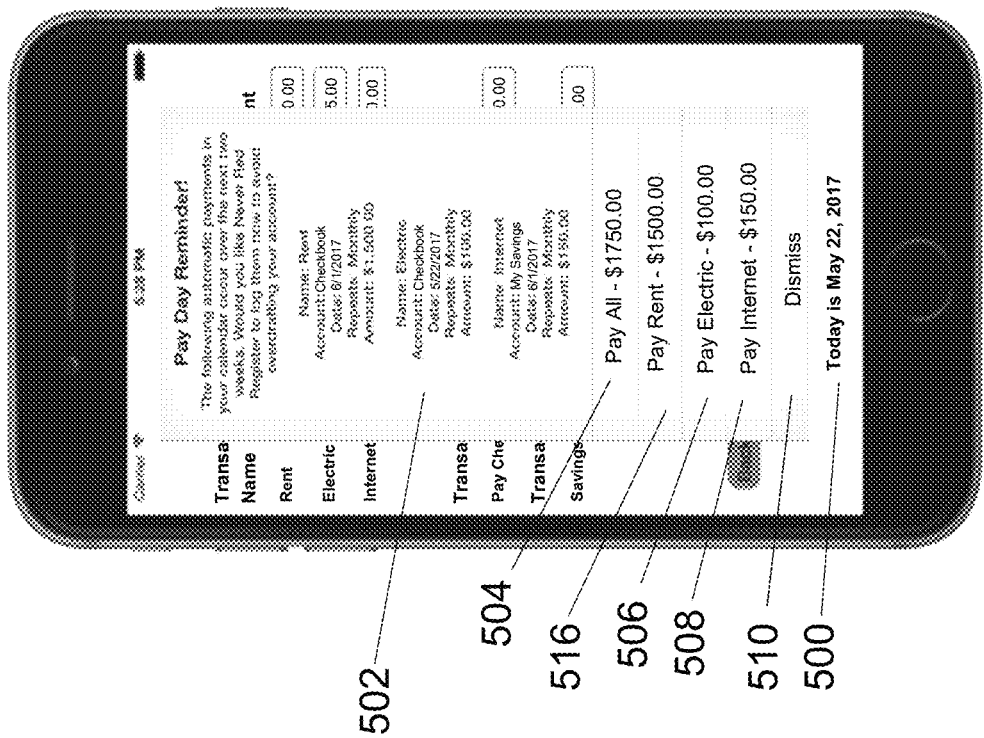
FIG. 43A is an embodiment of pay day reminder notification in an embodiment of the Never Red Register of the present invention.

As shown in FIG. 43A, a Pay Day Reminder 502 may be displayed at the beginning of the month and provide an option to log or earmark all of the payments for the month. By logging the payments at the beginning of the month and reflecting these payments in the Forever Black Account 88, the user is given information on the amount of money they have available from the Forever Black Account 88 balance after these payments prior to the user actually making any payments. The user can select Pay All 504 to log all payments, Pay Rent 516, to log only their rent payment, Pay Electric 506 to log only their electric bill payment, Pay Internet 508 to log only their internet payment or Dismiss 510 to not log any payments. Reminders may also be displayed on the Quick Check 90 screen and be provided on the day that a payment is due with a Calendar Payment Due 518 prompt providing the Item Name 436, the Transaction Account 438, the Due Date 440, and the Transaction Amount 444 and options to Enter Payment Now 520 or Remind Me Later 522, as shown in FIG. 43B. If the user chooses Enter Payment Now 520, a notification that the calendar item has been paid is provided and the payment within the display of Calendar Items 434 is updated with a Indicator 496 of Paid. In entering a Calendar Item 434, a transaction is performed either as a withdrawal for a payment, a deposit for example for a pay check, or a transfer of funds from for example the Checkbook Account 78 to the My Savings Account 270 if a calendar item is for a transfer. In performing any of these transactions, the withdrawal, deposit and transfer traction steps are completed as described herein where for example, a payment results in the allocation of funds from the Forever Black Account 88 with an additional amount withdrawn and deposited in the Say Go Green Account 86, the Silver Savings Account 220 or in any Goal Accounts 314 or Drawer Accounts 282 that are associated with the Money Bin Account 26 listed in the calendar item.

An important feature of the Never Red Register 10, is a notification to the user if in completing a transaction, an account is identified as having insufficient funds to perform the transaction. An Insufficient Funds Alert 524 is displayed which shows the available assets in the accounts associated with the Money Bin Account 26 where the transaction is being made from. As shown in FIG. 44A, the Forever Black Account 88, the Say Go Green Account 86 and the Silver Savings Account 220 and the available funds in all Goal Accounts 314 and Drawer Accounts 282, associated with the Money Bin Account 26 are displayed. The Insufficient Funds Alert 524 may be displayed on the Quick Check 90 screen and requires the user to make a selection from the alert before being able to access the Main Menu 50. If the user has not entered all transactions or a portion of the assets that are necessary for a payment are allocated to the Say Go Green Account 86, Silver Savings Account 220, Goal Accounts 314 and Drawer Accounts 282, the amount allocated in the Forever Black Account 88 may not cover the amount of a withdrawal needed to make a monthly calendar or other type of payment. The user must first review their actual ban account and verify that all transactions have been entered and then must enter transfer transactions to transfer assets within the Never Red Register 10 accounts to reallocate assets to the Forever Black Account 88 to cover any shortfall that arises due to the allocation of funds into these other Never Red Register 10 accounts. An important feature in some embodiments of the Never Red Register 10 is that because the designation of assets in the Never Red Register 10 is only represented virtually without control to move assets in or out of a user's actual bank account, the Never Red Register 10 removes the risk of an over allocation causing an over draw in the user's actual bank account. The user may monitor their assets in the Never Red Register 10 but be sensible in following the guidelines with the allocation of their actual assets. The Never Red Register 10 therefore provides a unique asset management tool that is unlike financial allocation tools that for example simply automatically withdraw a preset amount of funds on a periodic basis from the user's actual bank account without providing to the user necessary assets to cover expenses and have spendable assets. Spendable assets in the form of the Say Go Green Account 86 is a very different approach to have a user better save for their financial objectives and better understand how assets could be allocated if the user chooses to do so. With the Never Red Register 10 also providing indicators that assets may be insufficient, the user may simply transfer the virtually represented assets within the Never Red Register 10 accounts and then review their actual assets within their bank account to prevent against any shortfall.

Figure 44B:
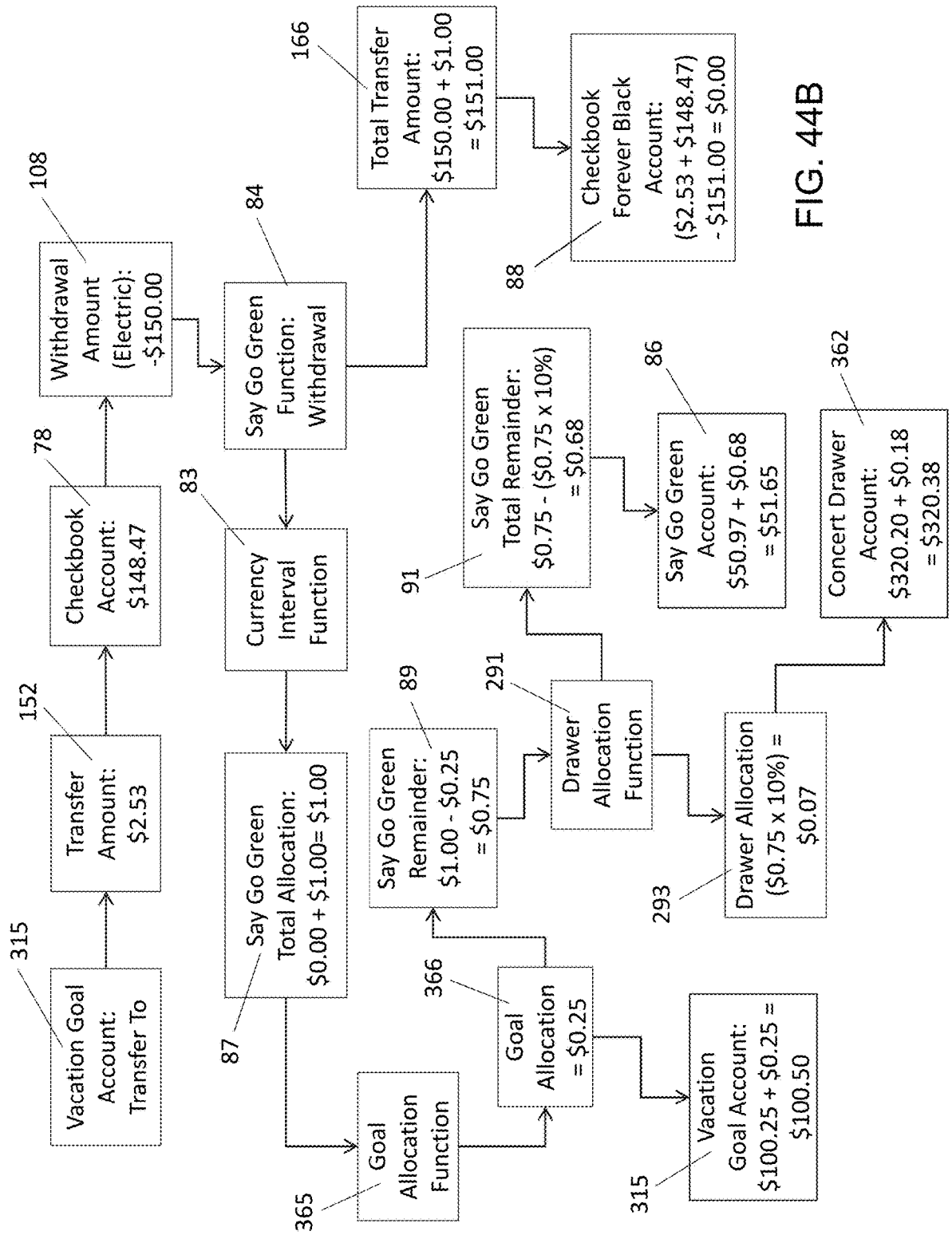

An insufficient funds notification is shown in FIG. 44A to provide to the user the option to review the balances in each of the accounts and select to transfer assets equal to or more than the shortfall from one or more accounts. In this example, the electric utility bill of $150.00 is logged or earmarked to be paid and the available balance in the Checkbook Forever Black Account 88, is $148.47, a shortfall of $1.53. As shown in the flow chart of FIG. 44B, in this example in performing the withdrawal from the Forever Black Account 88 the Never Red Register 10 then provides instructions for the computational circuitry 3 of the digital device to automatically implement the Say Go Green Function 84 for a withdrawal. The Say Go Green Function 84 invokes the Currency Interval Function 83 to determine the Currency Interval Allocation 85 which in this example where the Withdrawal Amount 108 is $150.00 the Currency Interval Allocation 85 is $0.00, so the Say Go Green Total Allocation 87 is equal the Say Go Green Allocation 46 amount of $1.00. The Say Go Green Total Allocation 87 of $1.00 is combined with the Withdrawal Amount 108 of $150.00 for a Total Withdrawal Amount 122 of $151.00 to be withdrawn from the Forever Black Account 88.

Because the assets in the Forever Black Account 88 are only $148.47 and are therefore insufficient in the Forever Black Account 88, the Never Red Register 10 issues the Insufficient Funds Alert 524. The user must then choose the Never Red Register 10 account that they would like to transfer assets from to cover the shortfall or select the Cancel 526 option to stop the withdrawal transaction. In this example, the user selects the Vacation Goal Account 315 from the Insufficient Funds Alert 524 and is prompted for the amount to transfer. The user selects to transfer assets in the amount of $2.53 the actual amount of the shortfall although any amount may be entered in the prompt to transfer assets to the Forever Black Account 88. The assets are transferred from the Vacation Goal Account 315 and the Never Red Register 10 enters the withdrawal transaction by invoking the Say Go Green Function 84 that invokes the Goal Allocation Function 365 to determine the Goal Allocation 366 which in this example is an exact amount of $0.25. The Goal Allocation Function 365 withdraws the Goal Allocation 366 from the Say Go Green Total Allocation 87 of $1.00 leaving a Say Go Green Allocation Remainder 89 of $0.75. The Goal Allocation of $0.25 is deposited into the Vacation Goal Account 315. The Say Go Green Function 84 invokes the Drawer Allocation Function 291 which determines and withdraws the Drawer Allocation 293 of 10% from the Say Go Green Allocation Remainder 89 of $0.75 leaving a Say Go Green Total Remainder 91 of $0.68 after invoking the Currency Interval Function 83 to round-down the Drawer Allocation 293 and round-up the Say Go Green Total Remainder 91 each to the lowest denomination of currency. The Drawer Allocation 293 of $0.07 is deposited in the Concert Drawer Account 362 and the Say Go Green Total Remainder 91 of $0.68 is deposited in the Say Go Green Account 86. The Checkbook Forever Black Account 88 balance in this example after the transaction is $0.00, the balance in the Vacation Goal Account 315 is $100.25, the balance in the Concert Drawer Account 362 is $320.38, and the balance of the Say Go Green Account 86 is $51.65. While more assets may have been transferred by the user to increase the assets in the Forever Black Account 88, again because the asset transfer is only represented virtually and no actual assets are transferred within the Never Red Register 10 the user is open to review and determine the best amounts for allocation without effecting the assets in their actual bank account, a powerful tool for the user for better asset management. In the event that a withdrawal is attempted in an amount that is more than the balance of the Granite Sum Account 80, the Insufficient Funds Alert 524 will display that the transaction will be denied and the user will be returned to the previous transaction screen and be unable to the proceed with the transaction.

Figures 45A, 45B:
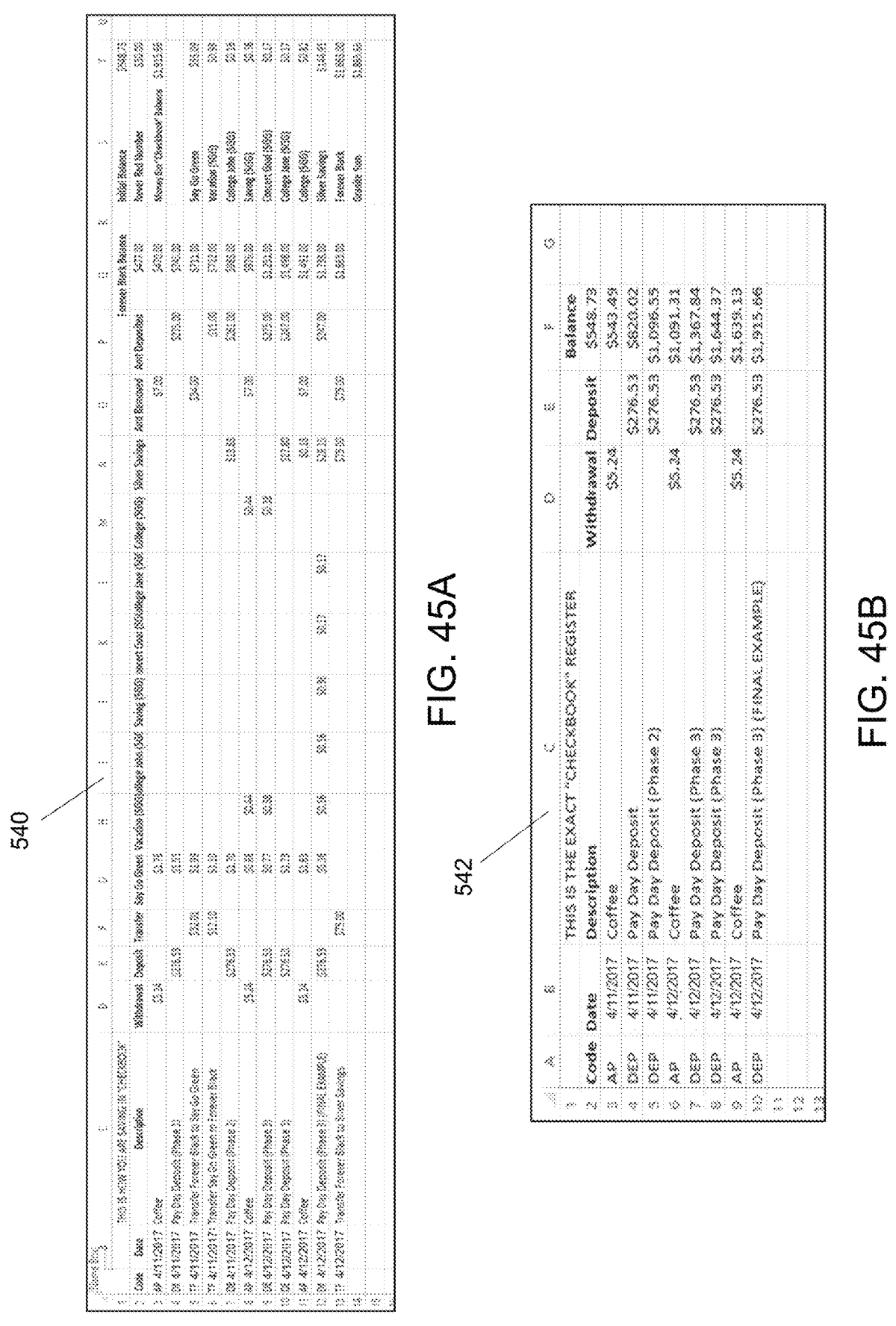
Figures 45C, 45D:
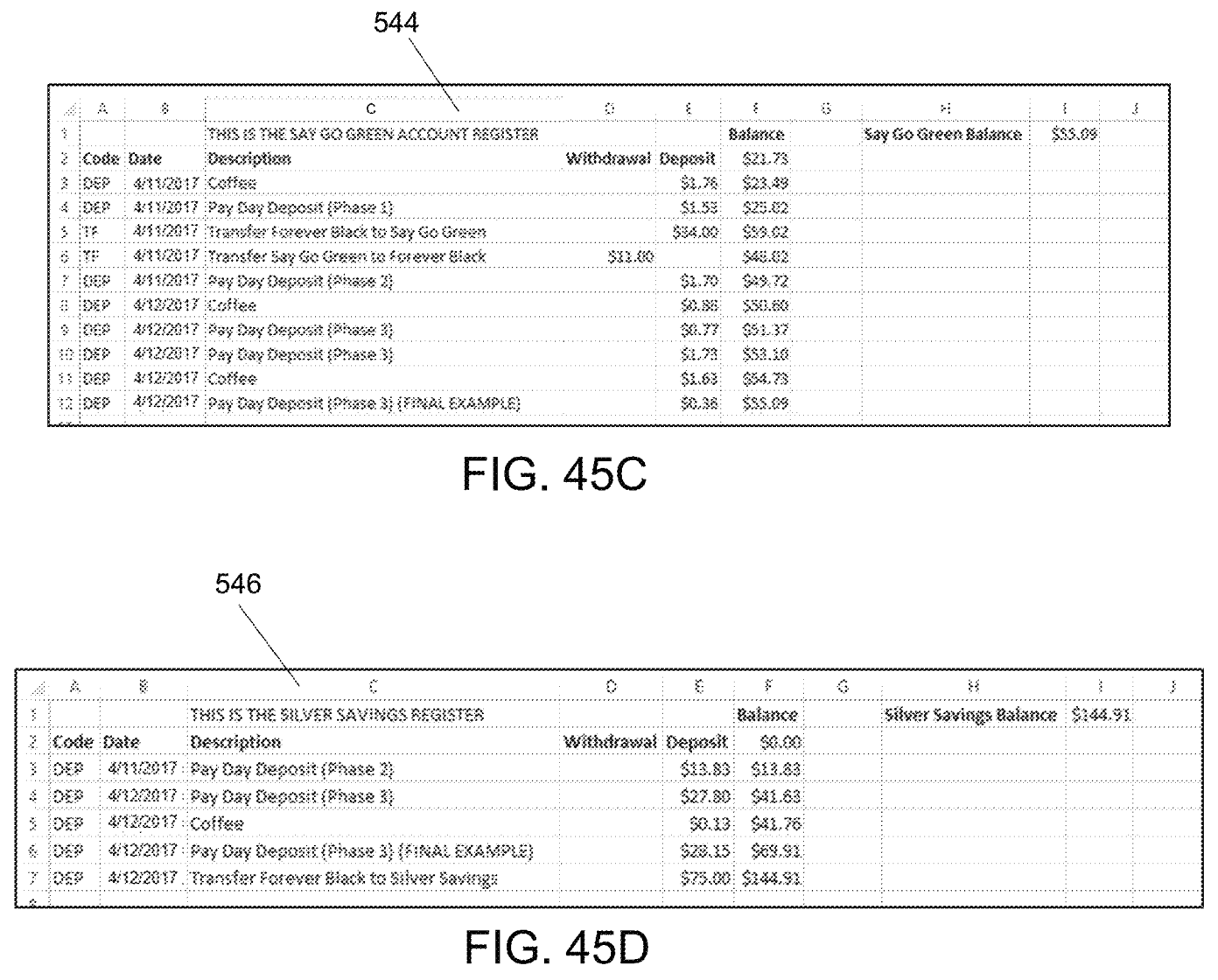

Importantly, using the Never Red Register 10 the user may enter transactions immediately when they occur and then review these transactions in a spreadsheet or other format that is provided for every account and that displays every withdrawal, deposit or transfer transaction including transfers to and from the Say Go Green Account 86, the Silver Savings Account 220 and to and from any Goal Accounts 314 and Drawer Accounts 282 associated with any Money Bin Account 26. An example of a Never Red Register spreadsheet 540 type format which shows the transactions between the Money Bin Account 26 and the Say Go Green Account 86, the Silver Savings Account 220 and Goal Accounts 314 and Drawer Accounts 282 is shown in FIG. 45A. An example of a Checkbook Register 542 is shown in FIG. 45B, of a Say Go Green Register 544 in FIG. 45C, a Silver Savings Register 546 in FIG. 45D, a Vacation Goal Register 548 in FIG. 45E, for a College Drawer Register 550 in FIG. 45F, and a Savings Register 552 in FIG. 45G. The spreadsheets contain a running total so that the user can at any time see the transactions and any or all registers may be emailed to the user with the data from the spreadsheets being encrypted.

In a further embodiment, a Money Bin Account 26 may be setup for a credit card to provide sub-value indicators and payment notifications to help to avoid unnecessary interest charges and to prevent making charges using the credit card that will exceed the maximum credit limit. By preventing the user from exceeding the maximum credit limit the user will not be charged for overage charges. The Never Red Register 10 also helps a user manage their payment schedule and provides a breakdown of payments to help a user pay off their credit card debt faster. From the Account Settings Menu 250, a user selects the Add Money Bin 256 that opens and prompts the user to enter a Money Bin Account Type 28 and an Account Name 30. When the user enters, or selects "Credit" for the type of account, the Never Red Register 10 configures the Add Money Bin 256 display to set the Interest Rate toggle button 34 to a default as "On" and the user is prompted to enter the Interest Rate 72 and How Often 74 the interest rate is compounded, as shown in FIG. 46A. The user is prompted to enter a Credit Card Account Name 562 to help indicate to the user which actual credit card the Credit Card Money Bin Account 560 is associated with. The Credit Card Account Name 562 of Visa has been entered as shown in the example in FIG. 46A. For a credit card type account, a Statement Prompt 564 instructs the user to review their credit card statement in order to enter accurate information for the Credit Card Money Bin Account 560 including their Credit Card Limit 566, their Credit Card Debt 568 and their Minimum Monthly Payment 570. The Minimum Monthly Payment 570 is the amount that must be paid each month to prevent a default in payment which could result in additional service charges from the credit card company.

The Never Red Register 10 also configures the Add Money Bin 256 settings to provide for the user to select to setup a Pay Off Goal 572 and provides for the user to select a Say Go Gold Transaction Allocation 586 for the user to set aside an amount to create a buffer to further assist in preventing overage charges and service fees as described herein. In setting up a Pay Off Goal 572, the Never Red Register 10 configures and the Pay Off Goal 572 display, as shown in FIG. 46B. The user enters or the Debt Type 561 is automatically entered by the Never Red Register 10 based on the Money Bin Account Type 28 which in this example is a credit card debt, but other debts such as a car loan, student loan, mortgage or others could be set up as a Pay Off Goal 572 within the Never Red Register 10. The Pay Off Goal 572 displays the Debt Name 563 as the name of the Money Bin Account 26 associated with the debt. In this example "Visa" is entered or is auto-filled from the Credit Card Money Bin Account Name 562. The Debt Total 565 and the Interest Rate 72 is displayed which in this example is the Credit Card Debt 568 of $4085.22 and the Interest Rate 72 of 16.5% which is entered or auto-filled from the Credit Money Bin Account 560 settings. A user is provided with prompts to enter a Date Desired 318 to pay off the Debt Total 565 and guidelines that show a breakdown of payments over different time periods are displayed to assist the user and help them to manage and pay off the Debt Total 565.

The Never Red Register 10 calculates a Total Pay Off Amount 574 based on the frequency when interest is calculated, the Credit Card Debt 568 and the Interest Rate 72. However, because different credit card and loan companies calculate interest using different formulas and time frames, and because sometimes there are additional service charges and fees, the Never Red Register 10 prompts the user to refer to their credit card or loan statement to verify the Total Pay Off Amount 574. This encourages the user to frequently review their statement to verify the Total Pay Off Amount 574 and the payoff guidelines are updated when the Total Pay Off Amount 574 is entered or calculated. In this example, the Total Pay Off Amount 574 is calculated as $4152.63. The Never Red Register 10 uses algorithms to perform for example calculations to determine and display a Daily Allocation 567 as the Total Pay Off Amount 574 divided by the remaining days to the Date Desired 318 which in this example of one year is 365 days for a Daily Allocation 567 of $11.38. A Weekly Allocation 569 in this example is $79.64 which is calculated by multiplying the Daily Allocation 567 of $11.38 by 7 for seven days in a week. A Monthly Allocation 571 in this example is $341.31 which is determined by multiplying the Daily Allocation 567 by 30 based on the most common total number of days of thirty in a month. A Yearly Allocation 573 may be determined by multiplying the Daily Allocation 567 by three hundred and sixty-five the total number of days in a year which in this example is $4152.63 to provide the user with an estimate of what they must pay towards the Credit Card Debt 568 to achieve their Pay Off Goal 572 by the Date Desired 318. These allocation amounts are updated as the Debt Total 565 changes as payments or additional charges are made, since the Pay Off Goal 572 settings are linked to the Money Bin Account 26 associated with the debt. The Pay Off Goal 572 settings may be saved by the user by selecting the Save! 336 option or be deleted by selecting the Delete Goal 350 option.

Figure 47A:
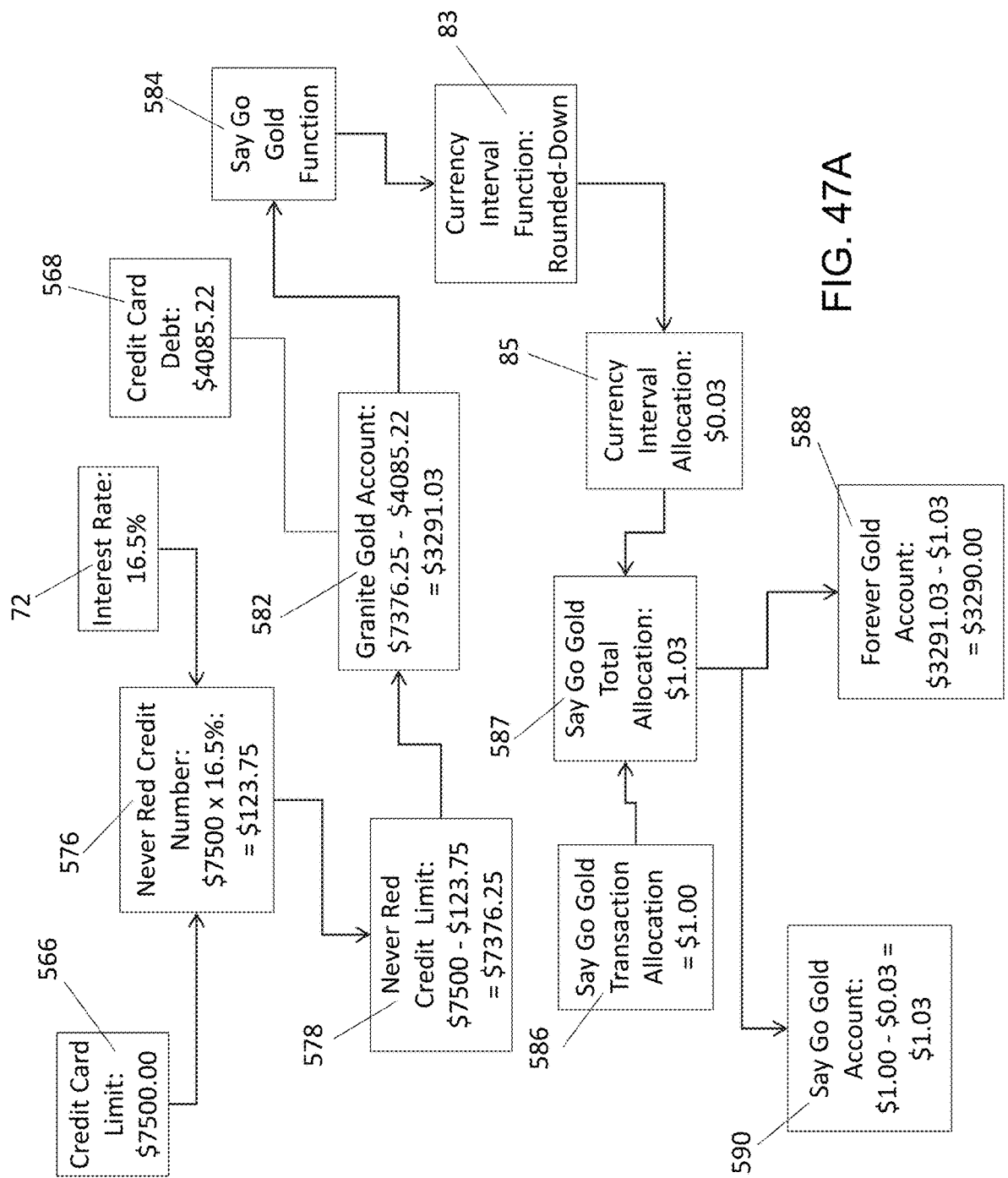

As noted above, an important feature of the Never Red Register 10 is the prevention of making charges over the Credit Card Limit 566 which provides the benefit to the user of not being charged credit card overage fees if the user controls their spending by adhering to the allocations prescribed by the Never Red Register 10. In setting up a Credit Card Money Bin Account 560, the Never Red Register 10 determines a Never Red Credit Number 576 and from that number displays a Never Red Credit Limit 578. As shown in FIG. 47A, the Never Red Credit Number 576 is determined by multiplying the Interest Rate 72 by the Credit Card Limit 566 and subtracting the Never Red Credit Number 576 from the Credit Card Limit 566. The Credit Card Debt 568 is then subtracted from the Never Red Credit Limit 578 and the Never Red Register 10 determines this amount as a balance for a Granite Gold Account 582. The Granite Gold Account 582 is therefore created by the Never Red Register 10 as a sub-value indicator that displays an amount that is less than the actual Credit Card Limit 566 in order to create a buffer to prevent a user from exceeding the Credit Card Limit 566. The amount of buffer is adjusted when a transaction of either a charge or a payment is made within the Credit Card Money Bin Account 560. The Never Red Register 10 implements a Say Go Gold Function 584 to allocate a Say Go Gold Transaction Allocation 586 to increase or decrease the amount of the buffer and display an available charge amount as the balance of a Forever Gold Account 588, a buffer amount as the balance of a Say Go Gold Account 590 and the sub-value indicator as the balance of the Granite Gold Account 582 to indicate to the user an amount that may be charged within their Credit Card Money Bin Account 560 without exceeding the Credit Card Limit 566.

As shown in an example in FIG. 47A, in the initial setup of the Credit Card Money Bin Account 560, the Never Red Register 10 implements instructions to determine the Never Red Credit Number 576 by multiplying the Credit Card Limit 566 of $7500 by the Interest Rate 72 of 16.5% to determine a Never Red Credit Number 576 of $123.75. The Never Red Credit Number 576 is subtracted from the Credit Card Limit 566 to determine the Never Red Credit Limit 578 of $7376.25. The Credit Card Debt 568 of $4085.22 is subtracted from the Never Red Credit Limit 578 to determine the Granite Gold Account 582 balance of $3291.03. The Never Red Register 10 increases the buffer to the Credit Card Limit 566 by implementing the Say Go Gold Function 584 that invokes the Currency Interval Function 83 to determine a Currency Interval Allocation 85 by rounding-down the Granite Gold Account 582 balance to an interval of currency. The Currency Interval Allocation 85 is combined with the Say Go Gold Transaction Allocation 586 to determine a Say Go Gold Total Allocation 587. The Never Red Register 10 creates the Forever Gold Account 588 that has the initial balance that is equal to the Granite Gold Account 582 of $3291.03. The Say Go Gold Total Allocation 587 of $1.03 is withdrawn from the Forever Gold Account 588 balance of $3291.03 and deposited into the Say Go Gold Account 590 for an initial balance $1.03 leaving the Forever Gold Account 588 balance of $3290.00. For every transaction that is entered in the Credit Card Money Bin Account 560, an adjustment to the Forever Gold Account 588 balance using the Say Go Gold Function 584 is made to increase or decrease the buffer to provide a sub-value indicator to the user of the amount that may be charged on the credit card and be assured that they will not exceed the credit card limit and so will not be charged with overage charges.

Figure 47B:
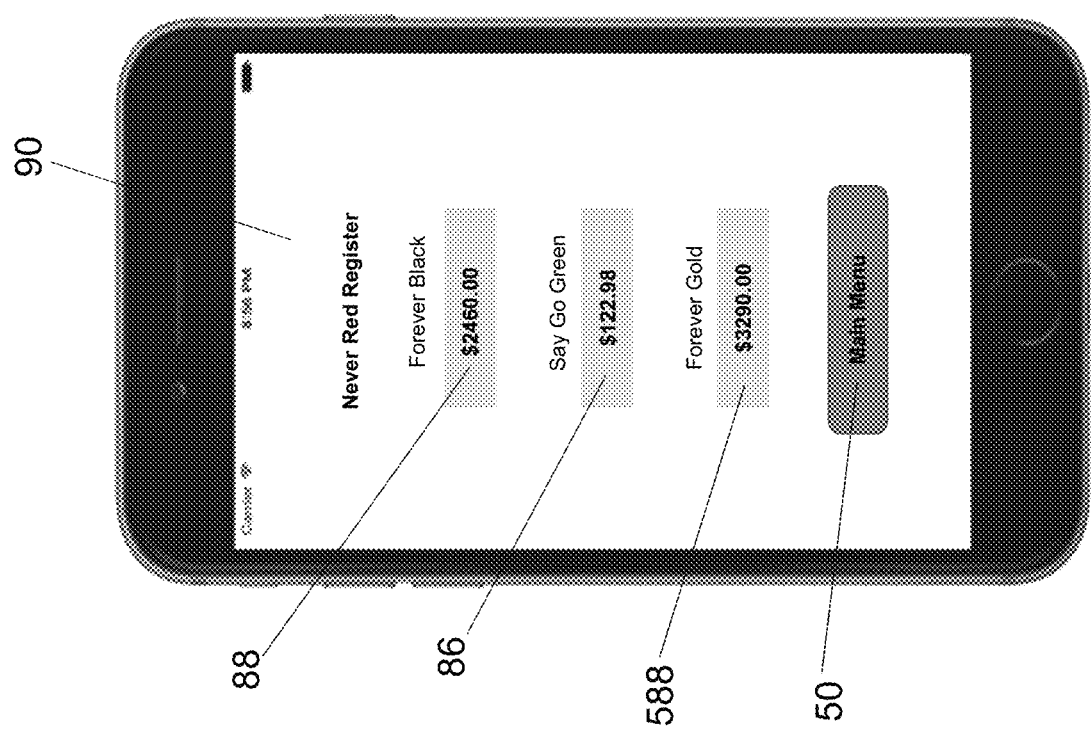

As shown in FIG. 47B, the Forever Gold Account 588 balance is then displayed for the user on the Quick Check 90 screen so the user can immediately see their available balance in the Forever Black Account 88, their spending balance in the Say Go Green Account 86 and their amount available to charge on their credit card in the Forever Gold Account 588 which includes the buffer provided by the sum of the Never Red Credit Number 576, the Say Go Gold Function 584 and the Say Go Gold Transaction Allocation 586. By displaying the Forever Gold Balance 588, the user will have better information than just the Credit Card Debt 568 and Credit Card Limit 566 in choosing whether to add charges to the credit card or to make a payment to pay towards their Credit Card Debt 568.

Figure 48:
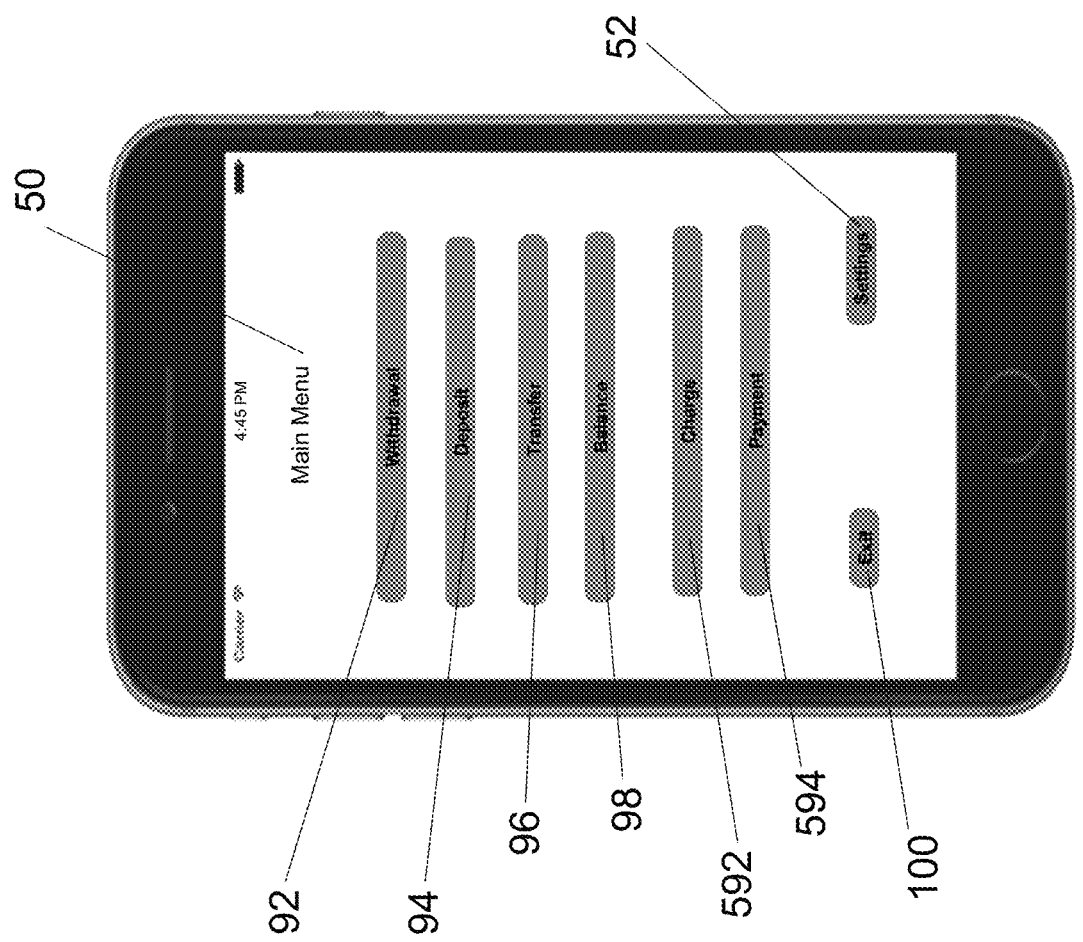
Figure 49:
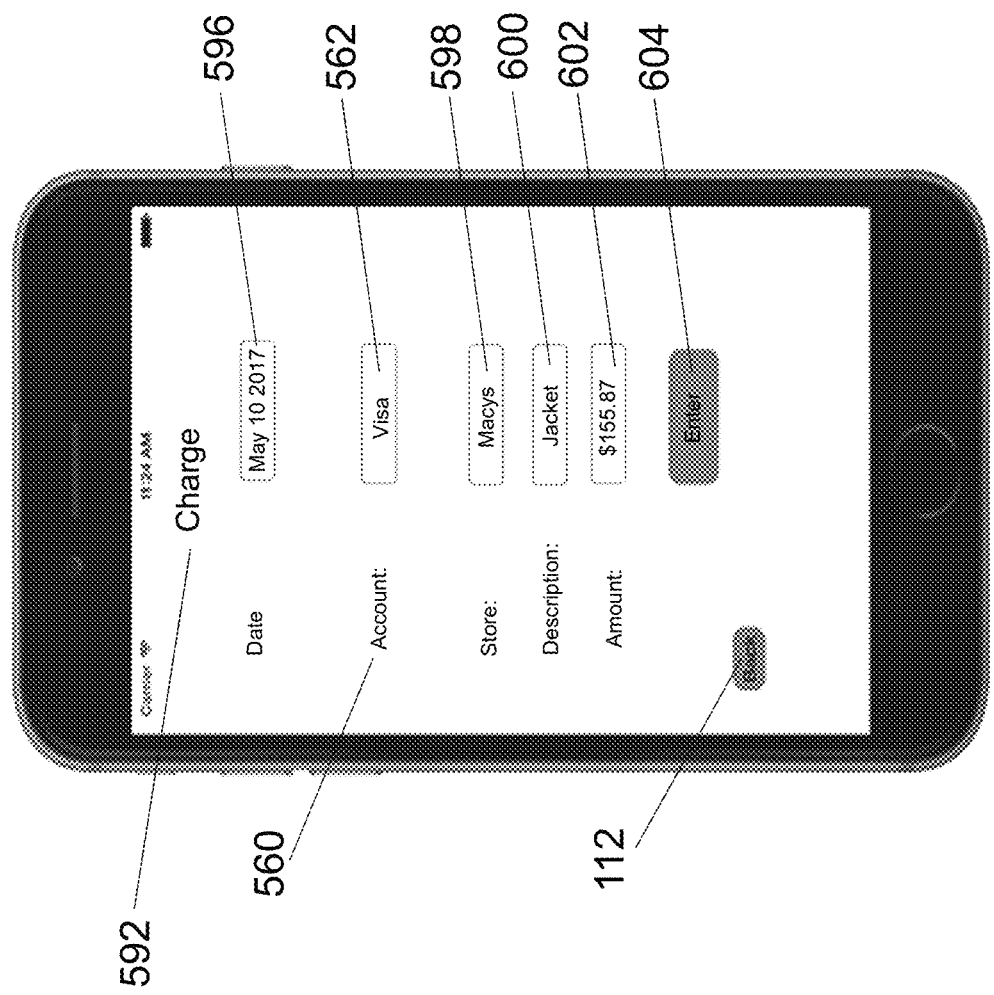

As shown in FIG. 48 the transactions of either a charge or a payment are entered for a Credit Card Money Bin Account 560 by selecting the Main Menu 50, and choosing the Credit Card Charge 592 option or the Credit Card Payment Option 594 for a user to enter the charges and payments that they have made using their credit card. For each charge transaction, the buffer is increased and for each payment transaction the buffer is decreased when entered into the Never Red Register 10. As shown in FIG. 49, when a user selects the Charge 592 option the user is prompted to enter information about the item purchased, such as the Charge Date 596, the Credit Card Money Bin Account 560 which if the user has only one credit card will default to the Credit Card Money Bin Account 560 having the entered Credit Card Account Name 562 which in this example is Visa. The user is also provided with an option to enter the Retail or Online Store 598 where the item was purchased, an option to enter a Description 600 of the item purchased and an option to enter a Charge Amount 602. The user may select the Enter 604 option to have the Credit Card Charge 592 entered in the Never Red Register 10 or select the Back 112 option to return to the Main Menu 50.

Figure 50A:
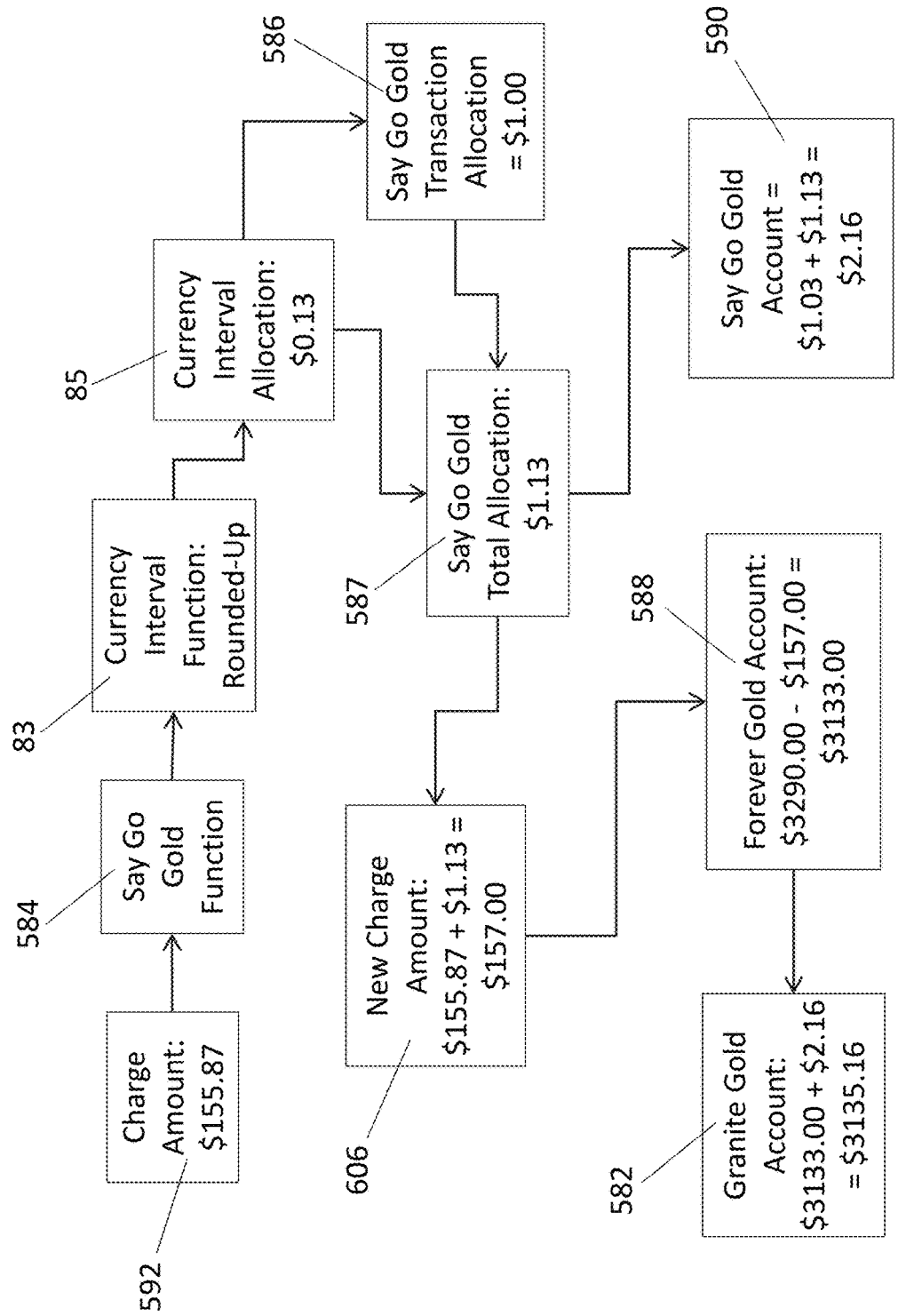
Figure 50B:
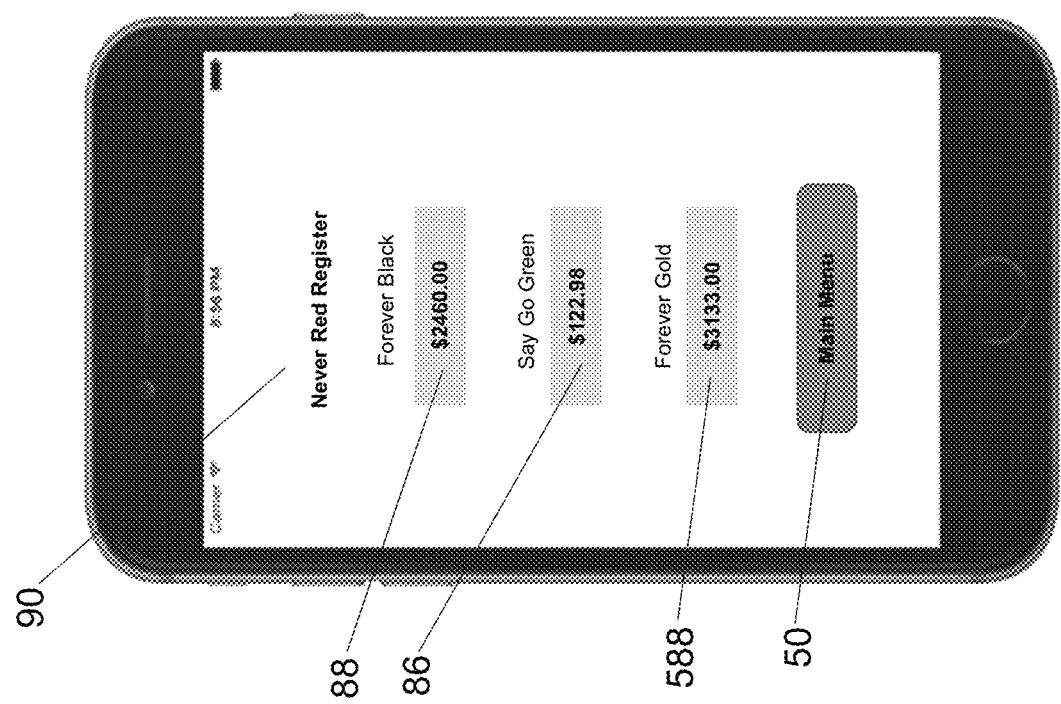

When the Credit Card Charge 592 is entered, the Never Red Register 10 increases the buffer to the Credit Card Limit 566 by implementing the Say Go Gold Function 584. The Say Go Gold Function 584 invokes the Currency Interval Function 83 to determine a Currency Interval Allocation 85 by rounding-up the Charge Amount 592 to an interval of currency. The Currency Interval Allocation 85 is combined with the Say Go Gold Transaction Allocation 586 to determine the Say Go Gold Total Allocation 587. The Say Go Gold Total Allocation 587 is withdrawn from the Forever Gold Account 588 thereby increasing the buffer. As shown in the example in FIG. 50A, the Never Red Register 10 implements the Say Go Gold Function 584 which invokes the Currency Interval Function 83. The Currency Interval Function 83 determines the Currency Interval Allocation 85 in the amount of $0.13 by rounding-up the Charge Amount 592 of $155.87 to an interval of currency. The Currency Interval Allocation 85 of $0.13 is combined with the Say Go Gold Transaction Allocation 586 of $1.00 to determine the Say Go Gold Total Allocation 587 of $1.13. The Say Go Gold Total Allocation 587 of $1.13 is combined with the Charge Amount 592 of $155.87 to determine a New Charge Amount 606 of $157.00. The New Charge Amount 606 of $157.00 is withdrawn from the Forever Gold Account 588 thereby decreasing the balance in the Forever Gold Account 588. By decreasing the Forever Gold Account 588 by more than the entered Charge Amount 602 a larger buffer is created. After entering the charge transaction, the balance of the Forever Gold Account 588 is $3133.00, of the Say Gold Account 590 is $2.16 and the balance of the Granite Gold Account 582 is 3135.16, the combined total of the balance of the Forever Gold Account 588 of $3133.00 and the balance of the Say Gold Account 590 of $2.16. As shown in FIG. 50B, the Forever Gold Account 588 balance is displayed on the Quick Check 90 screen providing an indicator to a user that by entering a charge there is a greater decrease than the Charge Amount 602 and a greater reduction in the amount available to charge on their credit card to prevent the user from exceeding their credit limit and incurring any overage charges.

Figure 51:
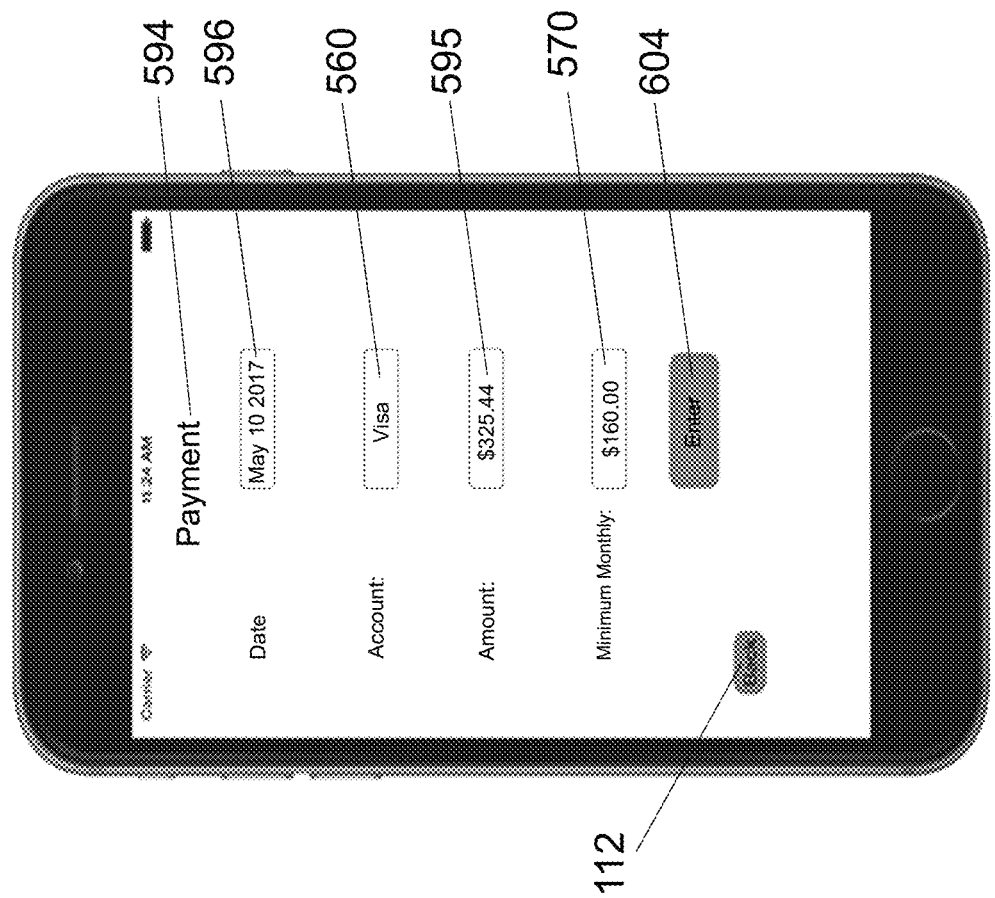

When the Credit Card Payment Option 594 is selected from the Main Menu 50, the Credit Card Payment Option 594 screen as shown in FIG. 51 is displayed. The user is prompted to enter the Date 596, the Credit Card Money Bin Account 560, and the New Payment Amount 608. The Never Red Register 10 also displays the Minimum Monthly Payment 570 which is the minimum payment required by the credit card company as a guideline for the user in making the payment. The user may select the Enter 604 option to have the Credit Card Payment 595 entered in the Never Red Register 10 or select the Back 112 option to return to the Main Menu 50.

As shown in FIG. 52A, when the Credit Card Payment 595 is entered, the Never Red Register 10 implements the Say Go Gold Function 584 which invokes the Currency Interval Function 83. The Currency Interval Function 83 determines the Currency Interval Allocation 85 in the amount of $0.44 by rounding-down the Credit Card Payment 595 amount of $325.44 to an interval of currency. The Currency Interval Allocation 85 of $0.44 is combined with the Say Go Gold Transaction Allocation 586 of $1.00 to determine the Say Go Gold Total Allocation 587 of $1.44. The Say Go Gold Total Allocation 587 of $1.44 is withdrawn from the Credit Card Payment 595 amount of $325.44 to determine a New Payment Amount 608 of $324.00. The New Payment Amount 608 of $324.00 is deposited into the Forever Gold Account 588 thereby increasing the balance in the Forever Gold Account 588. By decreasing the Credit Card Payment 595 by the Say Go Gold Total Allocation 587 less than the entered amount of the Credit Card Payment 595 is added to the Forever Gold Account 588 balance decreasing the buffer. After entering the payment transaction, the balance of the Forever Gold Account 588 is $3457.00, of the Say Gold Account 590 is $3.60 and the balance of the Granite Gold Account 582 is 3460.60, the combined total of the balance of the Forever Gold Account 588 of $3457.00 and the balance of the Say Gold Account 590 of $3.60. The Forever Gold Account 588 balance is displayed on the Quick Check 90 screen providing an indicator to a user that by entering a payment there is an increase in the amount available to charge on their credit card but this amount is less than the actual payment to prevent the user from exceeding their credit limit and incurring any overage charges as shown in FIG. 52B.

A Credit Card Charge 592 transaction is not a transaction that invokes the Say Go Green Function 84 in the user's Money Bin Account 26, but a Credit Card Payment 595 is a withdrawal transaction from the Money Bin Account 26 from where the payment is made. As shown in FIG. 53A, in the Balance 98 screen when a Credit Card Payment 592 is entered a withdrawal transaction occurs with the Credit Card Payment 595 being withdrawn in this example from the Checkbook Money Bin Account 78 to be paid towards the credit card balance. When the withdrawal transaction for the Credit Card Payment 595 is entered, the Never Red Register 10 provides instructions for the computational circuitry 3 of the digital device to automatically implement the Say Go Green Function 84 for a withdrawal. The Say Go Green Function 84 invokes the Currency Interval Function 83 to determine the Currency Interval Allocation 85 which in this example is $0.66 which is combined with the Say Go Green Allocation 46 amount of $1.00, so the Say Go Green Total Allocation 87 is $1.66. The Say Go Green Total Allocation 87 of $1.66 is combined with the Credit Card Payment Amount 595 of $325.44 for a Total Withdrawal Amount 122 of $327.00 that is withdrawn from the Checkbook Forever Black Account 88. The Say Go Green Function 84 invokes the Goal Allocation Function 365 to determine the Goal Allocation 366 which in this example is an exact amount of $0.25. The Goal Allocation Function 365 withdraws the Goal Allocation 366 from the Say Go Green Total Allocation 87 of $1.66 leaving a Say Go Green Allocation Remainder 89 of $1.41. The Goal Allocation of $0.25 is deposited in the Vacation Goal Account 315. The Say Go Green Function 84 invokes the Drawer Allocation Function 291 which determines and withdraws the Drawer Allocation 293 of 10% from the Say Go Green Allocation Remainder 89 of $1.41 leaving a Say Go Green Total Remainder 91 of $1.27 after invoking the Currency Interval Function 83 to round-down the Drawer Allocation 293 and round-up the Say Go Green Total Remainder 91 each to the lowest denomination of currency. The Drawer Allocation 293 of $0.14 is deposited in the Concert Drawer Account 362 and the Say Go Green Total Remainder 91 of $1.27 is deposited in the Say Go Green Account 86. The Checkbook Forever Black Account 88 balance in this example is $2460.00, the balance in the Vacation Goal Account 315 is $100.50, the balance in the Concert Drawer Account 362 is $320.52, and the balance of the Say Go Green Account 86 is $52.92. Importantly, the actual credit card payment made by the user to their credit card company is $325.44. The operational steps performed by the Never Red Register 10 are to present to the user indicators and guidelines that the user may use to more effectively manage the use of their credit card and finances. The user must enter accurate information for the Never Red Register 10 to provide proper indicators to assist the user. In using the Never Red Register 10, the user improves their understanding of their finances and by adhering to the guidelines and indicators provided achieves control of their finances to manage debt, achieve financial goals, save for retirement and meet their expenses.

As shown in FIG. 54A, in this example, the Granite Sum Account 80 balance is $2582.98 for the Checkbook Money Bin Account 78, the Granite Sum Account 80 balance is $942.75 for the My Savings Money Bin Account 270 and the balance of the Granite Gold Account 582 is $3460.60. By entering the payment towards the credit card balance, the Never Red Register 10 has applied funds towards the Total Credit Card Debt 554 and towards the Forever Gold Account 588 to provide a total amount that a user may charge on their credit card without going over their Credit Card Limit 566. The Forever Gold Account 588 balance and the Say Go Gold Account 590 balance that are combined to determine the Granite Gold Account 582 balance are shown in FIG. 54B. The Never Red Register 10 assists in preventing a user from charging more than their Credit Card Limit 566 thereby helping the user to better manage their finances and more easily reach their financial objectives.

In some embodiments, the Never Red Register 10 provides for a user to sync data between one or more devices to have a user be able to access data for example from their iPhone and iPad or with other devices such as a desktop to easily review data and perform transactions. As shown in FIG. 55A, Device Sync Settings 610 provide for a user to sync data between two devices using a wireless or Bluetooth type connection. In the Device Sync Settings 610 a Sync Toggle Button 612 may be turned on to find available devices to sync to and connect to transmit and receive data from and to a synced device. As shown, the Connected Devices 614 are listed by a Device Name 616 and as data is entered on the first device, the user may turn the Sync Toggle Button 612 to an active position to transmit the data to a second device. To sync to the device, the user selects the Sync 618 option and communication between the devices is established. The transmission of data is secured and encrypted, and the option to establish communication with a synced device using the Sync Toggle Button 612 provides added security. Leaving the Sync Toggle Button 612 in an active position allows data between synced devices to be transmitted and received automatically to maintain updated information at all access points to the Never Red Register 10. In some embodiments, a code or PIN must also be entered and further verification through a text or email to the device that includes a confirmation code may be required to establish communication with a synced device and transmit or receive data to further protect the user's financial information. A synced device may be removed by selecting the device and selecting the Remove Device 620 option. In selecting to remove a device a Remove Sync Device Prompt 622 provides the options to the user to select Remove Device 620 or to Cancel 624 and have the device remained synced. If a device is removed an encrypted copy of the Never Red Register 10 with data up to the time of removal remains on the device, for updating when the user selects to reestablish communication with the device. Having the option to sync devices, allows the user to more easily access their financial data and better manage their financial goals using the Never Red Register 10.

In some embodiments, the Never Red Register 10 may be accessed or be synced with an Apple Watch 630 as shown in FIG. 56A or be accessed on another type of wearable or hand held digital device. The Quick Check 90 screen may be provided to display a quick view of the Forever Black Account 88 balance showing total available funds within the Never Red Register 10 and the Say Go Green Account 86 balance showing the user has available for spending without effecting the user's scheduled expenses using the Calendar Option 252 features or other financial goals. Touching the screen or selecting the button 632 of the Apple Watch 630 allows the user to enter the Never Red Register 10 and perform transactions and review their financial data. For security of the user's financial information, a code or PIN 634 is entered to access the Never Red Register 10 as shown in FIG. 56B. A Cancel 636 option is provided to select if the user decides to not access the Never Red Register 10.

In some embodiments, withdrawal transactions are automatically entered and transformed using the Say Go Green Function 84 and other transformation functions of the Never Red Register 10 using a mobile or wireless payment system such as Apple Pay. As shown in FIG. 57A, when using Apple Pay or another mobile payment system, a Select Account 638 prompt is displayed for the user to select the account to have the transaction withdrawn from by selecting a Forever Black Account Prompt 640, a Say Go Green Account Prompt 642, or Visa Credit Account Prompt 644 to have a purchase from a retail store be automatically entered as a withdrawal transaction or a charge In automatically entering the transaction the Never Red Register 10 implements the Say Go Green Function 84 and transforms the withdrawal amount to allocation of assets to the user's Say Go Green Account 86, Silver Savings Account 220, Goal Accounts 314 and Drawer Accounts 282 to assist in effectively managing the user's finances. A similar function using Apple Pay or another mobile payment system may be provided using an Apple Watch 630 or other wearable for the user to easily select an account and have a withdrawal or another transaction be automatically entered into the Never Red Register 10, as shown in FIG. 57B. In other embodiments, the Never Red Register 10 may be integrated with a financial institutions bank statements and other account information to automatically enter a series of transactions, with each transaction implementing the Say Go Green Function 84 to "Pay Yourself First" to help a user better understand their financial objectives. The Never Red Register 10 transforms financial data to useful information and provides successful strategies to teach a user in financial management and asset allocation to improve their financial habits by limiting spending and alerting the user when financial goals are met.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. One or more non-transitory computer-readable media for the registration of assets to optimize the utilization and availability of assets without the transfer of actual assets, including computer instructions for performing a method comprising:
   receiving asset data in a computer with a memory having storage, the asset data corresponding to a total balance stored within an account:
   receiving minimum balance requirement data as an amount required to be maintained within the account to prevent paving overage charges or fees:
   determining a sub-value indicator by decreasing the designating asset data that is equal to the asset data decreased by the amount of the minimum balance requirement data as a sub value indicator;
   displaying a visually perceptible element that indicates the total balance of the account as the value of the sub-value indicator instead of the asset data to prevent a user from spending more than the asset data in order to have the user avoid paving overage charges or fees:
   receiving an electronic communication containing a transaction of the asset data comprising a transaction amount:
   creating a transactional allocation:
   adjusting the transaction amount by the transactional allocation:
   designating the transactional allocation as spendable assets:
   adjusting the sub-value indicator by the transactional allocation and the remaining transaction amount:
   designating the adjusted sub-value indicator as available assets:
   displaying a visually perceptible element that indicates to a user that the spendable assets are assets that may be spent without impacting the user's financial goals.

2. The one or more non-transitory computer-readable media for the registration of assets to optimize the utilization and availability of assets without the transfer of actual assets of claim 1 comprising:
   receiving an electronic communication containing a transaction amount designated as a withdrawal amount;
   creating a currency interval allocation as the withdrawal amount rounded-up to an interval of currency;
   adjusting the withdrawal amount by the currency interval allocation and the transactional allocation;
   combining the transactional allocation and the currency interval allocation with the assets designated as spendable assets in order to increase the assets designated as spendable assets on each transaction amount designated as a withdrawal amount;
   adjusting the sub-value indicator by the remaining withdrawal amount;
   designating the adjusted sub-value indicator as available assets.

3. The one or more non-transitory computer-readable media for the registration of assets to optimize the utilization and availability of assets without the transfer of actual assets of claim 1 comprising:
   receiving an electronic communication containing a transaction amount designated as a deposit amount;
   creating a currency interval allocation as the deposit amount rounded-down to an interval of currency;
   adjusting the deposit amount by the currency interval allocation and the transactional allocation;
   combining the transactional allocation and the currency interval allocation with the assets designated as spendable assets in order to increase the assets designated as spendable assets on each transaction amount designated as a deposit amount:
   adjusting the sub-value indicator by the remaining deposit amount;
   designating the adjusted sub-value indicator as available assets.

4. The one or more non-transitory computer-readable media for the registration of assets to optimize the utilization and availability of assets without the transfer of actual assets of claim 1 comprising:

creating the transactional allocation as a fixed asset amount in order to set the increase to the spendable assets to a fixed amount.

5. The one or more non-transitory computer-readable media for the registration of assets to optimize the utilization and availability of assets without the transfer of actual assets of claim 1 comprising:
creating the transactional allocation as a fixed percentage multiplied by a transaction amount in order to set the increase to the spendable assets to a variable amount.

6. The one or more non-transitory computer-readable media for the registration of assets to optimize the utilization and availability of assets without the transfer of actual assets of claim 1 comprising:
displaying the assets designated as available;
displaying the assets designated as spendable;
displaying the sub-value indicator.

7. The one or more non-transitory computer-readable media for the registration of assets to optimize the utilization and availability of assets without the transfer of actual assets of claim 1 comprising:
receiving an electronic communication containing a transaction amount designated as a transfer amount and comprising the transfer of assets from assets designated as available assets to the assets designated as spendable assets;
creating a currency interval allocation as the transfer amount rounded-up to an interval of currency;
adjusting the transfer amount by the currency interval allocation and the transactional allocation;
combining the transactional allocation and the currency interval allocation with the assets designated as spendable assets in order to increase the assets designated as spendable assets on each transaction amount designated as a transfer amount comprising the transfer of assets from
assets designated as available assets to the assets designated as spendable assets:
adjusting the sub-value indicator by the remaining transfer amount;
designating the adjusted sub-value indicator as available assets.

8. The one or more non-transitory computer-readable media for the registration of assets to optimize the utilization and availability of assets without the transfer of actual assets of claim 1 comprising:
receiving an electronic communication containing a transaction amount designated as a transfer amount and comprising the transfer of assets from the assets designated as spendable assets to the assets designated as available assets;
creating a currency interval allocation as the transfer amount rounded-down to an interval of currency;
adjusting the transfer amount by the currency interval allocation and the transactional allocation in order to decrease the amount transferred from the spendable assets on each transaction amount designated as a transfer amount comprising the transfer of assets from the
assets designated as spendable assets to the assets designated as available assets;
adjusting the sub-value indicator by the remaining transfer amount; designating the adjusted sub-value indicator as available assets.

9. The one or more non-transitory computer-readable media for the registration of assets to optimize the utilization and availability of assets without the transfer of actual assets of claim 1 comprising:
creating an asset register; the asset register comprising:
the date, time and description of a plurality of transactions of the sub-value indicator, the assets designated as available assets, and the assets designated as spendable assets; storing the asset register; displaying the asset register; transmitting the asset register.

10. The one or more non-transitory computer-readable media for the registration of assets to optimize the utilization and availability of assets without the transfer of actual assets of claim 1 comprising:
receiving an electronic communication containing a transaction of asset data and comprising a transaction amount;
creating a retirement allocation;
adjusting the transaction amount by the retirement allocation; designating the retirement allocation as a retirement asset in order to increase the assets designated as a retirement allocation on each transaction:
creating a currency interval allocation as the remaining transaction amount rounded-down to an interval of currency;
adjusting the remaining transaction amount by the transactional allocation and the currency interval allocation;
combining the transactional allocation and the currency interval allocation with the assets designated as spendable assets in order to increase the assets designated as spendable assets on each retirement allocation;
adjusting the sub-value indicator by the total remaining transaction amount;
designating the adjusted sub-value indicator as available assets.

11. The one or more non-transitory computer-readable media for the registration of assets to optimize the utilization and availability of assets without the transfer of actual assets of claim 1 comprising:
receiving an electronic communication containing a transaction of asset data and comprising a transaction amount;
creating a drawer allocation;
adjusting the transaction amount by the drawer allocation;
designating the drawer allocation as a drawer asset in order to increase the assets designated as a drawer allocation on each transaction:
creating a currency interval allocation as the remaining transaction amount rounded-up to an interval of currency;
adjusting the remaining transaction amount by the transactional allocation and the currency interval allocation;
combining the transactional allocation and the currency interval allocation with the assets designated as spendable assets in order to increase the assets designated as spendable assets on each drawer allocation:
adjusting the sub-value indicator by the total remaining transaction amount;
designating the adjusted sub-value indicator as available assets.

12. The one or more non-transitory computer-readable media for the registration of assets to optimize the utilization and availability of assets without the transfer of actual assets of claim 1 comprising:
receiving an electronic communication containing a transaction of asset data and comprising a transaction amount;

adjusting the transaction amount by the transactional allocation; creating a drawer allocation;

adjusting the transactional allocation by the drawer allocation in order to increase the assets designated as a drawer allocation on each transactional allocation;

designating the drawer allocation as a drawer asset;

combining the remaining transactional allocation with the assets designated as spendable assets in order to increase the assets designated as spendable assets on each drawer allocation;

adjusting the sub-value indicator by the remaining transaction amount; designating the adjusted sub-value indicator as available assets.

13. The one or more non-transitory computer-readable media for the registration of assets to optimize the utilization and availability of assets without the transfer of actual assets of claim 1 comprising:

receiving an electronic communication containing a transaction of asset data and comprising a transaction amount;

creating a goal allocation comprising a goal amount and a date desired; adjusting the transaction amount by the goal allocation;

designating the goal allocation as a goal asset in order to increase the assets designated as a goal allocation on each transaction to achieve the goal amount by the date desired;

receiving an electronic communication containing a transactional allocation; adjusting the remaining transaction amount by the transactional allocation; combining the transactional allocation with the assets designated as spendable assets in order to increase the assets designated as spendable assets on each goal allocation;

adjusting the sub-value indicator by the total remaining transaction amount; designating the adjusted sub-value indicator as available assets.

14. The one or more non-transitory computer-readable media for the registration of assets to optimize the utilization and availability of assets without the transfer of actual assets of claim 1 comprising:

creating a retirement allocation as a fixed asset amount;
creating a drawer allocation as a fixed asset amount;
creating a goal allocation as a fixed asset amount.

15. The one or more non-transitory computer-readable media for the registration of assets to optimize the utilization and availability of assets without the transfer of actual assets of claim 1 comprising:

creating a retirement allocation as a fixed percentage multiplied by a transaction amount;

creating a drawer allocation as a fixed percentage multiplied by a transaction amount;

creating a goal allocation as a fixed percentage multiplied by a transaction amount.

16. The one or more non-transitory computer-readable media for the registration of assets to optimize the utilization and availability of assets without the transfer of actual assets of claim 1 comprising:

receiving an electronic communication containing a goal target and desired date;

determining a goal allocation by dividing the goal target by the number of days from the current date to the desired date.

17. The one or more non-transitory computer-readable media for the registration of assets to optimize the utilization and availability of assets without the transfer of actual assets of claim 1 comprising:

receiving an electronic communication containing a transaction of asset data and comprising a transaction amount;

creating a retirement allocation;

adjusting the transaction amount by the retirement allocation;

creating a drawer allocation;

adjusting the retirement allocation by the drawer allocation;

designating the drawer allocation as a drawer asset in order to increase the assets designated as a drawer allocation on each retirement allocation:

designating the remaining retirement allocation as a retirement asset in order to increase the assets designated as retirement assets on each transaction:

adjusting the remaining transaction amount by the transactional allocation;

combining the transactional allocation with the assets designated as spendable assets in order to increase the assets designated as spendable assets on each retirement allocation;

adjusting the sub-value indicator by the total remaining transaction amount; designating the adjusted sub-value indicator as available assets.

18. The one or more non-transitory computer-readable media for the registration of assets to optimize the utilization and availability of assets without the transfer of actual assets of claim 1 comprising:

receiving an electronic communication containing a transaction of asset data and comprising a transaction amount;

creating a retirement allocation;

adjusting the transaction amount by the retirement allocation; creating a goal allocation;

adjusting the retirement allocation by the goal allocation;

designating the goal allocation as a goal asset in order to increase the assets designated as a goal allocation on each retirement allocation:

designating the remaining retirement allocation as a retirement asset in order to increase the assets designated as a retirement asset on each transaction:

adjusting the remaining transaction amount by the transactional allocation; combining the transactional allocation with the assets designated as spendable assets in order to increase the assets designated as spendable assets on each retirement allocation:

adjusting the sub-value indicator by the total remaining transaction amount; designating the adjusted sub-value indicator as available assets.

19. The one or more non-transitory computer-readable media for the registration of assets to optimize the utilization and availability of assets without the transfer of actual assets of claim 1 comprising:

receiving an electronic communication containing a transaction of asset data and comprising a transaction amount;

creating a retirement allocation;

adjusting the transaction amount by the retirement allocation; designating the retirement allocation as a retirement asset in order to increase the assets designated as a retirement asset on each transaction:

adjusting the remaining transaction amount by the transactional allocation; creating a drawer allocation;

adjusting the transactional allocation by the drawer allocation; designating the drawer allocation as a drawer asset in order to increase the assets designated as a drawer asset on each retirement allocation;

combining the remaining transactional allocation with the assets designated as spendable assets in order to increase the assets designated as spendable assets on each retirement allocation;

adjusting the sub-value indicator by the total remaining transaction amount; designating the adjusted sub-value indicator as available assets.

20. The one or more non-transitory computer-readable media for the registration of assets to optimize the utilization and availability of assets without the transfer of actual assets of claim 1 comprising:

receiving an electronic communication containing a transaction of asset data and comprising a transaction amount;

creating a retirement allocation;

adjusting the transaction amount by the retirement allocation; creating a first drawer allocation;

adjusting the retirement allocation by the first drawer allocation; designating the first drawer allocation as first drawer asset in order to increase the assets designated as the first drawer asset on each retirement allocation;

designating the remaining retirement allocation as a retirement asset in order to increase the assets designated as retirement assets on each transaction;

adjusting the remaining transaction amount by the transactional allocation; creating a second drawer allocation;

adjusting the transactional allocation by the second drawer allocation; designating the second drawer allocation as a second drawer asset in order to increase the assets designated as the second drawer asset on each transactional allocation;

combining the remaining transactional allocation with the assets designated as spendable assets in order to increase the assets designated as spendable assets on each retirement allocation;

adjusting the sub-value indicator by the total remaining transaction amount; designating the adjusted sub-value indicator as available assets.

21. The one or more non-transitory computer-readable media for the registration of assets to optimize the utilization and availability of assets without the transfer of actual assets of claim 1 comprising:

receiving an electronic communication containing a transaction of asset data and comprising a transaction amount;

creating a retirement allocation;

adjusting the transaction amount by the retirement allocation; creating a drawer allocation;

adjusting the retirement allocation by the drawer allocation; designating the remaining retirement allocation as a retirement asset in order to increase the assets designated as retirement assets on each transaction:

adjusting the remaining transaction amount by the transactional allocation; adjusting the transactional allocation by the drawer allocation; designating the total drawer allocation from the retirement allocation and the transactional allocation as a drawer asset in order to increase the assets designated as drawer assets on each retirement allocation:

combining the remaining transactional allocation with the assets designated as spendable assets in order to increase the assets designated as spendable assets on each retirement allocation:

adjusting the sub-value indicator by the total remaining transaction amount; designating the adjusted sub-value indicator as available assets.

22. The one or more non-transitory computer-readable media for the registration of assets to optimize the utilization and availability of assets without the transfer of actual assets of claim 1, comprising:

receiving an electronic communication containing a transaction of asset data and comprising a transaction amount designated as a credit card payment amount;

receiving credit card limit data in a computer with a memory having storage; receiving interest rate date; receiving credit card debt data;

designating a sub-value credit limit as equal to the credit card limit data multiplied by the interest rate;

designating a sub-value indicator as the credit card limit decreased by the sub-value credit limit combined with the credit card debt;

displaying a visually perceptible element that indicates the sub-value indicator as the maximum available charge amount instead of the credit card limit to prevent a user from overcharging on their credit card in order to avoid having the user pay additional fees.

23. The one or more non-transitory computer-readable media for the registration of assets to optimize the utilization and availability of assets without the transfer of actual assets of claim 1 comprising:

receiving an electronic communication containing a transaction of asset data and comprising a transaction amount designated as a credit card payment amount;

receiving an electronic communication containing a charge transaction of credit card data and comprising a charge amount;

creating a transaction allocation;

creating a currency interval allocation as the charge amount rounded-up to an interval of currency;

adjusting the charge amount by the currency interval allocation and the transaction allocation;

combining the transaction allocation and the currency interval allocation with the sub-value indicator to decrease the maximum available charge amount to prevent a user from overcharging on their credit card in order to avoid having the user pay additional fees.

24. The one or more non-transitory computer-readable media for the registration of assets to optimize the utilization and availability of assets without the transfer of actual assets of claim 1 comprising:

receiving an electronic communication containing a transaction of asset data and comprising a transaction amount designated as a credit card payment amount;

creating a transaction allocation;

creating a currency interval allocation as the payment amount rounded-down to an interval of currency;

adjusting the payment amount by the currency interval allocation and the transaction allocation;

combining the transaction allocation and the currency interval allocation with the sub-value indicator to increase the maximum available charge amount to prevent a user from overcharging on their credit card in order to avoid having the user pay additional fees.

* * * * *